(12) United States Patent
Olson et al.

(10) Patent No.: US 12,275,604 B2
(45) Date of Patent: *Apr. 15, 2025

(54) SWEEP SYSTEM FOR FULL ELEVATED FLOOR GRAIN BINS

(71) Applicant: Sukup Manufacturing Co., Sheffield, IA (US)

(72) Inventors: Ryan Olson, Dows, IA (US); David Jay Brownmiller, Mason City, IA (US); Randal Marcks, St. Ansgar, IA (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,670

(22) Filed: Feb. 23, 2022

(65) Prior Publication Data

US 2022/0250861 A1 Aug. 11, 2022

Related U.S. Application Data

(63) Continuation-in-part of application No. 16/997,333, filed on Aug. 19, 2020, now Pat. No. 11,337,374.

(Continued)

(51) Int. Cl.
| | | |
|---|---|---|
| *B65G 65/48* | (2006.01) | |
| *A01F 25/20* | (2006.01) | |
| *B65G 69/08* | (2006.01) | |

(52) U.S. Cl.
CPC ...... *B65G 65/4836* (2013.01); *A01F 25/2018* (2013.01); *B65G 69/08* (2013.01); *B65G 2201/042* (2013.01)

(58) Field of Classification Search
CPC ............. B65G 65/4836; B65G 69/08; B65G 2201/042; A01F 25/2018

(Continued)

(56) References Cited

U.S. PATENT DOCUMENTS

| | | |
|---|---|---|
| 2,998,123 A | 8/1961 | Kooiker et al. |
| 3,014,575 A | 12/1961 | Klein |

(Continued)

FOREIGN PATENT DOCUMENTS

| | | |
|---|---|---|
| BR | 112016008674 A2 | 9/2017 |
| CA | 2927760 A1 | 4/2015 |

(Continued)

OTHER PUBLICATIONS

Norstar Industries, Grain Handling Systems, Brochure, All pages, Jan. 1, 2015, Morris Manitoba, Canada.

(Continued)

*Primary Examiner* — Glenn F Myers
(74) *Attorney, Agent, or Firm* — Christopher A. Proskey; BrownWinick Law Firm

(57) ABSTRACT

A full floor sweep system having a skeletonized head section to facilitate removal of grain from a grain bin. The sweep system having an elongated body extending a length between an inward end and an outward end and having a leading side and a trailing side. The elongated body is connected to a pivot point at the center of the grain bin and is configured to rotate around the pivot point. An agitator is connected to the outward end of the elongated body and is configured to agitate grain as the elongated body rotates around the pivot point. The agitator includes an impeller that is connected to a shaft that extends through the elongated body. A scraper is positioned at the outward end of the elongated body and is configured to move grain into the path of the elongated body.

39 Claims, 115 Drawing Sheets

Related U.S. Application Data

(60) Provisional application No. 62/889,370, filed on Aug. 20, 2019, provisional application No. 63/253,161, filed on Oct. 7, 2021.

(58) Field of Classification Search
USPC ........................................................ 414/304
See application file for complete search history.

(56) References Cited

U.S. PATENT DOCUMENTS

| | | | |
|---|---|---|---|
| 3,057,608 A | 9/1962 | Patz et al. | |
| 3,064,831 A * | 11/1962 | Cook | A01F 25/2018 222/236 |
| 3,151,749 A | 10/1964 | Long | |
| 3,175,676 A | 3/1965 | Vander Schaaf | |
| 3,356,235 A | 12/1967 | Ladig | |
| 3,394,825 A | 7/1968 | Reed | |
| 3,532,232 A | 10/1970 | Sukup | |
| 3,538,618 A | 11/1970 | Neuenschwander | |
| 3,648,660 A | 3/1972 | Wennberg | |
| 3,749,259 A | 7/1973 | Stock | |
| 3,755,917 A | 9/1973 | Lambert, Jr. | |
| 3,800,964 A | 4/1974 | Patterson | |
| 3,851,774 A | 12/1974 | Laidig | |
| 3,974,908 A | 8/1976 | Keichinger | |
| 4,008,816 A | 2/1977 | Harrison | |
| 4,029,219 A | 6/1977 | Rutten | |
| 4,057,151 A | 11/1977 | Weaver | |
| 4,063,654 A * | 12/1977 | Shivvers | B65G 65/466 414/309 |
| 4,103,788 A | 8/1978 | Sutton | |
| 4,142,621 A | 3/1979 | Oliver | |
| 4,183,706 A | 1/1980 | Jackson | |
| 4,286,909 A | 9/1981 | Tingskog | |
| 4,578,012 A | 3/1986 | Petit | |
| 4,583,903 A | 4/1986 | Hutchison | |
| 4,585,385 A | 4/1986 | Buschbom | |
| 4,701,093 A | 10/1987 | Meyer | |
| 5,099,983 A | 3/1992 | Valdez | |
| 5,167,318 A | 12/1992 | Siemens | |
| 5,988,358 A | 11/1999 | Jonkka | |
| 6,431,810 B1 | 8/2002 | Weaver | |
| 6,499,930 B1 | 12/2002 | Dixon | |
| 8,210,342 B2 | 7/2012 | Lepp | |
| 8,616,823 B1 | 12/2013 | Hoogestraat | |
| 8,739,479 B1 | 6/2014 | Nelson et al. | |
| 8,770,388 B1 * | 7/2014 | Chaon | B65G 65/425 198/550.12 |
| 8,850,758 B1 | 10/2014 | Nelson et al. | |
| 8,959,846 B2 | 2/2015 | Polzin et al. | |
| 8,967,936 B2 | 3/2015 | Sukup | |
| 8,967,937 B2 | 3/2015 | Schuelke et al. | |
| 9,055,717 B2 | 6/2015 | Stumpe et al. | |
| 9,137,950 B1 | 9/2015 | Stumpe et al. | |
| 9,156,608 B1 * | 10/2015 | Skaife | B65G 65/466 |
| 9,156,622 B1 | 10/2015 | Chaon | |
| 9,199,807 B1 | 12/2015 | Schuelke | |
| 9,288,946 B1 | 3/2016 | Schuld | |
| 9,290,335 B1 | 3/2016 | Witt | |
| 9,327,921 B1 | 5/2016 | Olson | |
| 9,546,055 B2 | 1/2017 | Hoogestraat | |
| 9,650,217 B1 | 5/2017 | Hoogestraat | |
| 9,809,402 B2 | 11/2017 | Nelson et al. | |
| 9,815,639 B2 | 11/2017 | Schuelke et al. | |
| 9,864,344 B2 | 1/2018 | Nelson et al. | |
| 9,975,711 B2 | 5/2018 | Nelson | |
| 10,011,442 B2 | 7/2018 | Witt | |
| 10,214,361 B2 | 2/2019 | Kaeb | |
| 10,220,420 B2 | 3/2019 | Witt | |
| 10,220,968 B2 | 3/2019 | Stumpe et al. | |
| 10,227,188 B1 | 3/2019 | Chaon | |
| 10,377,573 B2 | 8/2019 | Olson | |
| 10,442,641 B2 | 10/2019 | Nelson et al. | |
| 10,654,668 B2 | 5/2020 | Olson | |
| 10,676,294 B2 | 6/2020 | Harrenstein et al. | |
| 10,703,588 B1 | 7/2020 | Schram et al. | |
| 10,836,582 B2 | 11/2020 | Olson | |
| 11,104,528 B1 | 8/2021 | Bloemendaal et al. | |
| 11,111,080 B2 | 9/2021 | Rauser | |
| 11,136,205 B2 | 10/2021 | Gutwein | |
| 11,267,664 B2 | 3/2022 | Bloemendaal | |
| 11,299,358 B1 | 4/2022 | Grass et al. | |
| 11,337,374 B2 | 5/2022 | Olson | |
| 11,414,281 B2 | 8/2022 | Olson | |
| 11,454,444 B1 | 9/2022 | Bloemendaal | |
| 11,608,236 B2 | 3/2023 | Olson | |
| 11,618,639 B1 | 4/2023 | Grass et al. | |
| 11,623,829 B2 | 4/2023 | Bloemendaal | |
| 11,708,227 B2 | 7/2023 | Olson | |
| 2004/0213650 A1 | 10/2004 | Epp | |
| 2004/0228711 A1 | 11/2004 | Hanig | |
| 2005/0263372 A1 | 1/2005 | Hollander et al. | |
| 2006/0285942 A1 * | 12/2006 | Fridgen | B65G 65/466 414/133 |
| 2012/0163947 A1 | 6/2012 | Koch | |
| 2013/0064629 A1 | 3/2013 | Schuelke | |
| 2015/0210485 A1 | 7/2015 | Hoogestraat | |
| 2016/0107849 A1 | 4/2016 | Olson | |
| 2016/0152422 A1 | 6/2016 | Nelson | |
| 2017/0158443 A1 * | 6/2017 | Harrenstein | B65G 19/08 |
| 2017/0275100 A1 | 9/2017 | Olson | |
| 2018/0215559 A1 | 8/2018 | Olson | |
| 2018/0237236 A1 | 8/2018 | Klubertanz | |
| 2019/0322457 A1 | 10/2019 | Olson | |
| 2020/0290826 A1 | 9/2020 | Gutwein | |
| 2020/0361726 A1 | 11/2020 | Olson | |
| 2021/0051856 A1 | 2/2021 | Olson | |
| 2022/0250861 A1 | 8/2022 | Olson | |
| 2023/0172112 A1 | 6/2023 | Olson | |

FOREIGN PATENT DOCUMENTS

| | | |
|---|---|---|
| CA | 2963634 A1 | 4/2016 |
| CA | 2764847 C | 4/2019 |
| CA | 2775932 C | 6/2019 |
| CA | 2944342 C | 5/2022 |
| JP | 63074821 A | 4/1988 |
| WO | 2015/057835 A1 | 4/2015 |
| WO | 2015/120359 A1 | 8/2015 |
| WO | 2016/057264 A1 | 4/2016 |
| WO | 2016/141083 A1 | 9/2016 |

OTHER PUBLICATIONS

Haven Industries, Grain Saver Augers, Brochure, All pages, Jan. 1, 2015, Dexter Minnesota.
Westeel, Easyflow 2 U-Through Unload, Brochure, All pages, Jan. 1, 2015, Winnepeg Manitoba, Canada.
Sioux Steel Company, Newest Sweep Model, Brouchure, All pages, Jan. 1, 2015, Sioux Falls South Dakota.
Hutchinson, New Sweep End Wheel, Brochure, All pages, Jan. 1, 2015, Clay Center Kansas.
Springland Mfg., Automated U-Through Unload Systems, Brochure, All pages, Jan. 1, 2015, Manitoba Canada.
Brock, 16:1 Reduction Wheel Upgrade Kit S055938 for Bin Sweeps, All pages, Oct. 2016, Milford Indiana.
Brock, Bin sweeps, Brochure, All pages, Jan. 1, 2015, Milford Indiana.
Gsi Group, Bin Unloading Systems, Brochure, All pages, Jan. 1, 2015, Assumption Illinois.
Sudenga Industries, Inc., Reduction Sweep Wheel, Brochure, All pages, Jan. 1, 2015, George Iowa.
Neco, Power Sweep Bin Unloading Systems, Brochure, All pages, Jan. 1, 2015, Omaha Nebraska.
Norwood Sales Inc., The Grain Handler, Website screenshots, All pages, Jan. 1, 2015, Horace North Dakota.
United Skid Tracks, Caterpillar 249B Track—Z-Lug, Oct. 4, 2021, Murfreesboro, TN, United States.
United Skid Tracks, Caterpillar Mini Excavators, Caterpillar Tracks, Oct. 4, 2021, Murfreesboro, TN, United States.

(56) References Cited

OTHER PUBLICATIONS

Patent Cooperation Treaty, International Search Report for PCT/US2022/045775, Mar. 14, 2023.
Brock Grain Systems, Commercial Bin Sweeps & Controllers, Sep. 30, 2021, Milford, IN, United States.
Norwood Sales Inc., The Grain Handler, Website screenshots, Oct. 2, 2017, Horace North Dakota.
Sukup, Unloading Equipment, Website screenshots, Apr. 1, 2019, Sheffield Iowa.
Sukup, Zero-Entry Commercial Paddle Sweep, Website Screenshots, Feb. 9, 2018, Sheffield Iowa.
Clump Buster Installation Instructions, Norwood Sales, Inc. (retrieved Apr. 26, 2024 from https://www.norwoodsales.com/files/manuals/grain%20handler/Instructions,%20Clump%20Buster%20Installation%20(10-5-00008).pdf).
DPS 12 Bin Sweep—Assembly, Operation & Maintenance Manual, Sioux Steel, Inc., (retrieved Apr. 26, 2024 fhttps://d3otus705uizil.cloudfront.net/resources/770377-DPS-12K-Bin-Sweep-Manual-10-17-18.pdf?mtime=20181214154344).

* cited by examiner

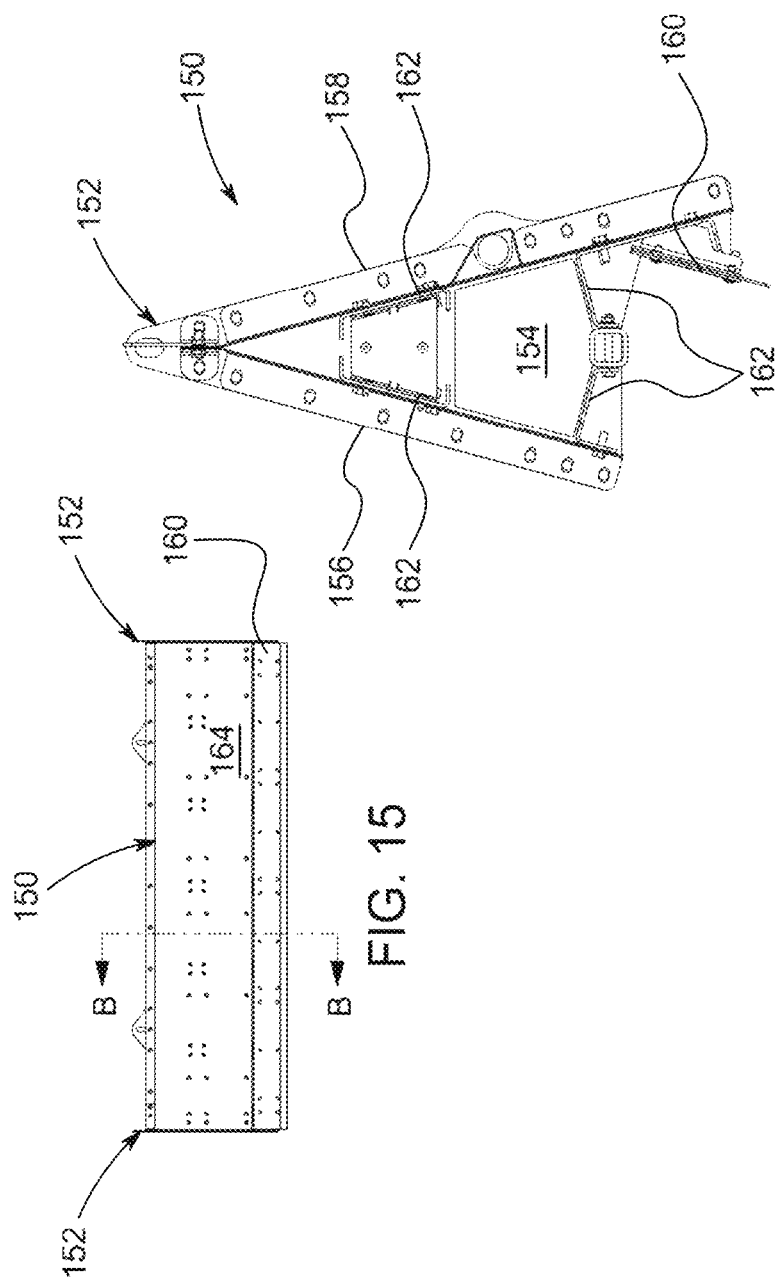

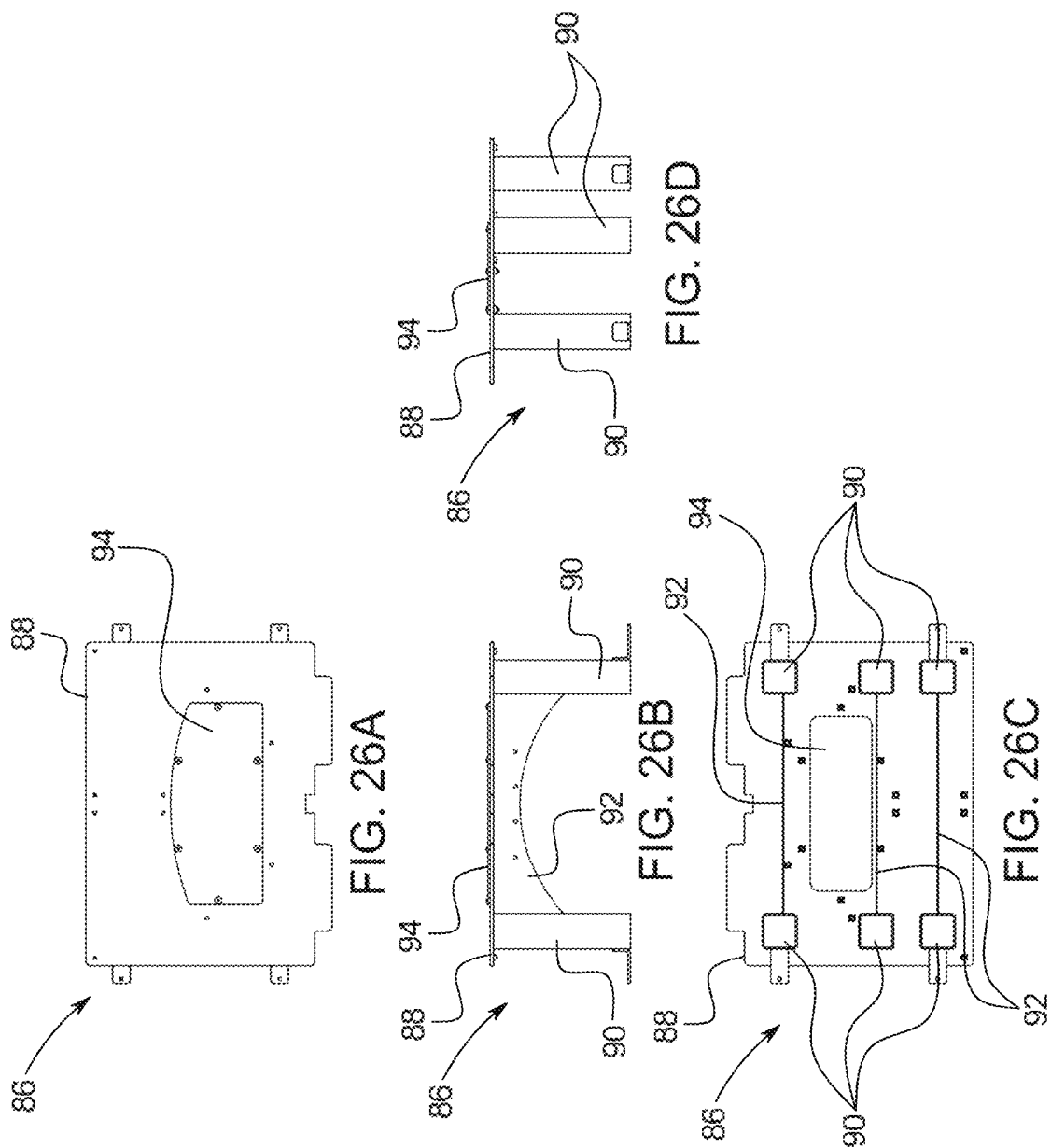

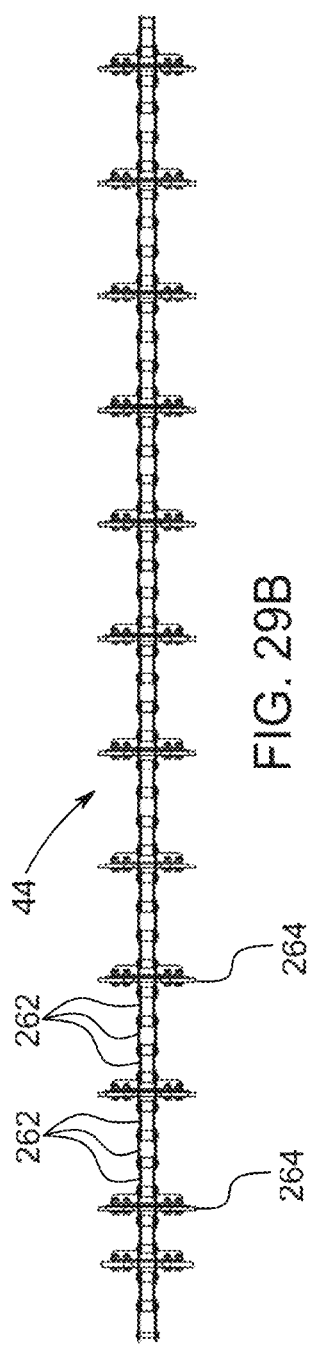
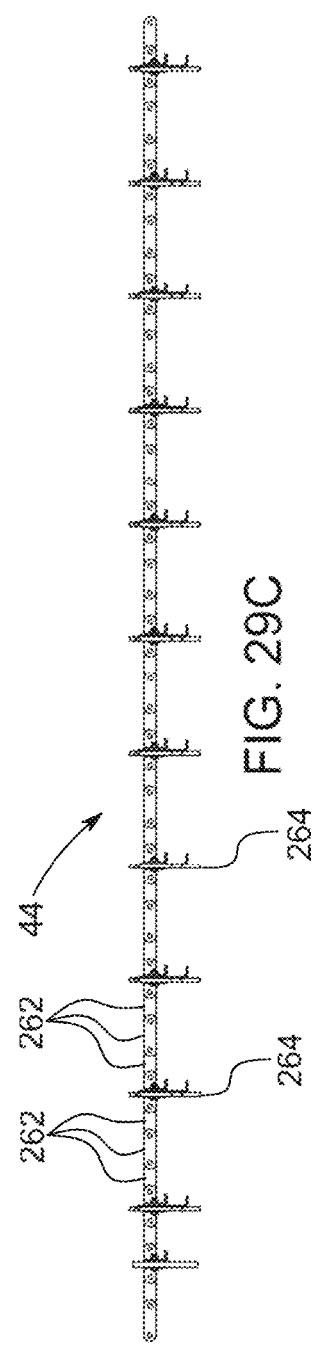
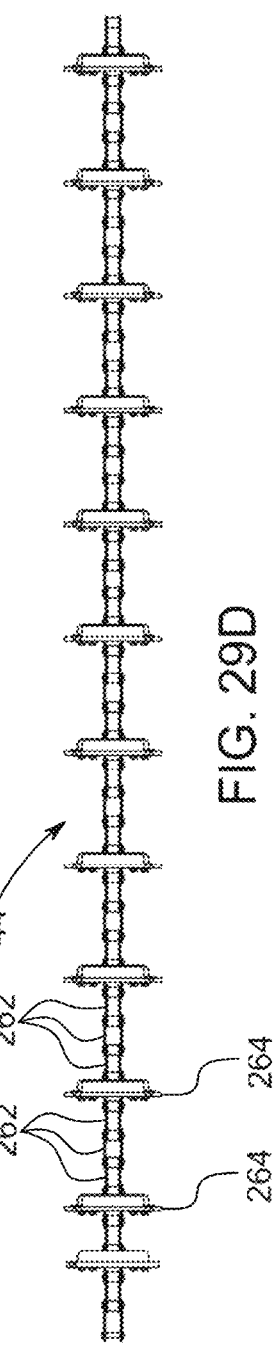
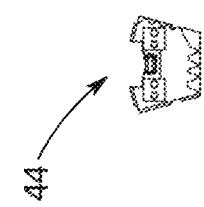
FIG. 29B
FIG. 29C
FIG. 29D
FIG. 29A

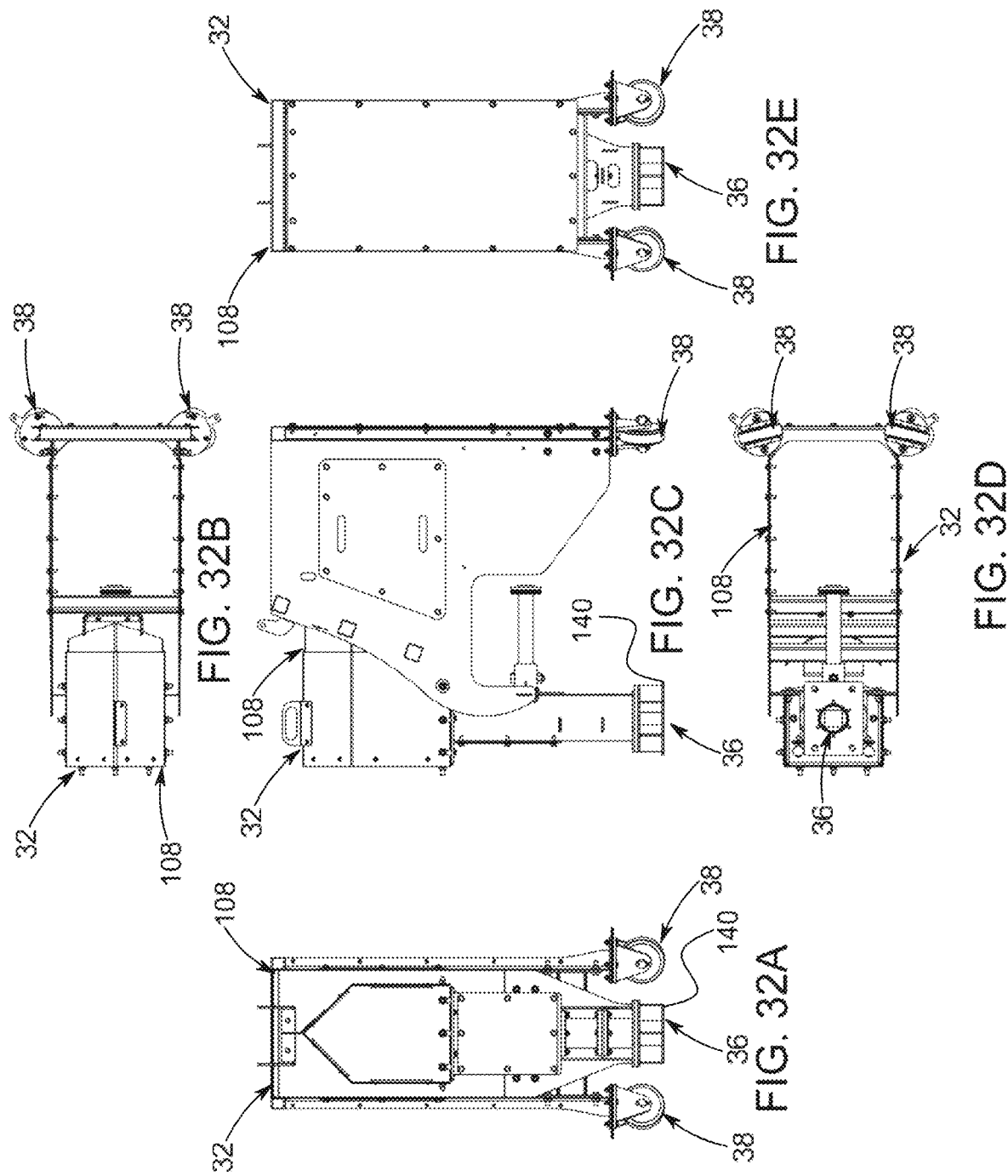

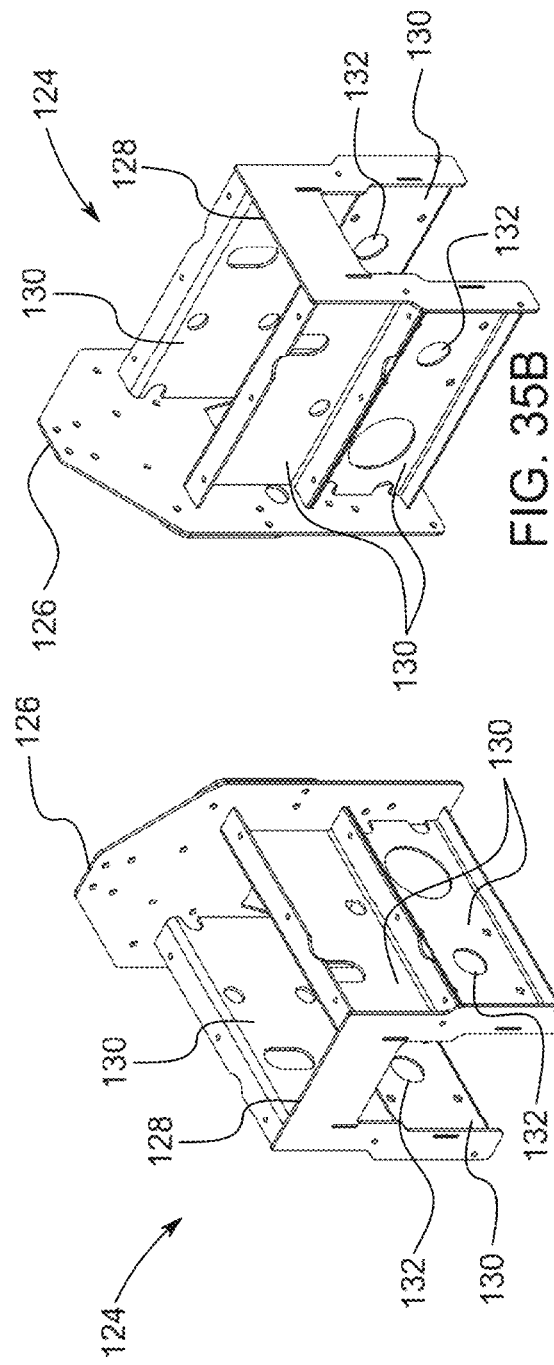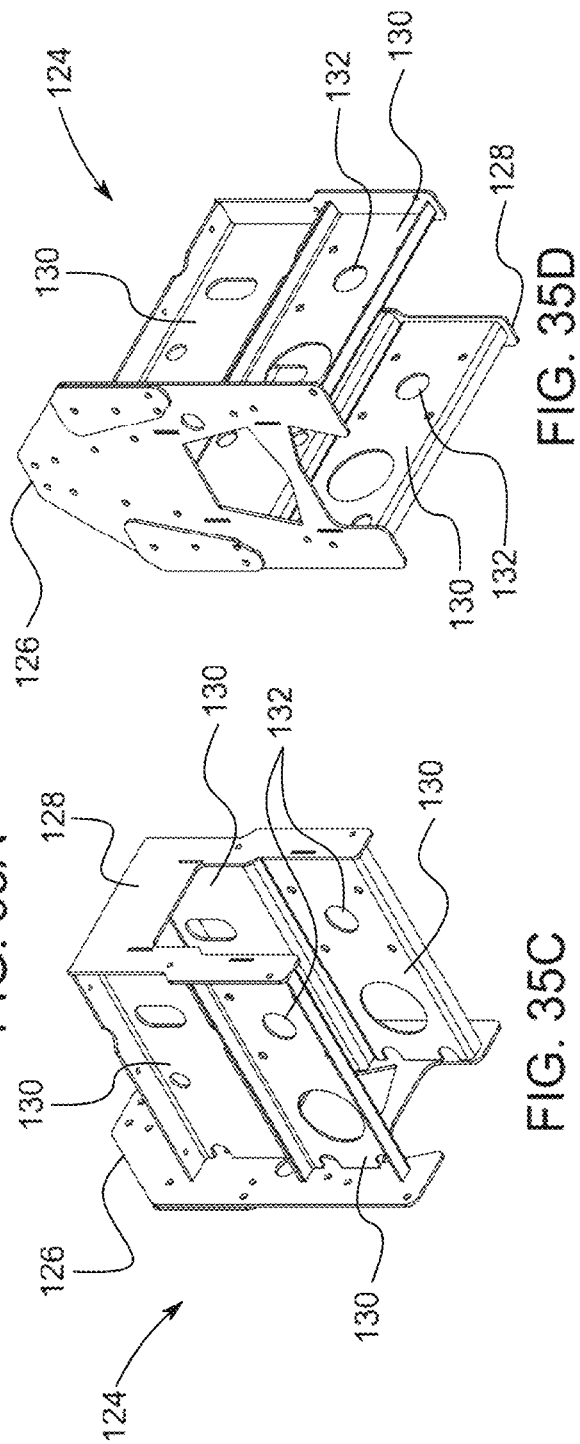

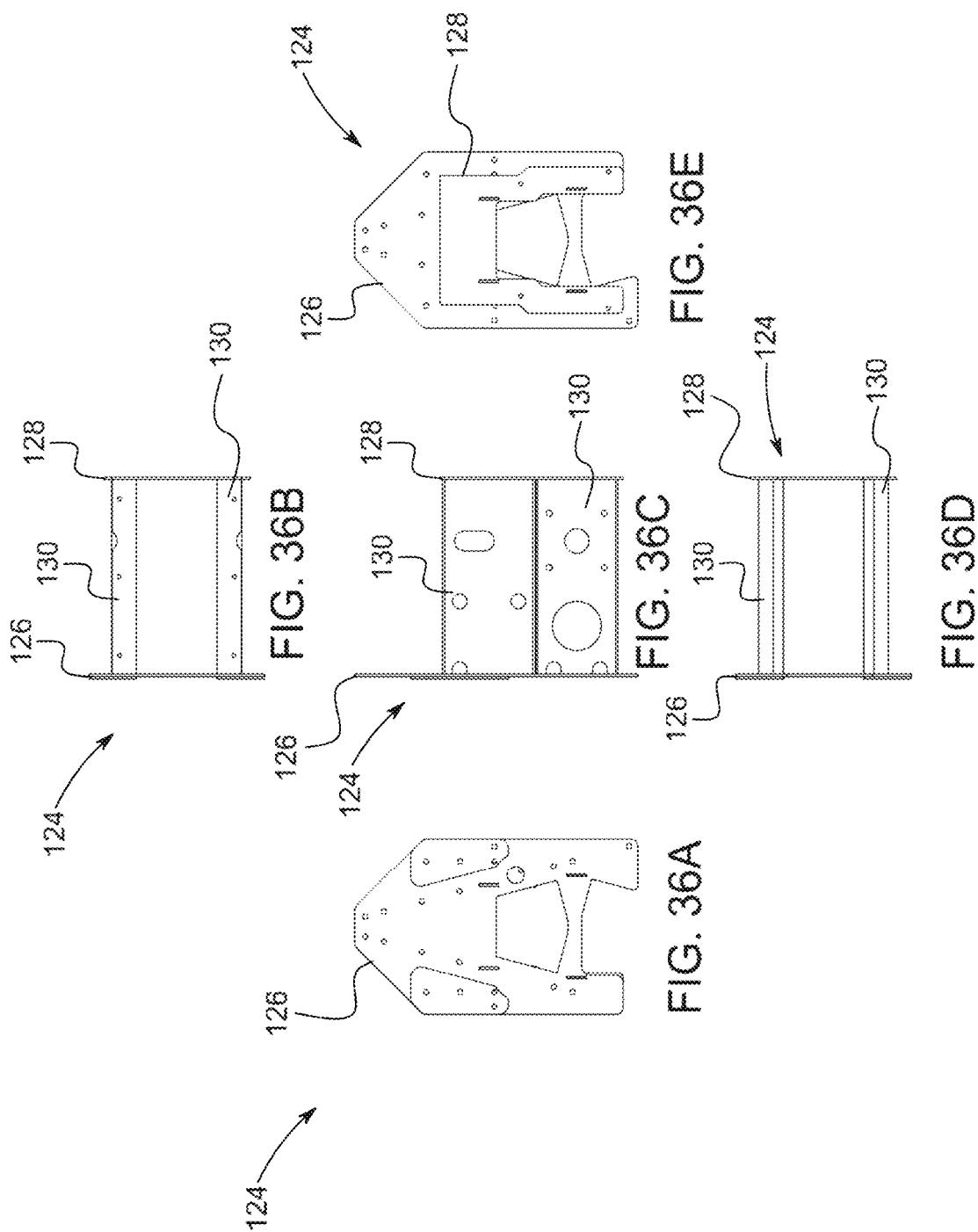

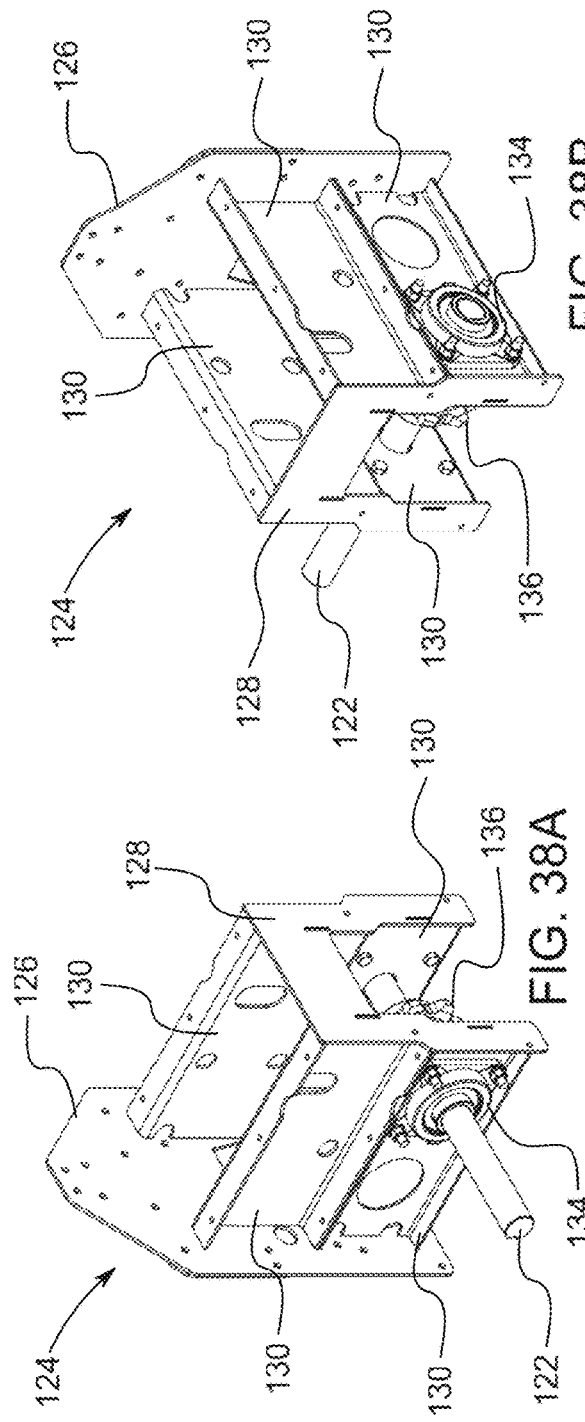
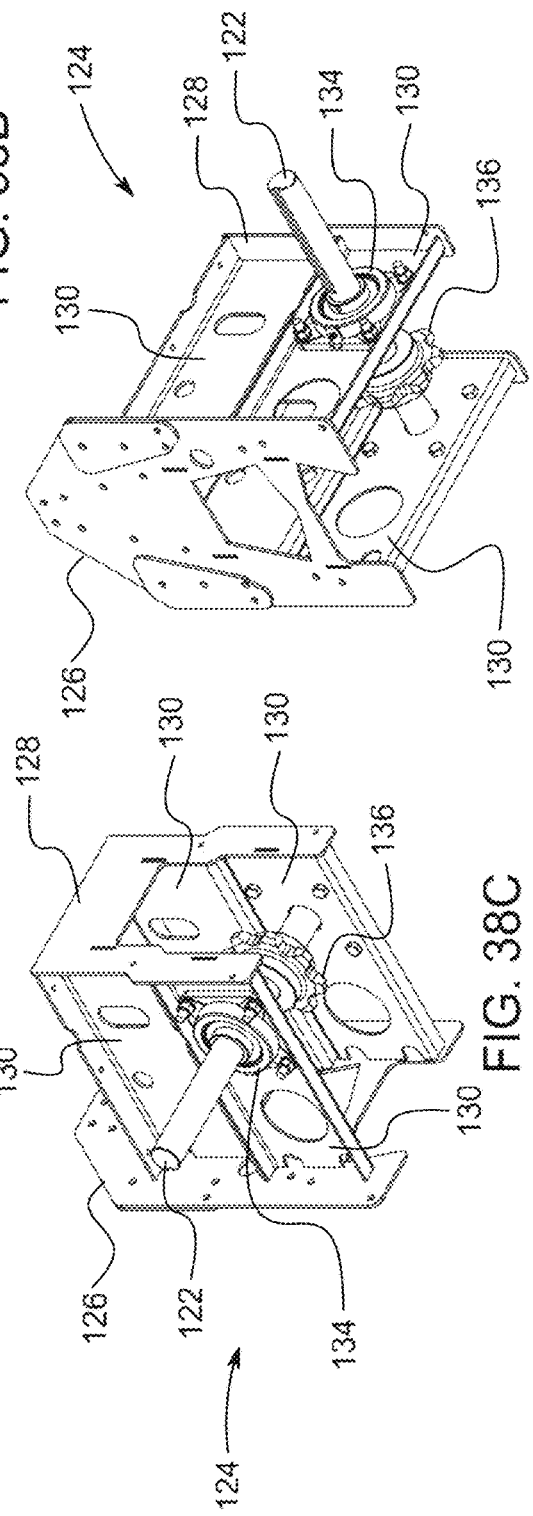
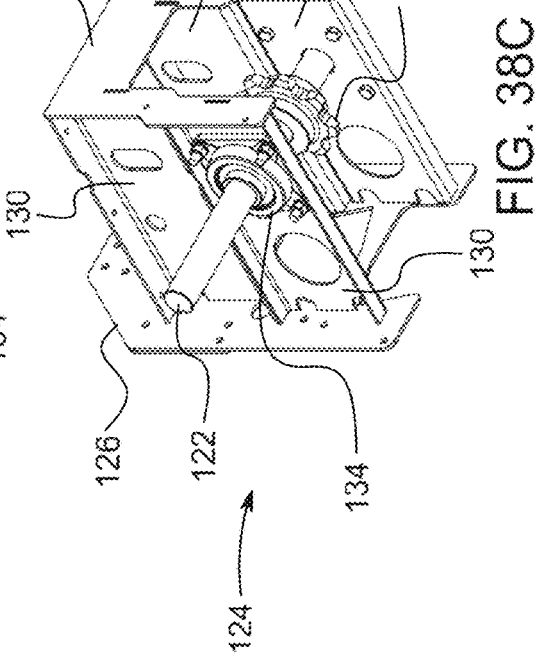
FIG. 38A  FIG. 38B  FIG. 38C  FIG. 38D

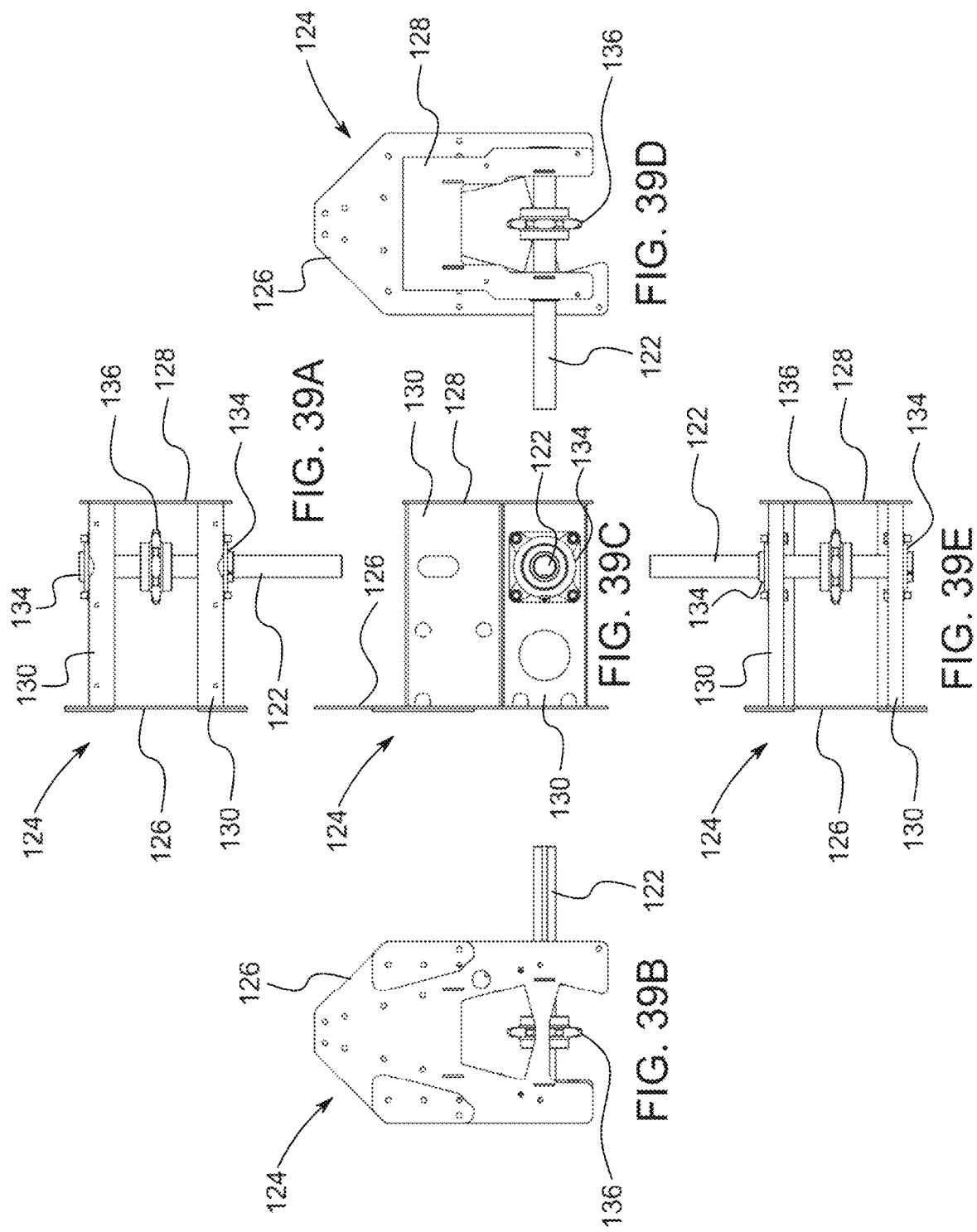

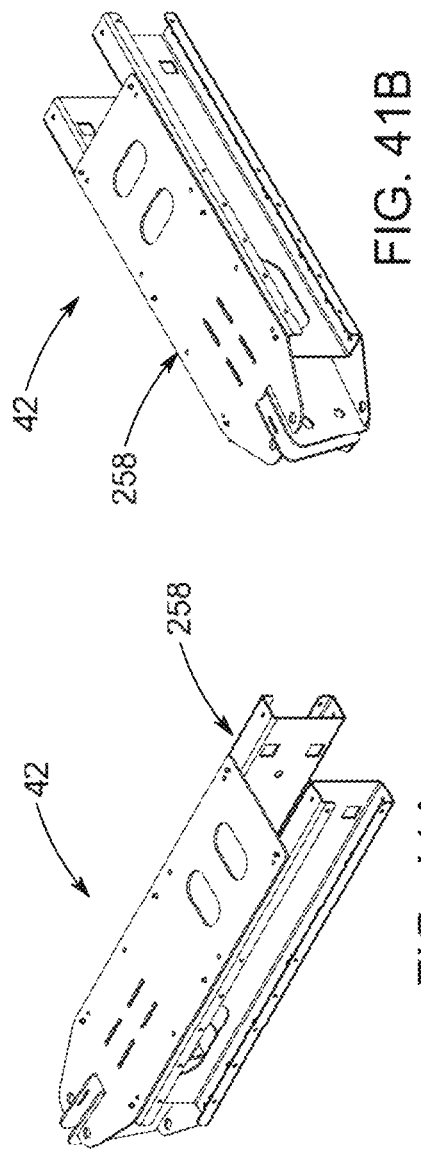
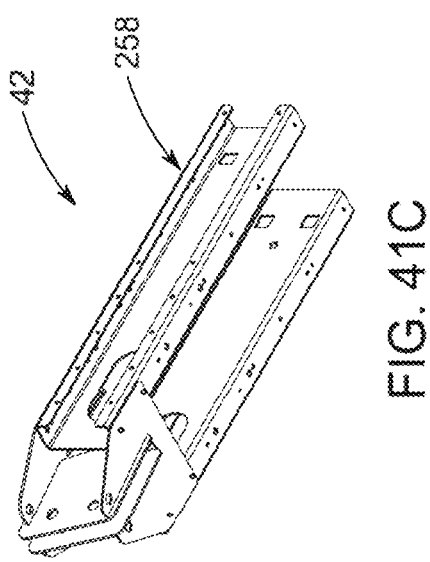
FIG. 41A
FIG. 41B
FIG. 41C

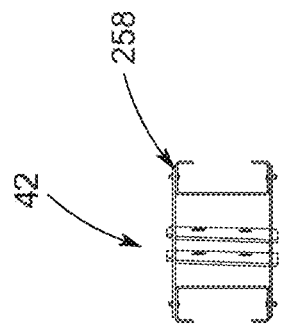
FIG. 42D
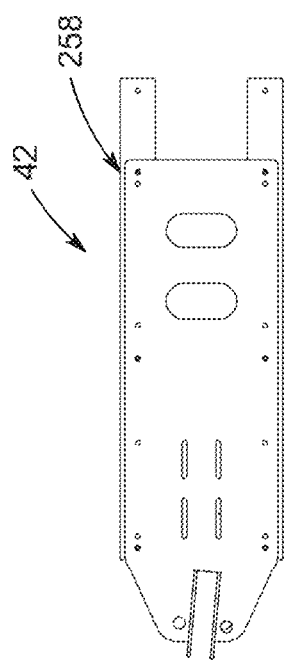
FIG. 42A
FIG. 42C
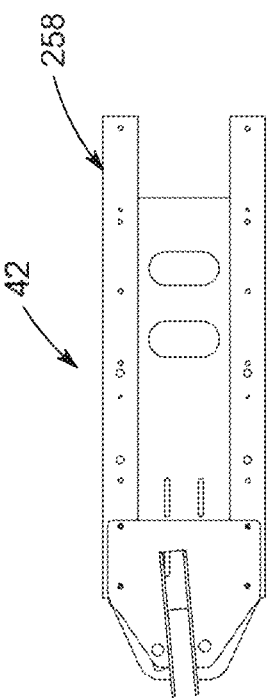
FIG. 42E
FIG. 42B

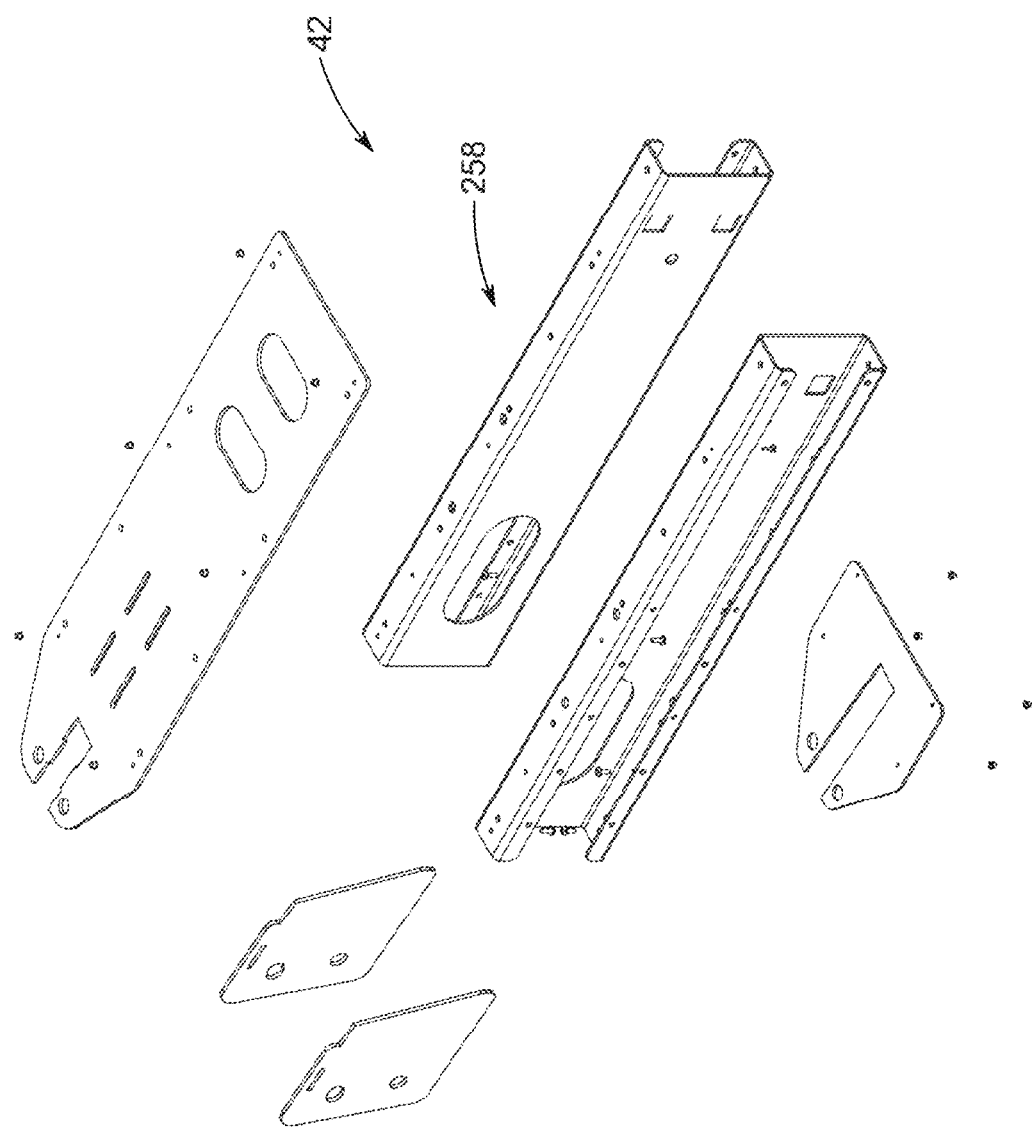

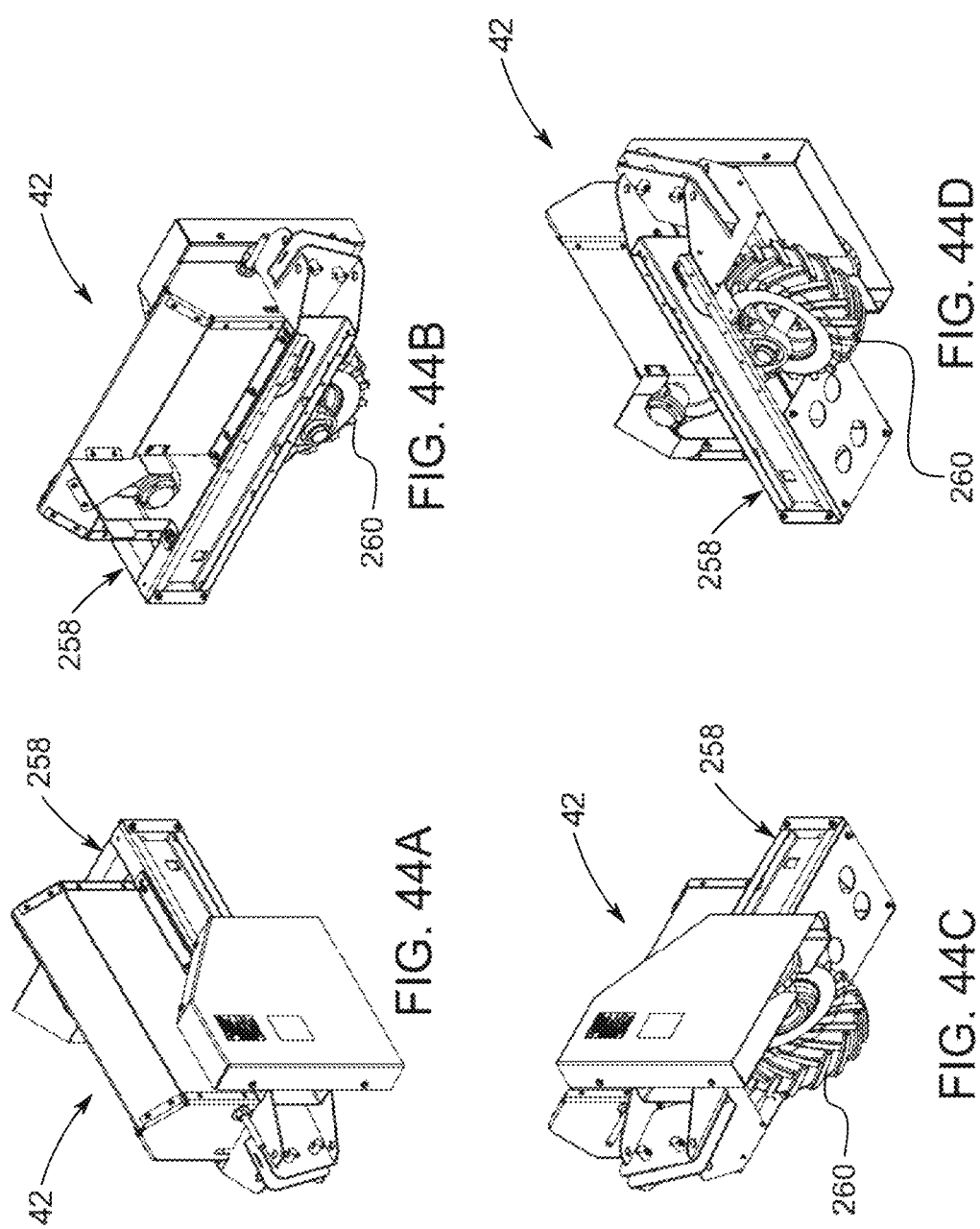

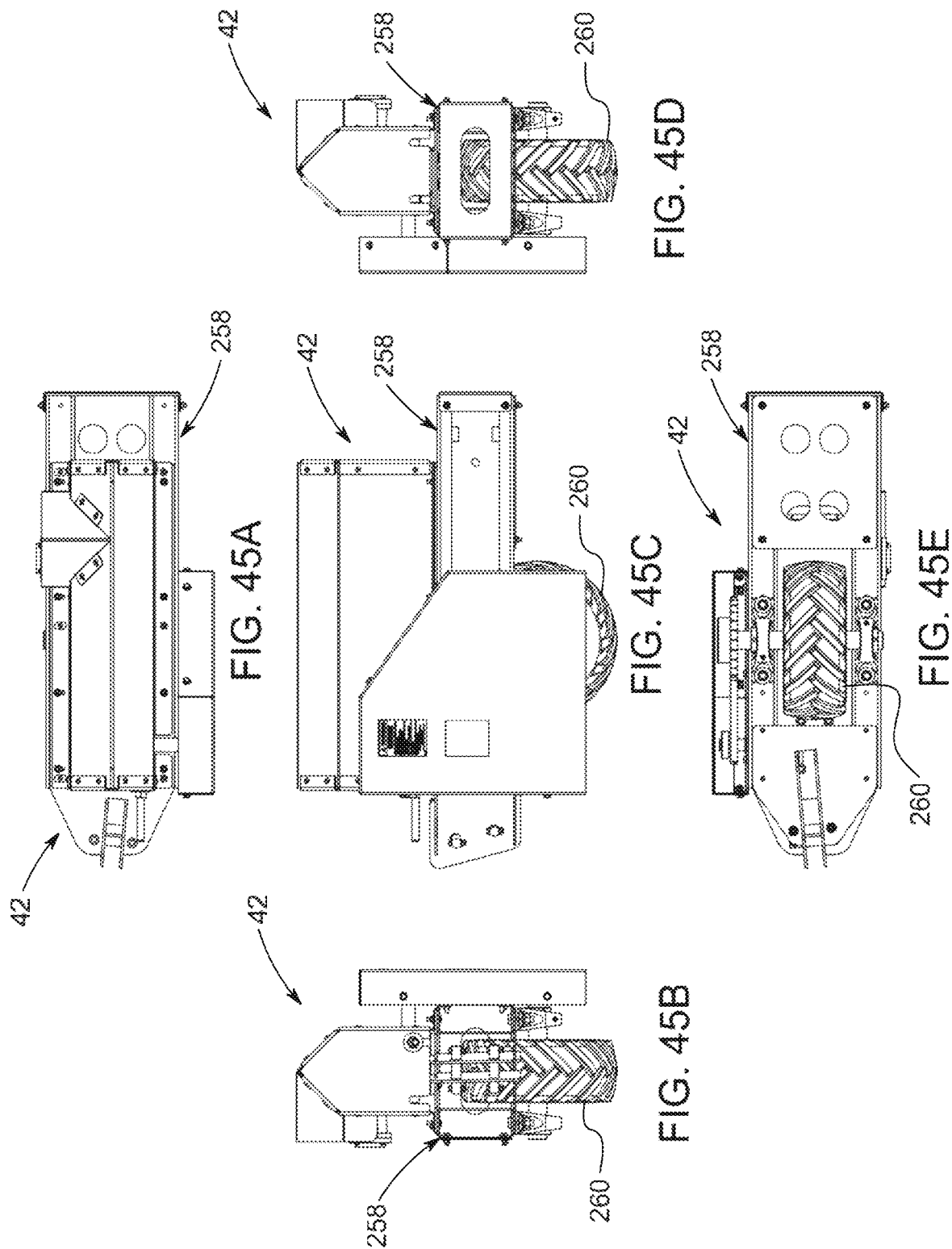

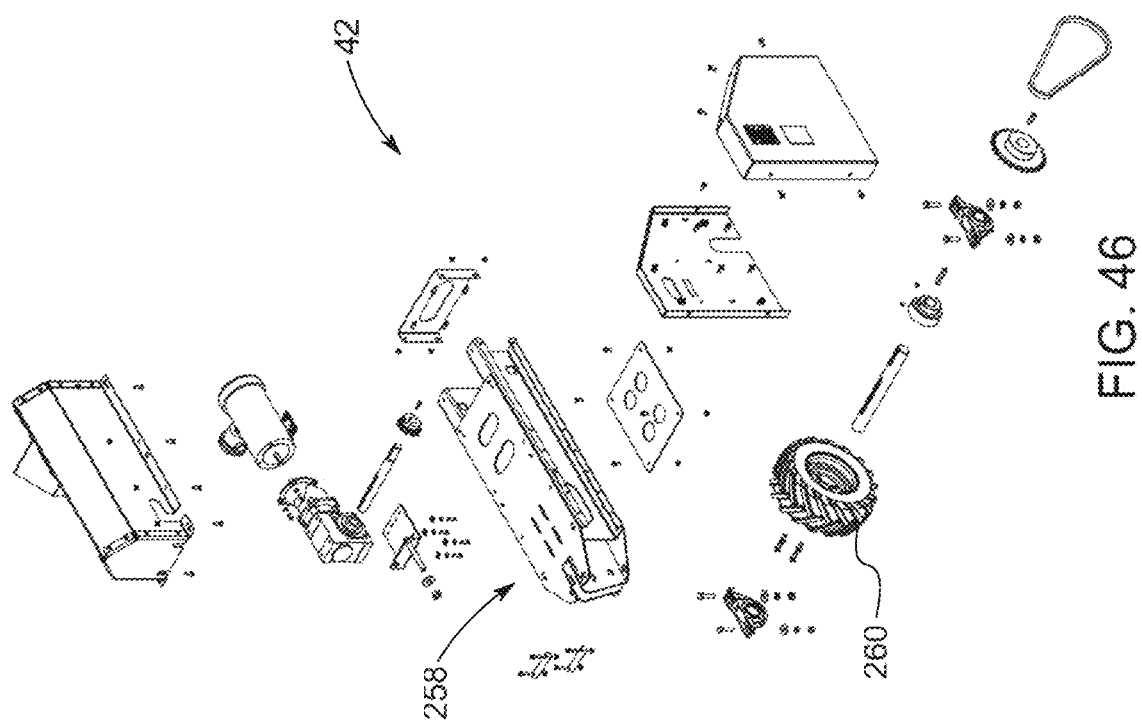

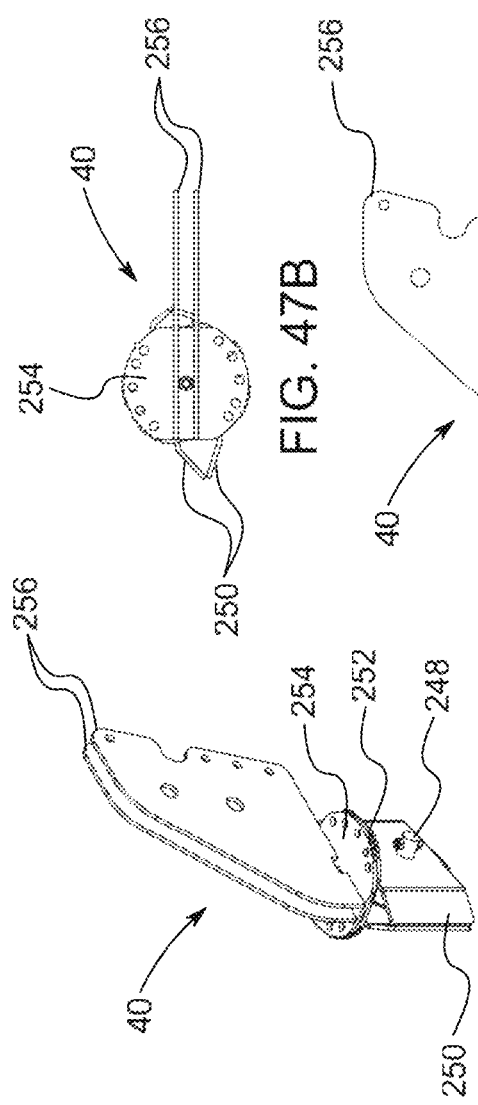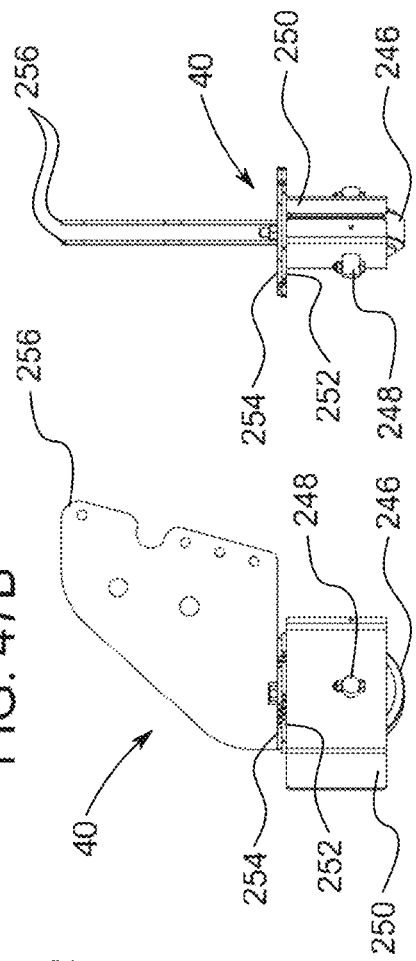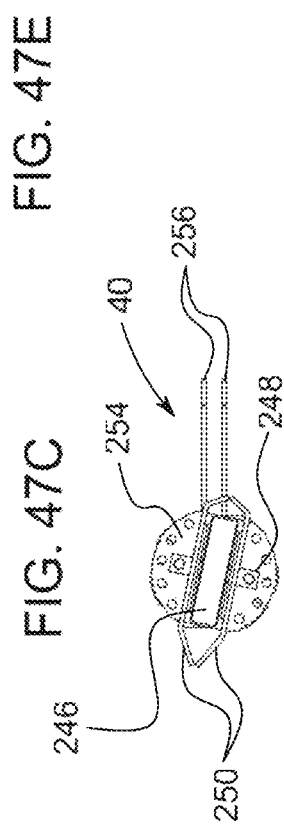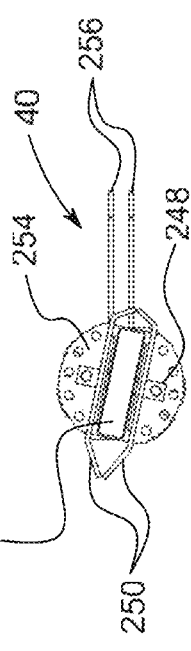
FIG. 47A  FIG. 47B  FIG. 47C  FIG. 47D  FIG. 47E

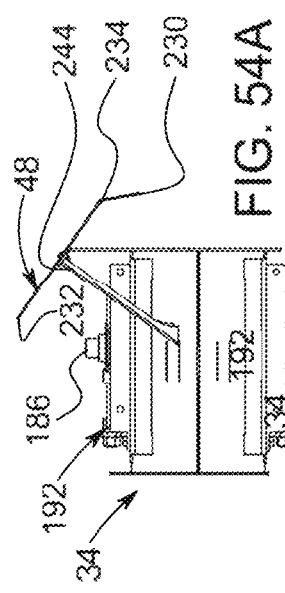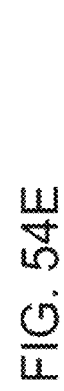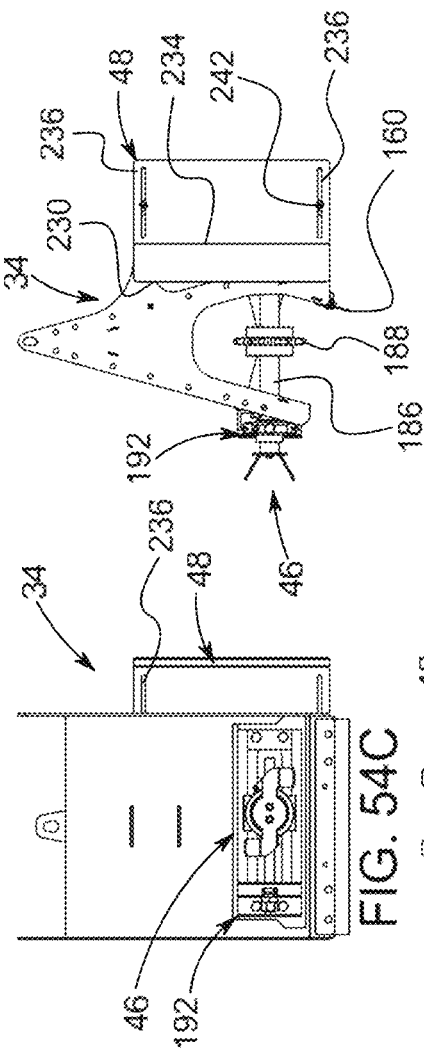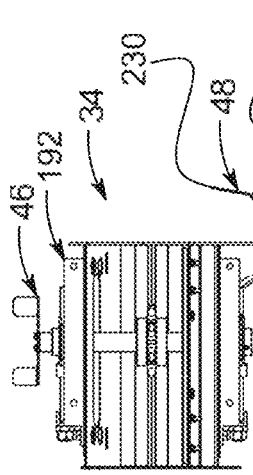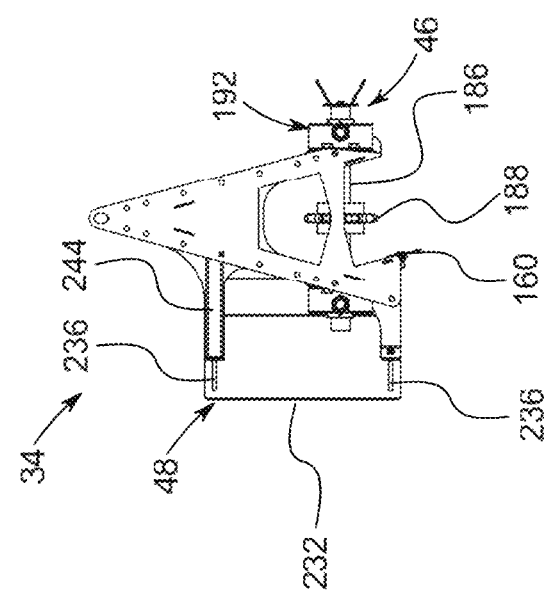

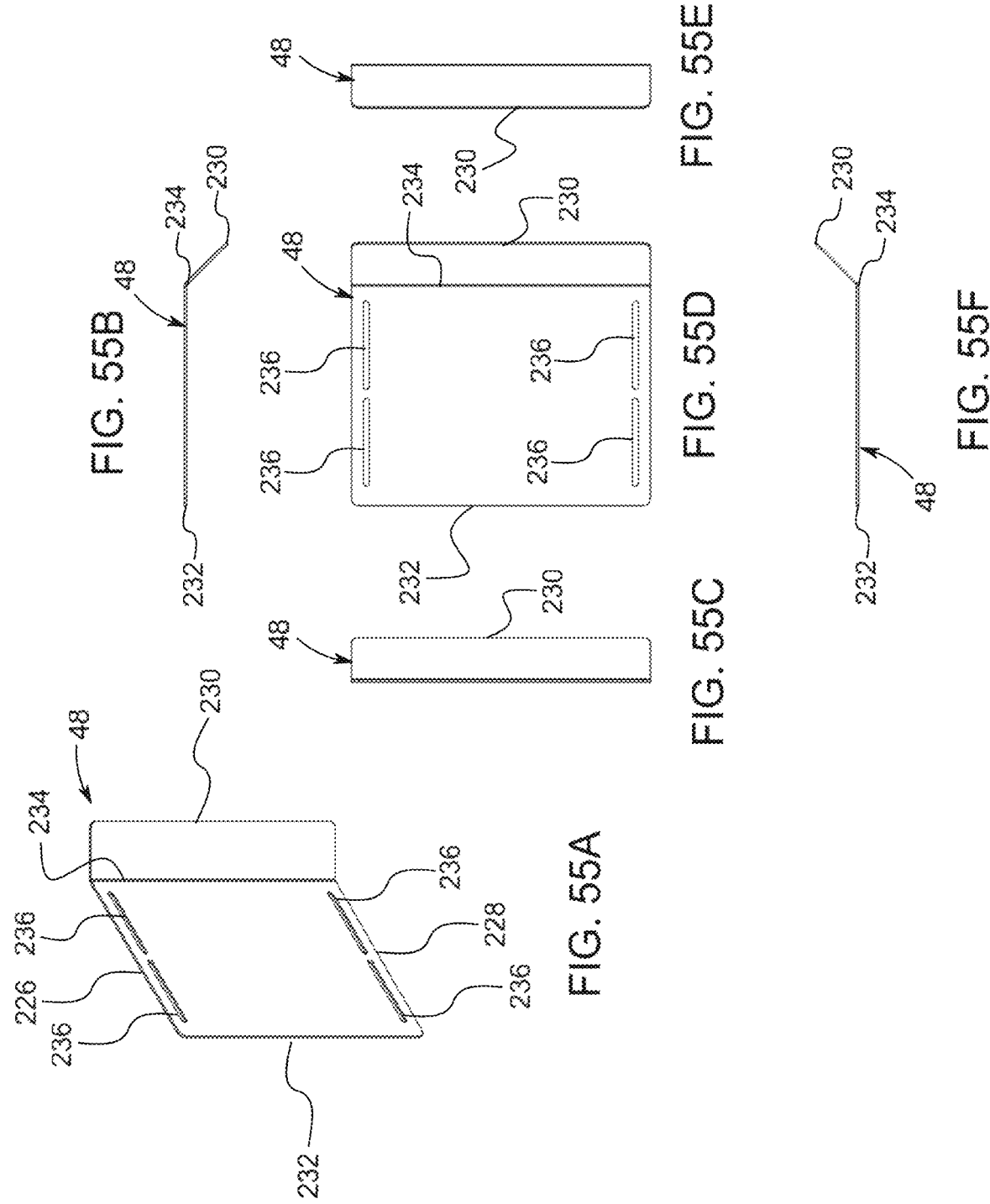

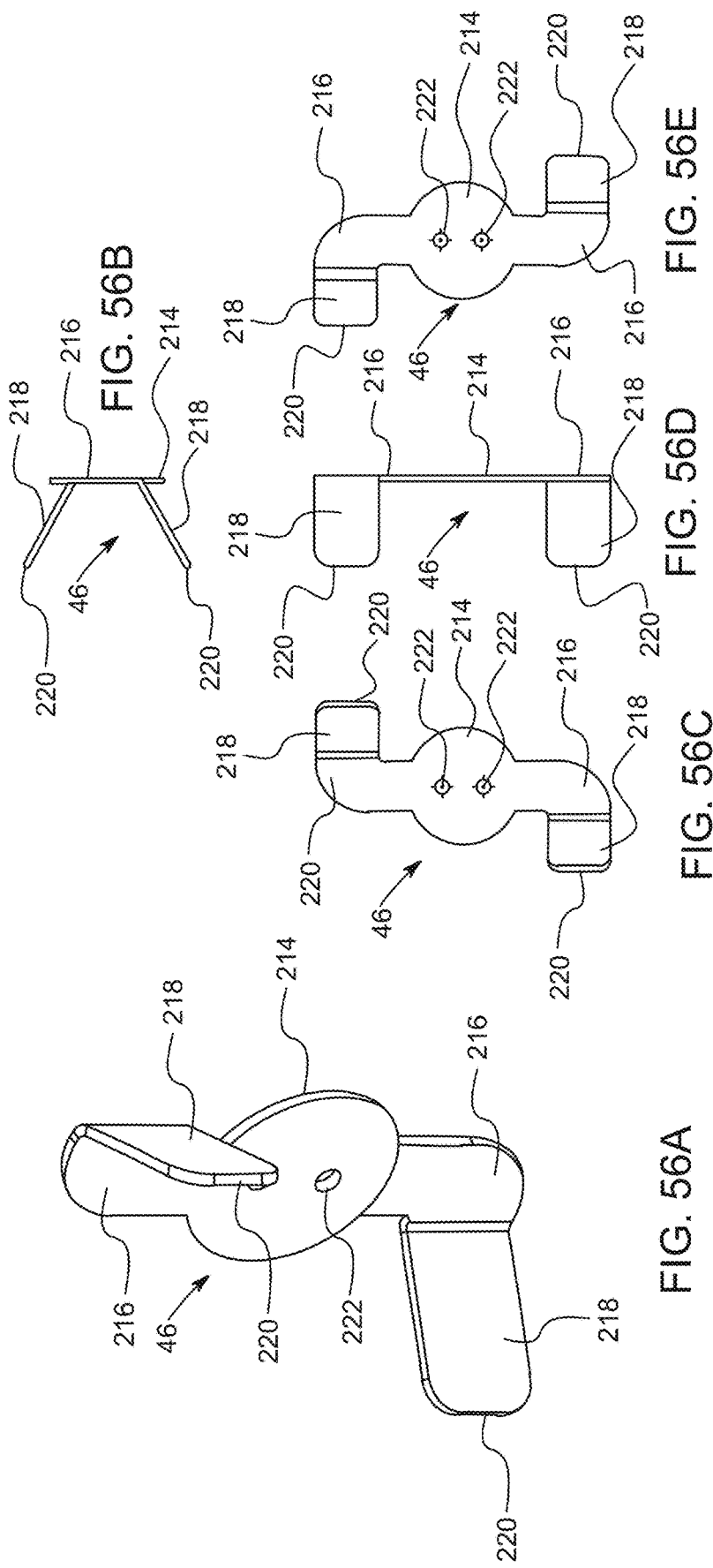

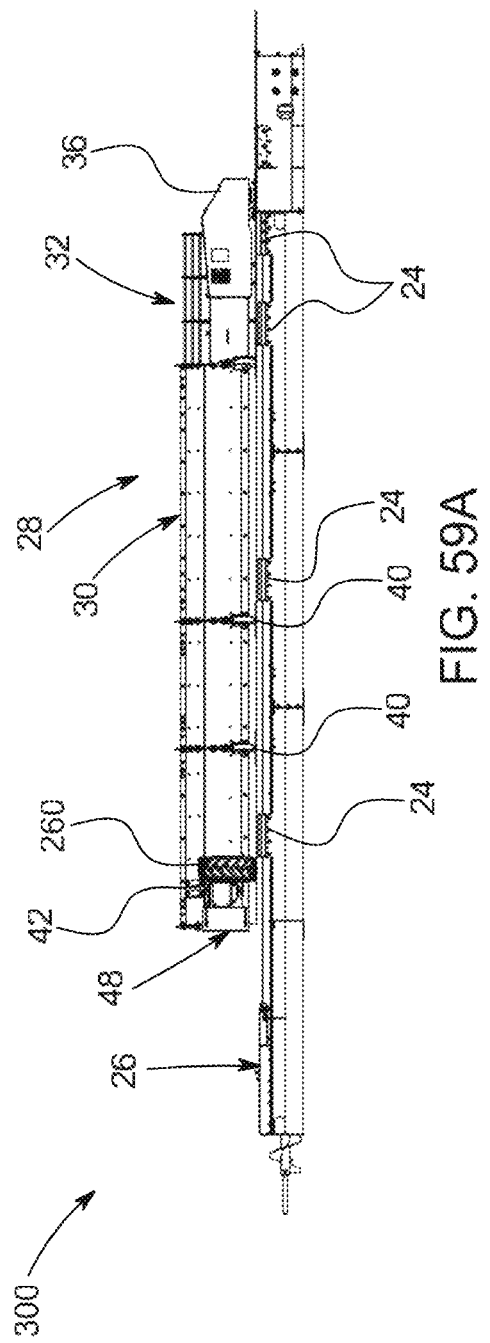
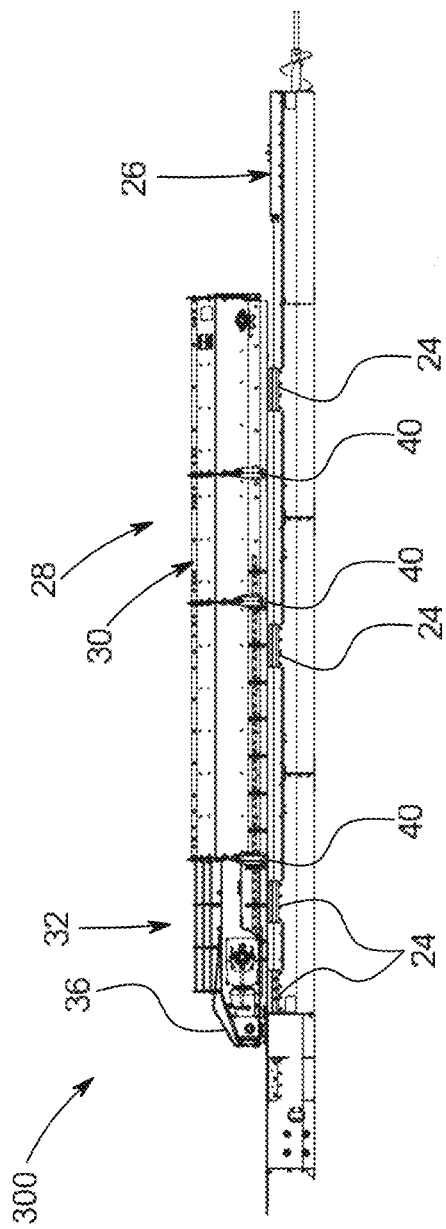
FIG. 59A
FIG. 59B

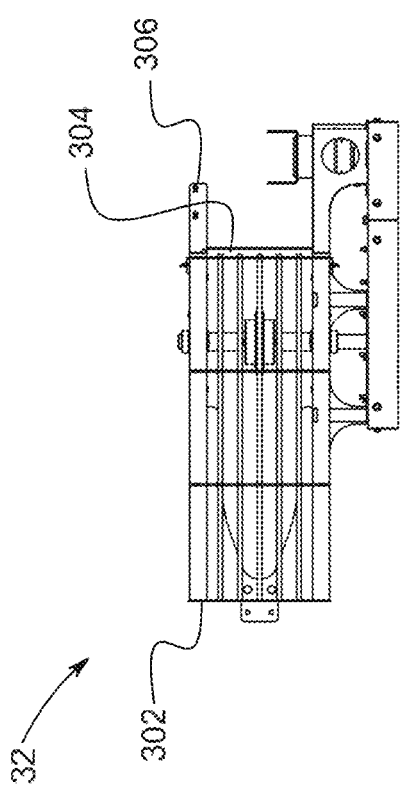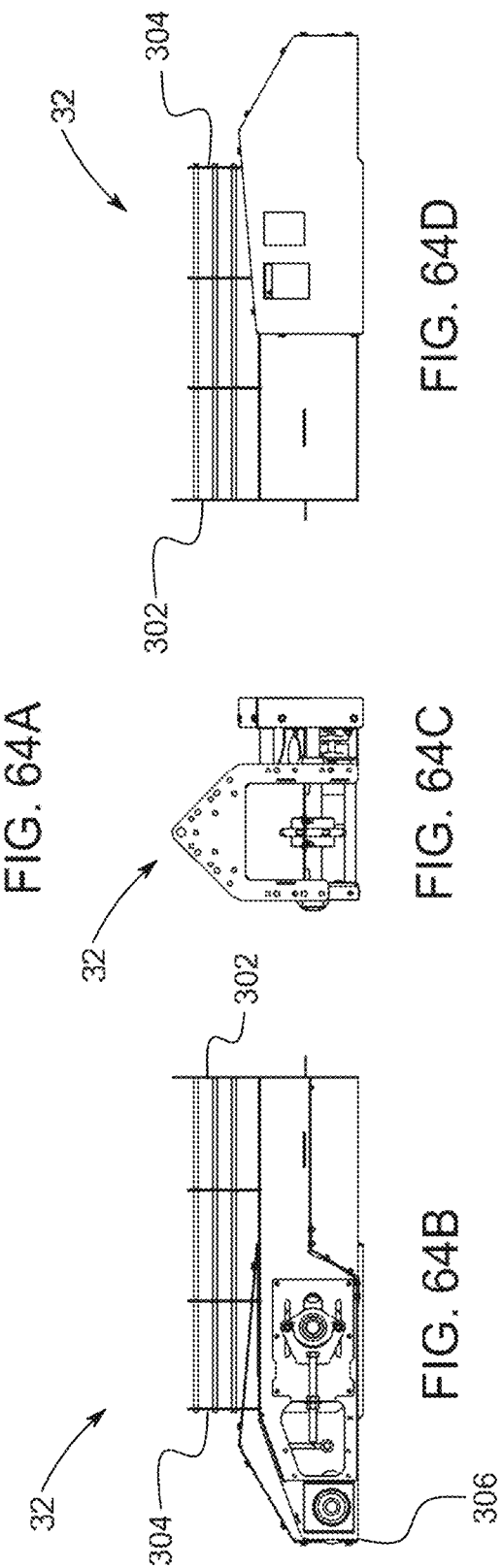

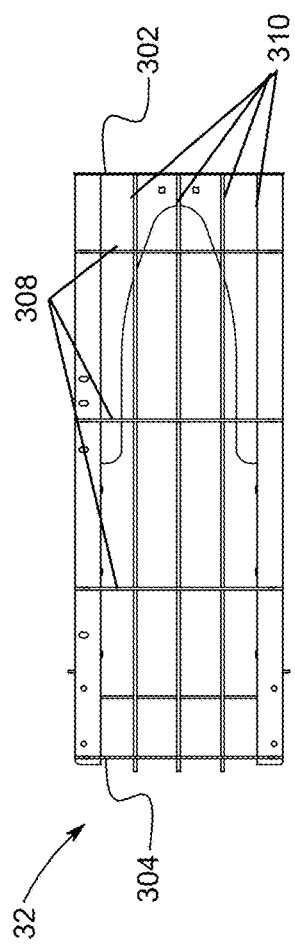
FIG. 94A
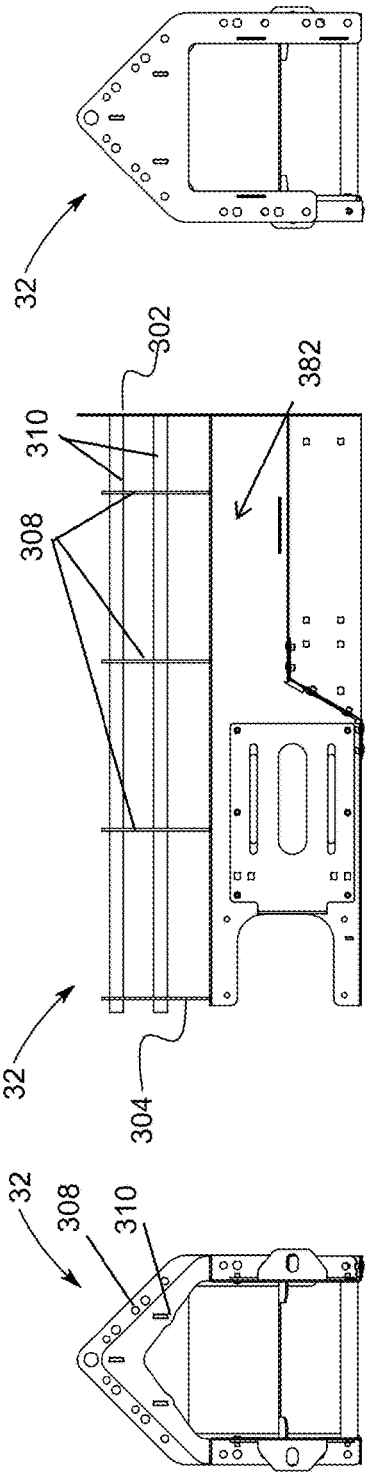
FIG. 94B
FIG. 94C
FIG. 94D
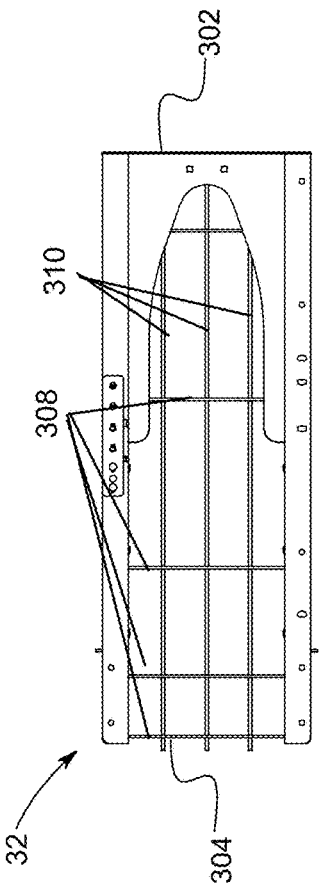
FIG. 94E

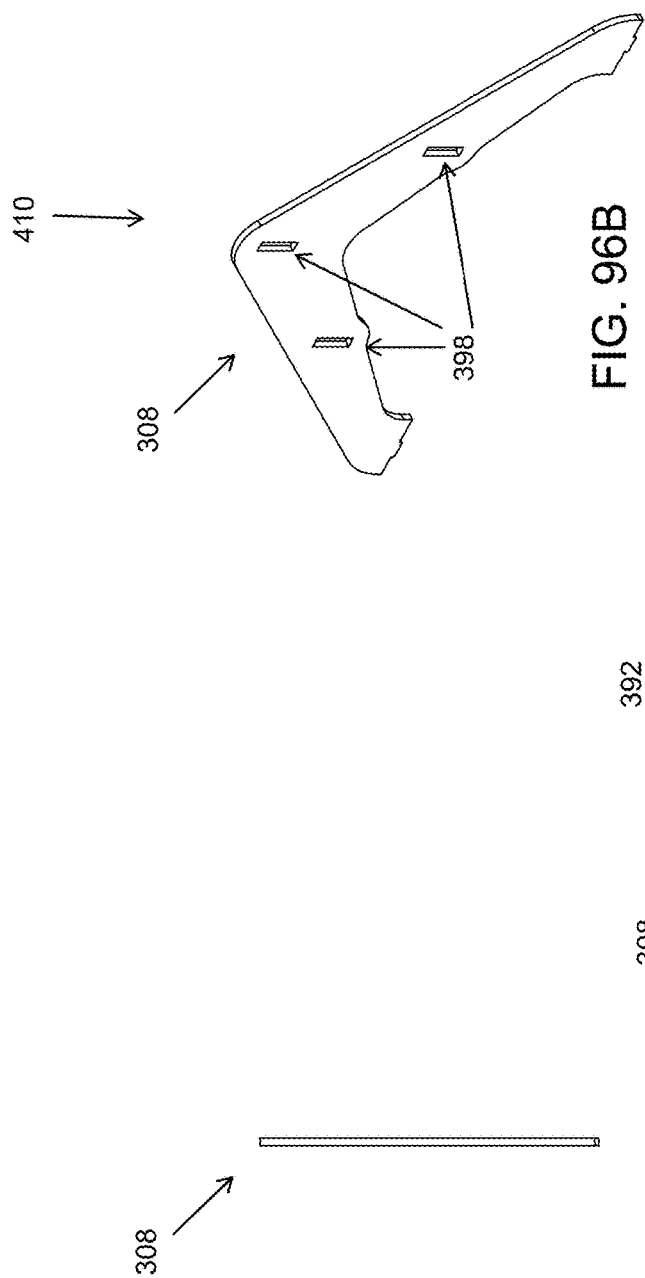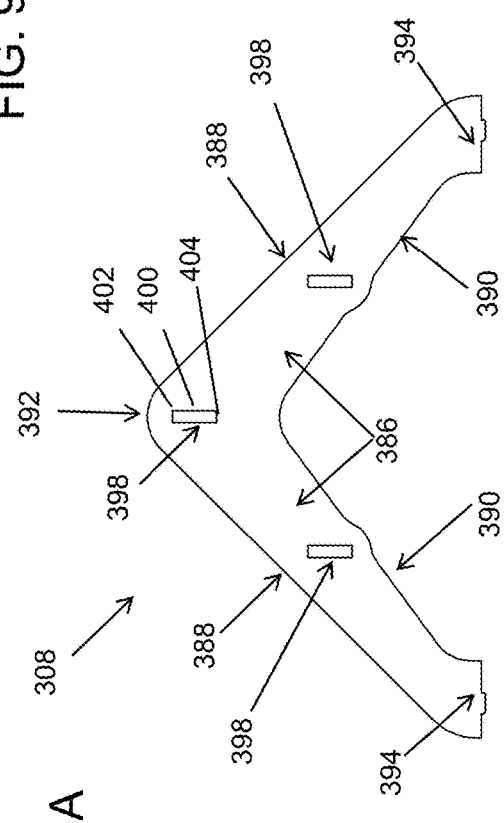

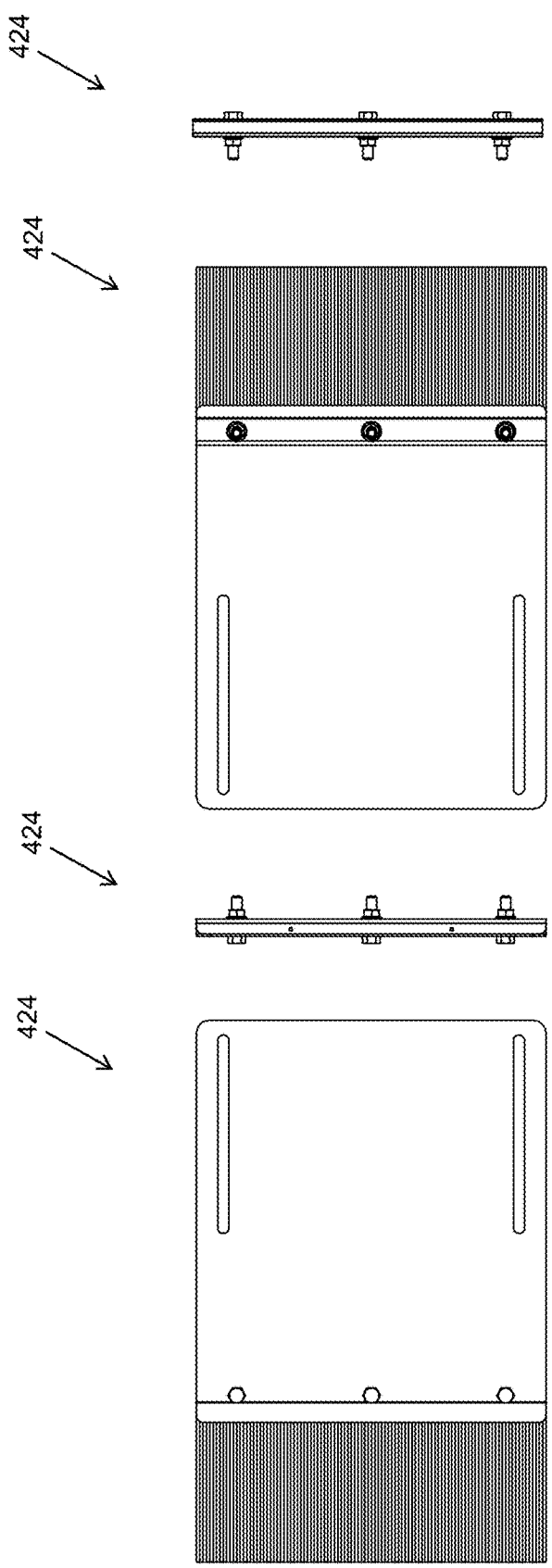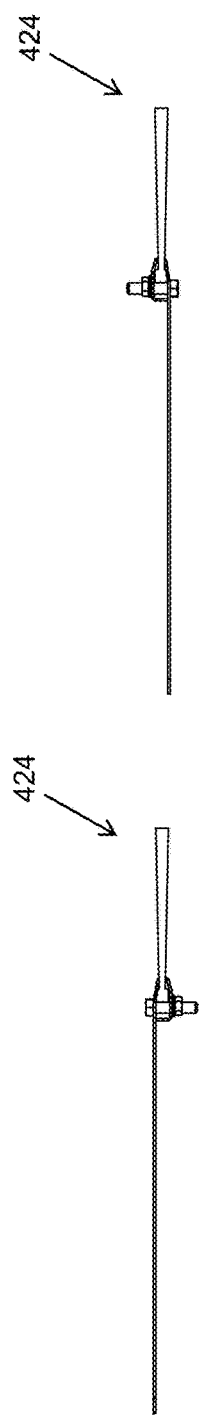
FIG. 110A  FIG. 110B  FIG. 110C  FIG. 110D  FIG. 110E  FIG. 110F

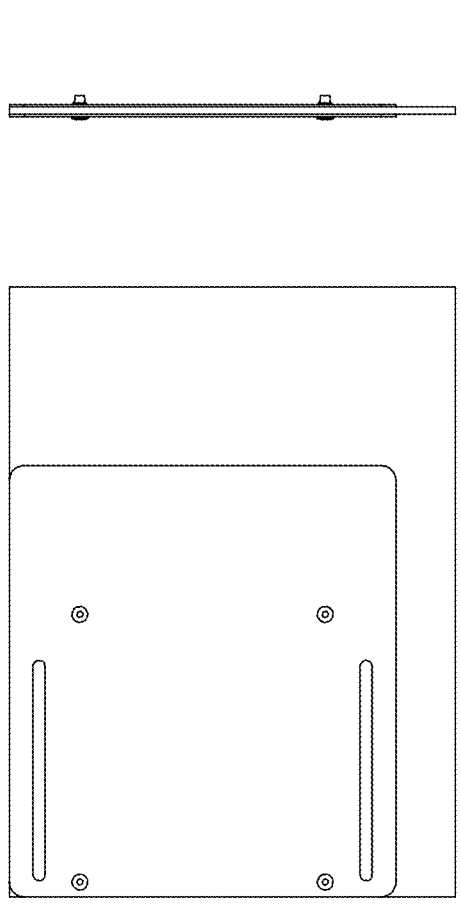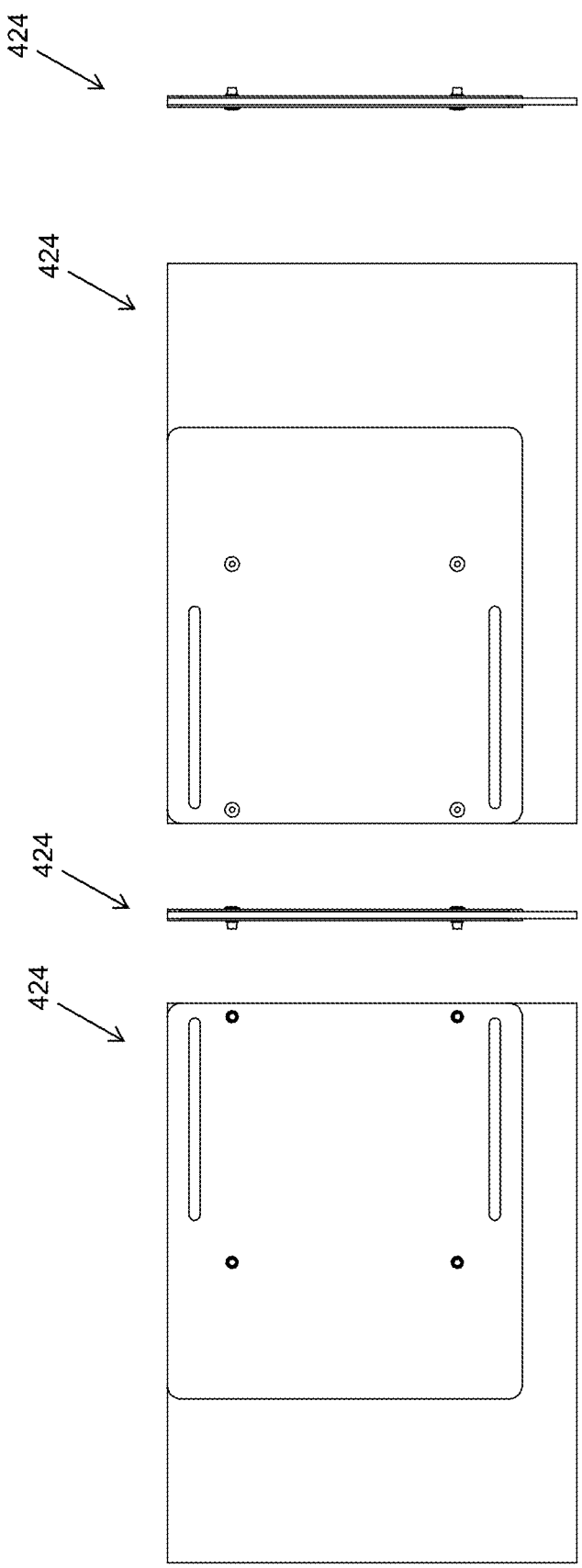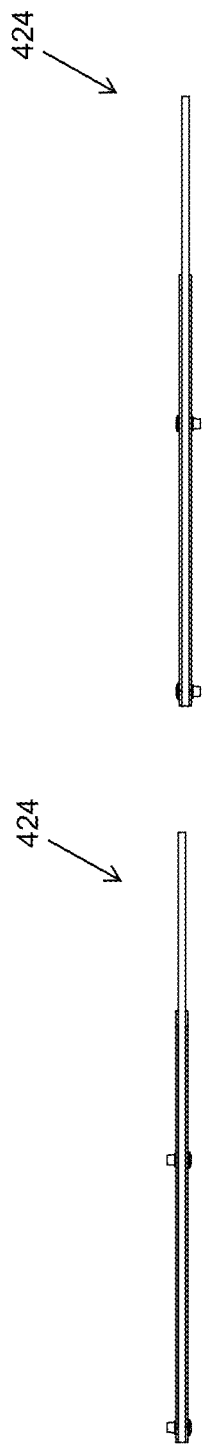
FIG. 114A  FIG. 114B  FIG. 114C  FIG. 114D  FIG. 114E  FIG. 114F

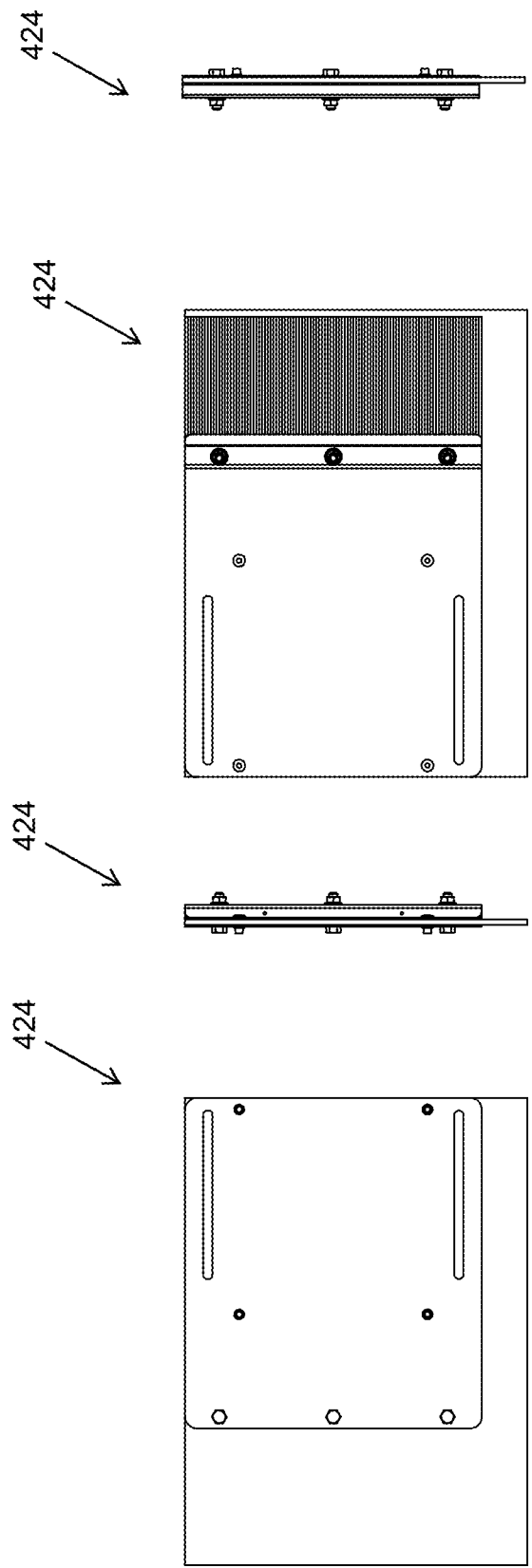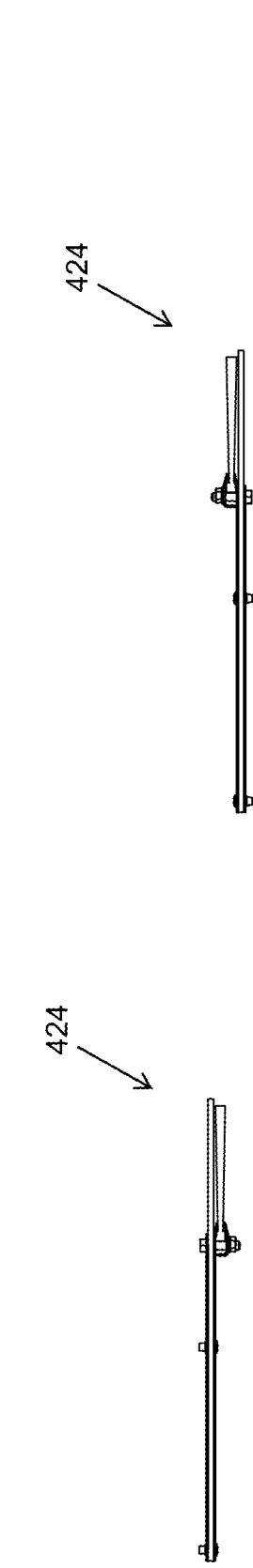
FIG. 116D
FIG. 116C
FIG. 116F
FIG. 116B
FIG. 116A
FIG. 116E ized sump alone leaves
SWEEP SYSTEM FOR FULL ELEVATED FLOOR GRAIN BINS

CROSS REFERENCE TO RELATED APPLICATIONS

This application is a continuation-in-part of U.S. patent application Ser. No. 16/997,333 filed Aug. 19, 2020 and titled "SWEEP SYSTEM FOR FULL ELEVATED FLOOR GRAIN BINS", which claims priority to U.S. Provisional Application No. 62/889,370 filed Aug. 20, 2019 and titled "SWEEP SYSTEM FOR FULL ELEVATED FLOOR GRAIN BINS", the entirety of each of which is hereby fully incorporated by reference herein.

This application also claims priority to U.S. Provisional Pat. App. No. 63/253,161 filed Oct. 7, 2021 and titled "TRACK DRIVEN SWEEP SYSTEM FOR GRAIN BINS", the entirety of which is hereby fully incorporated by reference herein.

FIELD OF THE DISCLOSURE

This disclosure relates to grain storage devices used in agriculture. More specifically and without limitation, this disclosure relates to a sweep system for full elevated floor grain bins.

OVERVIEW OF THE DISCLOSURE

Grain bins are massive structures used to store bulk flowable grain products such as corn, soybeans, wheat, rice, or any other grain products or other material. Conventional grain bins are generally formed in a cylindrical shape with a corrugated sidewall covered by a peaked roof. Grain bins vary in height (ranging from twenty feet high to over a hundred and fifty feet high, or higher). Grain bins vary in diameter, (ranging from eighteen feet in diameter to over a hundred and fifty feet in diameter, or larger). The storage capacity of modern grain bins can range anywhere from a few thousand bushels to well over two million bushels.

Smaller grain bins tend to have an elevated floor formed of a plurality of planks that are supported by a plurality of floor supports that are positioned in spaced alignment to one another. These floor supports rest upon the foundation of the grain bin, which is typically a concrete slab, and provide support to the elevated floor. The space formed between the foundation and the elevated floor facilitates airflow below the elevated floor. Air blown into this space below the elevated floor passes through perforations in the planks of the elevated floor and through the grain stored in the grain bin. In this way, grain stored within the grain bin is conditioned using air flow through the grain. The use of the elevated floor provides many advantages.

Using an elevated floor for larger grain bins becomes problematic due to the immense weight of the grain stored within larger grain bins. As such, in many larger grain bins, the grain sits directly upon the concrete slab that forms the foundation of the grain bin. This arrangement provides the benefit of being strong and rigid. However, this arrangement lacks some of the benefits of an elevated floor, such as airflow through the floor and room beneath the floor for various components.

Grain bins may be unloaded in various ways. Many grain bins include a generally centrally positioned sump that facilitates removal of grain from the grain bin. While this configuration is effective at removing most of the grain from a grain bin, using a centrally positioned sump alone leaves a coned ring of grain that cannot be removed by a centrally positioned sump alone.

To avoid manually shoveling this coned ring of grain out of the grain bin, in many applications sweeps are used. Sweeps travel around the grain bin and help to move grain towards the centrally positioned sump so that the grain may be removed by the sump. In many applications, temporary sweeps are used.

Temporary sweeps require the user to manually install the sweep into the grain bin when the sweep is to be used. Temporary sweeps also require the user to manually remove the sweep after use. Installing and removing a temporary sweep is an undesirable, tedious, difficult and dangerous task. To avoid manually installing and manually removing temporary sweeps, various configurations of "zero entry sweeps" have been developed.

Zero entry sweeps are configured to remain in the grain bin when it is filled thereby eliminating the need to enter the grain bin to install or remove the sweep from the grain bin. Hence the name "zero entry" as users are not required to enter the grain bin. While zero entry sweeps provide a number of advantages, there are a number of challenges associated with the use of zero entry sweeps. These challenges are exasperated when attempting to provide a zero entry sweep with a grain bin having an elevated floor. This is especially true for larger grain bins that require larger sweeps.

Therefore, for all the reasons stated above, and all the reasons stated below, there is a need in the art for an improved sweep system for full elevated floor grain bins.

Thus, it is a primary object of the disclosure to provide a sweep system for full elevated floor grain bins that improves upon the state of the art.

Another object of the disclosure is to provide a sweep system for full elevated floor grain bins that reduces or eliminates the need for a user to enter the grain bin.

Yet another object of the disclosure is to provide a sweep system for full elevated floor grain bins that works effectively.

Another object of the disclosure is to provide a sweep system for full elevated floor grain bins that is robust.

Yet another object of the disclosure is to provide a sweep system for full elevated floor grain bins that is durable.

Another object of the disclosure is to provide a sweep system for full elevated floor grain bins that can be used with all kinds of grain.

Yet another object of the disclosure is to provide a sweep system for full elevated floor grain bins that has a long useful life.

Another object of the disclosure is to provide a sweep system for full elevated floor grain bins that can be used with an elevated floor without damaging the elevated floor.

Yet another object of the disclosure is to provide a sweep system for full elevated floor grain bins that can be used with paddle sweeps, auger sweeps, or any other configuration of a sweep.

Another object of the disclosure is to provide a sweep system for full elevated floor grain bins that effectively removes the vast majority of grain from the grain bin.

Yet another object of the disclosure is to provide a sweep system for full elevated floor grain bins that is efficient to use.

Another object of the disclosure is to provide a sweep system for full elevated floor grain bins that improves safety.

Yet another object of the disclosure is to provide a sweep system for full elevated floor grain bins can be used with practically any grain bin.

Another object of the disclosure is to provide a sweep system for full elevated floor grain bins that does not cause sagging or collapse of the elevated floor.

Yet another object of the disclosure is to provide a sweep system for full elevated floor grain bins that has a long useful life.

Another object of the disclosure is to provide a sweep system for full elevated floor grain bins that is high quality.

Yet another object of the disclosure is to provide a sweep system for full elevated floor grain bins that helps to clear clumps in the grain.

Another object of the disclosure is to provide a sweep system for full elevated floor grain bins that operates in a robust manner.

These and other objects, features, or advantages of the disclosure will become apparent from the specification, figures and claims.

SUMMARY OF THE DISCLOSURE

A sweep system for a grain bin having a concrete slab and an elevated floor supported by a plurality of floor supports. The sweep system having an elongated body extending a length between an inward end and an outward end and having a leading side and a trailing side. The elongated body is connected to a pivot point at the center of the grain bin and is configured to rotate around the pivot point. In one or more embodiments, a head section of the sweep system located at the inward end, is skeletonized to facilitate removal of grain from the center of the grain bin. In one or more embodiments, an agitator is connected to the outward end of the elongated body and is configured to agitate grain as the elongated body rotates around the pivot point. The agitator includes an impeller that is connected to a shaft that extends through the elongated body. In one or more embodiments, a scraper is positioned at the outward end of the elongated body and is configured to move grain into the path of the elongated body.

BRIEF DESCRIPTION OF THE DRAWINGS

FIG. 15 shows a rear right lower perspective view of a section of an elongated body of a sweep, in accordance with one or more embodiments.

FIG. 16 shows a view of cross section B of the view shown in FIG. 15, in accordance with one or more embodiments.

FIG. 26A shows a top view of the center sump of a sweep shown in FIGS. 25A-25D, in accordance with one or more embodiments.

FIG. 26B shows a front view of the center sump of a sweep shown in FIGS. 25A-25D, in accordance with one or more embodiments.

FIG. 26C shows a bottom view of the center sump of a sweep shown in FIGS. 25A-25D, in accordance with one or more embodiments.

FIG. 26D shows a side view of the center sump of a sweep shown in FIGS. 25A-25D, in accordance with one or more embodiments.

FIG. 29A shows a side view of the sweep mechanism shown in FIG. 28, in accordance with one or more embodiments.

FIG. 29B shows a top view of the sweep mechanism shown in FIG. 28, in accordance with one or more embodiments.

FIG. 29C shows a side view of the sweep mechanism shown in FIG. 28, in accordance with one or more embodiments.

FIG. 29D shows a bottom view of the sweep mechanism shown in FIG. 28, in accordance with one or more embodiments.

FIG. 32A shows a front view of the drive housing of a head section of an exemplary sweep system shown in FIGS. 31A and 31B, in accordance with one or more embodiments.

FIG. 32B shows a top view of the drive housing of a head section of an exemplary sweep system shown in FIGS. 31A and 31B, in accordance with one or more embodiments.

FIG. 32C shows a side view of the drive housing of a head section of an exemplary sweep system shown in FIGS. 31A and 31B, in accordance with one or more embodiments.

FIG. 32D shows a bottom view of the drive housing of the head section of the exemplary sweep system shown in FIGS. 31A and 31B, in accordance with one or more embodiments.

FIG. 32E shows a rear view of the drive housing of head section of an exemplary sweep system shown in FIGS. 31A and 31B, in accordance with one or more embodiments.

FIG. 35A shows an upper front right perspective view of a head frame weldment of a head section of an exemplary sweep system, in accordance with one or more embodiments.

FIG. 35B shows an upper rear right perspective view of a head frame weldment of a head section of an exemplary sweep system, in accordance with one or more embodiments.

FIG. 35C shows a lower rear right perspective view of a head frame weldment of a head section of an exemplary sweep system, in accordance with one or more embodiments.

FIG. 35D shows a lower rear left perspective view of a head frame weldment of a head section of an exemplary sweep system, in accordance with one or more embodiments.

FIG. 36A shows a left side view of the head frame weldment shown in FIGS. 35A-35D, in accordance with one or more embodiments.

FIG. 36B shows a top view of the head frame weldment shown in FIGS. 35A-35D, in accordance with one or more embodiments.

FIG. 36C shows a rear view of the head frame weldment shown in FIGS. 35A-35D, in accordance with one or more embodiments.

FIG. 36D shows a bottom view of the head frame weldment shown in FIGS. 35A-35D, in accordance with one or more embodiments.

FIG. 36E shows a right side view of the head frame weldment shown in FIGS. 35A-35D, in accordance with one or more embodiments.

FIG. 38A shows an upper rear right perspective view of the head frame weldment shown in FIGS. 35A-35D, in accordance with one or more embodiments; the view showing a shaft, a bearing assembly, and a sprocket positioned in the head frame weldment.

FIG. 38B shows an upper front right perspective view of the head frame weldment shown in FIGS. 35A-35D, in accordance with one or more embodiments; the view showing a shaft, a bearing assembly, and a sprocket positioned in the head frame weldment.

FIG. 38C shows a lower rear right perspective view of the head frame weldment shown in FIGS. 35A-35D, in accordance with one or more embodiments; the view showing a shaft, a bearing assembly, and a sprocket positioned in the head frame weldment.

FIG. 38D shows a lower rear left perspective view of the head frame weldment shown in FIGS. 35A-35D, in accordance with one or more embodiments; the view showing a shaft, a bearing assembly, and a sprocket positioned in the head frame weldment.

FIG. 39A shows a top view of the head frame weldment shown in FIGS. 35A-35D, in accordance with one or more embodiments; the view showing a shaft, a bearing assembly, and a sprocket positioned in the head frame weldment.

FIG. 39B shows a left side view of the head frame weldment shown in FIGS. 35A-35D, in accordance with one or more embodiments; the view showing a shaft, a bearing assembly, and a sprocket positioned in the head frame weldment.

FIG. 39C shows a rear view of the head frame weldment shown in FIGS. 35A-35D, in accordance with one or more embodiments; the view showing a shaft, a bearing assembly, and a sprocket positioned in the head frame weldment.

FIG. 39D shows a bottom view of the head frame weldment shown in FIGS. 35A-35D, in accordance with one or more embodiments; the view showing a shaft, a bearing assembly, and a sprocket positioned in the head frame weldment.

FIG. 39E shows a right side view of the head frame weldment shown in FIGS. 35A-35D, in accordance with one or more embodiments; the view showing a shaft, a bearing assembly, and a sprocket positioned in the head frame weldment.

FIG. 41A shows an upper rear left perspective view of a frame of a pusher of an exemplary sweep system, in accordance with one or more embodiments.

FIG. 41B shows an upper front left perspective view of a frame of a pusher of an exemplary sweep system, in accordance with one or more embodiments.

FIG. 41C shows a lower front left perspective view of a frame of a pusher of an exemplary sweep system, in accordance with one or more embodiments.

FIG. 42A shows a top view of the frame of the pusher of the exemplary sweep system shown in FIGS. 41A-41C, in accordance with one or more embodiments.

FIG. 42B shows a rear view of the frame of the pusher of the exemplary sweep system shown in FIGS. 41A-41C, in accordance with one or more embodiments.

FIG. 42C shows a left side view of the frame of the pusher of the exemplary sweep system shown in FIGS. 41A-41C, in accordance with one or more embodiments.

FIG. 42D shows a front view of the frame of the pusher of the exemplary sweep system shown in FIGS. 41A-41C, in accordance with one or more embodiments.

FIG. 42E shows a bottom view of the frame of the pusher of the exemplary sweep system shown in FIGS. 41A-41C, in accordance with one or more embodiments.

FIG. 43 shows a rear left exploded perspective view of the frame of the pusher of the exemplary sweep system shown in FIGS. 41A-41C, in accordance with one or more embodiments.

FIG. 44A shows an upper front left perspective view of a pusher of an exemplary sweep system, in accordance with one or more embodiments.

FIG. 44B shows an upper front right perspective view of a pusher of an exemplary sweep system, in accordance with one or more embodiments.

FIG. 44C shows a lower front left perspective view of a pusher of an exemplary sweep system, in accordance with one or more embodiments.

FIG. 44D shows a lower front right perspective view of a pusher of an exemplary sweep system, in accordance with one or more embodiments.

FIG. 45A shows a top view of the pusher shown in FIGS. 44A-44D, in accordance with one or more embodiments.

FIG. 45B shows a front view of the pusher shown in FIGS. 44A-44D, in accordance with one or more embodiments.

FIG. 45C shows a let side view of the pusher shown in FIGS. 44A-44D, in accordance with one or more embodiments.

FIG. 45D shows a rear view of the pusher shown in FIGS. 44A-44D, in accordance with one or more embodiments.

FIG. 45E shows a bottom view of the pusher shown in FIGS. 44A-44D, in accordance with one or more embodiments.

FIG. 46 shows an upper front left exploded perspective view of the pusher shown in FIGS. 44A-44D, in accordance with one or more embodiments.

FIG. 47A shows an upper rear right perspective view of a carrier wheel of an exemplary sweep system, in accordance with one or more embodiments.

FIG. 47B shows a top view of a carrier wheel of an exemplary sweep system, in accordance with one or more embodiments.

FIG. 47C shows a right side view of a carrier wheel of an exemplary sweep system, in accordance with one or more embodiments.

FIG. 47D shows a bottom view of a carrier wheel of an exemplary sweep system, in accordance with one or more embodiments.

FIG. 47E shows a front view of a carrier wheel of an exemplary sweep system, in accordance with one or more embodiments.

FIG. 52A shows an upper front left perspective view of a tail section of an exemplary sweep system, in accordance with one or more embodiments; the view showing an agitator and scraper of the tail section.

FIG. 52B shows an upper front right perspective view of a tail section weldment of an exemplary sweep system, in accordance with one or more embodiments; the view showing an agitator and scraper of the tail section.

FIG. 52C shows an upper rear right perspective view of a tail section of an exemplary sweep system, in accordance with one or more embodiments; the view showing an agitator and scraper of the tail section.

FIG. 52D shows a lower front right perspective view of a tail section of an exemplary sweep system, in accordance with one or more embodiments; the view showing an agitator and scraper of the tail section.

FIG. 53 shows an upper front left exploded perspective view of the tail section shown in FIGS. 52A-52D, in accordance with one or more embodiments; the view showing an agitator and scraper of the tail section.

FIG. 54A shows a top view of a tail section shown in FIGS. 52A-52D, in accordance with one or more embodiments.

FIG. 54B shows a right side view of a tail section shown in FIGS. 52A-52D, in accordance with one or more embodiments.

FIG. 54C shows a front view of a tail section shown in FIGS. 52A-52D, in accordance with one or more embodiments.

FIG. 54D shows a bottom view of a tail section shown in FIGS. 52A-52D, in accordance with one or more embodiments.

FIG. 54E shows a left side view of a tail section shown in FIGS. 52A-52D, in accordance with one or more embodiments.

FIG. 55A shows a perspective view of a scraper of the tail section shown in FIGS. 52A-52D, in accordance with one or more embodiments.

FIG. 55B shows a top side view of the scraper of the tail section shown in FIGS. 52A-52D, in accordance with one or more embodiments.

FIG. 55C shows a side view of the scraper of the tail section shown in FIGS. 52A-52D, in accordance with one or more embodiments.

FIG. 55D shows a front view of the scraper of the tail section shown in FIGS. 52A-52D, in accordance with one or more embodiments FIG. 55E shows a rear side view of the scraper of the tail section shown in FIGS. 52A-52D, in accordance with one or more embodiments.

FIG. 55F shows a bottom view of a scraper of the tail section shown in FIGS. 52A-52D, in accordance with one or more embodiments.

FIG. 56A shows a front left perspective view of an agitator of a tail section of an exemplary sweep system, in accordance with one or more embodiments.

FIG. 56B shows a top view of an agitator of a tail section of an exemplary sweep system, in accordance with one or more embodiments.

FIG. 56C shows a front view of an agitator of a tail section of an exemplary sweep system, in accordance with one or more embodiments.

FIG. 56D shows a left side view of an agitator of a tail section of an exemplary sweep system, in accordance with one or more embodiments.

FIG. 56E shows a rear view of an agitator of a tail section of an exemplary sweep system, in accordance with one or more embodiments.

FIG. 56F shows a bottom view of an agitator of a tail section of an exemplary sweep system, in accordance with one or more embodiments.

Figure 57:
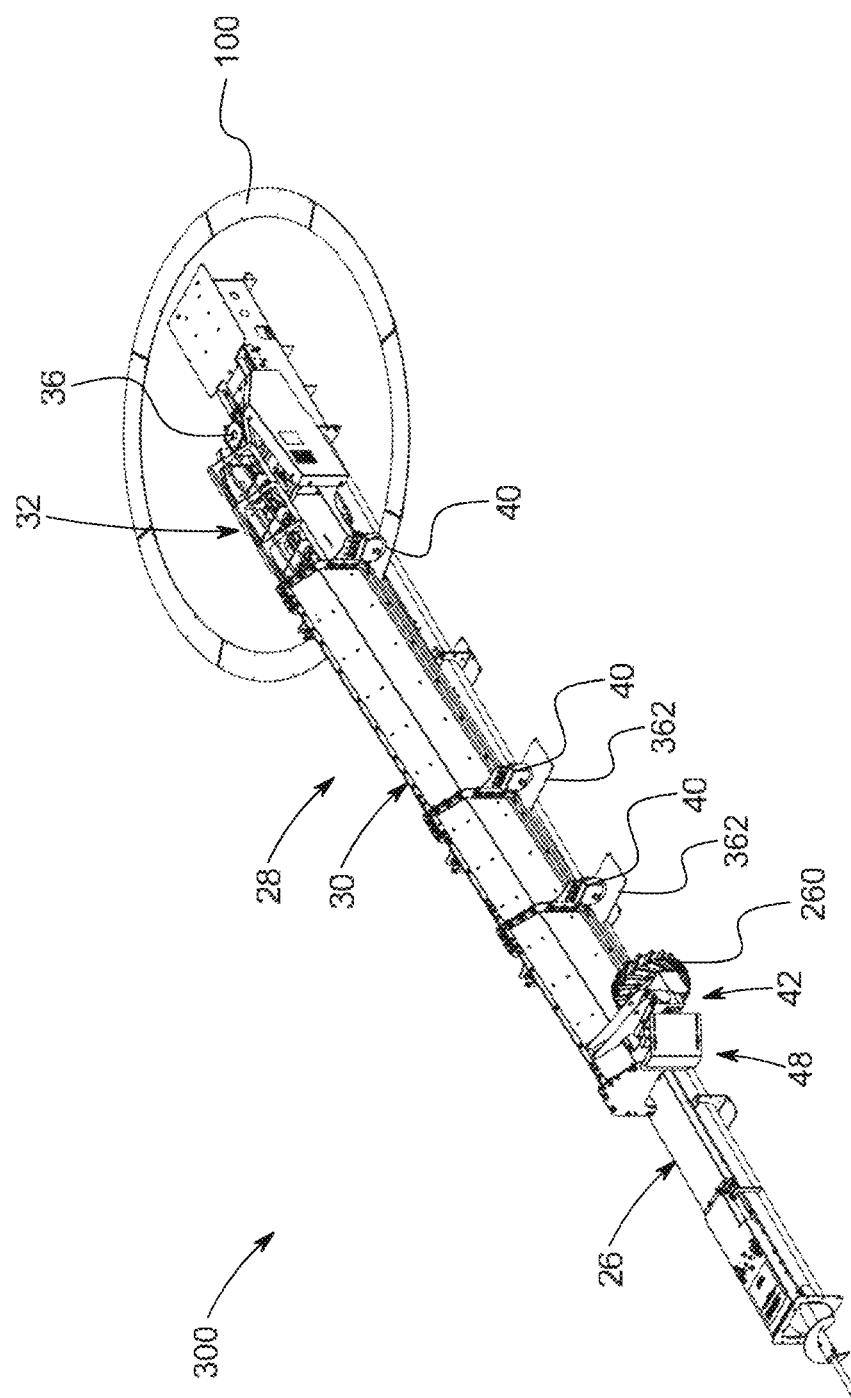

FIG. 57 shows an upper rear left perspective view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a lowered position.

Figure 58:
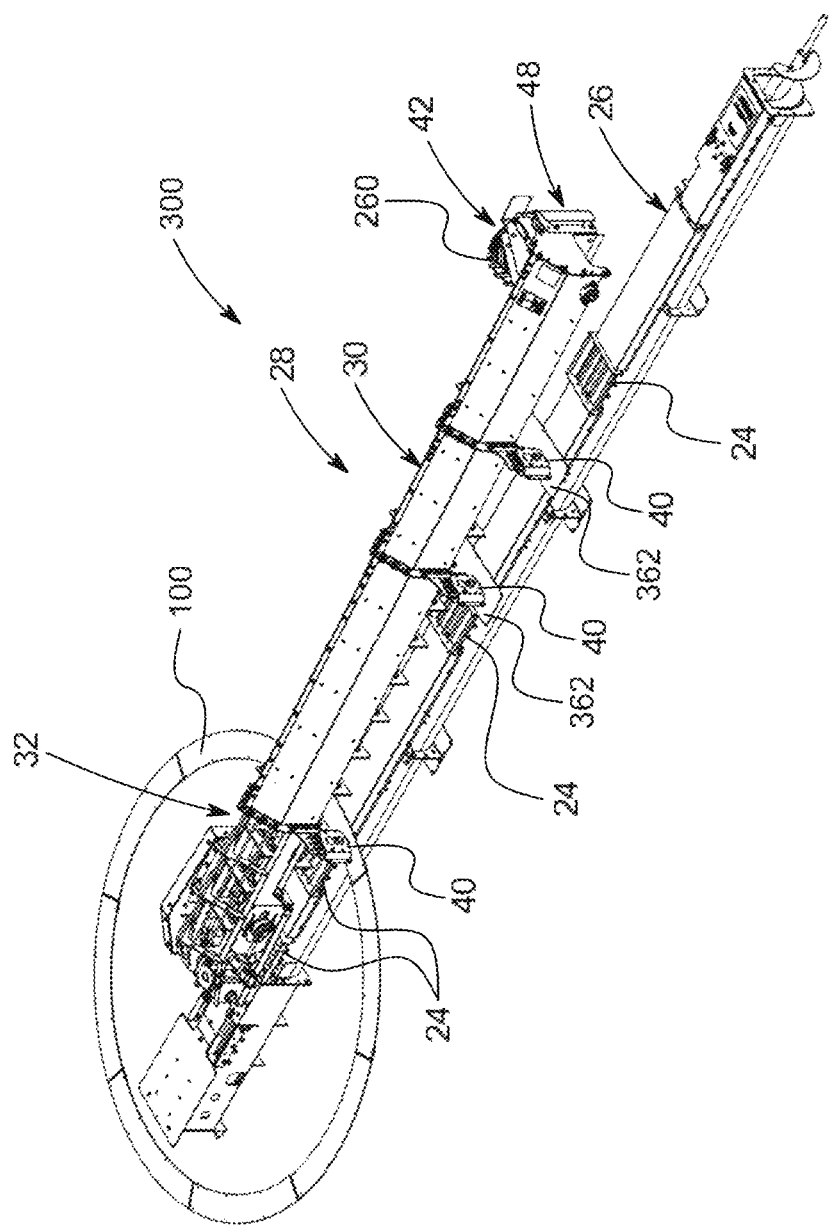

FIG. 58 shows an upper rear left perspective view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a raised position.

FIG. 59A shows a rear view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a lowered position.

FIG. 59B shows a front view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a lowered position.

Figure 60:
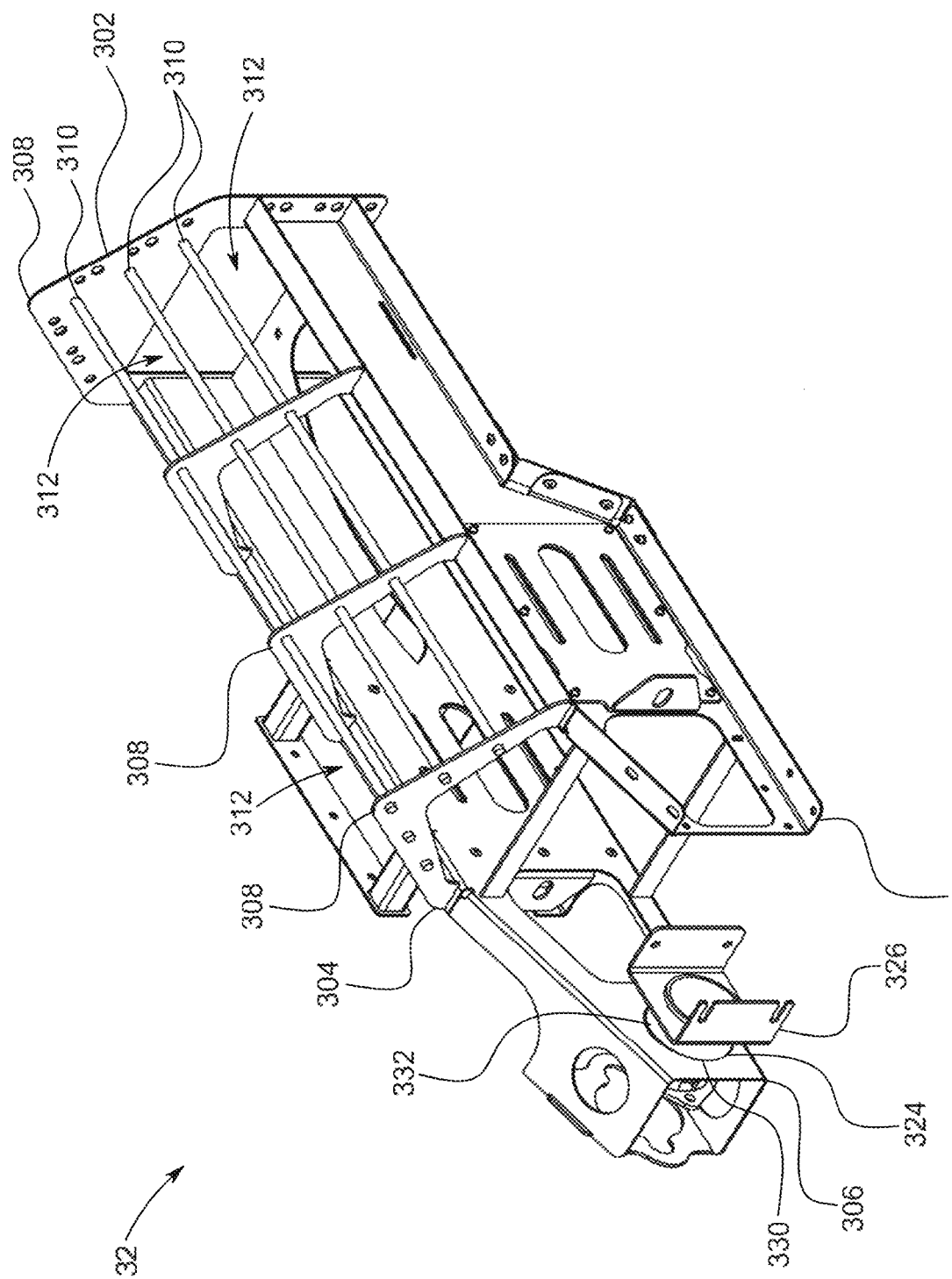

FIG. 60 shows an upper front right perspective view of a skeletonized head section of an exemplary sweep system, in accordance with one or more embodiments.

Figure 61:
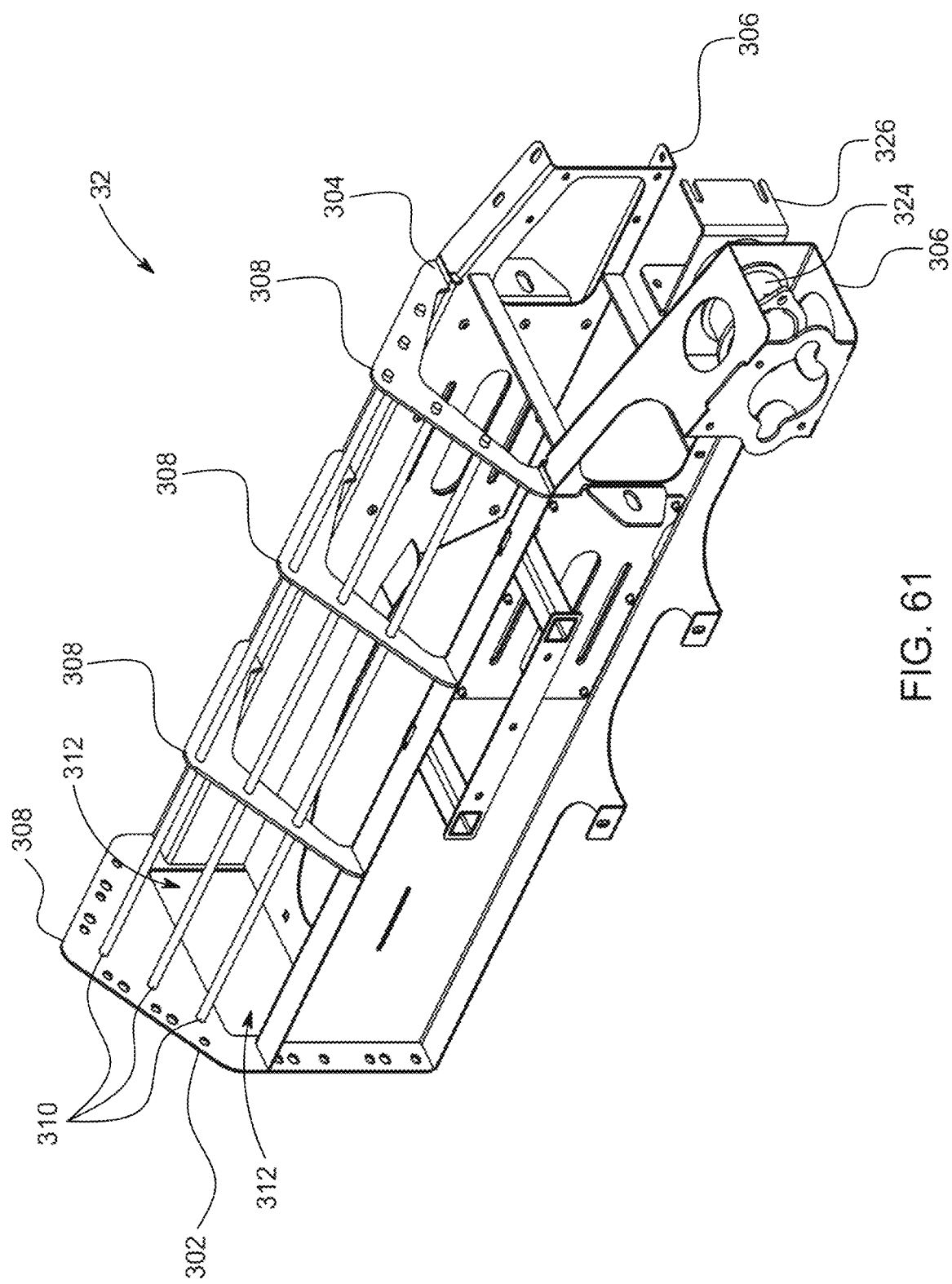

FIG. 61 shows an upper rear right perspective view of the skeletonized head section shown in FIG. 60, in accordance with one or more embodiments.

Figure 62:
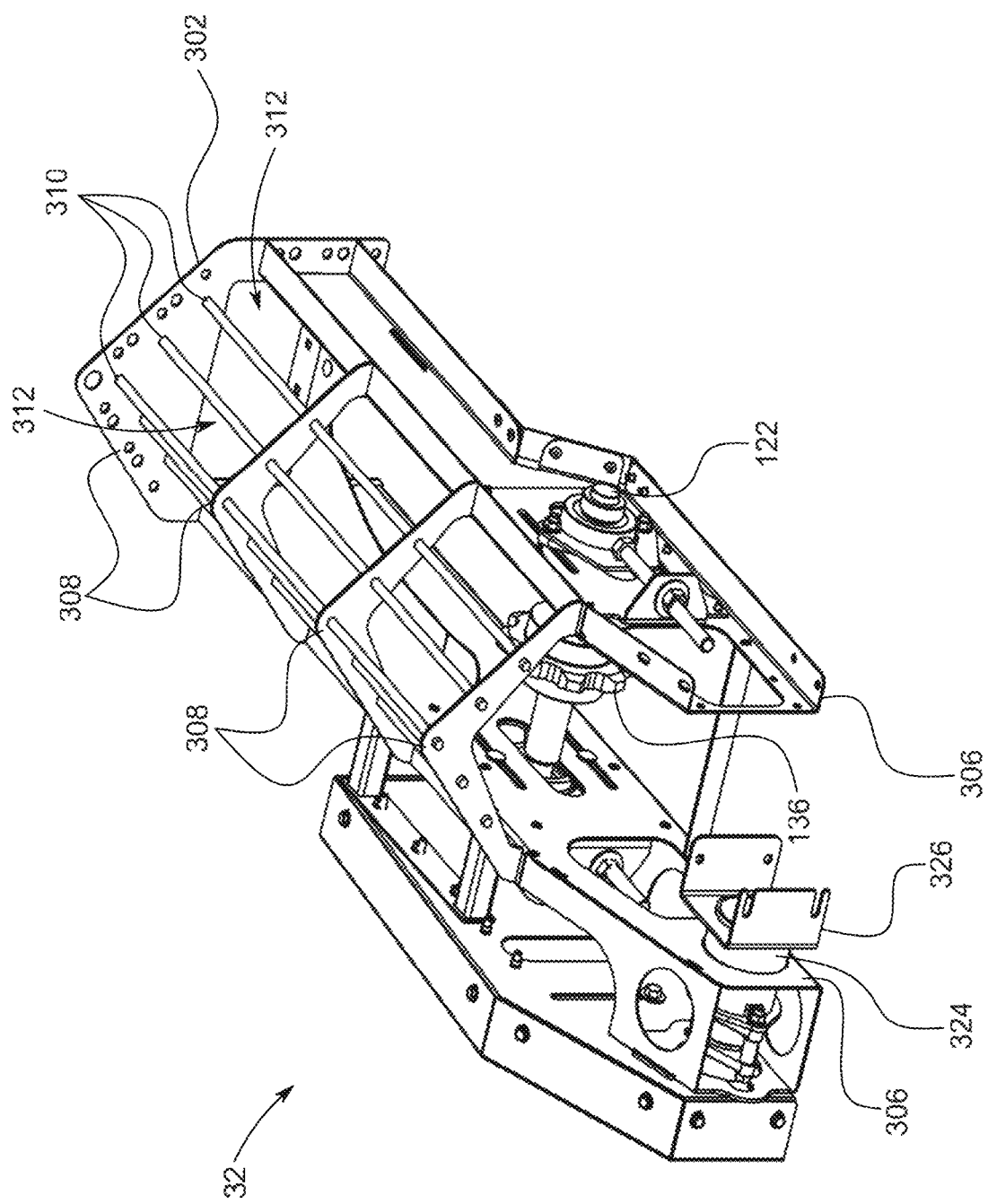

FIG. 62 shows an upper front right perspective view of a skeletonized head section of an exemplary sweep system, in accordance with one or more embodiments; the view showing a shaft and a sprocket positioned in the skeletonized head section.

Figure 63:
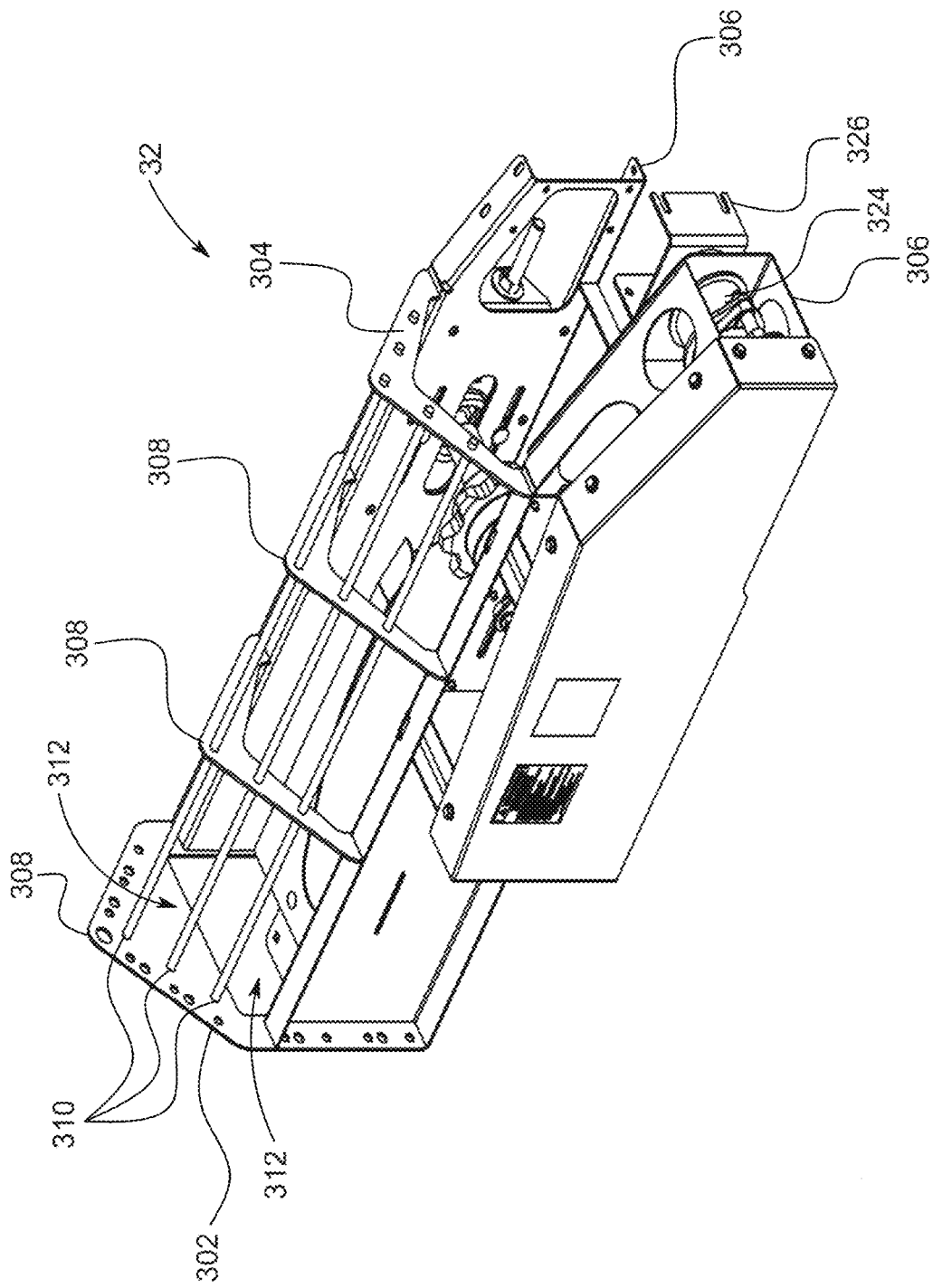

FIG. 63 shows an upper rear right perspective view of a skeletonized head section of an exemplary sweep system, in accordance with one or more embodiments; the view showing a shaft and a sprocket positioned in the skeletonized head section.

FIG. 64A shows a top view of the skeletonized head section shown in FIGS. 62-63, in accordance with one or more embodiments.

FIG. 64B shows a front view of the skeletonized head section shown in FIGS. 62-63, in accordance with one or more embodiments.

FIG. 64C shows a side view of the skeletonized head section shown in FIGS. 62-63, in accordance with one or more embodiments.

FIG. 64D shows a rear view of the skeletonized head section shown in FIGS. 62-63, in accordance with one or more embodiments.

Figure 65A:
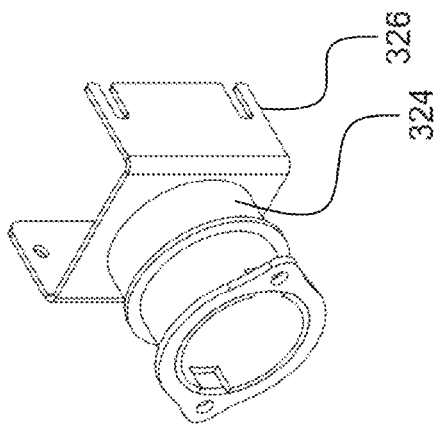

FIG. 65A shows an upper rear right perspective view of the collar and bracket of the skeletonized head section shown in FIGS. 62-63, in accordance with one or more embodiments.

Figure 65C:
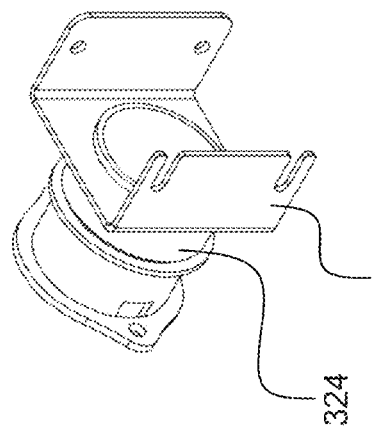
Figure 65B:
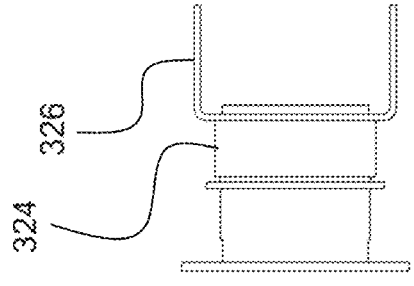

FIG. 65B shows a top view of the collar and bracket of the skeletonized head section shown in FIGS. 62-63, in accordance with one or more embodiments.

FIG. 65C shows an upper font right perspective view of the collar and bracket of the skeletonized head section shown in FIGS. 62-63, in accordance with one or more embodiments.

Figure 65E:
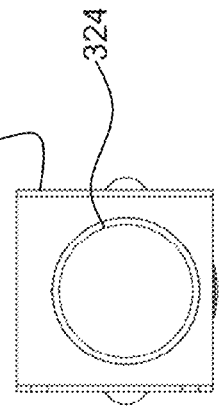
Figure 65D:
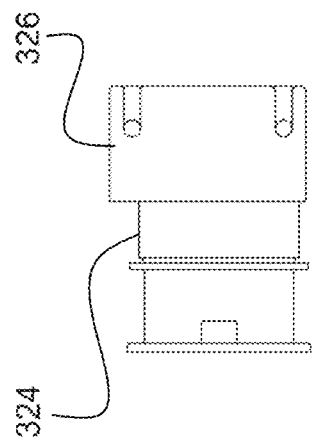

FIG. 65D shows a right side view of the collar and bracket of the skeletonized head section shown in FIGS. 62-63, in accordance with one or more embodiments.

FIG. 65E shows a front view of the collar and bracket of the skeletonized head section shown in FIGS. 62-63, in accordance with one or more embodiments.

Figure 66A:
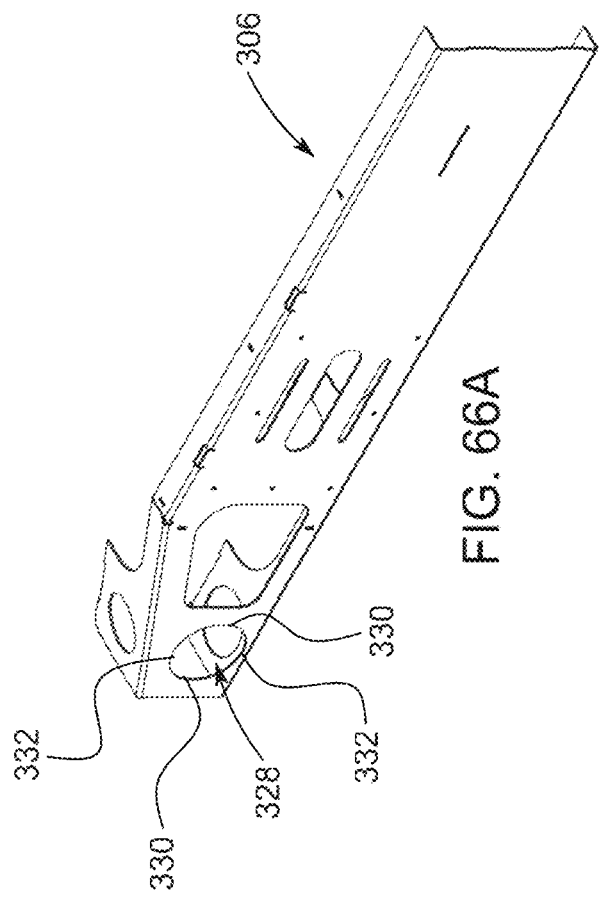

FIG. 66A shows an upper front left perspective view of an arm of the skeletonized head section, in accordance with one or more embodiments.

Figure 66B:
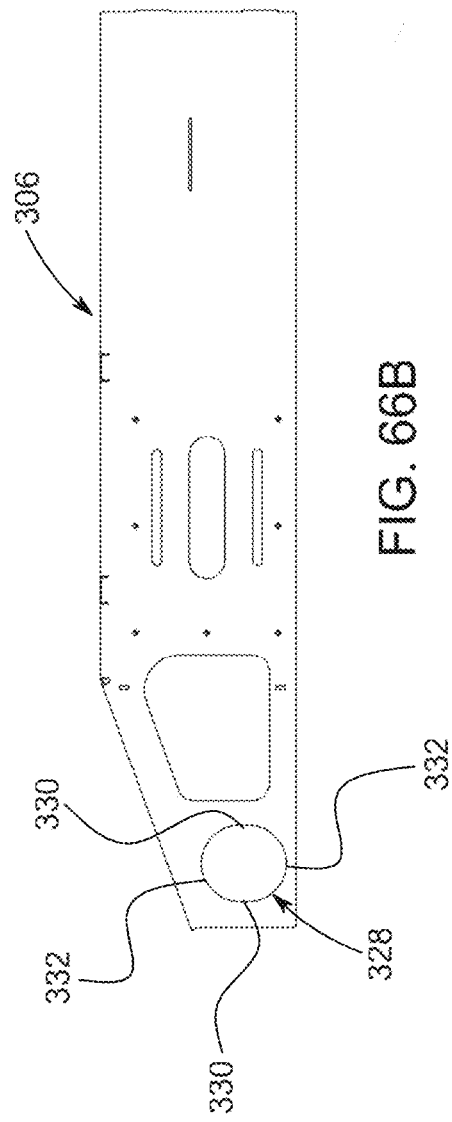

FIG. 66B shows a front view of an arm of the skeletonized head section, in accordance with one or more embodiments.

Figure 67:
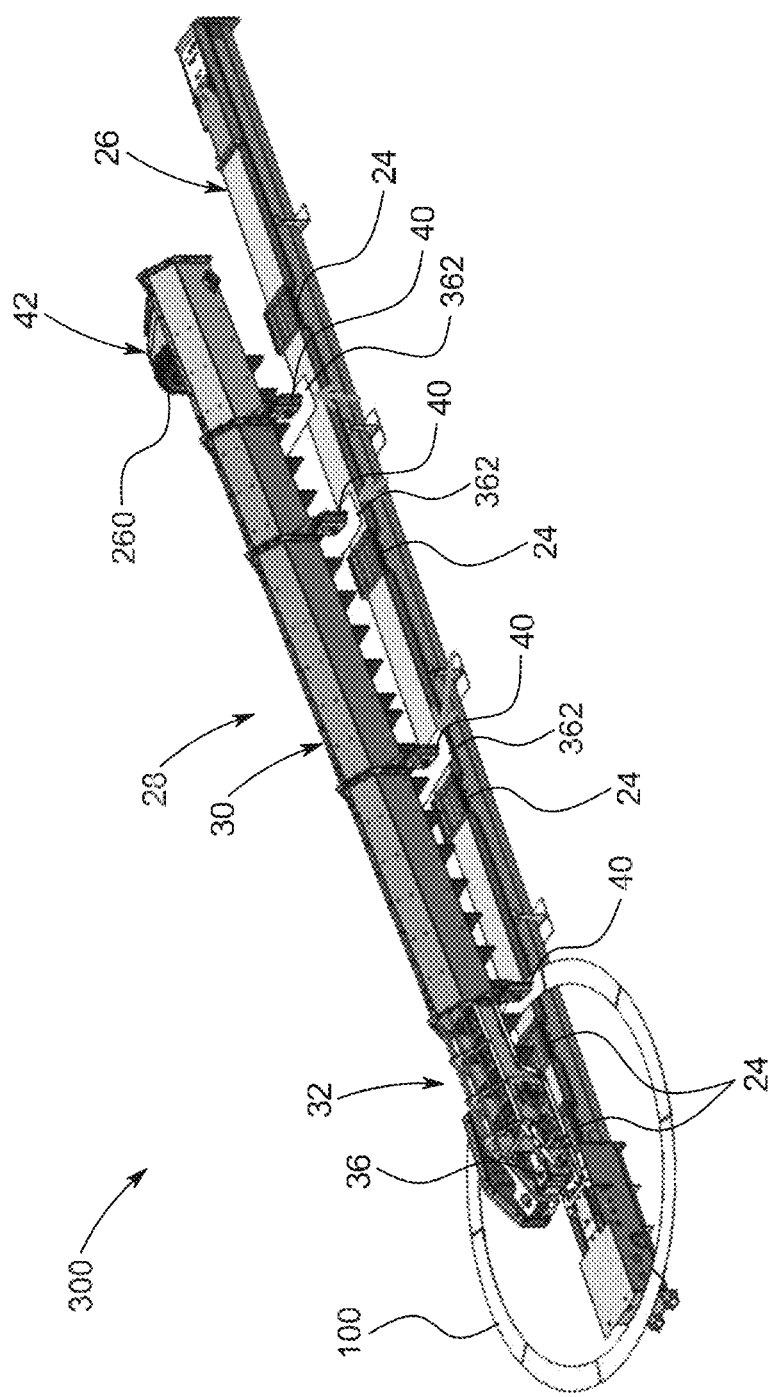

FIG. 67 shows an upper front right perspective shaded view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a raised position.

Figure 68:
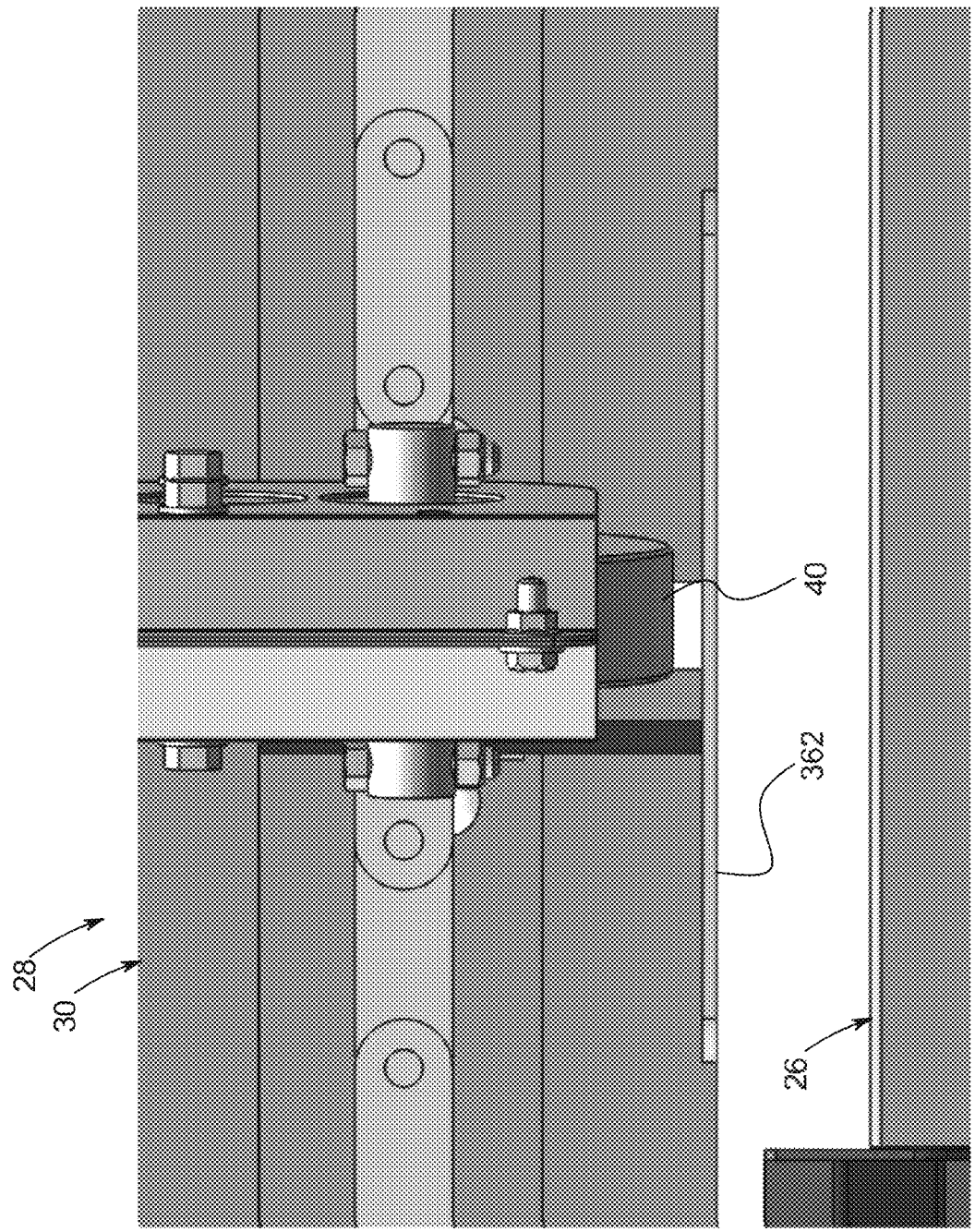

FIG. 68 shows a close up front shaded view of a carrier wheel of a sweep of an exemplary sweep system, in accordance with one or more embodiments, the view showing the carrier wheel at a slight distance above a parking plate.

Figure 69:
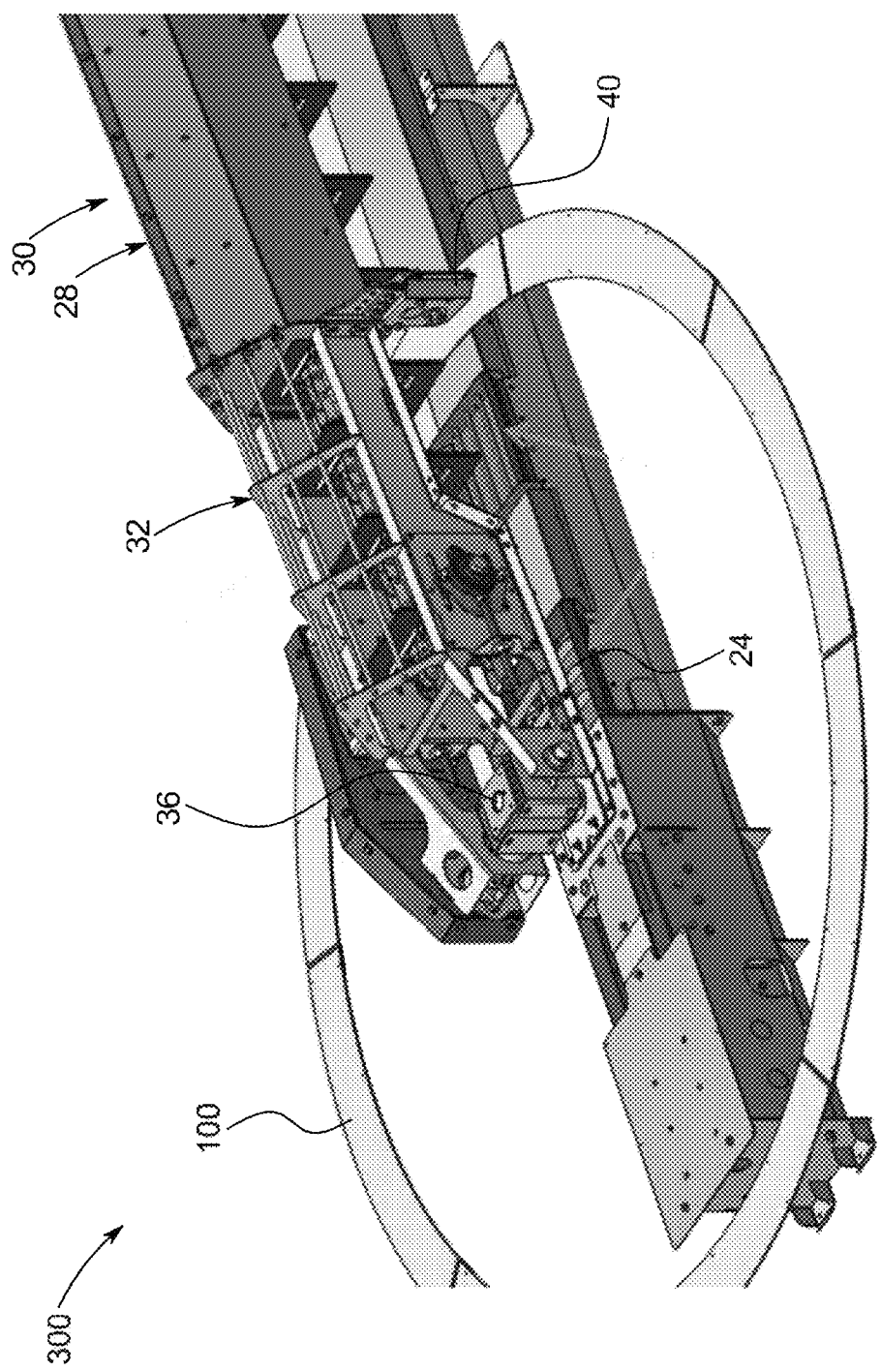

FIG. 69 shows a close up front right shaded perspective view of a head section of a sweep of an exemplary sweep system, in accordance with one or more embodiments.

Figure 70:
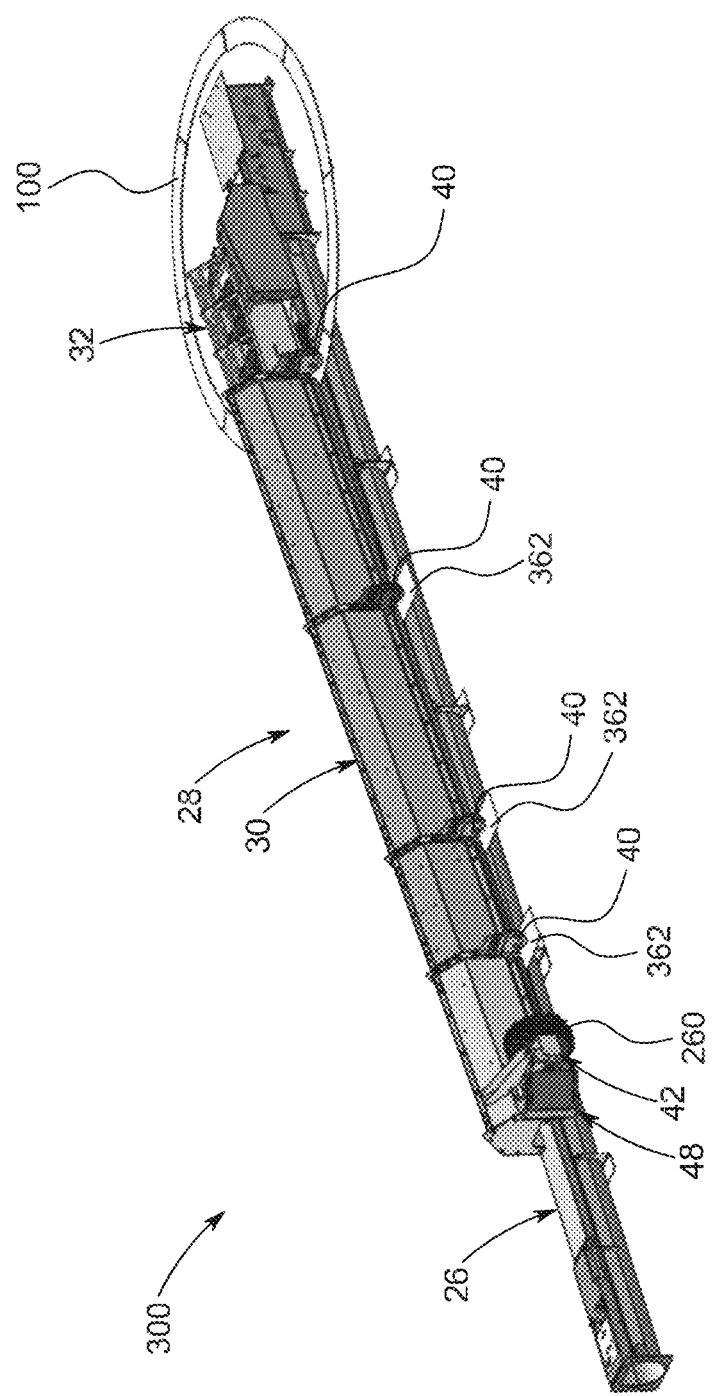

FIG. 70 shows an upper rear left perspective shaded view of an exemplary sweep system, in accordance with one or more embodiments, the view showing a sweep positioned over a grain conveyer of the system; the view showing elevated floor of a grain bin omitted; the view showing the sweep system having a skeletonized head section configured to facilitate the flow of grain through the head section; the view showing the sweep in a lowered position.

Figure 71:
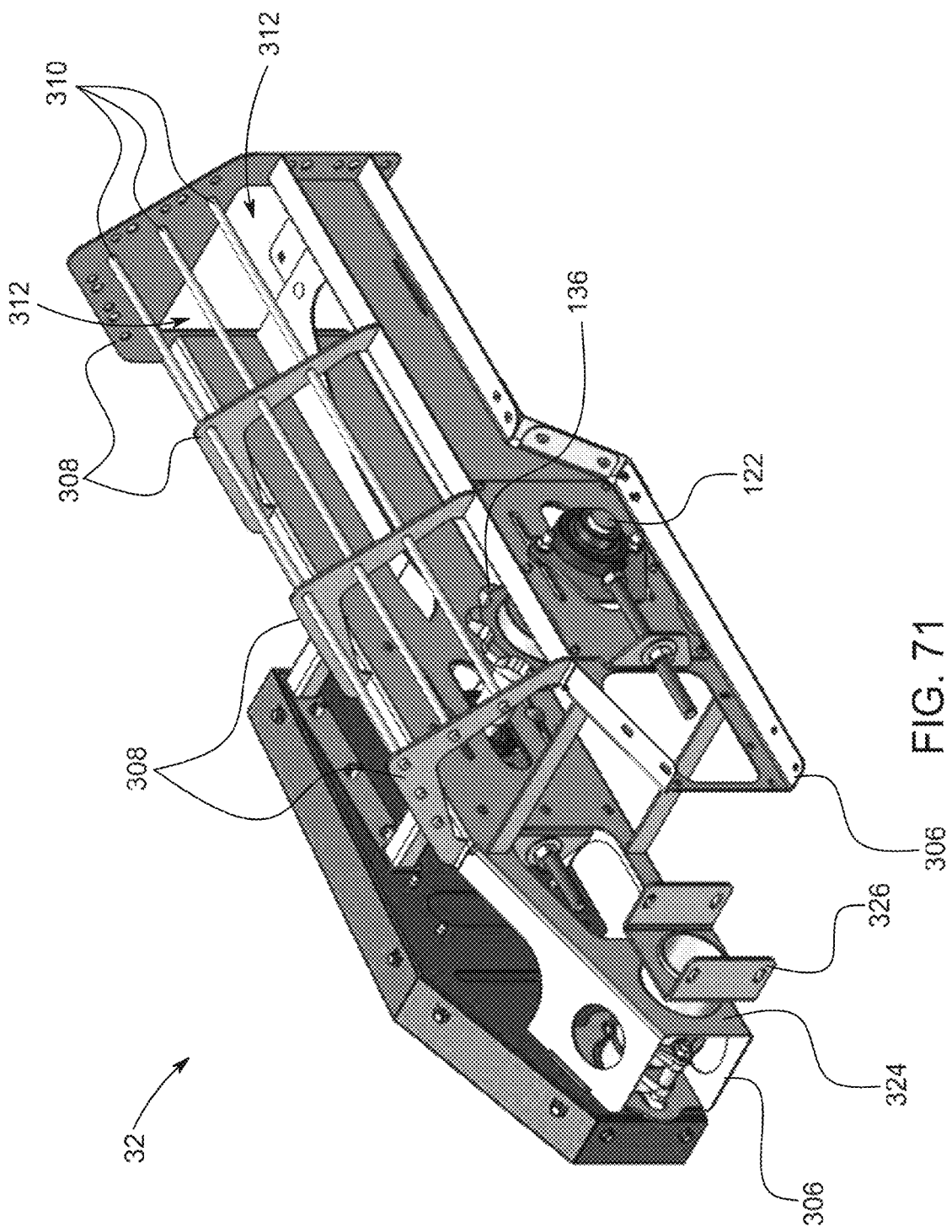

FIG. 71 shows an upper front right perspective shaded view of a skeletonized head section of an exemplary sweep system, in accordance with one or more embodiments; the view showing a shaft and a sprocket positioned in the skeletonized head section.

Figure 72:
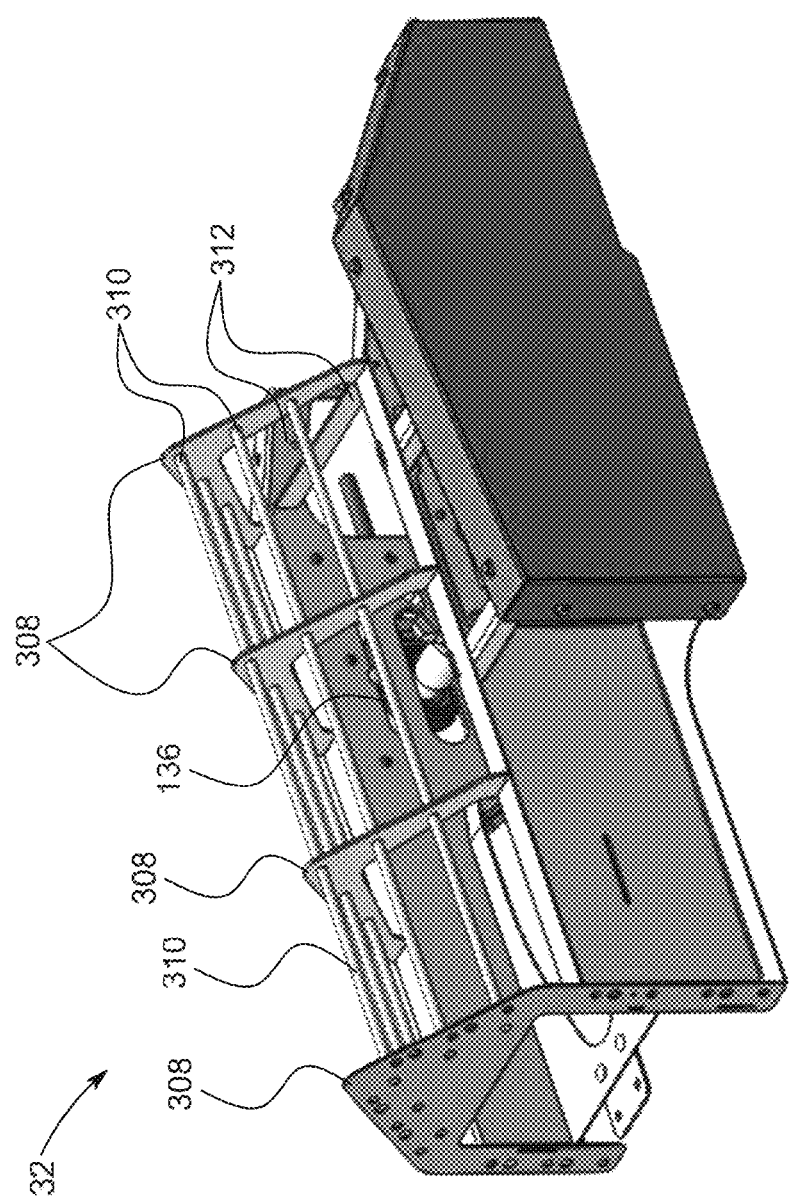

FIG. 72 shows an upper rear right perspective shaded view of a skeletonized head section of an exemplary sweep system, in accordance with one or more embodiments; the view showing a shaft and a sprocket positioned in the skeletonized head section.

Figure 73:
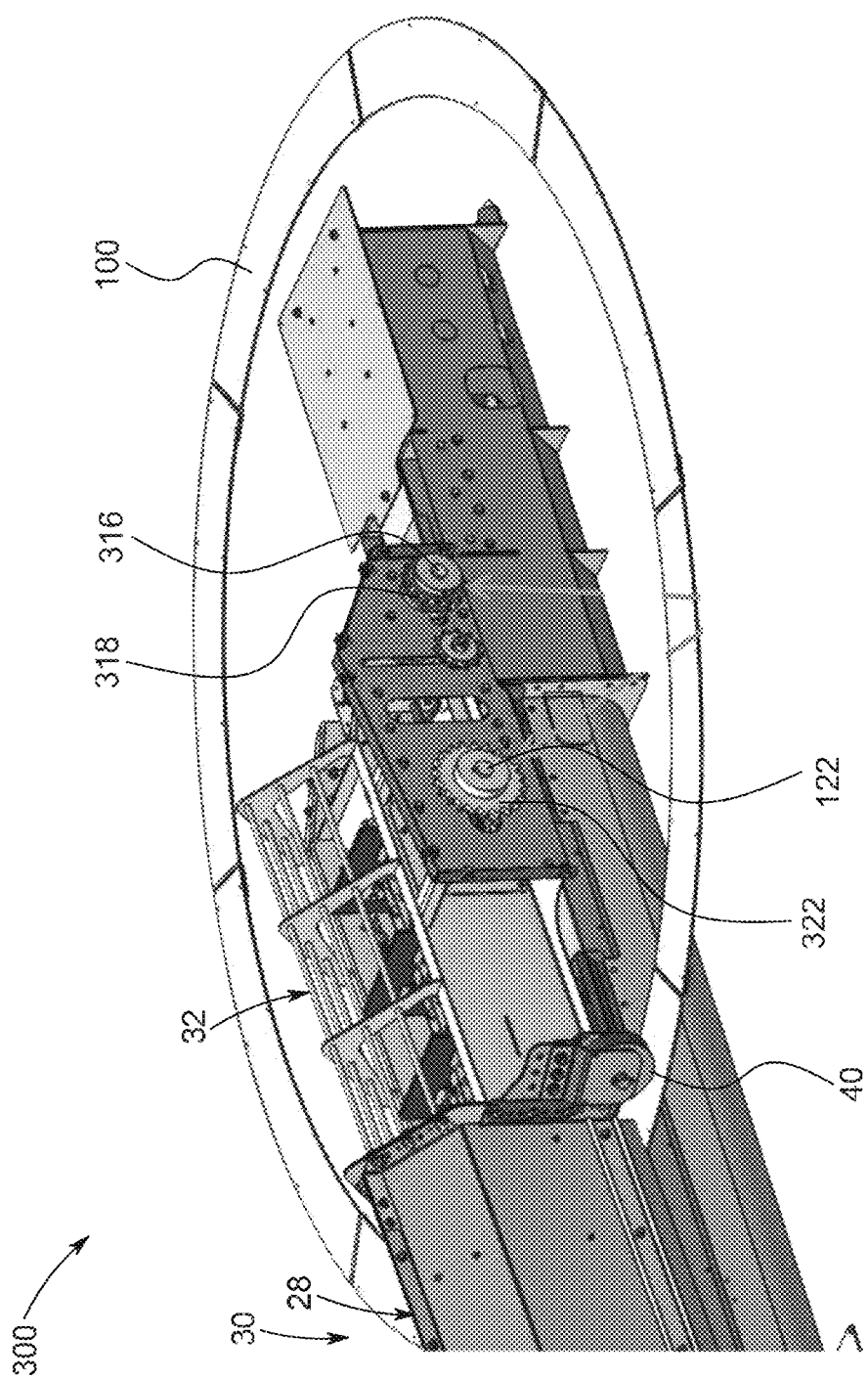

FIG. 73 shows an upper rear right perspective shaded view of a skeletonized head section of an exemplary sweep system, in accordance with one or more embodiments; the view showing an outer cover over chain sprockets omitted.

Figure 74:
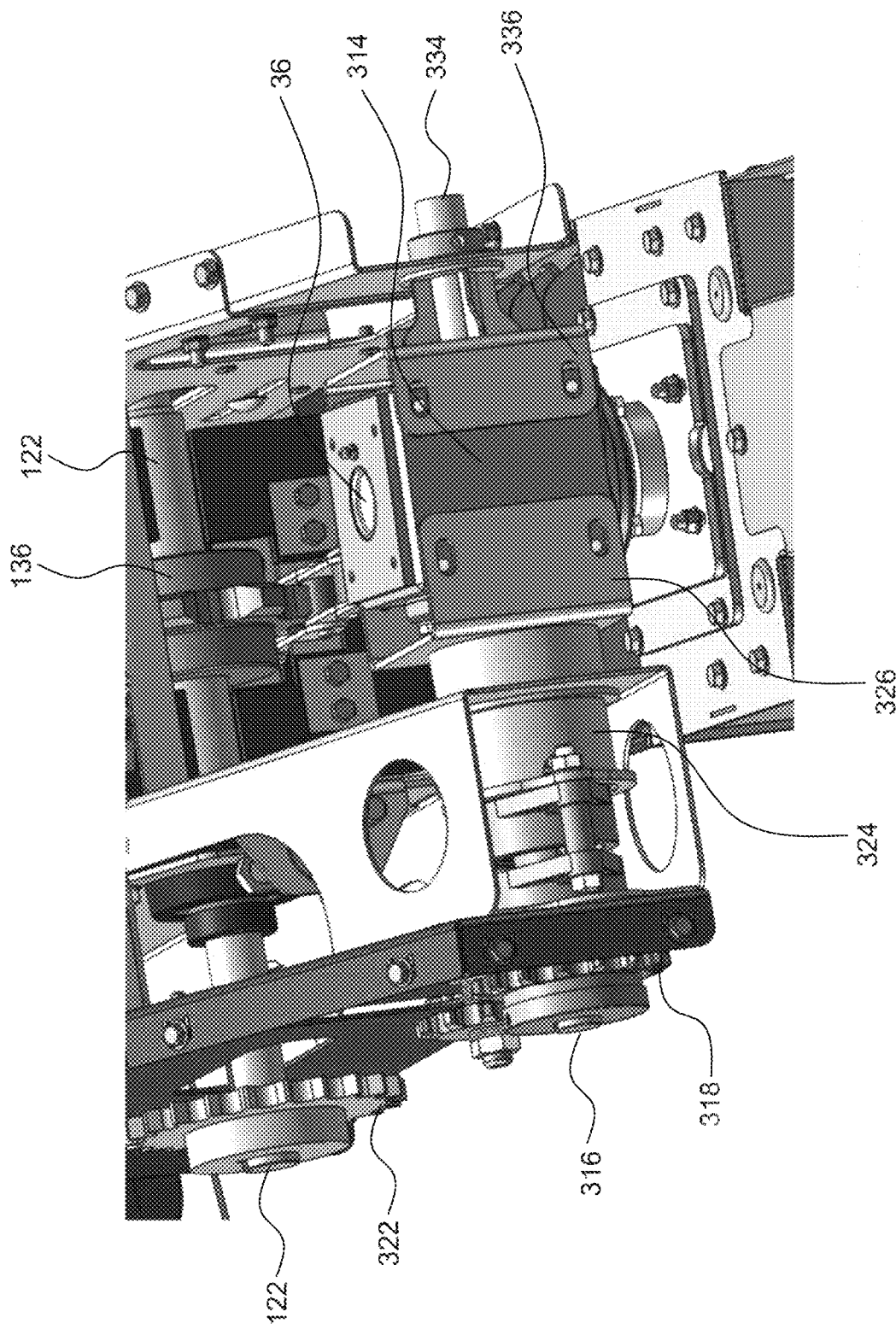

FIG. 74 shows a close up upper rear right perspective shaded view of a gearbox of a skeletonized head section of an exemplary sweep system, in accordance with one or more embodiments.

Figure 75:
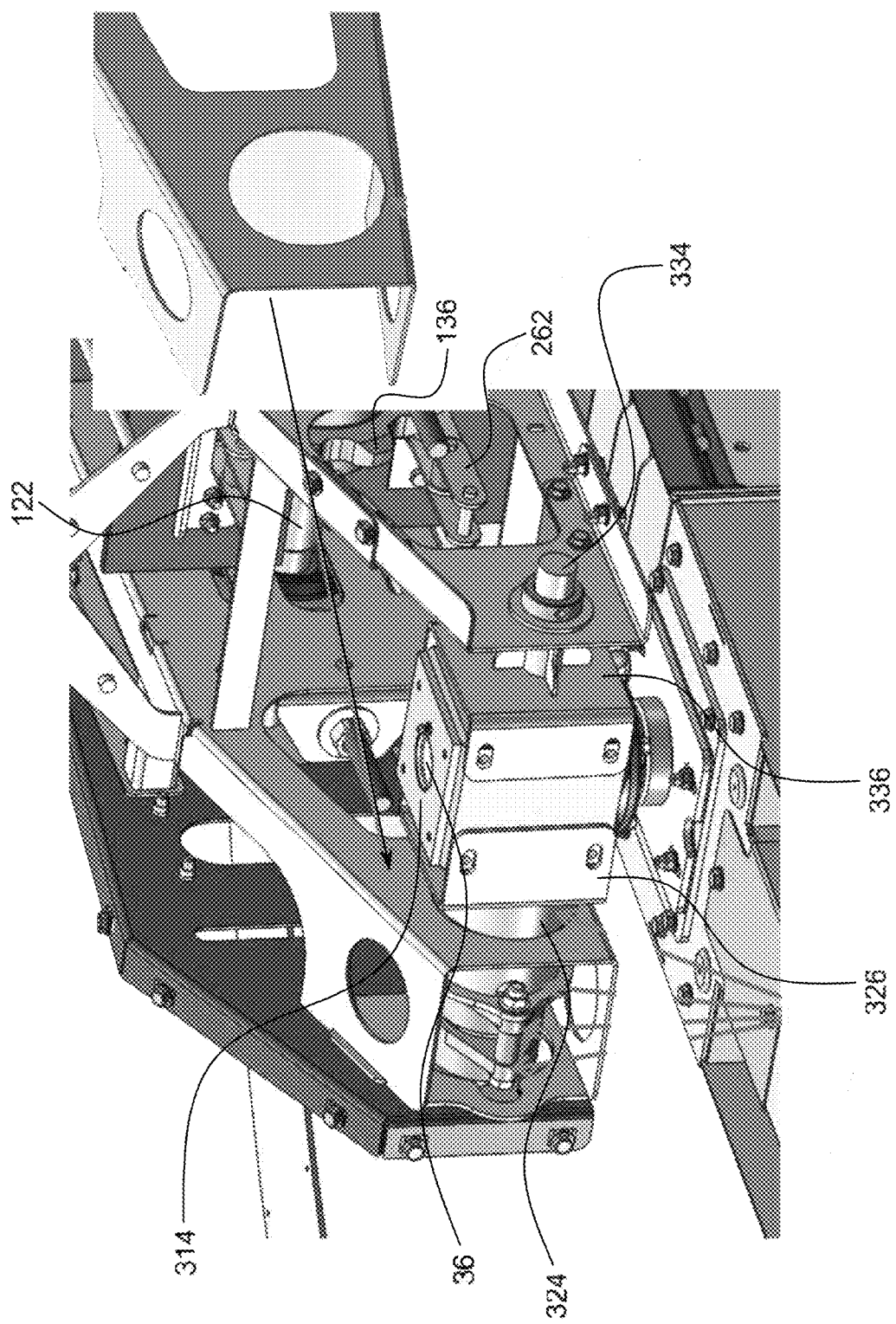

FIG. 75 shows a close up upper rear right perspective shaded view of a gearbox of a skeletonized head section of an exemplary sweep system, in accordance with one or more embodiments.

Figure 76:
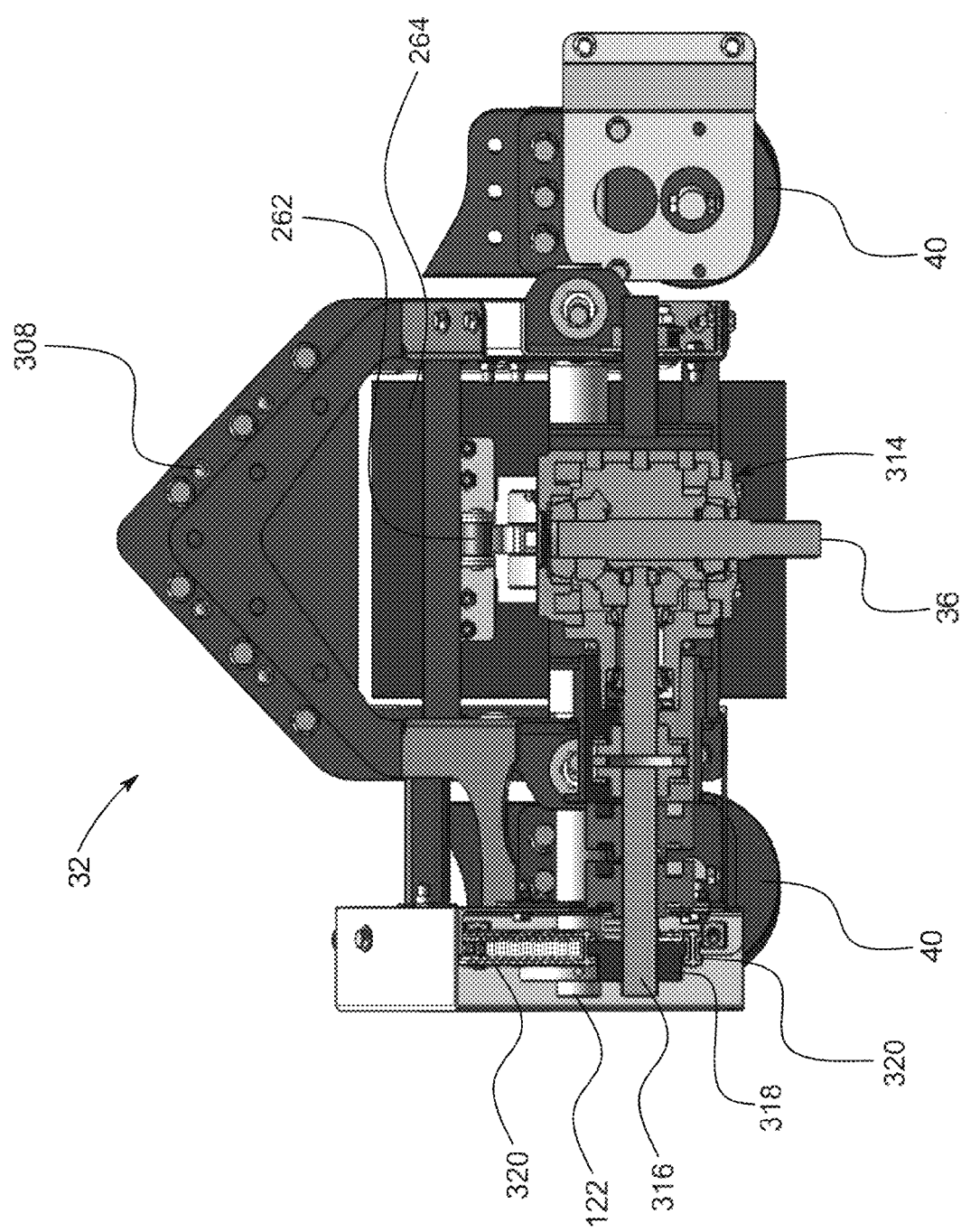

FIG. 76 shows a right side cross sectional view of a gearbox and skeletonized head section of an exemplary sweep system, in accordance with one or more embodiments.

Figure 77:
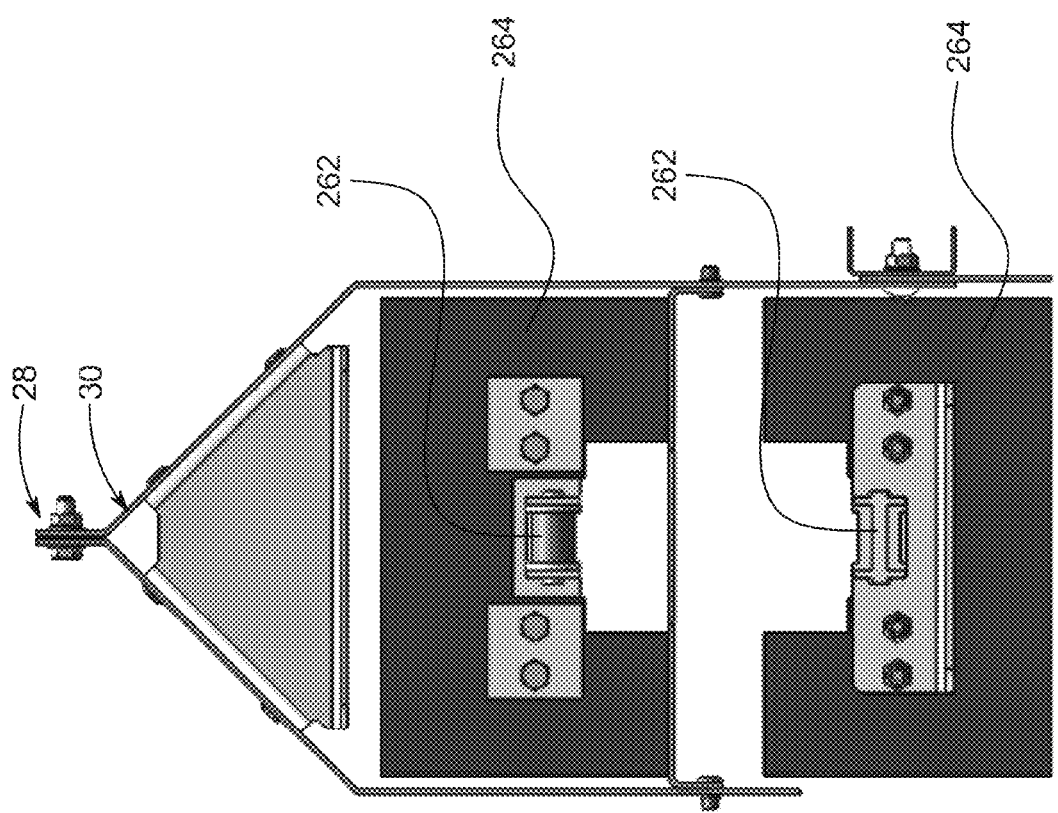

FIG. 77 shows a left side cross sectional view of an elongated body of a sweep of an exemplary sweep system, in accordance with one or more embodiments; the view showing links and paddles of a sweep mechanism.

Figure 78:
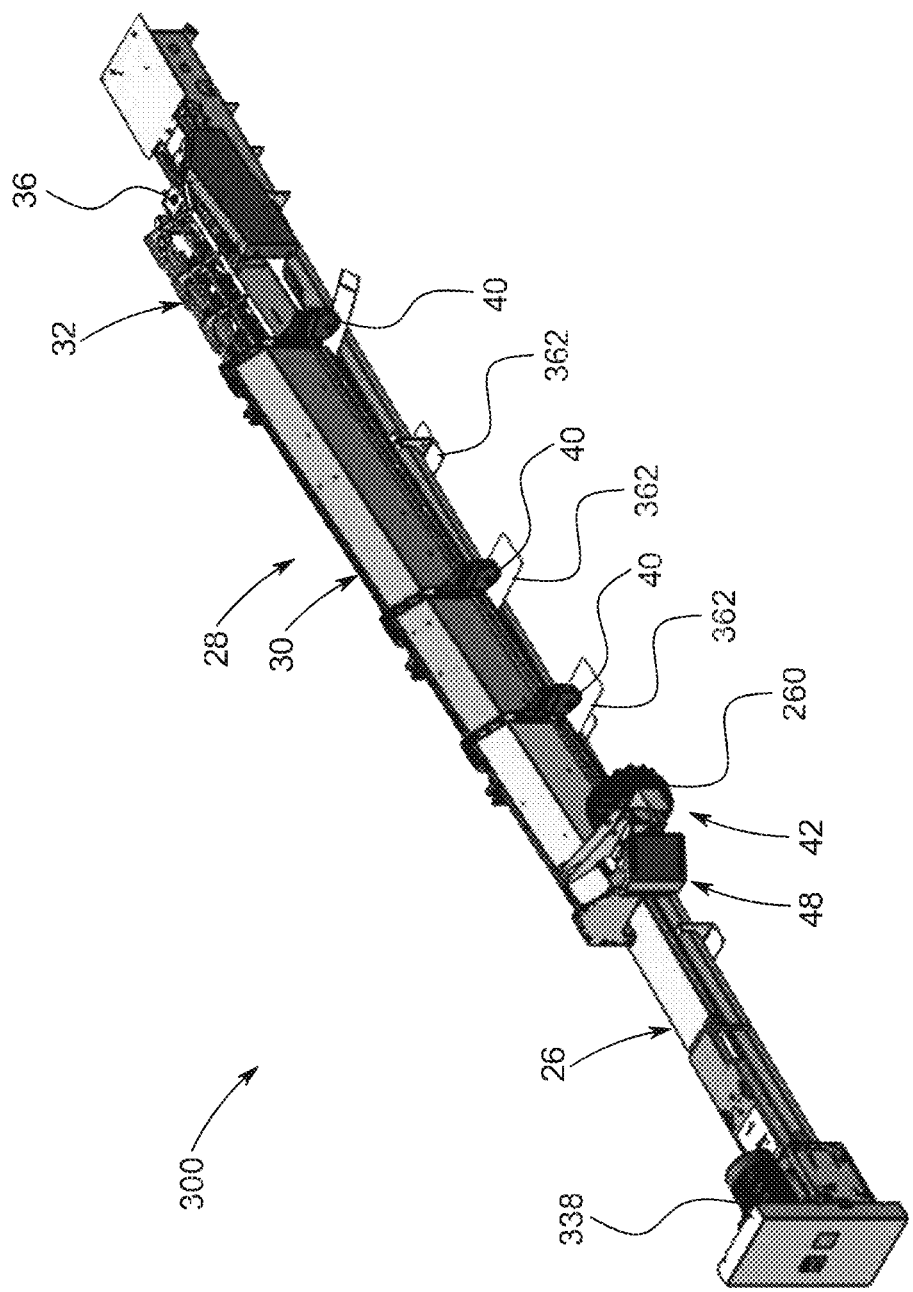

FIG. 78 shows an upper rear left perspective shaded view of an exemplary sweep system, in accordance with one or more embodiments, the view showing elevated floor of a grain bin omitted; the view showing the sweep system having a skeletonized head section configured to facilitate the flow of grain through the head section; the view showing the sweep in a lowered position; the view showing a motor connected to the grain conveyer.

Figure 79:
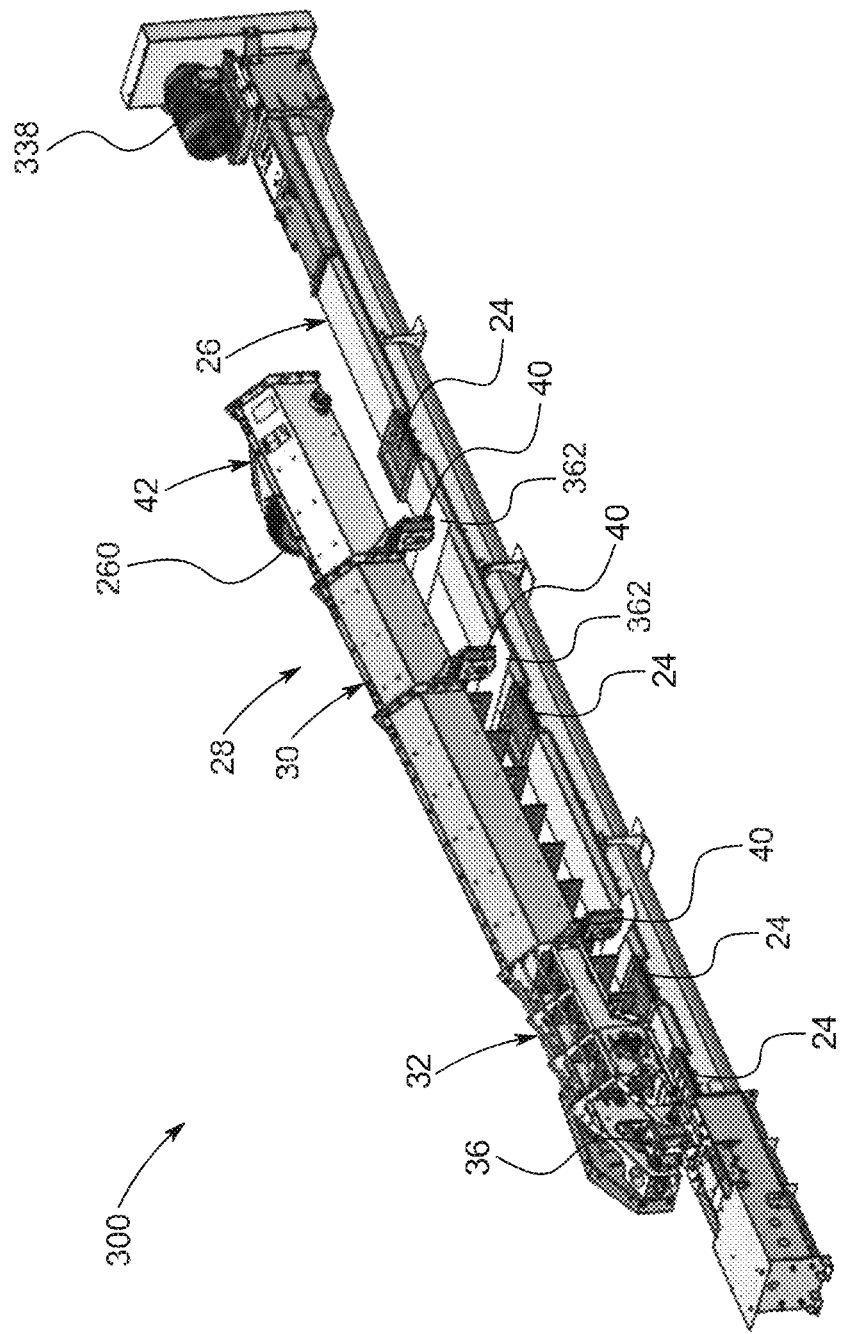

FIG. 79 shows an upper front right perspective shaded view of the exemplary sweep system shown in FIG. 78, in accordance with one or more embodiments; the view showing the sweep in a raised position.

Figure 80:
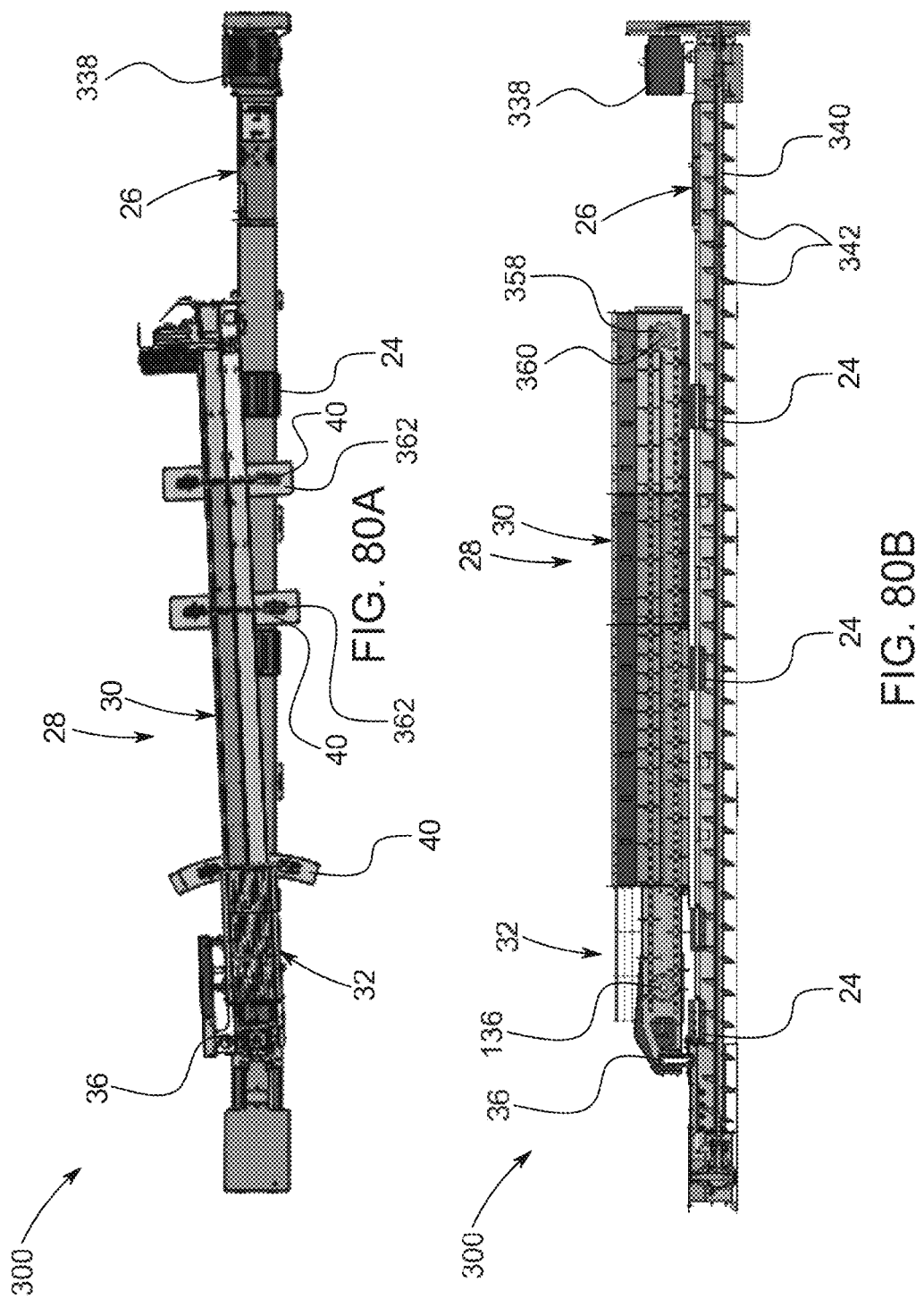

FIG. 80A shows top shaded view of the exemplary sweep system shown in FIG. 78, in accordance with one or more embodiments.

FIG. 80B shows front cross section view of the exemplary sweep system shown in FIG. 78, in accordance with one or more embodiments.

Figure 81:
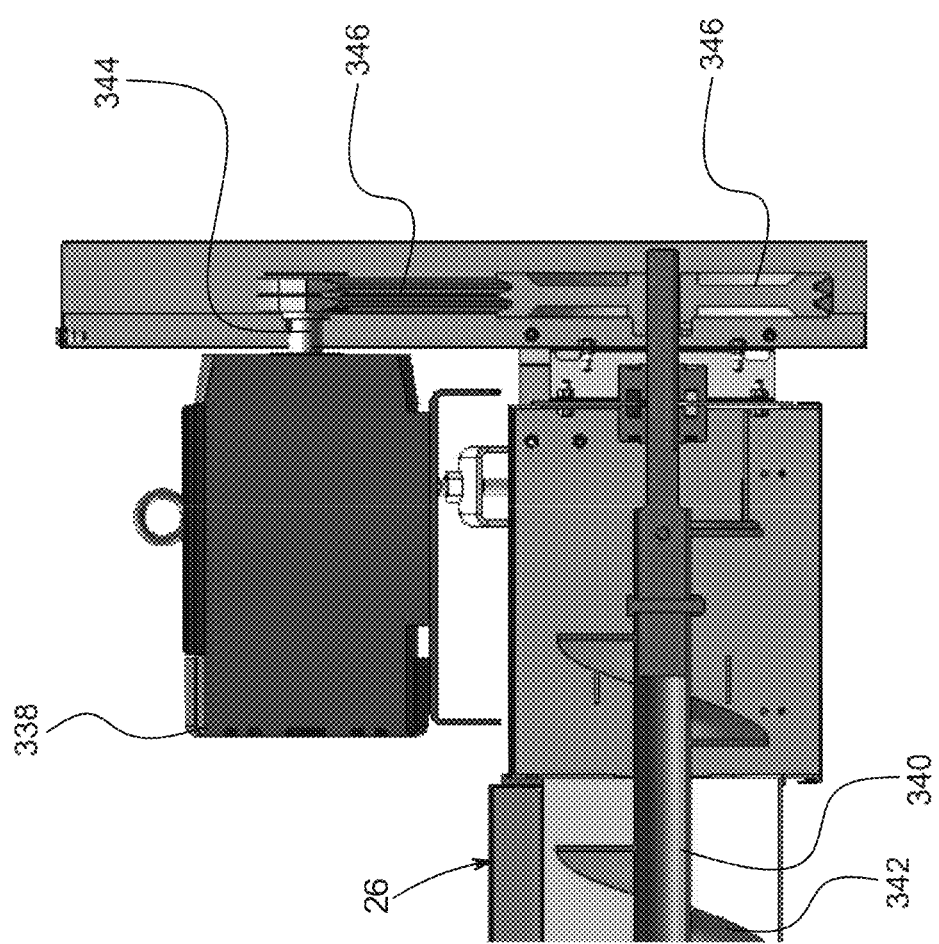

FIG. 81 shows a close up front view of the cross section shown in FIG. 80B, in accordance with one or more embodiments; the view showing the motor operably connected to the shaft at a tail end of the grain conveyer.

Figure 82:
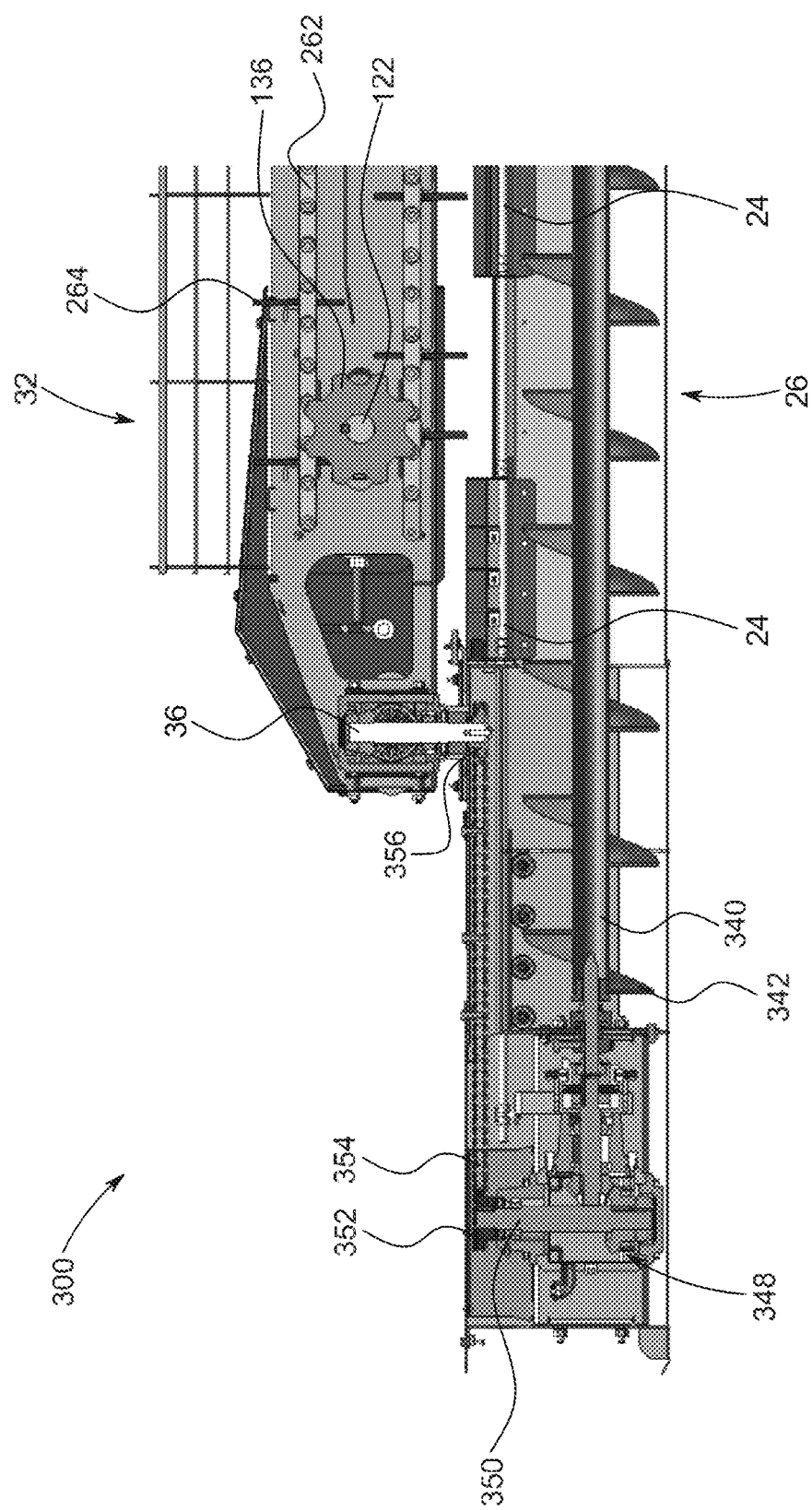

FIG. 82 shows a close up front view of the cross section shown in FIG. 80B, in accordance with one or more embodiments; the view showing the shaft of the grain conveyer operably connected to the head section of sweep.

Figure 83:
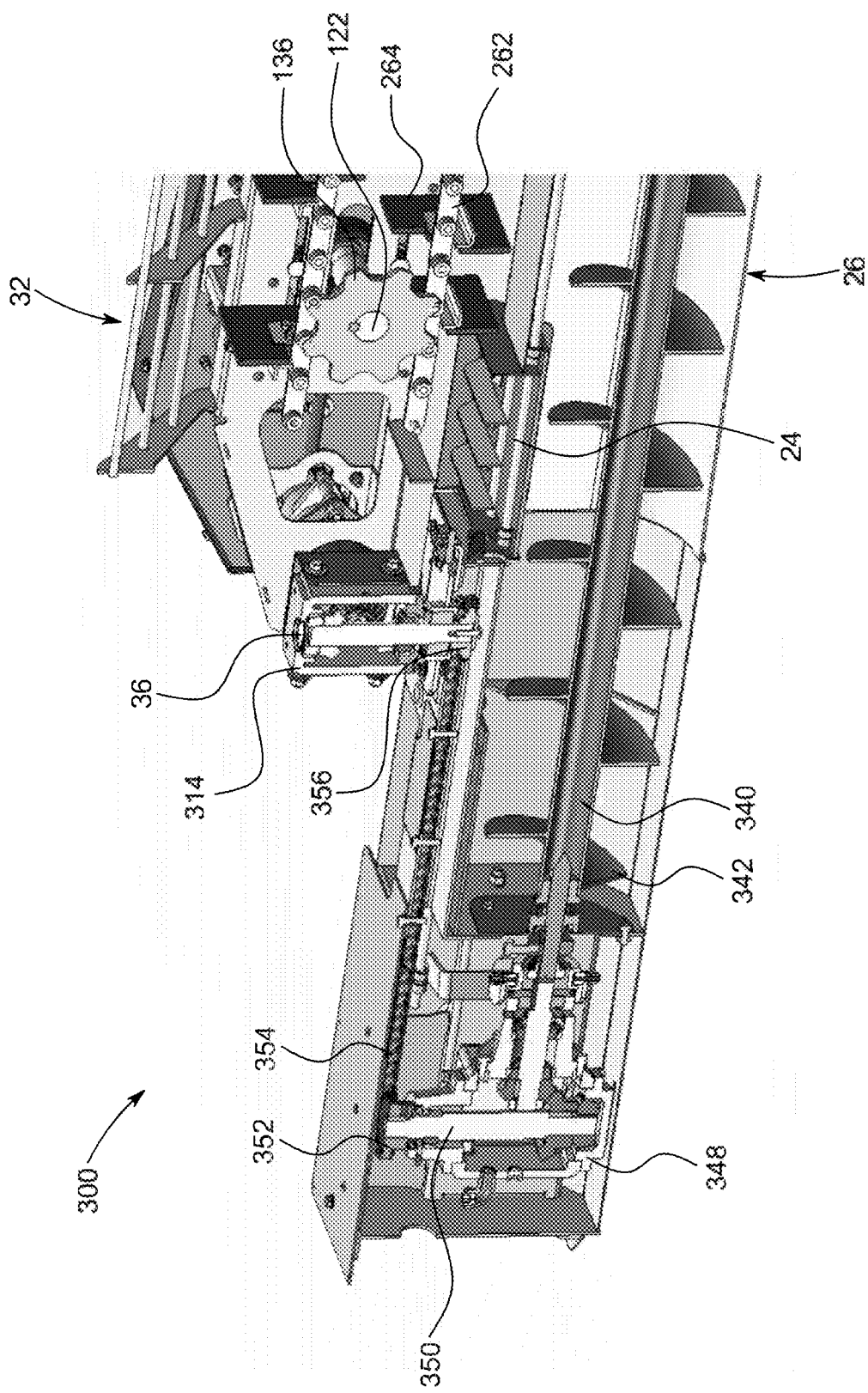

FIG. 83 shows a close up upper front left perspective view of the cross section shown in FIG. 80B, in accordance with one or more embodiments; the view showing the shaft of the grain conveyer operably connected to the head section of sweep.

Figure 84:
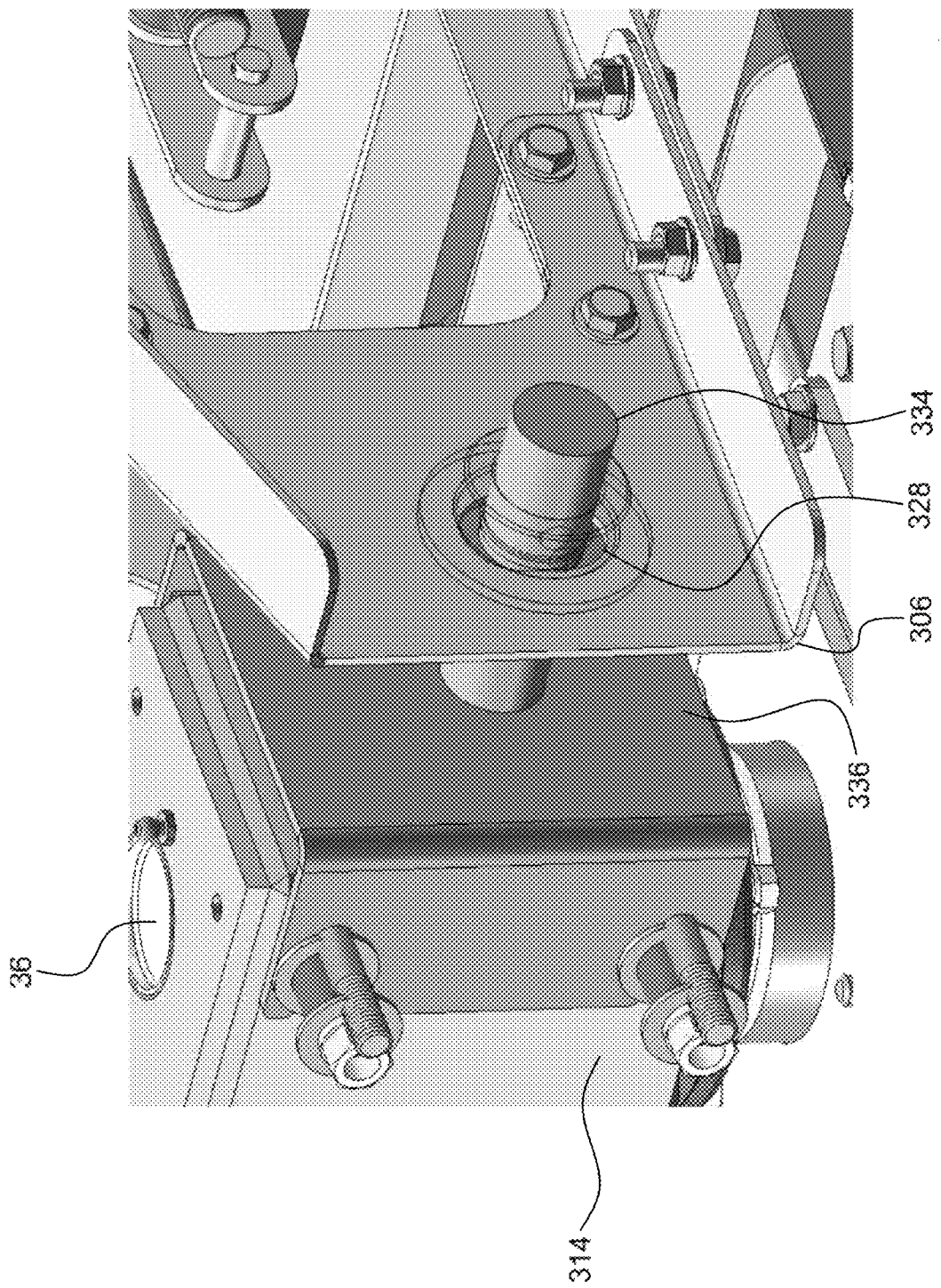

FIG. 84 shows a close up front right perspective view of a hinged connection between a gearbox and a head section of a sweep, in accordance with one or more embodiments.

Figure 85:
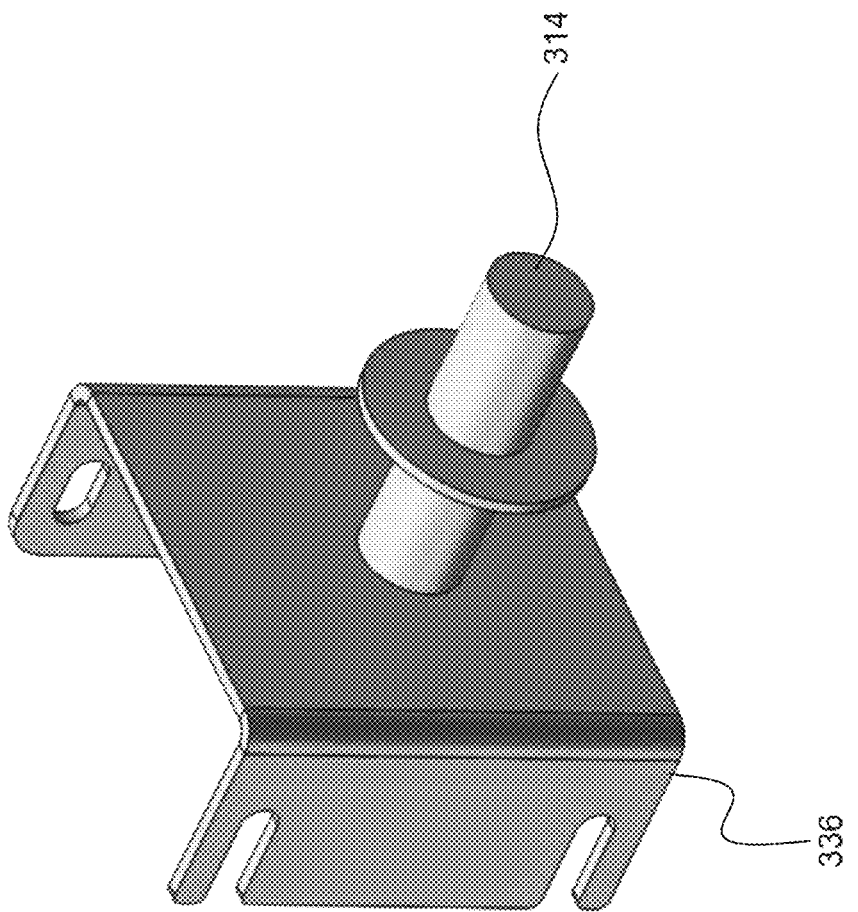

FIG. 85 shows a front right perspective view of a bracket of the hinged connection shown in FIG. 84, in accordance with one or more embodiments.

Figure 86:
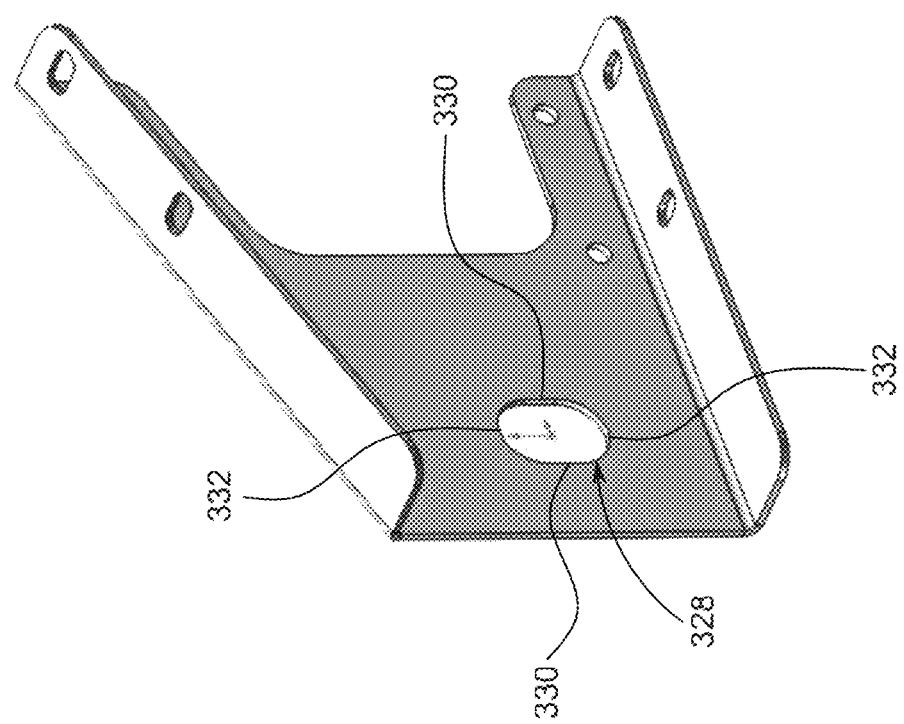

FIG. 86 shows a front right perspective view of an arm of a head section shown in FIG. 84, in accordance with one or more embodiments.

Figure 87:
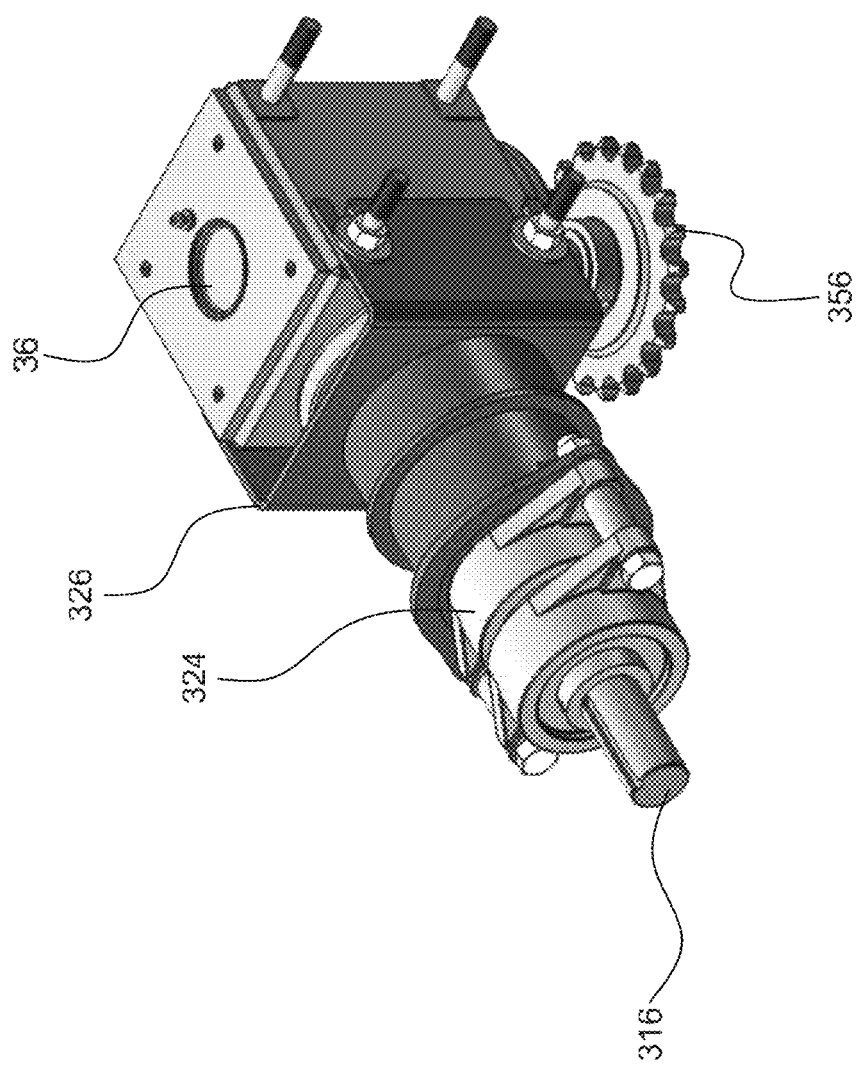

FIG. 87 shows an upper rear right perspective view of a gearbox of a head section of an exemplary sweep system, in accordance with one or more embodiments.

Figure 88:
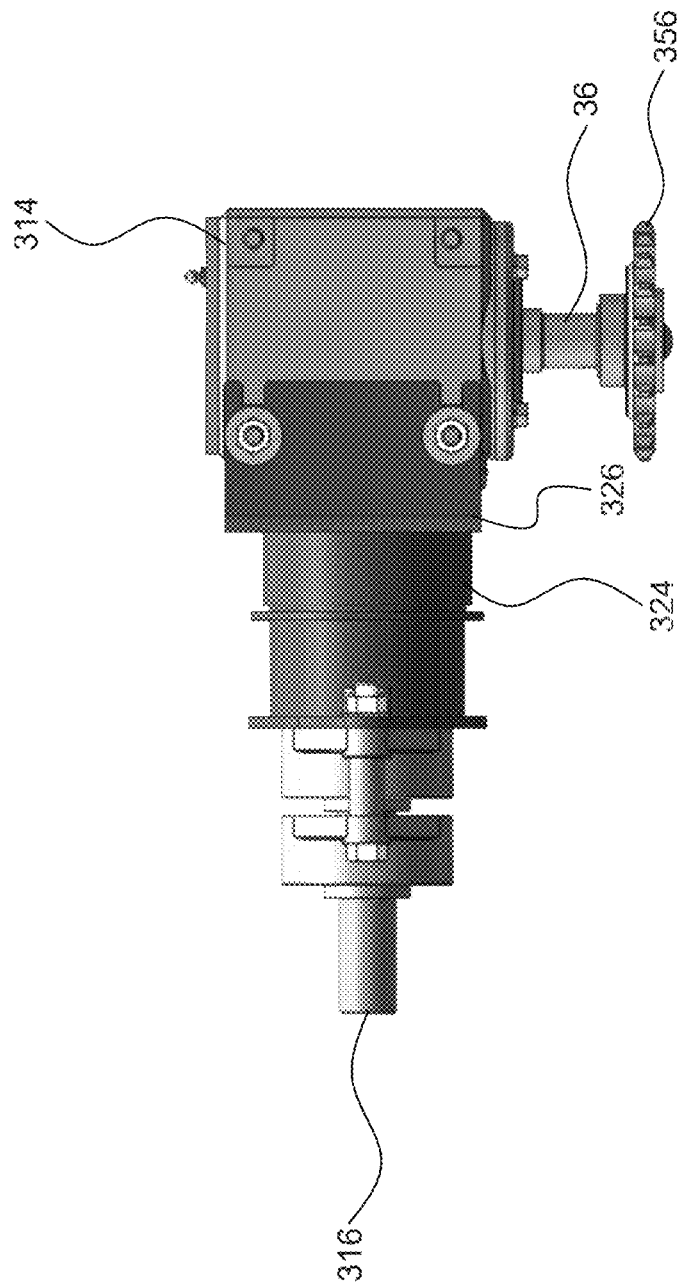

FIG. 88 shows right side view of the gearbox shown in FIG. 87, in accordance with one or more embodiments.

Figure 89:
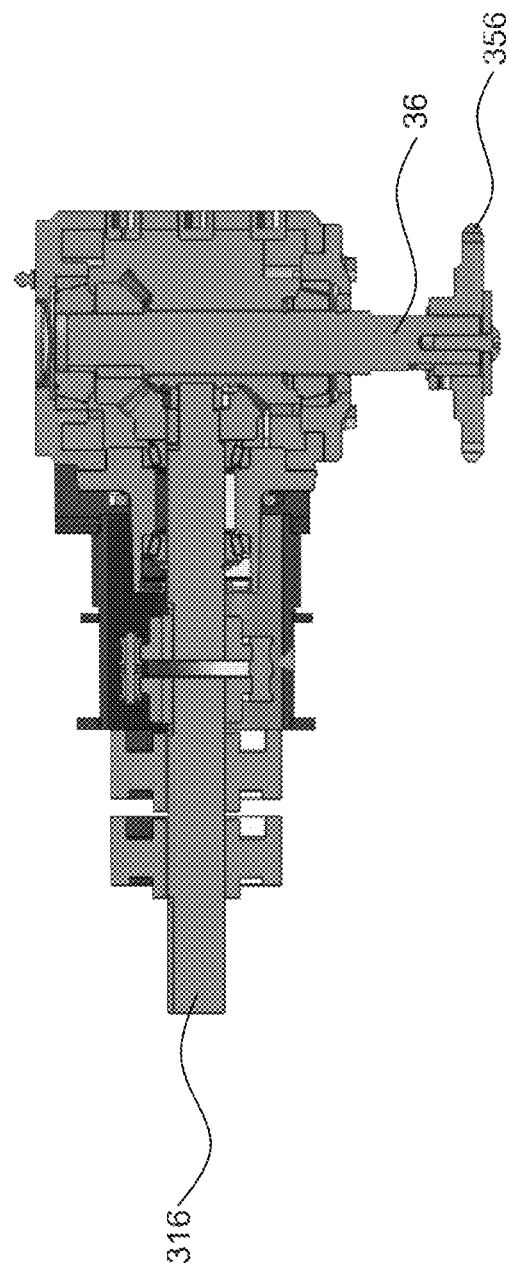

FIG. 89 shows right side cross section view of the gearbox shown in FIG. 88, in accordance with one or more embodiments.

Figure 90:
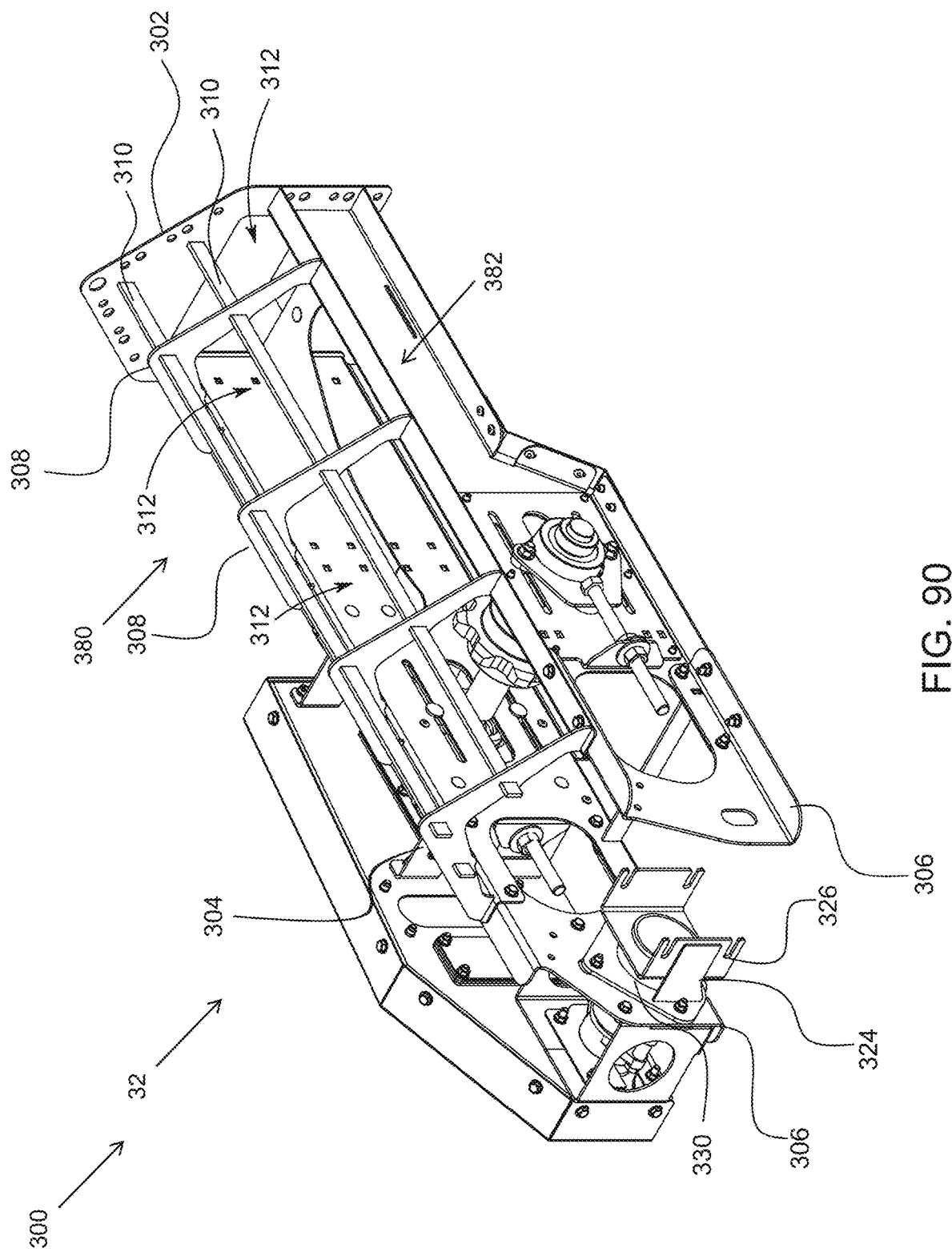

FIG. 90 shows an upper front right perspective view of a skeletonized head section of an exemplary sweep system, in accordance with one or more embodiments.

Figure 91:
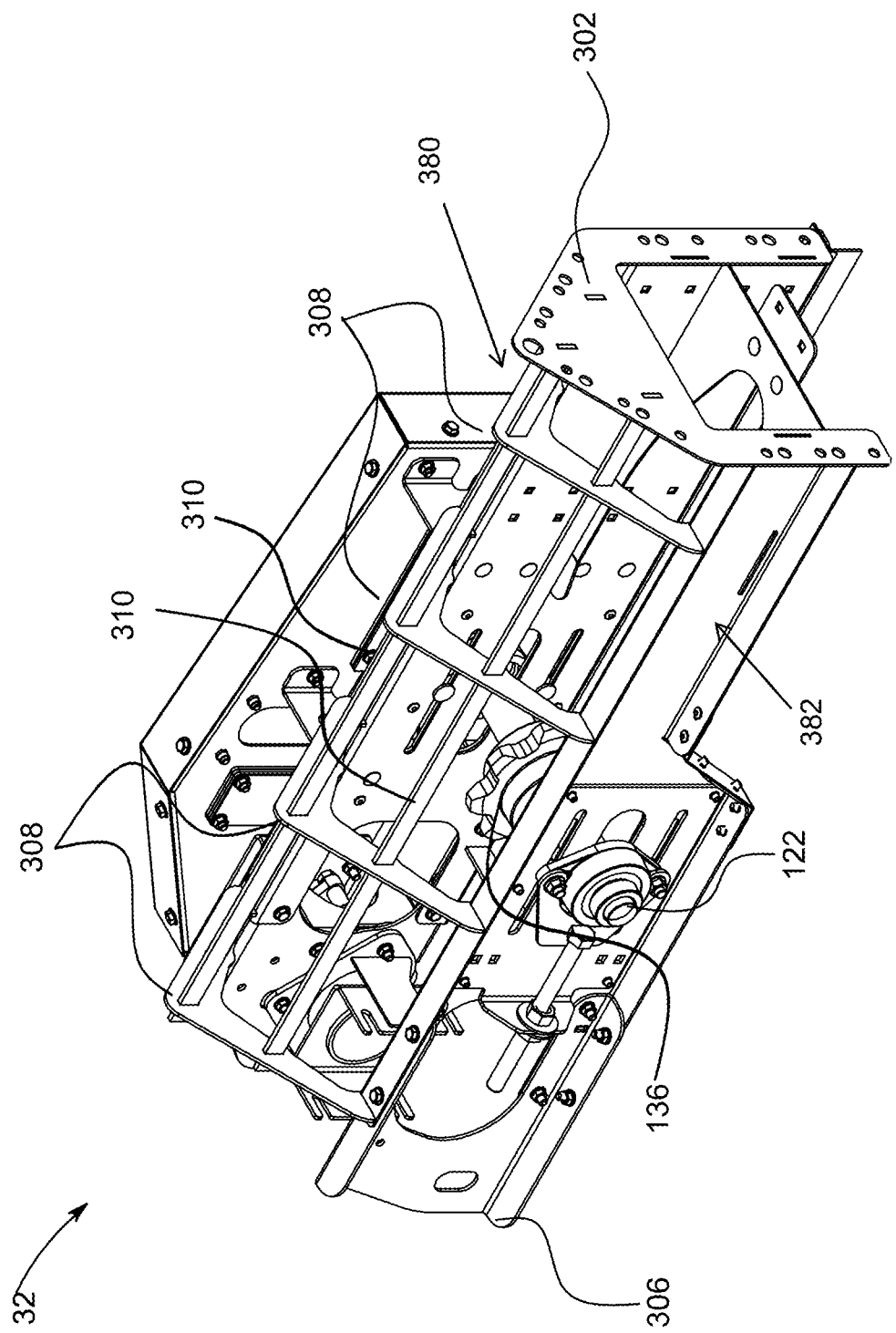

FIG. 91 shows an upper front left perspective view of the head section shown in FIG. 90, in accordance with one or more embodiments.

Figure 92A:
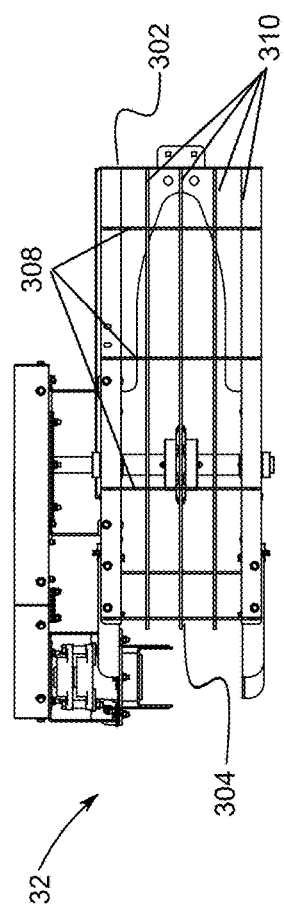

FIG. 92A shows a top view of the head section shown in FIG. 90, in accordance with one or more embodiments.

Figure 92B:
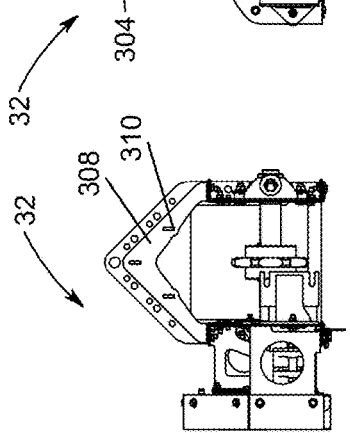

FIG. 92B shows a right side view of the head section shown in FIG. 90, in accordance with one or more embodiments.

Figure 92C:
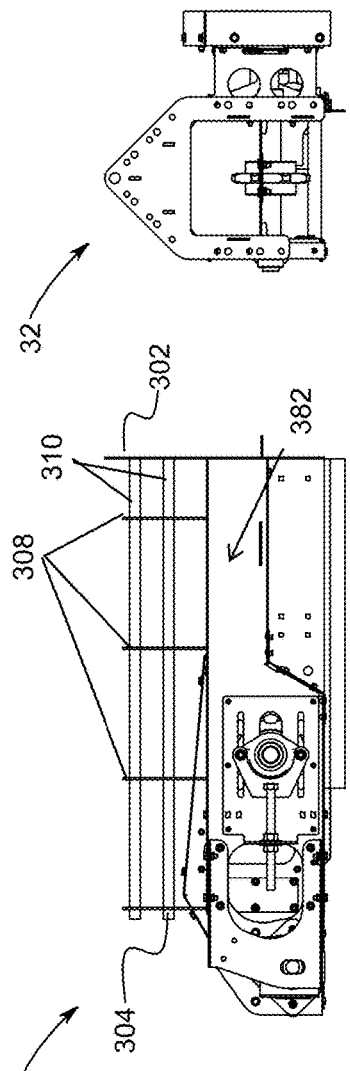

FIG. 92C shows a front view of the head section shown in FIG. 90, in accordance with one or more embodiments.

Figure 92D:
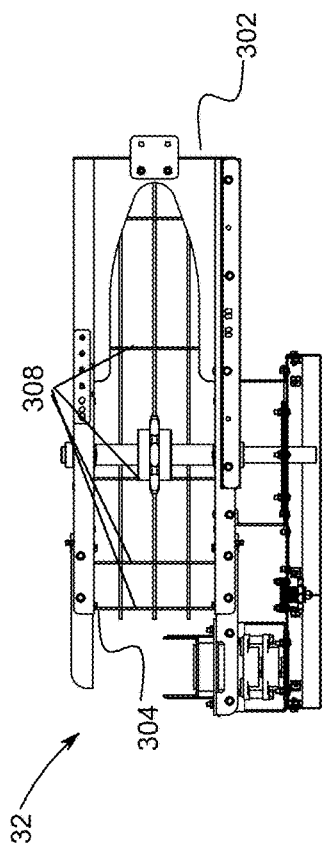

FIG. 92D shows a left side view of the head section shown in FIG. 90, in accordance with one or more embodiments.

Figure 92E:
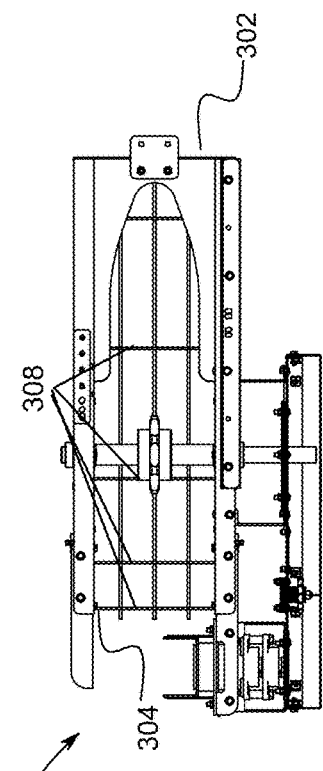

FIG. 92E shows a bottom view of the head section shown in FIG. 90, in accordance with one or more embodiments.

Figure 93:
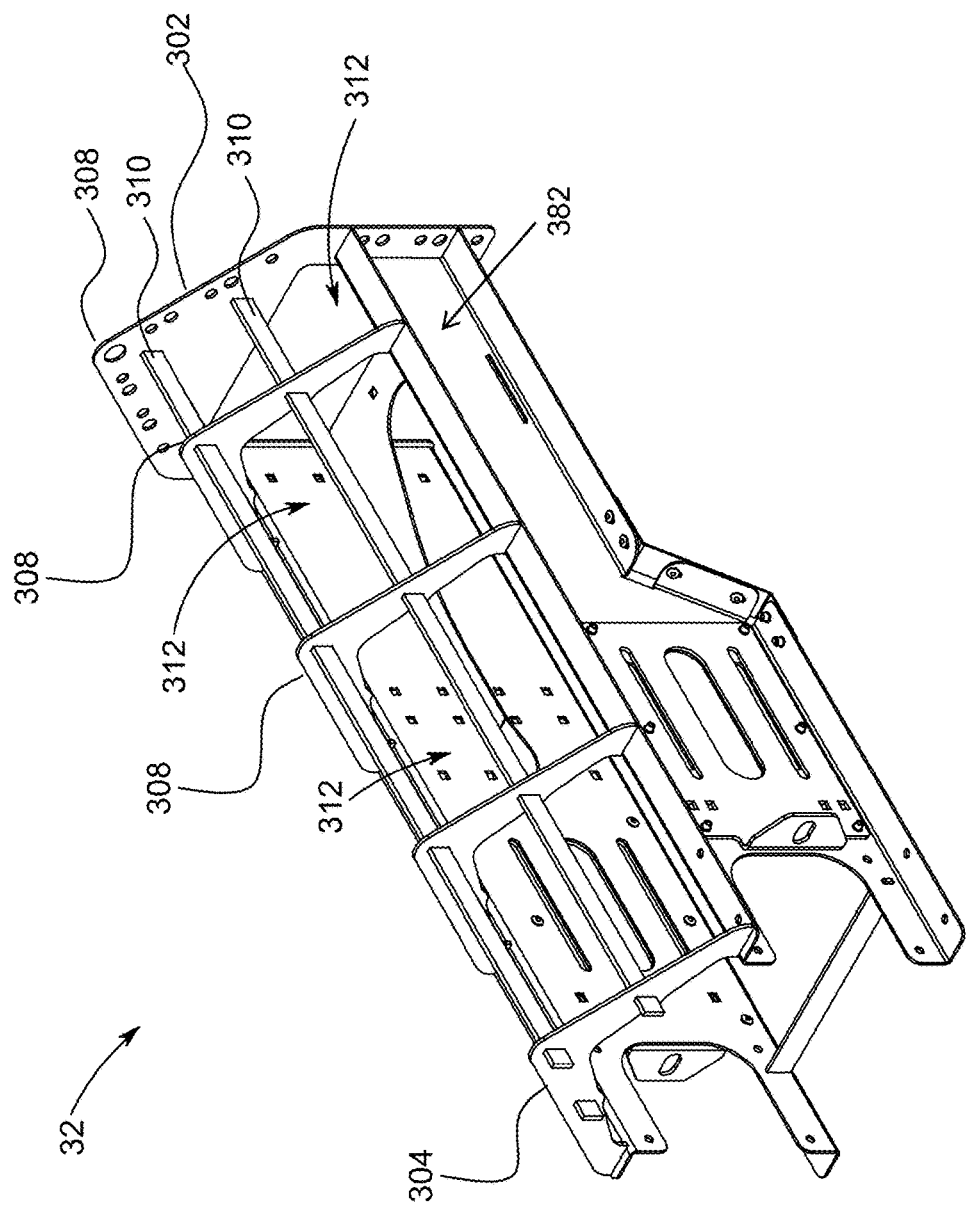

FIG. 93 shows an upper front right perspective view of a skeletonized head section of an exemplary sweep system, in accordance with one or more embodiments; the view showing head section with gearbox, chain, sprockets and various other components omitted.

FIG. 94A shows a top view of the head section shown in FIG. 93, in accordance with one or more embodiments.

FIG. 94B shows a right side view of the head section shown in FIG. 93, in accordance with one or more embodiments.

FIG. 94C shows a front view of the head section shown in FIG. 93, in accordance with one or more embodiments.

FIG. 94D shows a left side view of the head section shown in FIG. 93, in accordance with one or more embodiments.

FIG. 94E shows a bottom view of the head section shown in FIG. 93, in accordance with one or more embodiments.

Figure 95:
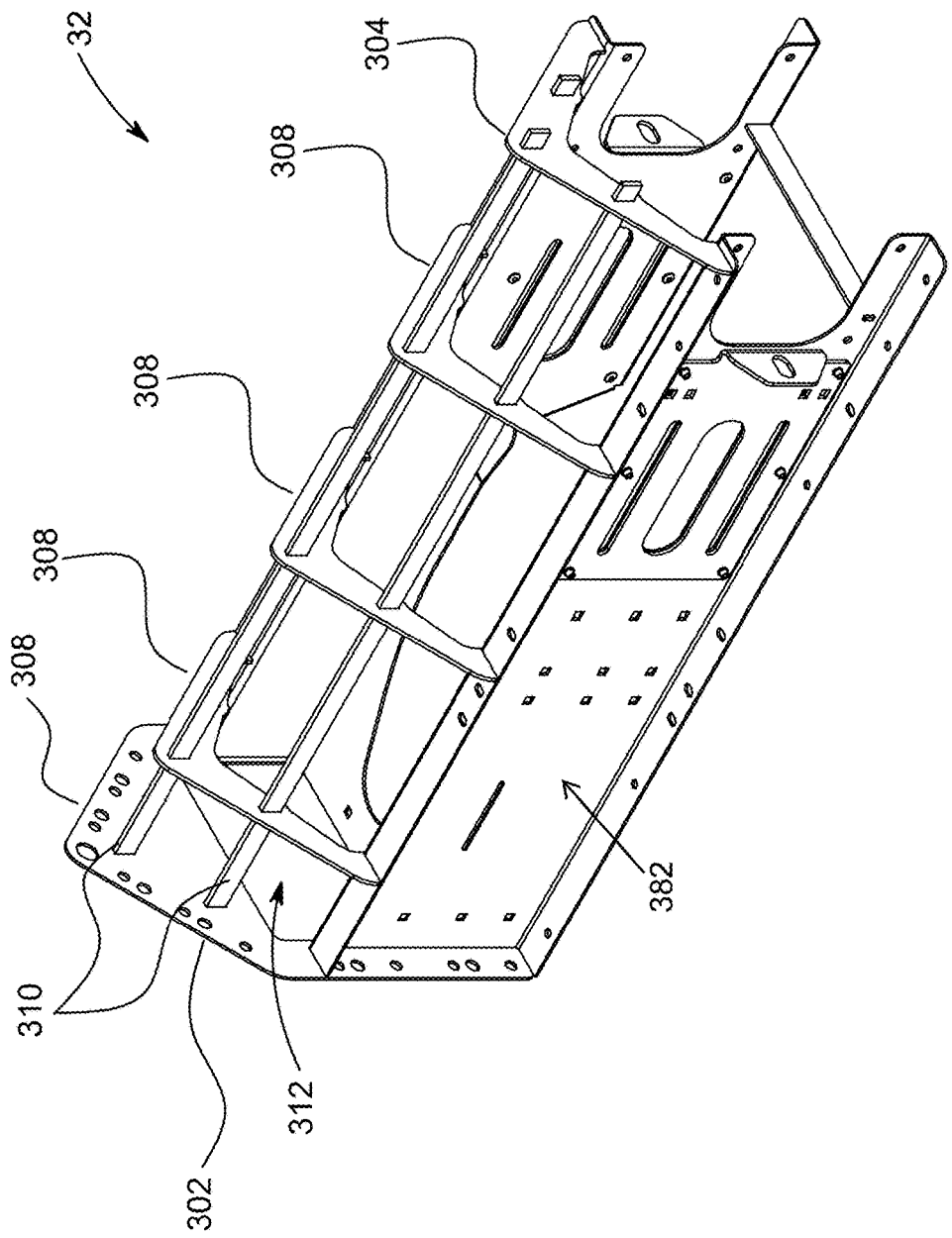

FIG. 95 shows upper rear left perspective view of the head section shown in FIG. 93, in accordance with one or more embodiments.

FIG. 96A shows a front view of a support member of an exposed frame portion of an exemplary head section, in accordance with one or more embodiments.

FIG. 96B shows an upper front right perspective view of a support member of an exposed frame portion of an exemplary head section, in accordance with one or more embodiments.

FIG. 96C shows a right side view of a support member of an exposed frame portion of an exemplary head section, in accordance with one or more embodiments.

Figure 97:
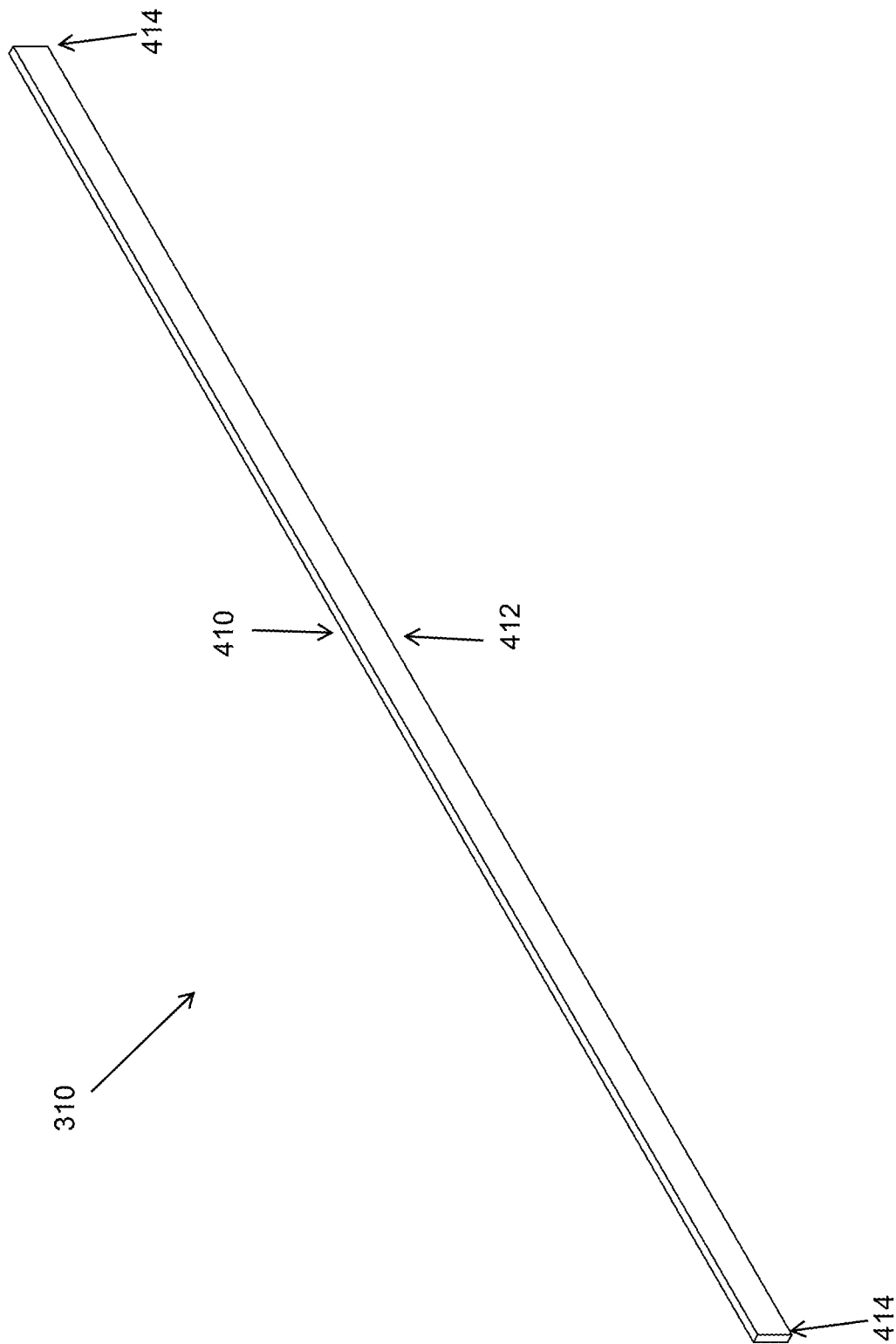

FIG. 97 shows an upper front right side view of a bar of an exposed frame portion of an exemplary head section, in accordance with one or more embodiments.

Figure 98:
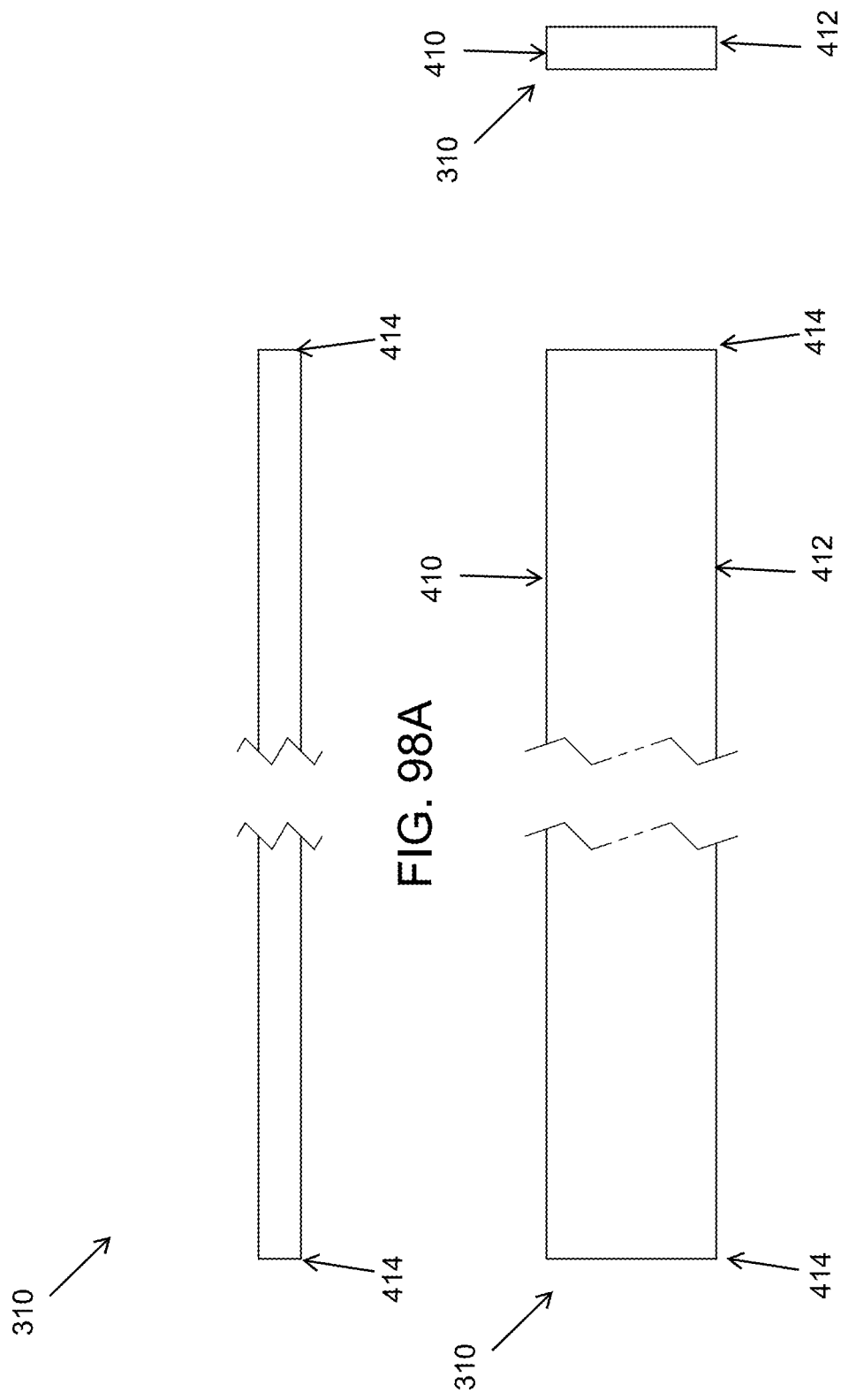

FIG. 98A shows a top view of the bar shown in FIG. 97, in accordance with one or more embodiments.

FIG. 98B shows front view of the bar shown in FIG. 97, in accordance with one or more embodiments.

FIG. 98C shows a side view of the bar shown in FIG. 97, in accordance with one or more embodiments.

Figure 99:
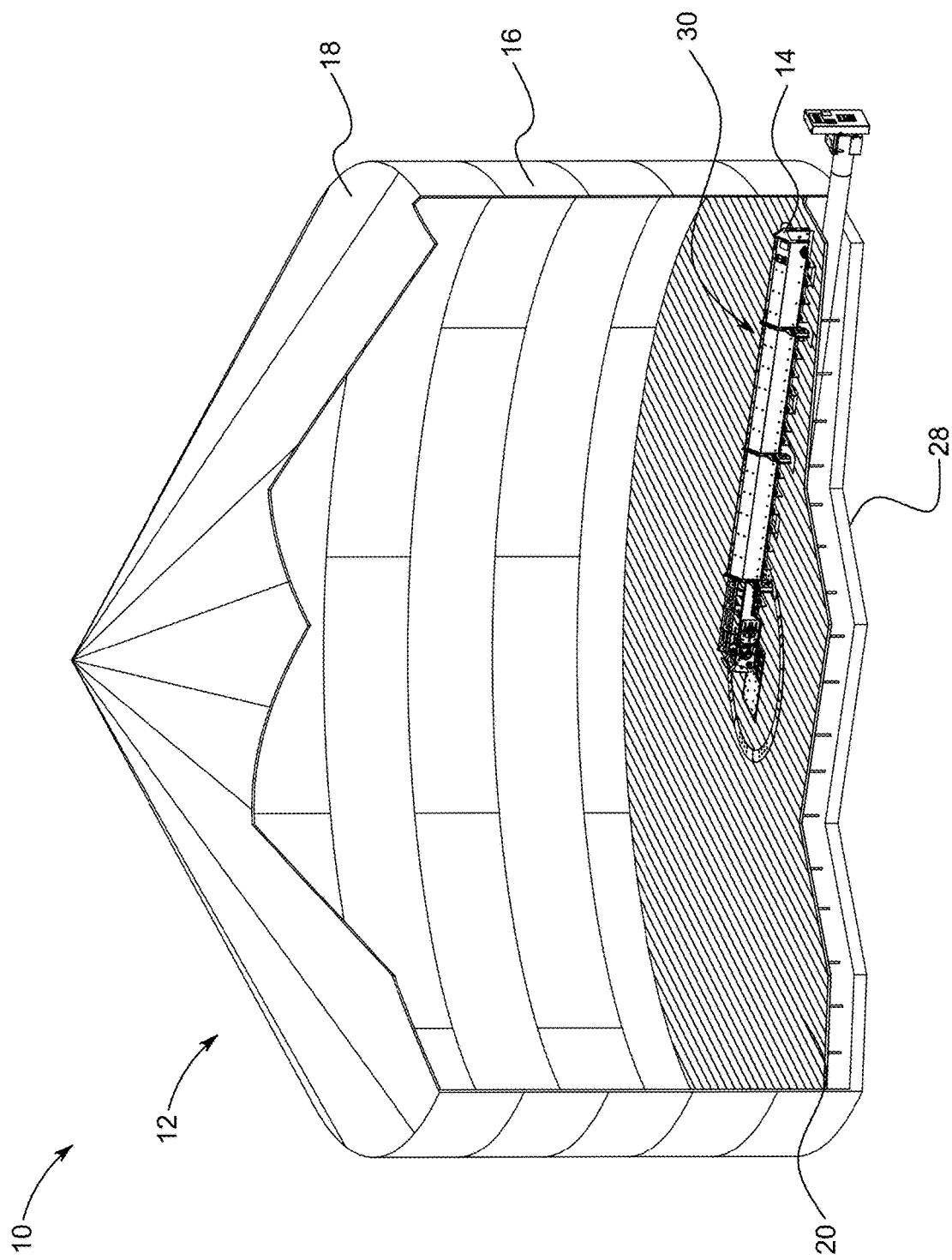

FIG. 99 shows a perspective cut-away elevation view of an exemplary grain bin having an exemplary sweep system, in accordance with one or more embodiments, the view showing a sweep system positioned on top of an elevated floor and just within the sidewall of the grain bin; the view showing the sweep connected at its inward end to a pivot point; the view showing the sweep system having a skeletonized head section.

Figure 100:
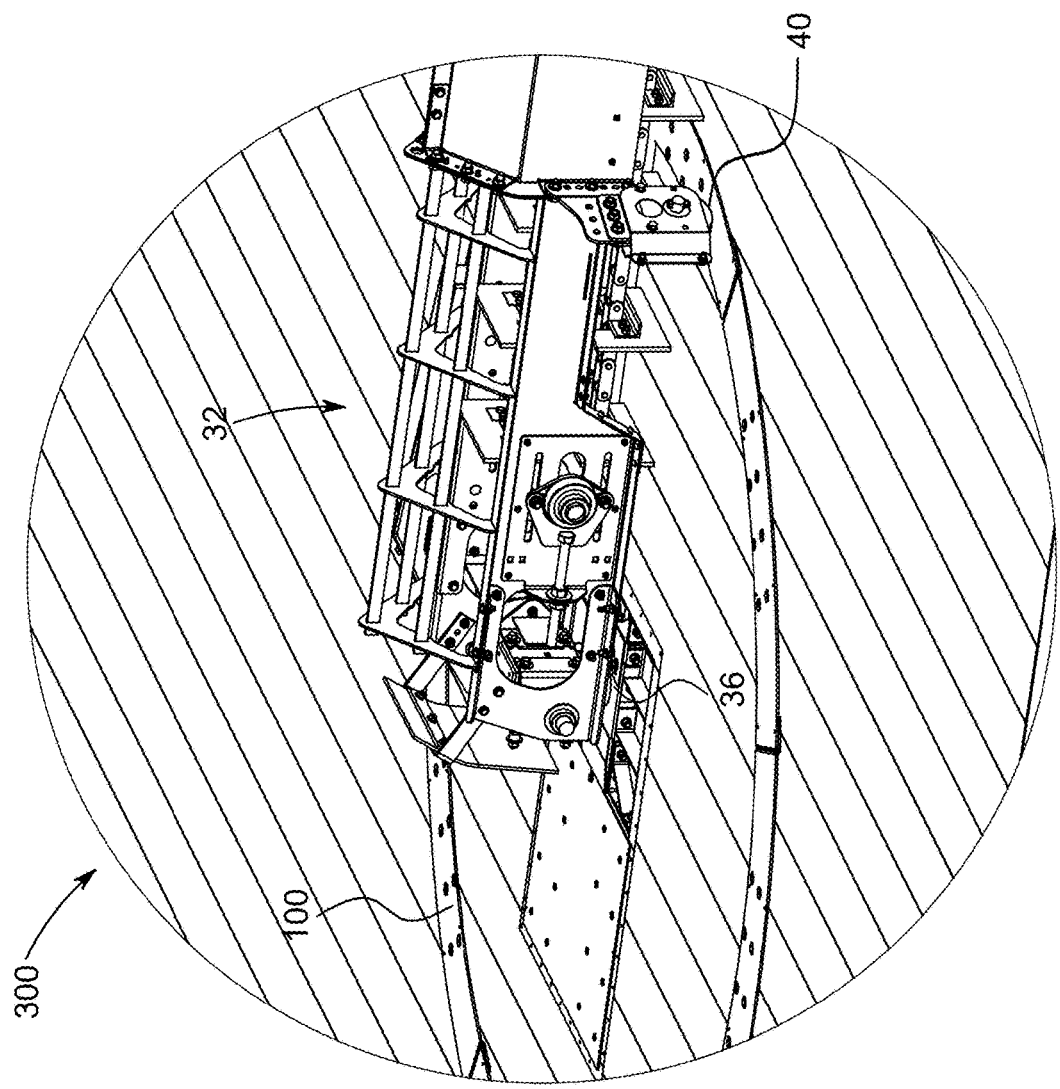

FIG. 100 shows a close up upper front left perspective view of the head section of the sweep system shown in FIG. 99, in accordance with one or more embodiments.

Figure 101:
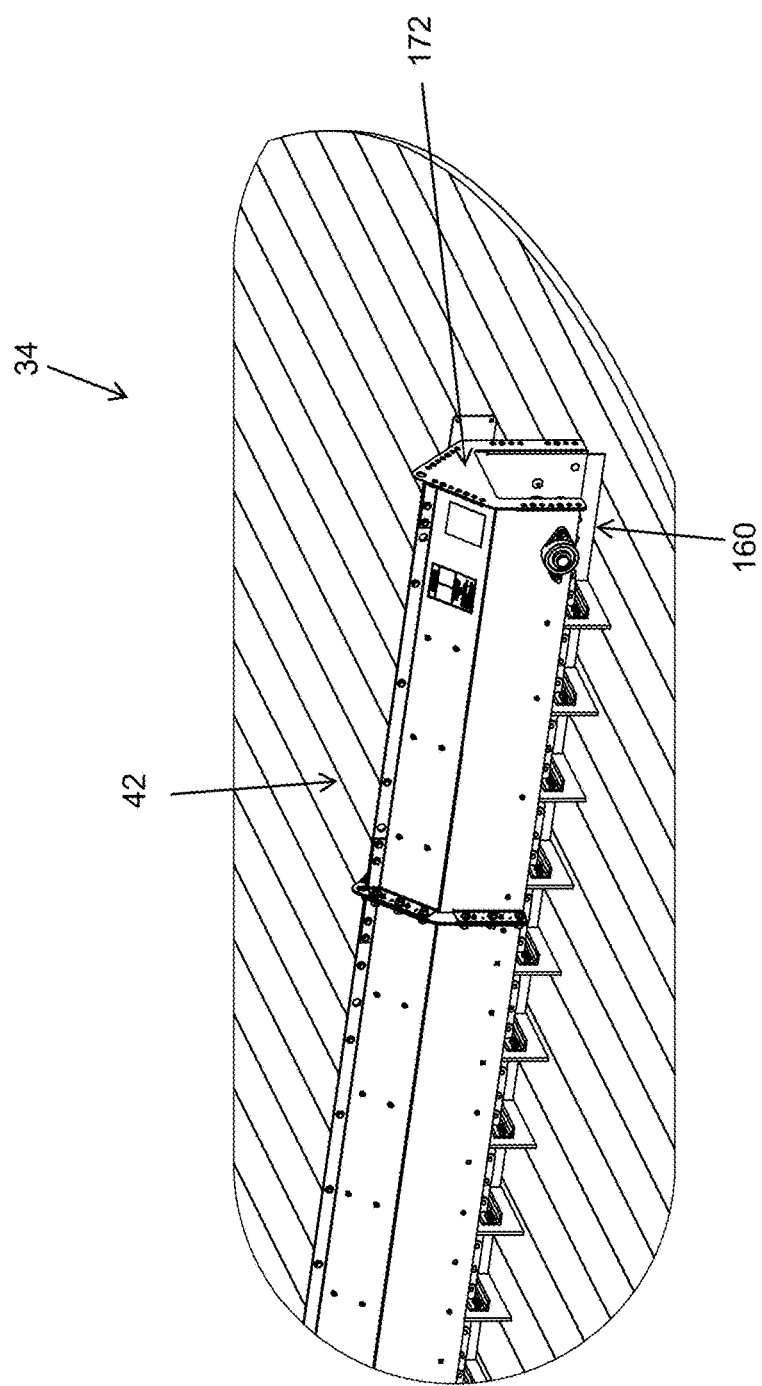

FIG. 101 shows a close up upper front left perspective view of the tail section of the sweep system shown in FIG. 99, in accordance with one or more embodiments.

Figure 102:
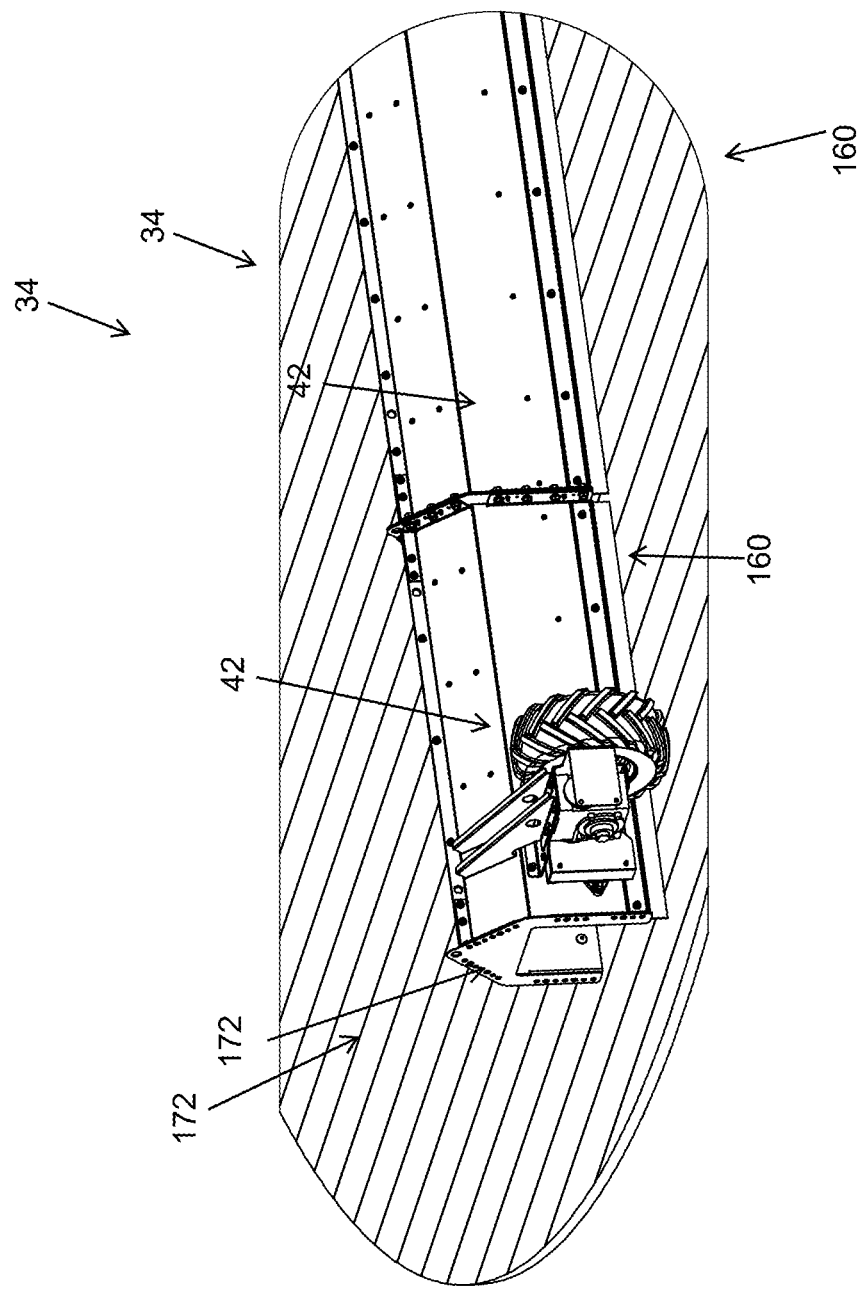

FIG. 102 shows a close up upper rear left perspective view of the tail section of the sweep system shown in FIG. 99, in accordance with one or more embodiments.

Figure 103:
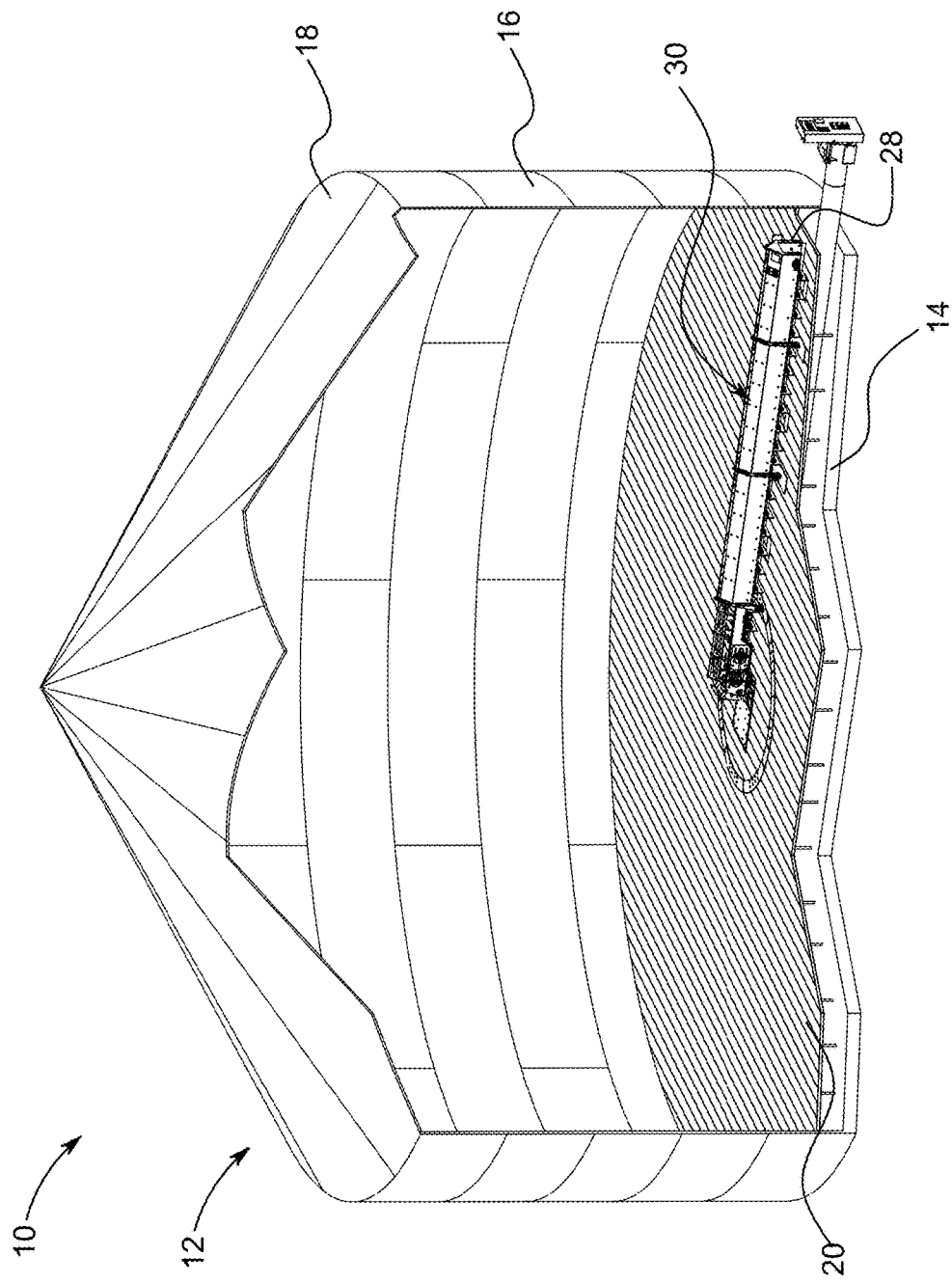

FIG. 103 shows a perspective cut-away elevation view of an exemplary grain bin having an exemplary sweep system, in accordance with one or more embodiments, the view showing a sweep system positioned on top of an elevated floor and just within the sidewall of the grain bin; the view showing the sweep connected at its inward end to a pivot point; the view showing the sweep system having a skeletonized head section; the view showing the sweep system having a support skid at an outward end of the head section in lieu of a carrier wheel.

Figure 104:
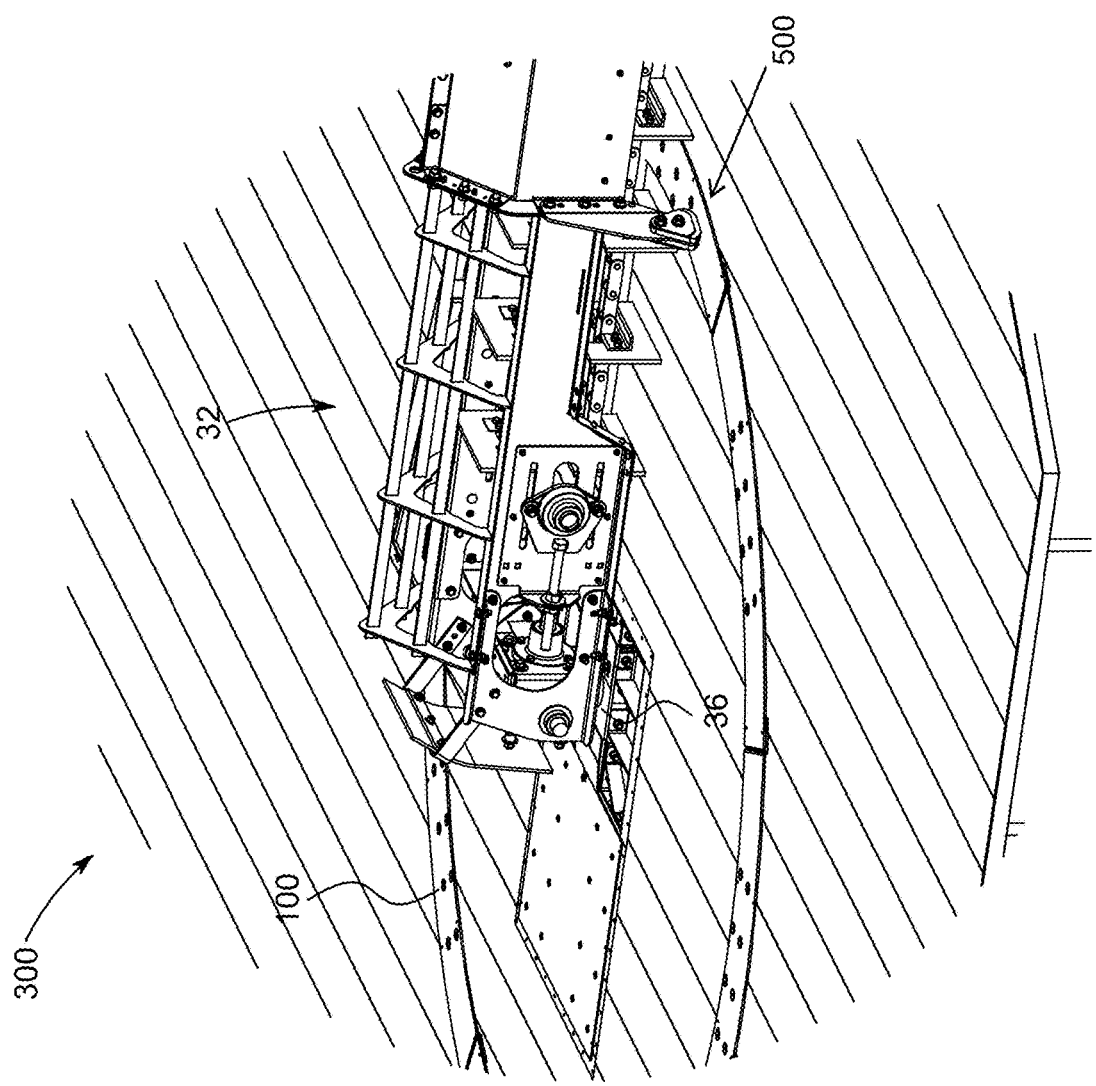

FIG. 104 shows a close up upper front left perspective view of the head section of the sweep system shown in FIG. 103, in accordance with one or more embodiments.

Figure 105:
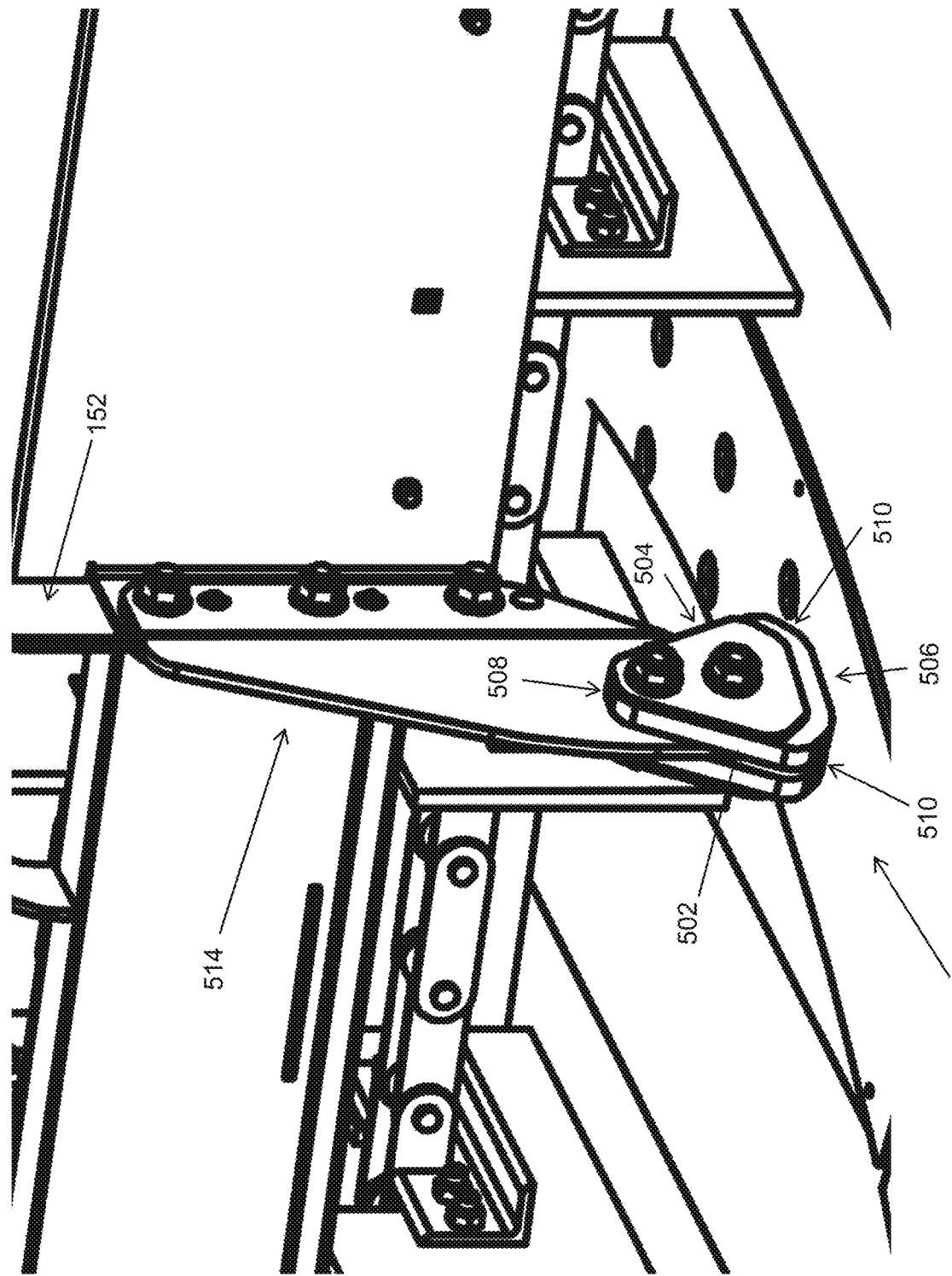

FIG. 105 shows a close up upper front left perspective view of the support skid shown in FIG. 105, in accordance with one or more embodiments.

Figure 106:
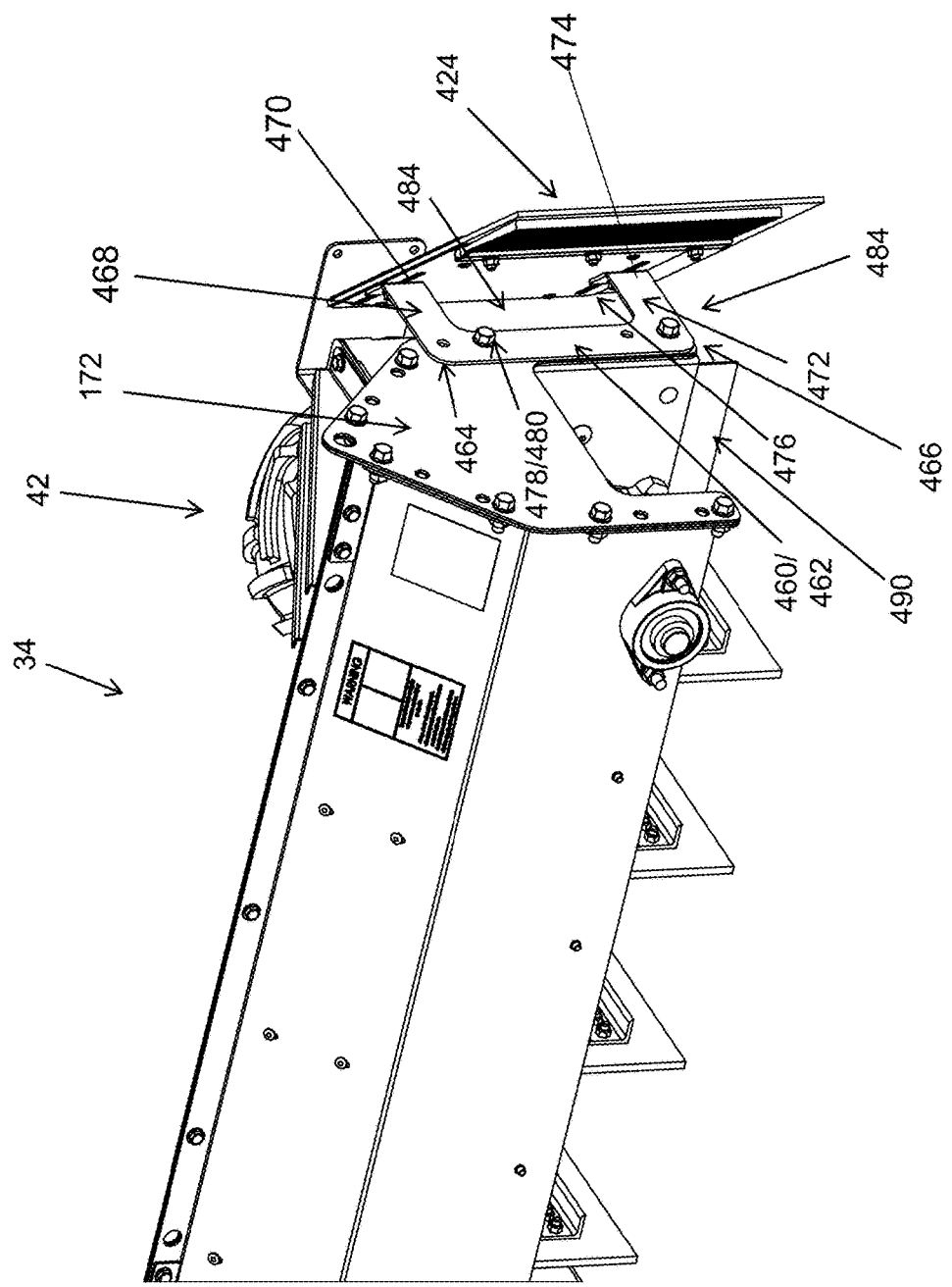

FIG. 106 shows a partial upper front left perspective view of a tail section of an exemplary sweep system, in accordance with one or more embodiments; the view showing a scraper attached to an outward end of the tail section.

Figure 107:
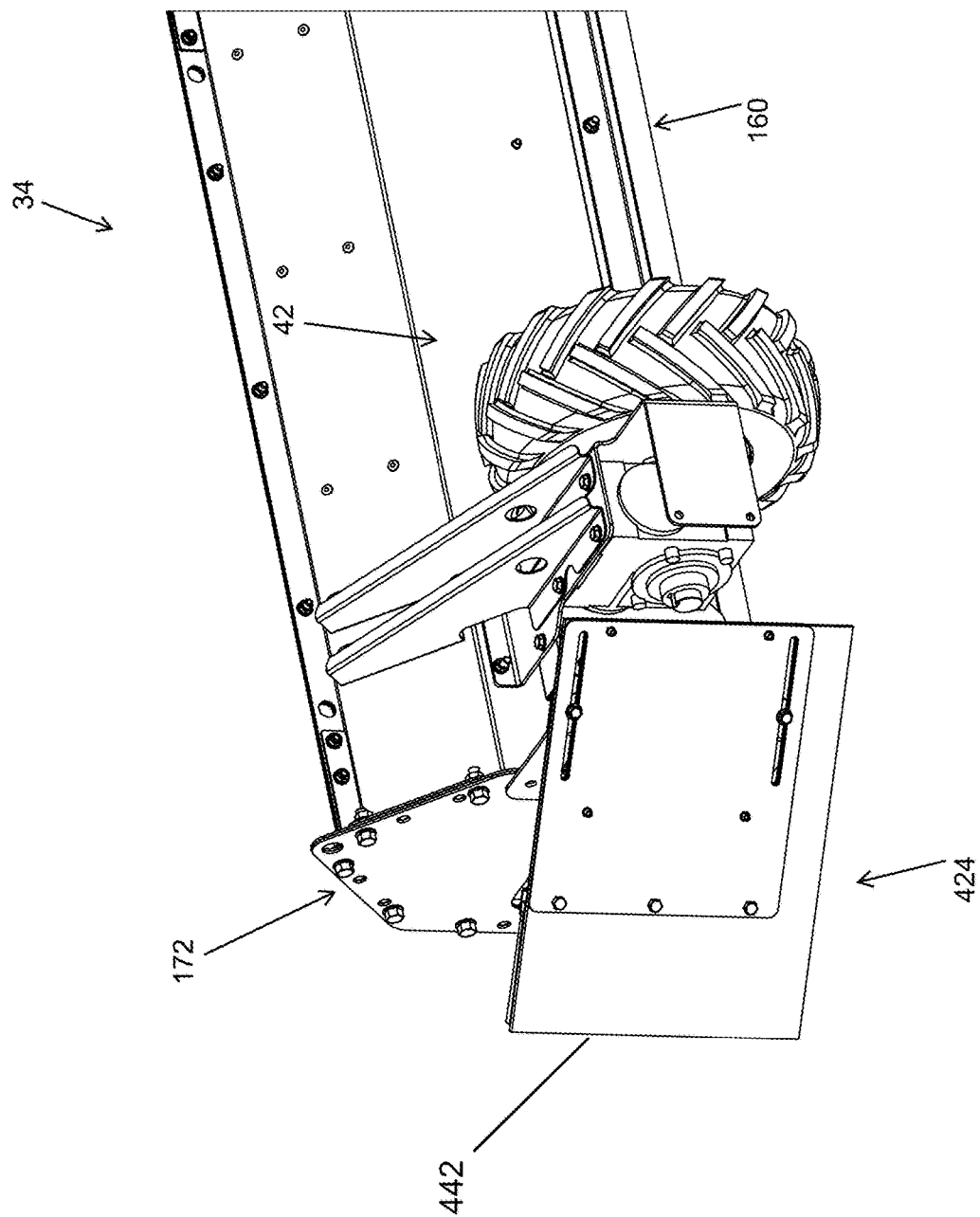

FIG. 107 shows a partial upper rear left perspective view of a tail section of an exemplary sweep system shown in FIG. 106, in accordance with one or more embodiments.

Figure 108A:
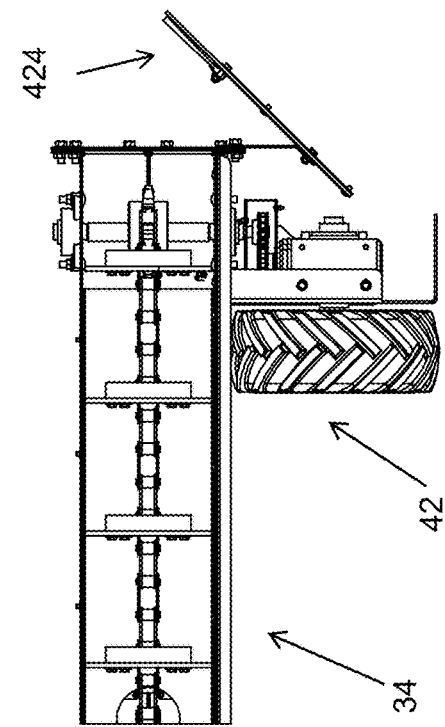

FIG. 108A shows a top view of a tail section of an exemplary sweep system shown in FIG. 106, in accordance with one or more embodiments.

Figure 108B:
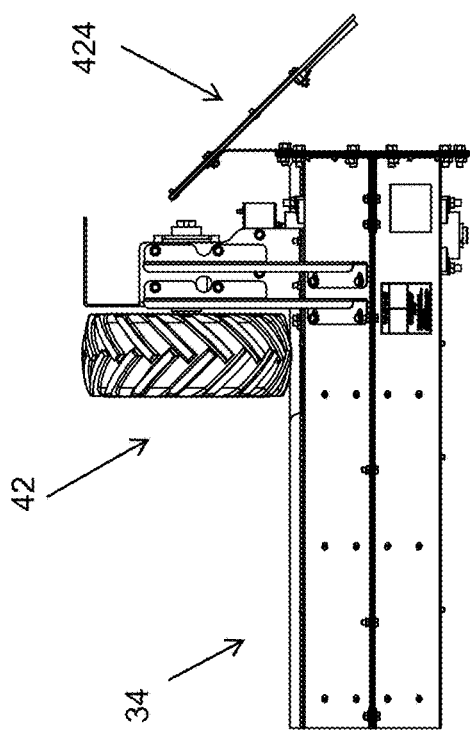

FIG. 108B shows a bottom view of a tail section of an exemplary sweep system shown in FIG. 106, in accordance with one or more embodiments.

Figure 108D:
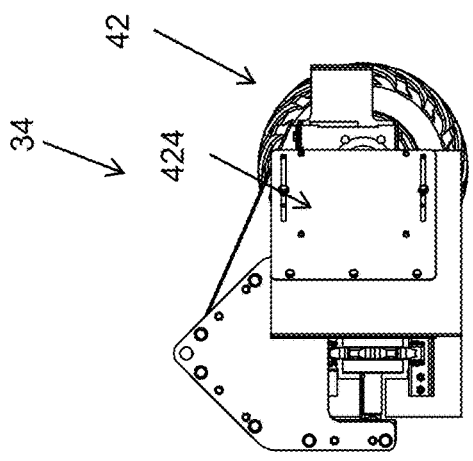
Figure 108C:
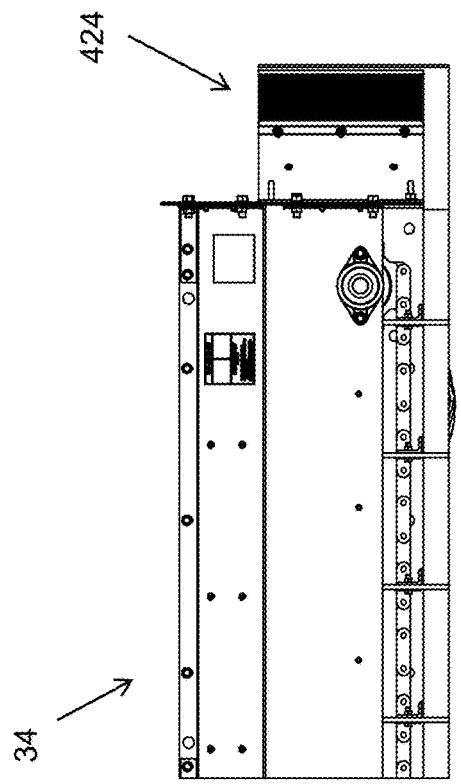

FIG. 108C shows a front view of a tail section of an exemplary sweep system shown in FIG. 106, in accordance with one or more embodiments.

FIG. 108D shows a left side view of a tail section of an exemplary sweep system shown in FIG. 106, in accordance with one or more embodiments.

Figure 109:
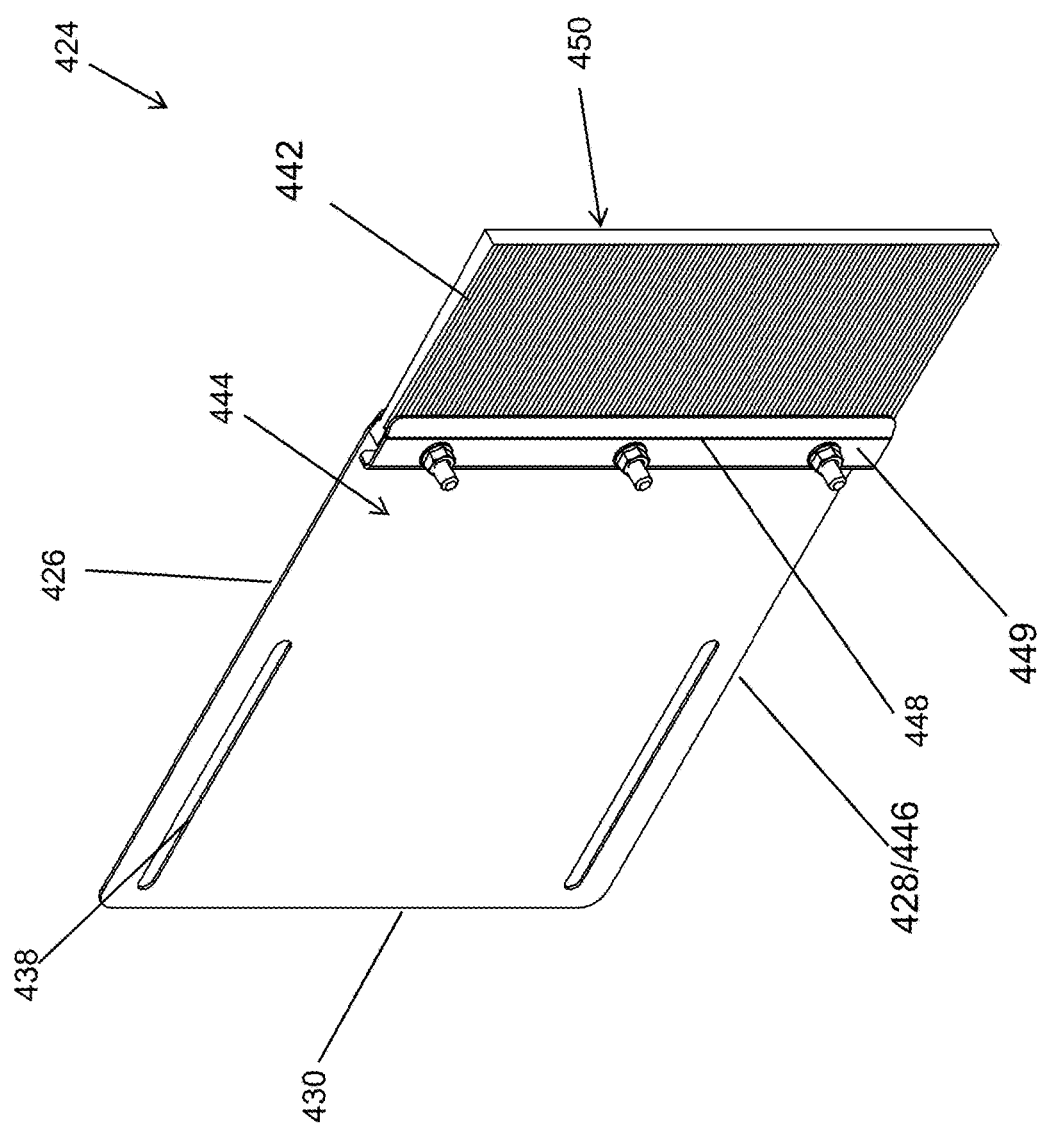

FIG. 109 shows an upper front left perspective view of a scraper for use with an exemplary sweep system, in accordance with one or more embodiments; the view showing the scraper having a brush attached to a rigid support member.

FIG. 110A shows a rear view of the scraper shown in FIG. 109, in accordance with one or more embodiments.

FIG. 110B shows a right side view of the scraper shown in FIG. 109, in accordance with one or more embodiments.

FIG. 110C shows a front view of the scraper shown in FIG. 109, in accordance with one or more embodiments.

FIG. 110D shows a left side view of the scraper shown in FIG. 109, in accordance with one or more embodiments.

FIG. 110E shows a top view of the scraper shown in FIG. 109, in accordance with one or more embodiments.

FIG. 110F shows a bottom view of the scraper shown in FIG. 109, in accordance with one or more embodiments.

Figure 111:
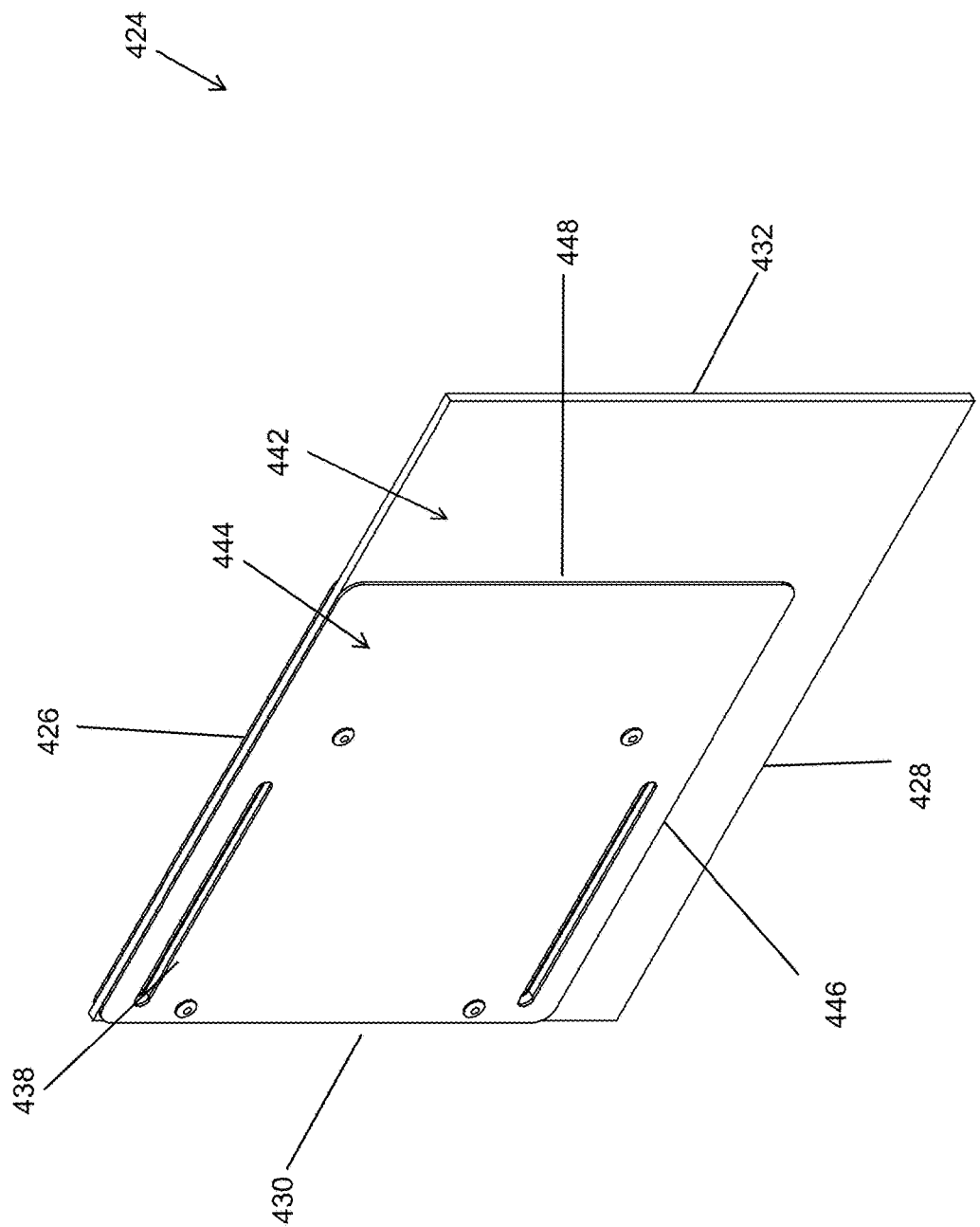

FIG. 111 shows an upper front left perspective view of a scraper for use with an exemplary sweep system, in accordance with one or more embodiments; the view showing the scraper having a flexible member attached to a rigid support member.

Figure 112:
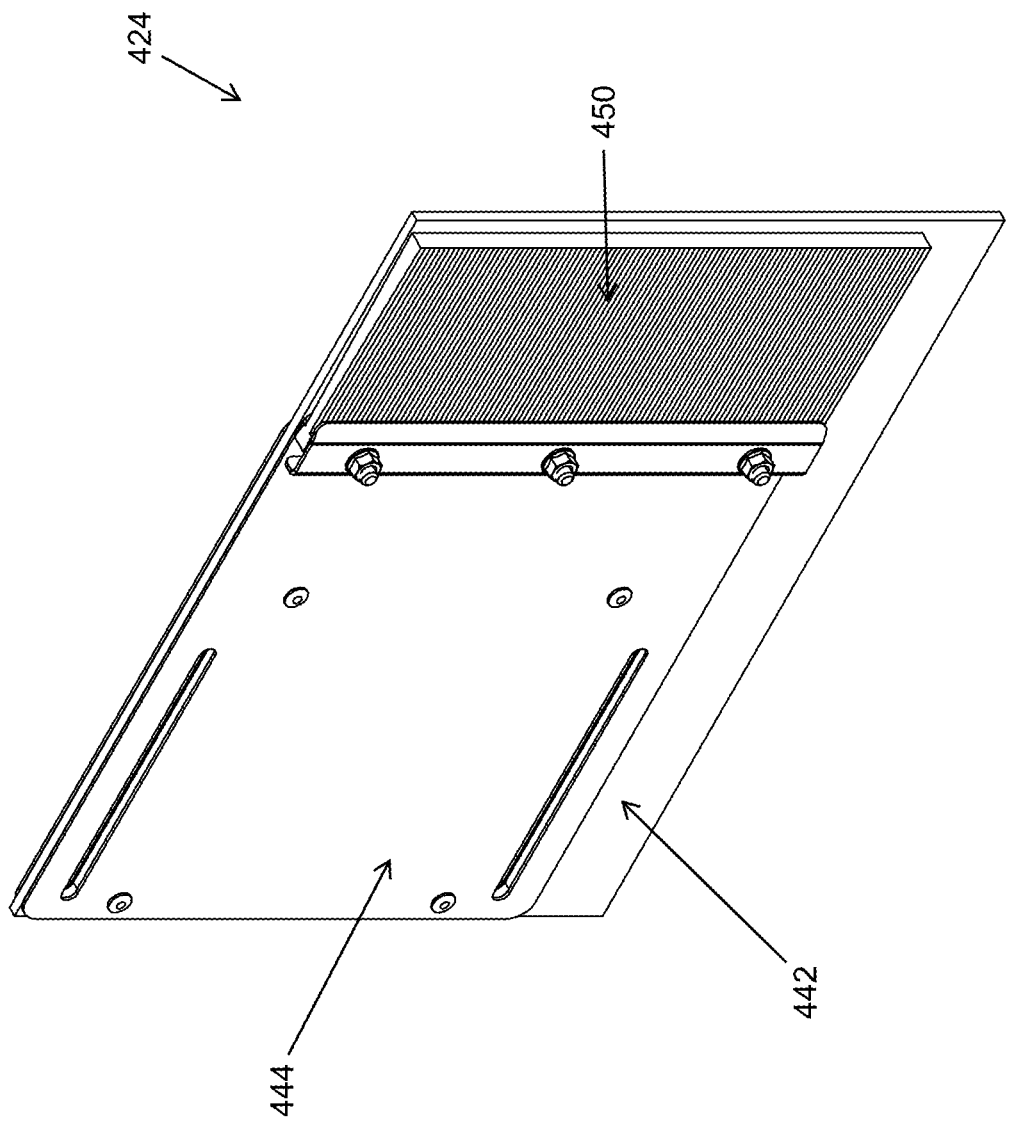

FIG. 112 shows an upper front left perspective view of a scraper for use with an exemplary sweep system, in accordance with one or more embodiments; the view showing the scraper having a flexible member attached to a rigid support member; the view showing a brush attached to the rigid support member.

Figure 113:
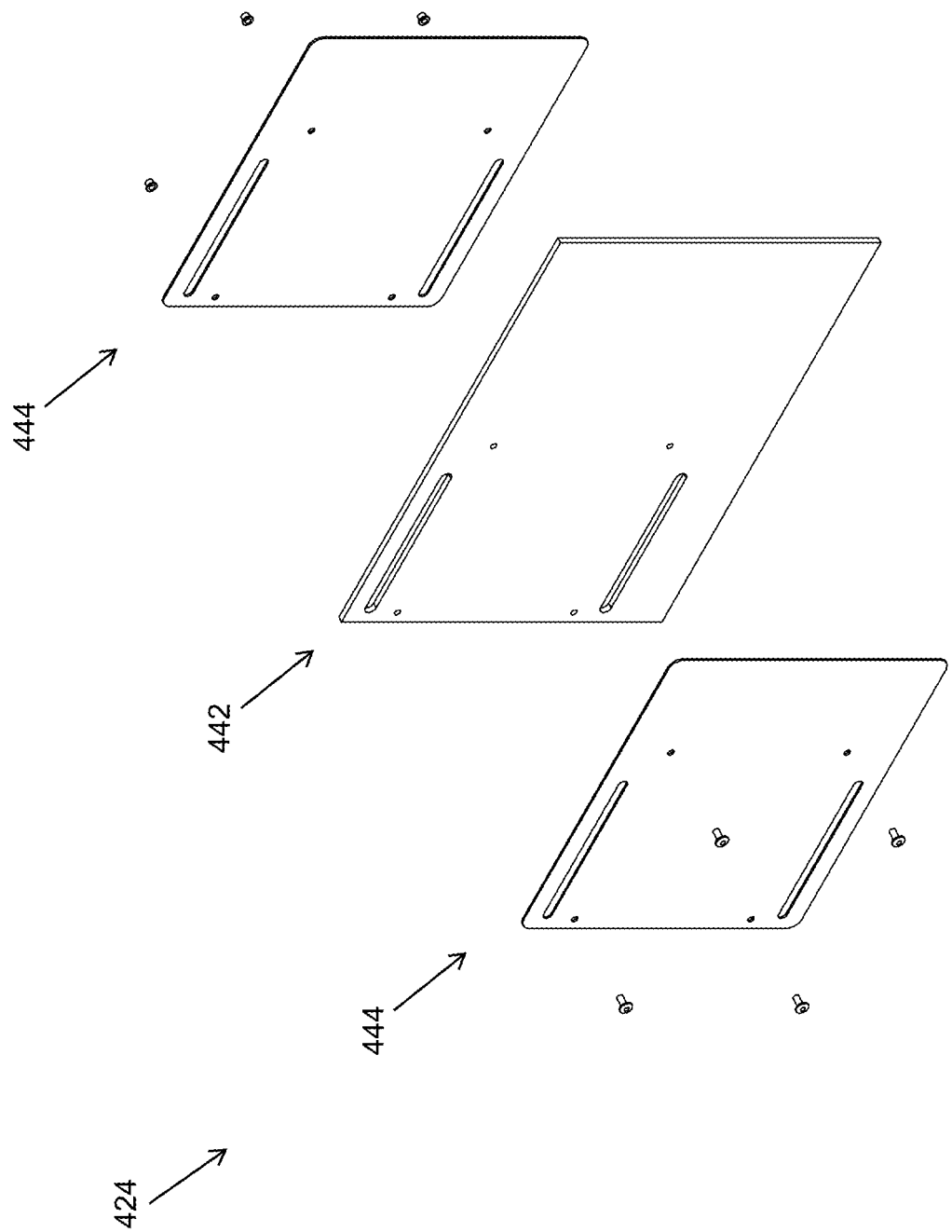

FIG. 113 shows an exploded upper front left perspective view of a scraper for use with an exemplary sweep system, in accordance with one or more embodiments; the view showing the scraper having a flexible member sandwiched between a pair of rigid support members.

FIG. 114A shows a rear view of the scraper shown in FIG. 113, in accordance with one or more embodiments.

FIG. 114B shows a right side view of the scraper shown in FIG. 113, in accordance with one or more embodiments.

FIG. 114C shows a front view of the scraper shown in FIG. 113, in accordance with one or more embodiments.

FIG. 114D shows a left side view of the scraper shown in FIG. 113, in accordance with one or more embodiments.

FIG. 114E shows a top view of the scraper shown in FIG. 113, in accordance with one or more embodiments.

FIG. 114F shows a bottom view of the scraper shown in FIG. 113, in accordance with one or more embodiments.

Figure 115:
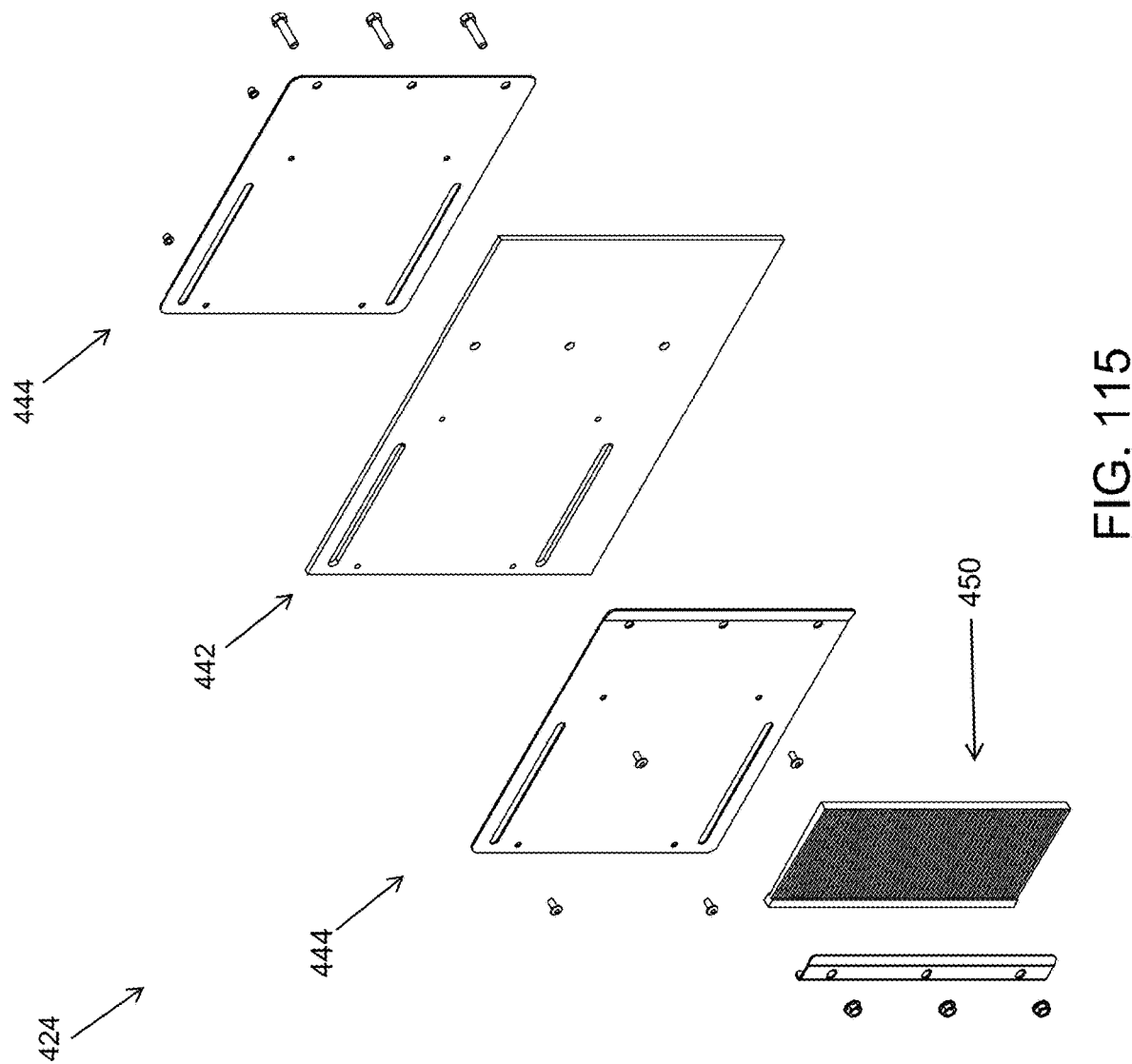

FIG. 115 shows an exploded upper front left perspective view of a scraper for use with an exemplary sweep system, in accordance with one or more embodiments; the view showing the scraper having a flexible member sandwiched between a pair of rigid support members; the view showing a brush attached to the front one of the rigid support members.

FIG. 116A shows a rear view of the scraper shown in FIG. 115, in accordance with one or more embodiments.

FIG. 116B shows a right side view of the scraper shown in FIG. 115, in accordance with one or more embodiments.

FIG. 116C shows a front view of the scraper shown in FIG. 115, in accordance with one or more embodiments.

FIG. 116D shows a left side view of the scraper shown in FIG. 115, in accordance with one or more embodiments.

FIG. 116E shows a top view of the scraper shown in FIG. 115, in accordance with one or more embodiments.

FIG. 116F shows a bottom view of the scraper shown in FIG. 115, in accordance with one or more embodiments.

DETAILED DESCRIPTION OF THE DISCLOSURE

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of grain bins. However, the embodiments are not so limited. It is appreciated that the embodiments may be adapted for use in other applications which may be improved by the disclosed structures, arrangements and/or methods. The system is merely shown and described as being used in in the context of grain bins for ease of description and as one of countless examples.

System:

With reference to the figures, a sweep system for full floor grain bins 10, or sweep system 10, or simply system 10 is presented. The system 10 is used in association with a grain bin 12 having a foundation 14, a sidewall 16, a peaked roof 18, an elevated floor 20 supported by a plurality of floor supports 22, a sump 24, and grain conveyor 26. The system 10 includes a sweep 28 having an elongated body 30, a head section 32, a tail section 34, a pivot point 36, support wheels 38, carrier wheels 40, at least one pusher 42, a sweep mechanism 44, an agitator 46, a scraper 48 and an electrical lead 50, among other features, systems, and components as is described herein and shown in the figures.

Grain Bin:

In the arrangement shown, sweep system 10 is used in association with a grain bin 12. Grain bin 12 may be formed of any suitable size, shape and design and is configured to hold a bulk amount of flowable material such as grain, granular materials or other like materials. In the arrangement shown, as one example, grain bin 12 is a large, generally cylindrical structure that sits upon a foundation 14. Foundation 14 may be formed of any suitable size, shape and design and is configured to provide support to grain bin 12. In the arrangement shown, as one example, foundation 14 is a circular or cylindrical concrete slab, however any other form of a foundation is hereby contemplated for use. In the arrangement shown, as one example, foundation 14 provides support for the lower end of sidewall 16.

In the arrangement shown, as one example, grain bin 12 has a sidewall 16. Sidewall 16 may be formed of any suitable size, shape and design and is configured to enclose the contents of grain bin 12 and enclose the hollow interior of grain bin 12. In the arrangement shown, as one example, sidewall 16 is cylindrical in nature and is formed of a plurality of sheets of corrugated material that are connected to one another in end-to-end relation to form rings. These rings are stacked on top of one another to form the desired height of sidewall 16 of grain bin 12. However, any other form or configuration of a sidewall 16 is hereby contemplated for use. In the arrangement shown, as one example, the upper end of sidewall 16 provides support for peaked roof 18.

In the arrangement shown, as one example, grain bin 12 has a peaked roof 18. Peaked roof 18 may be formed of any suitable size, shape and design and is configured to enclose the upper end of grain bin 12 and enclose the hollow interior of grain bin 12. In the arrangement shown, as one example, peaked roof 18 is formed of a plurality of panels that extend from the peak of the roof 18 downward and outward to the upper edge of sidewall 16. However, any other form or configuration of a roof 18 is hereby contemplated for use.

In the arrangement shown, as one example, elevated floor 20, which is supported by a plurality of floor supports 22, is positioned within the hollow interior of grain bin 12.

Floor Supports:

In the arrangement shown, as one example, grain bin 12 includes a plurality of floor supports 22 which support elevated floor 20. Floor supports 22 are formed of any suitable size, shape and design and are configured to provide support for elevated floor 20 as well as facilitate airflow between foundation 14 and elevated floor 20. In one arrangement, as is shown, floor supports 22 are formed upper members 52, lower members 54 and middle members 56 that extend between upper members 52 and lower members 54 that are connected to one another such as through welding, screwing, bolting, or any other manufacturing process that joins two components together. In an alternative arrangement, as is also shown, floor supports 22 may be formed of a single member that is formed by bending and/or cutting and includes passageways 58 therein that allow the passage of air through the floor support 22.

Upper members 52 are formed of any suitable size, shape and design and are configured to connect the upper end of a plurality of middle members 56 that form each floor support 22. Upper members 52 are also configured to provide a mounting surface for elevated floor 20 to rest upon. In one arrangement, as is shown, upper members 52, when viewed from the side, are formed of an elongated L-shaped member. However, any other shape or component is hereby contemplated for use as upper member 52, such as a square tube, an I-beam, a C-shaped channel, or any other structural member or the like. The upper end of middle members 56 connect to the lower surface of upper member 52 by any manner or method such as welding, bolting, gluing, affixing, locking, friction fitting, threading, or forming the components out of a single piece of material such as stamping, machining, molding, casting, or by any other manner or method or the like.

Lower members 54 are formed of any suitable size, shape and design and are configured to connect the lower end of a plurality of middle members 56 that form each floor support 22. Lower members 54 are also configured to provide a support surface that rests upon the upper surface of foundation 14 thereby providing stability to floor support 22. In one arrangement, as is shown, lower members 54, when viewed from the side, are formed of an elongated flat bar or rectangular shaped member having a generally flat upper surface and lower surface that extend in approximate parallel spaced alignment to one another. That is, in the arrangement shown, lower member 54 includes a generally flat lower surface that generally sits upon the generally flat upper surface of foundation 14 and a generally flat upper surface that engages the lower end of a plurality of middle members 56. However, any other shape or component is hereby contemplated for use as lower member 54, such as an angle iron, square tube, an I-beam, a C-shaped channel, or any other structural member or the like. The lower end of middle members 56 connect to the upper surface of lower member 54 by any manner or method such as welding, bolting, gluing, affixing, locking, friction fitting, threading, or forming the components out of a single piece of material such as stamping, machining, molding, casting, or by any other manner or method or the like.

Middle members 56 are formed of any suitable size, shape and design and are configured to connect the upper members 52 and lower members 54 that form each floor support 22. Middle members 56 are also configured to provide support, strength and rigidity between upper members 52 and lower members 54 while also providing for air flow between upper members 52 and lower members 54. In one arrangement, as is shown, middle members 56 are cylindrical rods that connect at their lower end to the upper surface of lower members 54, and connect at their upper end to the lower surface of upper member 52. However, any other shape or configuration is hereby contemplated for use as lower member 56. The upper and lower ends of middle members 56 connect to the upper member 52 and lower member 54 by any manner or method such as welding, bolting, gluing, affixing, locking, friction fitting, threading, or forming the components out of a single piece of material such as stamping, machining, molding, casting, or by any other manner or method or the like.

In the arrangement shown, as one example, floor supports 22 extend an elongated length between opposing ends in a generally straight fashion. However, in other arrangements, it is hereby contemplated that floor supports 22 extend in a curved, angled, zig-zag or other non-linear or non-straight fashion.

In the arrangement just described, floor support 22 is formed of a plurality of components, namely upper members 52, lower members 54 and a plurality of middle members 56 that are connected to one another, often by welding. However, in another arrangement, floor supports 22 may be formed by other manners or methods including, but not limited to, being formed of a single, monolithic, component that is formed by cutting and/or stamping and/or bending. An example of this monolithic floor support 22 is shown and described in Applicant's U.S. Pat. No. 8,297,016 issued on Oct. 30, 2012 entitled "Support for a grain bin floor and method of making the same" which is fully incorporated by reference herein. In this arrangement, this form of floor support 22 includes passageways 58 through the monolith body of the floor support that allows the passage of air there through. Any other form of a floor support 22 is hereby contemplated for use in association with system 10.

In the arrangement shown, as one example, a plurality of floor supports 22 are positioned across the foundation 14 in approximate equal-spaced alignment. In this way, this grid or array of floor supports 22 provides even support for the planks 60 of elevated floor 20 to rest upon.

Elevated Floor & Planks:

In the arrangement shown, as one example, grain bin 12 includes an elevated floor 20 which is supported by a plurality of floor supports 22. Elevated floor 20 is formed of any suitable size, shape and design and is configured to support a mass of grain poured within the hollow interior of grain bin 12. In one arrangement, as is shown, elevated floor 20 rests upon the upper surface of upper members 52 of floor supports 22 and establishes a generally planar upper surface.

In the arrangement shown, as one example, elevated floor 20 is formed of a plurality of planks 60. Planks 60 are formed of any suitable size, shape and design and are configured to connect to one another to form elevated floor 20.

In one arrangement, as is shown, planks 60 extend a length in a generally straight manner between opposing ends. In the arrangement shown, as one example, planks 60 include a center wall that is generally flat and planar in shape and extends horizontally. This center wall connects at its outward edges to sidewalls which extend vertically. In one arrangement, the center wall has a plurality of openings or perforations therein that are large enough to allow air flow through the elevated floor 20 but not so large that grain can fall through the perforations. The sidewalls are generally flat and planar in shape and extend downward from the outward edges of the center wall in approximate parallel spaced alignment to one another and form a channel at their lower ends that facilitate nesting with adjacent planks.

Any other shape or configuration is hereby contemplated for use for planks 60. In the arrangement shown, the combination of bends and shapes that form planks 60 provides strength and rigidity to planks 60 in much the same way that corrugation provides strength and rigidity to a sheet of sheet metal.

In the arrangement shown, as one example, planks 60 nest in side-to-side alignment with one another and rest upon floor supports 22 to form elevated floor 20. The space between elevated floor 20 and foundation 14 allows for the passage of air there through. The space between elevated floor 20 and foundation 14 also allows room for other components of the system 10 such as sump 24 and grain conveyor 26.

Sump

In the arrangement shown, as one example, system 10 includes at least one sump 24. Sump 24 is formed of any suitable size, shape and design and is configured to selectively allow grain to pass through elevated floor 20 and into grain conveyor 26 thereby allowing grain out of grain bin 12. In the arrangement shown, as one example, a plurality of sumps 24 are shown in elevated floor 20 which are formed of an opening 62 that is covered by a gate 64 that selectively opens and closes by operation of a control mechanism 66 so as to facilitate grain to enter grain conveyor 26 positioned below sump 24. Opening 62 is framed by horizontal supports 68 that extend across the width of grain conveyor 26, and connectors 70, that extend between adjacent horizontal supports 68, thereby providing strength to sump 24 and preventing sagging of sump 24 due to the downward pressure on sump 24 due to the weight of grain. Horizontal supports 68 connect at their outward ends to vertical supports 72 that extend vertically from their upper ends, which connect to horizontal supports 68 to their lower ends which are configured to engage foundation 14 thereby providing support to sump 24. These components and this configuration may be referred to as a sump stand. In the arrangement shown, as one example, horizontal supports 68, connectors 70 and vertical supports 72 are formed of hollow square or rectangular shaped members. However, any other suitable structural member is hereby contemplated for use such as square tubing, round tubing, angle iron, I-beams, solid bars or rods, or any other structural member.

In the arrangement shown, as one example, the upper wall 74 of grain conveyor 26 fits within opposing vertical supports 72 and is positioned just below horizontal supports 68 and connectors 70. In the arrangement shown, as one example, a portion of upper wall 74 is formed as part of the sump stand.

In the arrangement shown, a plurality of sumps 24 extend in a line in spaced relation with one another from just inward of the sidewall 16 of grain bin 12 to a generally centrally positioned sump 24, also known as the center sump 24. This spacing of a plurality of sumps 24 allows grain to be drained out of grain bin 12 from various positions within grain bin 12. In the arrangement shown, as one example, center sump 24 includes two openings 62 or a single opening 62 separated by a generally centrally positioned horizontal support 68 that extends across the center of the opening 62. In the arrangement shown, as one example, a mounting plate 76 is attached to the upper surface of the centrally positioned horizontal support 68 and includes a hole 78 that is generally centrally positioned within the center sump 24 as well as generally centrally positioned within grain bin 12. Mounting plate 76 serves to facilitate mounting of pivot point 36 to center sump 24, and the strength of the sump stand, formed of horizontal supports 68, connectors 70 and vertical supports 72, serve to support the weight of the sweep 28 at pivot point 36.

In the arrangement shown, as one example, the hollow interior of the centrally positioned vertical support 72 and the centrally positioned horizontal support 68 of center sump 24 provide a protected passageway for electrical lead 50 to pass there through. That is, electrical lead 50 extends through the space between foundation 14 and elevated floor 20, which protects the electrical lead 50. Electrical lead 50 then extends upward within the hollow interior of the centrally positioned vertical support 72 and then through the hollow interior of centrally positioned horizontal support 68. Electrical lead 50 then passes through the hole 78 at the center of mounting plate 76, up the hollow interior of pivot point 36 and into sweep 28, as is described herein.

In one arrangement, as is shown herein, sump 24 as is described herein may be assembled by screwing, bolting and/or welding the components together at the factory into a single unit which is then to be installed in the grain bin 12 as a single part. This arrangement saves installation time and improves quality and reduces cost.

Grain Conveyor:

In the arrangement shown, as one example, system 10 includes a grain conveyor 26. Grain conveyor 26 is formed of any suitable size, shape and design and is configured to move grain out of grain bin 12, such as through a sump 24 or other opening in the elevated floor 20. As examples, grain conveyor 26 may be formed of an auger, a conveyor belt, a drag chain, or any other form of a grain movement device is hereby contemplated for use as grain conveyor 26.

In the arrangement shown, as one example, grain conveyor 26 is positioned between foundation 14 and elevated floor 20. Generally speaking, the larger the grain conveyor 26 the greater the amount of grain the grain conveyor 26 can move. While moving more grain faster is advantageous, especially for large grain bins, the larger the grain conveyor 26 gets the more problematic it becomes to provide support above and around the grain conveyor 26 as floor supports 22 must be moved or removed to make space for the large grain conveyor 26.

In the arrangement shown, as one example, grain conveyor 26 includes a pair of sidewalls 80 that connect at their upper end to the outward edges of an upper wall 74. The lower end of sidewalls 80 connect to the outward edges of a lower wall 82. Sidewalls 80 and upper wall 74 and lower wall 82 form planes that extend in approximate perpendicular alignment to one another and thereby form a generally square or rectangular member with a hollow interior 84. A belt or drag chain or other grain movement device is positioned within the hollow interior 84 formed by sidewalls 87, upper wall 74 and lower wall 82.

Generally speaking, the larger, and wider, the grain conveyor 26 the greater the amount of grain the grain conveyor 26 can move in a given amount of time. However, the larger the grain conveyor 26 the greater the amount of space required to fit the grain conveyor 26 between adjacent floor supports 22. To facilitate the increased distance between adjacent floor supports 22 additional support may be used to prevent planks 60 of elevated floor 20 from sagging above grain conveyor 26. This is especially true when using sweep 28 on top of elevated floor 20. Support is provided for grain conveyor 26 at and around sumps 24 by sump stands formed of horizontal supports 68, connectors 70 and vertical supports 72. Additional support is provided around pivot point 36 by center support stands 86.

Center Support Stand:

In the arrangement shown, as one example, system 10 includes a center support stand 86. Center support stand 86 is formed of any suitable size, shape and design and is configured to provide additional support for elevated floor 20 and sweep 28 at and around pivot point 36 where forces are concentrated. In the arrangement shown, as one example, center support stand 86 is formed of a top plate 88 that serves as the upper end of center support stand 86. In the arrangement shown, top plate 88 is a generally flat sheet of material that forms a generally flat and straight upper surface upon which support wheels 38 of sweep 28 can roll over. In the arrangement shown, as one example, top plate 88 is generally square or rectangular in shape when viewed from above or below. However, any other shape is hereby contemplated for use as top plate 88

In the arrangement shown, as one example, a plurality of vertical supports 90 extend from the lower surface of top plate 88 to the upper surface of foundation 14 and in this way, vertical supports 90 provide support for top plate 88. In the arrangement shown, as one example, vertical supports 90 are formed of square or rectangular tubing. However, any other suitable structural member is hereby contemplated for use such as round tubing, angle iron, I-beams, solid bars or rods, or any other structural member. In the arrangement shown, as one example, three vertical supports 90 are positioned in spaced relation to one another along each side of top plate 88, however any other number of vertical supports 90 are hereby contemplated for use. In the arrangement shown, as one example, a cross member 92 extends between opposing vertical supports 90. In the arrangement shown, as one example, cross members 92 are formed of plate shaped member that connects at its outward ends to the inward facing surfaces of opposing vertical supports 90, connects at its upper end to the lower surface of top plate 88, and includes an arched or curved lower surface. However, any other configuration is hereby contemplated for use and any other suitable structural member is hereby contemplated for use such as round tubing, angle iron, I-beams, solid bars or rods, or any other structural member. However, the use of the arched lower surface maximizes strength while facilitating air flow below elevated floor 20.

In the arrangement shown, as one example, an access plate 94 is positioned in top plate 88. Access plate 94 is formed of any suitable size shape and design and is configured to facilitate easy access through and below top plate 88 so as to allow access to the components below top plate 88 and elevated floor 20, such as electrical lead 50. In the arrangement shown, as one example, access plate 94 is generally rectangular in shape and has a side-to-side width that is slightly narrower than the inward facing sides of opposing vertical supports 90, and is positioned between a pair of cross members 92 so that clear access is provided, however any other shape, placement and configuration is hereby contemplated for use. In the arrangement shown, as one example, access plate 94 screws or bolts to top plate 88 so as to provide a secure attachment while allowing for easy removal. When access plate 94 is in place on top plate 88 a generally flat and planar combined top surface is formed that allows support wheels 38 of sweep 28 to ride there over. In one arrangement, access plate 94 overlaps top plate 88 at the edges of the opening that access plate 94 covers so as to provide an overlapping layer of access plate 94 and top plate 88 so as to facilitate screwing or bolting these components together. In an alternative arrangement, top plate 88 and access plate 94 are flush with one another.

In one arrangement, as is shown herein, center support stand 86 as is described herein may be assembled by screwing, bolting and/or welding the components together at the factory into a single unit which is then to be installed in the grain bin 12 as a single part. This arrangement saves installation time and improves quality and reduces cost.

Center support stands 86 are placed wherever additional support is needed to support sweep 28 and/or elevated floor 20. In the arrangement shown, as one example, a center support stand 86 is placed at each side of grain conveyor 26 adjacent pivot point 36. In one arrangement, a center support stand 86 is also placed at the end of grain conveyor 26 adjacent pivot point 36. In this way, the support provided by the sump stand of center sump 24 as well as adjacent center support stands 86 provides adequate support for the concentrated forces around pivot point 36.

Wear Plates and Wear Track:

In the arrangement shown, as one example, wear plates 96 are positioned over center sump 24 and center support stands 86 in the area where support wheels 38 of sweep 28 travel thereby forming a wear track 98. In the arrangement shown, as one example, wear plates 96 have cut outs therein for access plate 94 of center support stand 86 as well as openings 62 of center sump 24, as well as any other features. Wear plates 96 are formed of planar sheets of material and are laid over the top surface of center sump 24 and center support stands 86 and thereby form a generally flat surface upon which support wheels 38 of sweep 28 may roll. Wear plates 96 provide additional support for the weight of support wheels 38 of sweep 28 and help to distribute this weight across the support members 68/72 of center sump 24 and center support stands 86. In the arrangement shown, as one example, four wear plates 96 are combined to form a single wear track 98 that has a generally circular exterior periphery that is slightly larger in diameter than the path of support wheels 38 of sweep 28.

Unlike the center walls of planks 60 of elevated floor 20, wear plates 96 and wear track 98 are solid and smooth and do not have perforations therein and therefor wear plates 96 and wear track 98 do not allow air to pass there through. The solid and smooth upper surface of wear track 98 improves the ability for support wheels 38 to roll thereon. However, solid wear plates 96 prevent air flow through the grain. For this reason, the size of wear plates 96 are minimized while providing adequate support for the weight of sweep 28.

In one or more arrangements, there is a concentration of support wheels 38 around pivot point 36 to provide support for the heavy components positioned around pivot point 36. In one or more arrangements, there are also a plurality of carrier wheels 40 spaced along the length of sweep 28 to provide support along the length of sweep 28. In the arrangement shown, as one example, outer wear tracks 100 are positioned at each place where carrier wheels 40 are attached to sweep 28. In the arrangement shown, as one example, these outer wear tracks 100 are formed of narrow sheets of solid material that is screwed or bolted to the upper surface of elevated floor 20 thereby forming narrow rings at each diameter where carrier wheels 40 are placed. Due to the narrow nature of outer wear tracks 100, air flow through the grain around outer wear tracks 100 is not substantially affected.

The addition of outer wear tracks 100 to elevated floor 20 provides some additional strength and rigidity to elevated floor 20 at the position wherein the additional forces are applied by carrier wheels 40, which may be adequate in some places on elevated floor 20. To provide additional bridging support over grain conveyor 26, bridging supports 102 are placed below outer wear tracks 100 and over grain conveyor 26.

Bridging Supports:

In the arrangement shown, as one example, system 10 includes one or more bridging supports 102. Bridging supports 102 are formed of any suitable size, shape and design and are configured to provide support for carrier wheels 40 and outer wear tracks 100 at and where needed. In the arrangement shown, as one example, bridging supports 102 are positioned below outer wear tracks 100 and over grain conveyor 26. In the arrangement shown, as one example, bridging supports 102 are formed of one or more horizontal members 104 that connect to vertical members 106. Vertical members 106 connect at their upper ends to horizontal members 104 and connect at their lower ends to foundation 14. In this way, horizontal members 104 provide horizontal support while vertical members 106 provide vertical support. In the arrangement shown, as one example, bridging supports 102 are formed of a pair of horizontal members 104 and vertical members 106 formed of square or rectangular hollow tubing that are positioned adjacent to one another. However, any other configuration is hereby contemplated for use and any other suitable structural member is hereby contemplated for use such as round tubing, angle iron, I-beams, solid bars or rods, or any other structural member.

In the arrangement shown, as one example, as carrier wheels 40 travel over outer wear tracks 100, force is applied to bridging supports 102 which help support the weight of sweep 28, especially when traveling over grain conveyor 26.

In one arrangement, as is shown herein, bridging support 102 as is described herein may be assembled by screwing, bolting and/or welding the components together at the factory into a single unit which is then to be installed in the grain bin 12 as a single part. This arrangement saves installation time and improves quality and reduces cost.

Sweep 28:

In the arrangement shown, as one example, system 10 includes a sweep 28. Sweep 28 is formed of any suitable size, shape and design and is configured to rotate around pivot point 36 and move grain toward the center sump 24. In the arrangement shown, as one example, sweep 28 includes an elongated body 30 that extends a length from an inward end, positioned adjacent the center of grain bin 12, or pivot point, and an outward end, positioned adjacent the sidewall 16 of grain bin 12. In the arrangement shown, as one example, a head section 32 is positioned adjacent the inward end of sweep 28 and a tail section 34 is positioned adjacent the outward end of sweep 28 and elongated body 30 extends between the inward end and outward end of sweep 28.

Head Section:

In the arrangement shown, as one example, sweep 28 includes a head section 32. Head section 32 is formed of any suitable size, shape and design and is configured to connect the inward end of sweep 28 to pivot point 36 as well as house various components of sweep 28 as is described herein.

In the arrangement shown, as one example, head section 32 includes a drive housing 108. Drive housing 108 is formed of any suitable size shape and design and is configured to connect at one end to pivot point 36 and connect at an opposing end to at least one support wheel 38 that provides support and facilitates rotation around pivot point 36. Drive housing 108 forms a hollow interior 110 that houses and holds various components of sweep 28 and deflects grain around the hollow interior 110.

In the arrangement shown, as one example, head section 32 includes a pivot column 112 that is configured to receive and hold pivot point 36 therein. Pivot column 112 includes a hole 114 that extends through pivot column 112 that receives pivot point 36 therein as well as provides a passageway for electrical lead 50 to extend into head section 32 of sweep 28. One or more bearings 116 are positioned at the intersection of pivot column 112 and pivot point 36 that facilitate rotation of sweep 28 around pivot point 36.

A motor 118 is positioned within the hollow interior 110 of drive housing 108 and is connected by a gearing mechanism 120 to a shaft 122. Motor 118 is any form of a motor, such as an electrical motor. Gearing mechanism 120 is any device which reduces the rotational speed of motor 118 and/or changes its direction or angle of rotation. Shaft 122 is any device which transfers rotational movement from one component to another.

In the arrangement shown, as one example, shaft 122 connects at one end to gearing mechanism 120 and motor 118 and is held by head frame weldment 124 which is itself held by drive housing 108. Head frame weldment 124 is formed of any suitable size shape and design and is configured to facilitate connection of shaft 122 to drive housing 108 while facilitating rotation of shaft 122. In the arrangement shown, as one example, head frame weldment 124 is formed of a first end wall 126 and a second end wall 128 positioned in parallel spaced relation to one another and connected by opposing sidewalls 130 that are positioned in parallel spaced relation to one another. In the arrangement shown, as one example, a pair of sidewalls 130 are connected to each side of head frame weldment 124, with one sidewall 130 stacked on top of the other on each side. Holes 132 extend through opposing sidewalls 130 that are sized and shaped to receive shaft 122 therein. A bearing assembly 134 is positioned at the intersection of shaft 122 and holes 132 that facilitates rotation of shaft 122 with respect to head frame weldment 124. A sprocket 136 is positioned on and keyed to shaft 122 between opposing lower sidewalls 130. Sprocket 136 is configured to engage and rotate sweep mechanism 44. While the term sprocket is used herein, this term is to be construed broadly, unless specified otherwise, to mean any object or device that facilitates rotation of another object and device. In the arrangement of a drag chain or sweep chain, sprocket 136 includes teeth that engage the drag chain or sweep chain. In the arrangement of a conveyor belt, sprocket 136 is a roller without teeth.

In the arrangement shown, as one example, head frame weldment 124 is connected to and held by drive housing 108 at the inward end of elongated body 30.

In one arrangement, as is shown herein, head frame weldment 124 as is described herein may be assembled by screwing, bolting and/or welding the components together at the factory into a single unit which is then to be installed in the grain bin 12 as a single part. This arrangement saves installation time and improves quality and reduces cost.

Pivot Point:

In the arrangement shown, as one example, system 10 includes a pivot point 36. Pivot point 36 is formed of any suitable size, shape and design and is configured to connect the inward end or head section 32 of sweep 28 to elevated floor 20 so as anchor the inward end of sweep 28 while allowing sweep 28 to rotate around pivot point 36.

In the arrangement shown, as one example, pivot point 36 is formed of a generally cylindrical tube 138 that extends upward from a plate 140 connected adjacent the lower end of cylindrical tube 138. A hollow interior 142 extends through the center of tube 138 and plate 140, which allows passage of electrical lead 50 there through.

Plate 140 is mounted to mounting plate 76 at the center of grain bin 12. In the arrangement shown, as one example, plate 140 is bolted to mounting plate 76 using a plurality of screws or bolts thereby providing a strong and rigid connection between the two components. The structural support of the sump stands at the centrally positioned sump 24 provides support for the weight and forces experienced by pivot point 36 which is connected to mounting plate 76 in the center of center sump 24.

The cylindrical exterior surface of tube 138 is received within the generally cylindrical hole 114 that extends through pivot column 112 of drive housing 108. One or more bearings 116 are positioned at the intersection of the stationary cylindrical tube 138 of pivot point 36 and rotating cylindrical hole 114 of pivot column 112 so as to facilitate rotation of sweep 28 around pivot point 36.

In the arrangement shown, as one example, a conduit 144 extends through the approximate center of the hollow interior 142 of pivot point 36 as well as through the approximate center of pivot column 112 of drive housing 108. Conduit 144 is formed of any suitable size, shape and design and is configured to protect electrical lead 50 as it extends through the stationary pivot point 36 and into the rotating drive housing 108. In the arrangement shown, as one example, conduit 144 is itself a cylindrical tube having a hollow interior through which electrical lead 50 extends through.

In the arrangement shown, as one example, at the upper end of conduit 144, electrical lead 50 connects to a slip ring assembly 146. Slip ring assembly 146 is formed of any suitable size, shape and design and is configured to facilitate the transmission of power and electrical signals into the rotating sweep 28. In the arrangement shown, as one example, slip ring assembly 146 is an electromechanical device that allows the transmission of power and electrical signals from a stationary object, in this case grain bin 12, elevated floor 20, pivot point 36, to a rotating structure, in this case sweep 28. The use of slip ring assembly 146 facilitates the ability to provide continuous uninterrupted power and control signals as sweep 28 rotates in only a single direction (in the example shown, in a clockwise direction) without binding, twisting or rotating electrical lead 50. In the arrangement shown, as one example, electrical lead 50 remains stationary below slip ring assembly 146, and above slip assembly 146 electrical lead 50 rotates around pivot point 36 as sweep 28 rotates around pivot point 36.

In the arrangement shown, as one example, cover 148 surrounds slip ring assembly 146 and provides access to slip ring assembly 146 for assembly and maintenance. In the arrangement shown, as one example, cover 148 connects at its lower end to the upper end of pivot column 112 of drive housing 108.

Elongated Body:

In the arrangement shown, as one example, sweep 28 includes an elongated body 30. Elongated body 30 is formed of any suitable size, shape and design and is configured to connect at its inward end to head section 32 and to connect at its outward end to tail section 34.

In the arrangement shown, as one example, elongated body 30 is formed of a plurality of sections 150 that connect to one another in end-to-end linear alignment. In the arrangement shown, as one example, each section 150 includes an end frame 152 positioned at each opposing end of the section 150 that extend in approximate parallel spaced relation to one another. In the arrangement shown, as one example, end frames 152, when viewed from an end, are generally triangular in shape and include an opening 154 at their middle that allows the passage of sweep mechanism 44 there through. In the arrangement shown, as one example, end frames 152, when viewed from the leading side 156 or the trailing side 158 or from above or below, are generally flat and planar in shape.

In the arrangement shown, as one example, the lower side of end frame 152 on the trailing side 158 extends a distance below the leading side 156. The lower extension of the trailing side 158 of end frame 152 supports and/or holds and/or is connected to a stop surface 160 (also referred to as floor scraper 160) positioned along trailing edge 158 of sections 150 of elongated body 30. Stop surface 160 operates as a floor scraper that stops grain and prevents grain from being passed over as the sweep 28 moves around pivot point 36. In the arrangement shown, as one example, stop surface 160 is a generally flat and straight member that extends between opposing end frames 152 and is positioned just rearward of sweep mechanism 44. In use, the lower edge of stop surface 160 passes over the upper surface of elevated floor 20 with close tolerances thereby scraping most if not all of the grain off of the elevated floor 20. In some arrangements, stop surface 160 includes a flexible member and/or brush configured to contact a surface of the floor 20 to move grain forward and prevent grain from passing under lower edge 158 of sections 150 of elongated body 30, while being able to flex during operation to avoid causing damage for the floor 20 of grain bin 12.

In the arrangement shown, as one example, a plurality of lateral supports 162 extend between opposing end frames 152 in approximate parallel spaced relation to one another thereby connecting opposing end frames 152 and providing needed strength and rigidity to section 150. In the arrangement shown, as one example, a front cover plate 164 is connected to and covers the front side or leading edge 156 of section 150 and extends between opposing end frames 152. In the arrangement shown, as one example, a rear cover plate 166 is connected to and covers the rear side or trailing edge 158 of section 150 and extends between opposing end frames 152. In the arrangement shown, as one example, a rear support 168 is connected to the rearward side of rear cover plate 166. Rear support 168 is formed of any suitable size, shape and design and is configured to provide structural support to rear cover plate 166 as well as to provide a cover for an electrical lead or conduit to extend along the rearward side of section 150 so as to provide power to electrical components along the length of elongated body 30, such as pushers 42.

In the arrangement shown, as one example, the elongated body 30 of sweep 28 is formed by attaching sections 150 in end-to-end relation to one another. More specifically, the outward facing surfaces of two end frames 152 are placed in planar engagement with one another and are affixed to one another by passing a plurality of screws and/or bolts through the overlapping exterior peripheral edges of end frames 152. This process is repeated until using sections 150 until the desired length of elongated body 30 is formed. A tail section 34 is then added to the outward end of elongated body 30.

Tail Section:

In the arrangement shown, as one example, sweep 28 includes a tail section 34. Tail section 34 is formed of any suitable size, shape and design and is configured to connect to the outward end of the elongated body 30 of sweep 28 and is configured to facilitate the movement of as much grain adjacent the interior surface of sidewall 16 as possible as well as facilitate the rotation of sweep 28 around pivot point 36.

In the arrangement shown, as one example, tail section 34 includes a tail section weldment 170. Tail section weldment 170 is formed of any suitable size, shape and design and is configured to attach to the outward end of elongated body 30 and is configured to facilitate the movement of grain from just inside of the sidewall 16 of grain bin 12 toward the sump 24 positioned at the center of grain bin 12. In the arrangement shown, as one example, tail section weldment 170 includes an end frame 152, which is similar to, if not identical to, the end frame 152 described herein with respect to sections 150. End frame 152 is positioned at the interior end of tail section weldment 170. In the arrangement shown, as one example, the end frame 152, which is positioned at the interior side of tail section weldment 170, includes all of the features as is described with end frames 152 used in association with sections 150. As such, in this arrangement, the end frame 152 at the interior side of tail section weldment 170 attaches to the exterior positioned end frame 152 of elongated body 30 in the same manner that adjacent sections 150 connect to one another. In the arrangement shown, as one example, end frame 152 at the outward end of elongated body 30 attaches to the end frame 152 at the interior end of tail section weldment 170 in the same way that one section 150 of elongated body 30 connects to another section 150 of elongated body in end frame 152 to end frame 152 engagement.

In the arrangement shown, as one example the outward end frame 172 connected to the outward end of tail section weldment 170 differs slightly than the inward positioned end frame 152 in that the section of material that encloses the lower end of opening 154 is missing. Instead, the outward end frame 172 has an opening at its lower end that extends upward a distance. Or, said another way, outward end frame 172 includes an inverted U-shaped opening at its lower side.

In the arrangement shown, as one example, tail section 34 includes a leading wall 174 positioned on the leading side of tail section weldment 170 extending between the inward positioned end frame 152 and the outward positioned outward end frame 172. In the arrangement shown, as one example, tail section 34 includes a trailing wall 177 positioned on the trailing side of tail section weldment 170 extending between the inward positioned end frame 152 and the outward positioned outward end frame 172. Leading wall 174 and trailing wall 176 are generally planar shaped members that extend from a lower end 178 to an upper end 180. Leading wall 174 and trailing wall 176 include a slot 182 therein. Slot 182 is positioned near the lower end of leading wall 174 and trailing wall 176 and extends a distance between the inward end and outward end of leading wall 174 and trailing wall 176. These slots 182 of leading wall 174 and trailing wall 176 are positioned in approximate parallel spaced alignment to one another on opposing sides of tail section weldment 170. Leading wall 174 and trailing wall 176 enclose the leading side and trailing side of tail section weldment 170, respectively.

Leading wall 174 and trailing wall 176 angle inward toward one another as they extend upward thereby forming a triangular shaped member when viewed from an end. In the arrangement shown, a support bracket 184 is connected to leading wall 174 and trailing wall 176 at the outward side of slots 182 in leading wall 174 and trailing wall 176. Support brackets 184 themselves include slots 182 therein that are configured to align with the slots 182 in leading wall 174 and trailing wall 176. The outward facing surfaces of support brackets 184 are configured to extend in a generally vertical fashion so as to compensate for the inward angle of leading wall 174 and trailing wall 176.

In the arrangement shown, as one example, slots 182 of leading wall 174 and trailing wall 176, and their respective support brackets 184, receive a shaft 186 therein. In the arrangement shown, as one example, a generally cylindrical shaft 186 extends in an approximate perpendicular alignment to the length of elongated body 30. Or, said another way, shaft 186 extends in an approximate perpendicular alignment to an imaginary center line that extends down the center of elongated body 30 from inward end to outward end. In the arrangement shown, as one example, shaft 186 is held by tail section weldment 170 and extends through slots 182 of opposing leading wall 174 and trailing wall 176.

In the arrangement shown, as one example, a sprocket 188 is connected to shaft 186 using a key 190, that prevents rotation of sprocket 188 with respect to shaft 186 such that when shaft 186 rotates so rotates shaft 186. Sprocket 188 is positioned mid-way between leading wall 174 and trailing wall 176 within tail section weldment 170. Sprocket 188 may be a toothed wheel, as is shown, or sprocket 188 may be any other device that supports or facilitates rotation of another member such as a paddle sweep, a drag chain, a belt, a conveyor or any other grain movement device.

In the arrangement shown, as one example, adjustment brackets 192 are connected to the outward facing surfaces of support brackets 184 on both the leading wall 174 and trailing wall 176 adjacent slots 182. Adjustment brackets 192 are formed of any suitable size, shape and design and are configured to receive and hold shaft 186 therein while allowing for shaft 186 to rotate while also facilitating the lateral adjustment of the position of shaft 186 relative to sweep 28. Or, said another way, adjustment brackets 192 facilitate adjustment of the position of shaft 186 along the length of sweep 28. This is a notable feature as this adjustment of the lateral position of shaft 186 along the length of sweep 28 allows for tightening of sweep mechanism 44 when sweep mechanism 44 is a paddle sweep, a drag chain, a belt, a conveyor or any other grain movement device that can and/or needs to be tightened. This is also a notable feature in that the adjustment mechanism of the lateral position of shaft 186 is positioned at the outward end of sweep 28. This eliminates the need to have the adjustment mechanism at the inward end of sweep 28, at the congested and complex head section.

In the arrangement shown, as one example, adjustment brackets 192 include a generally rectangular opening 194 at their middle that extends the majority of the length of adjustment bracket 192. Shaft 186 extends through this opening 194 in adjustment brackets 192. In the arrangement shown, as one example, opposing features 196 are positioned adjacent the upper end and lower end of opening 194 that extend the length of opening 194. In the arrangement shown, as one example, features 196 are rails that extend the length of opening 194. A bearing assembly 198 includes opposing features 200 in its upper and lower ends that are configured to engage and hold on to opposing features 196 of adjustment brackets 192. In the arrangement shown, as one example, opposing features 200 are grooves that receive the rails that are features 196 of adjustment bracket 192.

In this way, when bearing assembly 198 is in position on adjustment bracket 192, the features 200 of bearing assembly 198, which in the arrangement shown, as one example, are grooves, receive the features 196 of adjustment brackets 192, which in the arrangement shown, as one example, are rails. In this way, with this engagement and configuration, bearing assembly 198 may slide the length of opening 194 between the inward end of opening 194 and the outward end of opening 194.

In the arrangement shown, as one example, bearing assembly 198 includes an opening 202 at its approximate middle that is sized and shaped to receive shaft 186 therein while also allowing shaft 186 to extend there through. In the arrangement shown, as one example, the inward facing side of bearing assembly 198 includes a socket 204. Socket 204 is configured to receive and hold an adjustment member 206 therein.

Adjustment member 206 is formed of any suitable size, shape and design and is configured to selectively adjust the position of bearing assembly 198 with respect to adjustment bracket 192. Or, said another way, adjustment member 206 is configured to adjust the position of shaft 186 relative to adjustment bracket 192. In the arrangement shown, as one example, adjustment member 206 is a rod or threaded rod that is connected to socket 204 as well as to an inward wall 208 of adjustment bracket 192. In the arrangement shown, as one example, adjustment member 206 includes a tightening mechanism 210 that when operated is configured to move the position of adjustment member 206. In the arrangement shown, as one example, adjustment member 206 extends in approximate parallel spaced relation to the center axis of the length of sweep 28. In the arrangement shown, as one example, adjustment member 206 extends in approximate parallel spaced relation to the length of opening 194 in adjustment bracket 192.

In the arrangement shown, as one example, adjustment member 206 is a threaded rod that extends through inward wall 208 and into the space just outward of opening 202 with the outward positioned end of adjustment member 206 received within socket 204 of bearing assembly 198. In the arrangement shown, as one example, tightening mechanism 210 is a head, bolt head, nut or any other device or feature that can be used to move or tighten adjustment member 206. In the arrangement shown, as one example, as adjustment member 206 is moved in a first rotational direction, bearing assembly 198 and attached shaft 186 are moved toward the outward end of sweep 28, whereas, when adjustment member 206 is moved in a second rotational direction, which is opposite the first rotational direction, bearing assembly 198 and attached shaft 186 are moved toward the inward end of sweep 28. In this way, adjustment bracket 192 and adjustment member 206 facilitate adjustment of the position of shaft 186 relative to sweep 28. In the arrangement shown, as one example, a lock nut 212 is used to lock the position of adjustment member 206 once adjustment member 206 is moved to its desired position.

This arrangement also facilitates the loosening and tightening of sweep mechanism 44 when sweep mechanism 44 is connected to shaft 186 and/or sprocket 188. This configuration allows for tightening and loosening of sweep mechanism 44 at the outward end of sweep 28 in a manner that is easily accessible, robust and easy to adjust to an infinite degree for optimal operation.

In the arrangement shown, as one example, shaft 186 extends a distance forward through bearing assembly 198 on the leading side 156 of tail section weldment 170 of sweep 28. In the arrangement shown, as one example, an agitator 46 is connected to this forward-protruding end of shaft 186. Agitator 46 is formed of any suitable size, shape and design and is configured to facilitate agitation of grain at the outward end of sweep 28 as sweep 28 rotates around pivot point 36 so as to both move grain toward the center positioned sump 24 as well as to break up clumps in the grain that may stop rotation of sweep 28. In the arrangement shown, as one example, agitator 46 is an impeller, or propeller or any other device connected to the forward end of shaft 186 that agitates the grain as shaft 186 rotates.

In the arrangement shown, as one example, agitator 46 includes a generally circular shaped center member 214 having a pair of opposing arms 216 extending outwardly therefrom. In the arrangement shown, as one example, tabs 218 are connected to the trailing edge (in the direction of rotation) of arms 216. When viewed from a front side, tabs 218 extend forward at an angle as they extend away from the plane formed by center member 214 and arms 216 before terminating in unattached free ends 220. In the arrangement shown, as one example, to facilitate attachment to the forward end of shaft 186 a pair of holes 222 are positioned in the center member 214 that are configured to receive fasteners 224 therein that tighten agitator 46 to shaft 186.

In this arrangement, when sweep mechanism 44 is a paddle sweep, a drag chain, a belt or another device that rotates around shaft 186 and/or sprocket 188, sweep mechanism 44 causes rotation of shaft 186. As shaft 186 rotates, this causes rotation of agitator 46. As agitator 46 rotates, sweep 28 is driven around pivot point 36, this drives agitator 46 into the grain adjacent the outward end of sweep 28. The rotation of agitator 46, long with its forward angled tabs 218 engage the grain and have a tendency to move or throw the grain toward the center of grain bin 12. This grain is then picked up and moved to the center of grain bin 12 by sweep 28. As agitator 46 engages the grain, agitator 46 breaks up clumps in the grain which can block the forward rotation of sweep 28 when agitator 46 is not in use. In this way, the use of agitator 46 improves the efficiency of sweep system 10, reduces blockages, improves functionality and improves the robustness and uptime of the sweep system 10.

While the drawings show agitator 46 used with a sweep mechanism 44 that is a paddle sweep, it is hereby contemplated that agitator 46 may be used with any other type of sweep mechanism 44 such as a drag chain, an auger or any other grain moving system. In the example of sweep mechanism 44 being an auger, a gearbox, ring and pinion or other mechanism may be used to change the direction of rotation of the auger which extends along the length of the elongated body 30 to perpendicular to the length of elongated body 30.

Scraper:

In the arrangement shown, as one example, sweep 28 includes scraper 48. Scraper 48 is formed of any suitable size, shape and design and is configured to connect to the outward end of the elongated body 30 of sweep 28 and is configured to facilitate the inward movement of as much grain adjacent the interior surface of sidewall 16 as possible so that this grain may be captured by sweep 28 and moved to sump 24.

In the arrangement shown, as one example, scraper 48 is a generally square or rectangular planar member that extends a height between an upper edge 226 and a lower edge 228 and extends a length between a leading edge 230 and a trailing edge 232. In the arrangement shown, as one example, scraper 48 includes a bend 234 positioned a distance rearward of the trailing edge 232 and forward of the forward end of slots 236. Bend 234 extends vertically across scraper 48 from upper edge 226 and lower edge 228. In the arrangement shown, as one example, a pair of slots 236 are positioned in end-to-end relation with one another just inward from each of upper edge 226 and lower edge 228. These slots extend the majority of the distance between trailing edge 232 and bend 234 and facilitate connection to tail section 34.

In the arrangement shown, as one example, to facilitate the attachment of scraper 48 to tail section 34, the trailing edge 158 of outward end frame 172 of tail section weldment 170 includes an upper arm 238, which is positioned adjacent the upper end of outward end frame 172, and a lower arm 240, which is positioned adjacent the lower end of outward end frame 172, that extend rearward from the trailing edge 158 a distance. In the arrangement shown, as one example, the rearward trailing ends of upper arm 238 and lower arm 240 are bent out of plane with the other portions of outward end frame 172, and angle slightly toward pivot point 36 and the other portions of sweep 28 rearward of the bend. In the arrangement shown, these angled portions positioned at the trailing ends of upper arm 238 and lower arm 240 facilitate connection of the forward facing surface of scraper 48 to upper arm 238 and lower arm 240 through fasteners 242.

Fasteners 242 extend through slots 236 in scraper 48 and into and/or through the trailing ends of upper arm 238 and lower arm 240 thereby rigidly affixing scraper 48 to tail section weldment 170. The position of scraper 48 may be adjusted by loosening fasteners 242 and sliding scraper 48 further outward or further rearward and then tightening the fasteners 242 again once scraper 48 is in its desired position. In this way, scraper 48 may be quickly and easily and precisely adjusted so as to ensure scraper 48 extends as close as is desired to the interior surface of grain bin 12 so as to capture as much grain as possible.

Due to the longer rearward extension of upper arm 238, which is due to the triangular shape of outward end frame 172, a support bracket 244 is connected to and extends between the rearward trailing edge of upper arm 238 and the trailing wall 176, or any other portion of the tail section weldment 170. In this way, the addition of support bracket 244 provides additional strength and rigidity to upper arm 238.

In the arrangement shown, as one example, when viewed from above or below, the leading edge 230 of scraper 48 extends past the outward end of the other portions of sweep 28 a distance. In this way, scraper 48 forms a travel path for grain identified by arrow "A". That is, the addition of scraper 48 helps sweep 28 reach and capture grain positioned outward of the outward end of sweep 28, which is defined by outward end frame 172. This grain is outside of the reach of sweep mechanism 44, such as a paddle sweep, a drag chain, a conveyor, an auger or any other form of a grain moving device. As such, without scraper 48 this grain will remain. With scraper 48, scraper 48 engages this grain and moves it from outside of the outward end of sweep 28 inward a distance, along arrow "A" and into the travel path of sweep 28 such that this grain is captured by sweep 28 on a subsequent pass. In this way, the addition of scraper 48 improves the efficiency of sweep 28.

It is worth noting that in the arrangement shown, as one example, sweep 28 is positioned rearward of the center line that extends through the approximate center of sweep 28 that extends from its inward end to its outward end. This is true whether scraper 48 is slid all the way rearward on slots 236 as well as when scraper 48 is slid all the way forward on slots 236. As such, scraper 48 is positioned rearward of the center of sweep 28. This configuration and placement allows scraper 48 to be pulled into the grain as the scraper 48 trails the sweep 28. This prevents the sweep 28 from pushing the leading edge 230 of scraper 48 into the grain, which can cause operational problems and inefficiencies.

Carrier Wheels:

In the arrangement shown, as one example, system 10 includes a plurality of carrier wheels 40. Carrier wheels 40 are formed of any suitable size, shape and design and are configured connect to either the leading side or trailing side of the elongated body 30 of sweep 28 and provide support to sweep 28. In the arrangement shown, as one example, carrier wheels 40 include a rolling member 246 that connects to an axle 248 that extends through rolling member 246 as well as a pair of opposing guides 250 that converge together at a point in front of rolling member 246 and extend rearward on each side or rolling member 246. Opposing guides 250 help to deflect grain around rolling member 246 of carrier wheels 40. In the arrangement shown, as one example, a top plate 252 is connected adjacent the upper end of guides 250. Top plate 252 connects to bottom plate 254 which is itself connected to a pair of attachment plates 256 that extend upward from bottom plate 254 in approximate parallel spaced relation to one another with a space positioned between attachment plates 256.

In the arrangement shown, as one example, carrier wheels 40 are spaced along the length of elongated body 30 to provide support along the length of elongated body 30. In the arrangement shown, as one example, carrier wheels 40 may be attached to the leading edge 156 or trailing edge 158 by placing joined end frames 152 within the space positioned between opposing attachment plates 256 and screwing or bolting the attachment plates 256 to end frames 152.

In the arrangement shown, as one example, the angle and/or orientation of rolling member 246 may be set by rotating the position of top plate 252 relative to bottom plate 254. In the arrangement shown, as one example, carrier wheels 40 are positioned along the length of elongated body 30 such that they ride on outer wear tracks 100 so as to help disperse the weight and prevent damage to elevated floor 20.

Pushers:

In the arrangement shown, as one example, system 10 includes a plurality of pushers 42. Pushers 42 are formed of any suitable size, shape and design and are configured connect to either the trailing side of the elongated body 30 of sweep 28 and push the sweep 28 forward such that sweep 28 rotates around pivot point 36. In the arrangement shown, as one example, a plurality of pushers 42 are positioned along the length of elongated body 30 such that they ride on outer wear tracks 100 so as to help disperse the weight and prevent damage to elevated floor 20. In the arrangement shown, as one example, pushers 42 include a frame 258 and powered wheel 260 that rotates thereby imparting rotation on elongated body 30 of sweep 28.

Sweep Mechanism:

In the arrangement shown, as one example, system 10 includes a sweep mechanism 44. Sweep mechanism 44 is formed of any suitable size, shape and design and is configured sweep grain along the length of elongated body 30 and into center sump 24. In the arrangement shown, as one example, sweep mechanism 44 is what is known as a paddle sweep, having a plurality of links 262 that separate adjacent paddles 264.

In the arrangement shown, as one example, the links 262 of sweep mechanism 44 wrap around the sprocket 136 and shaft 122 of the drive housing 108 at the inward end of sweep 28. In the arrangement shown, as one example, the links 262 of sweep mechanism 44 wrap around the sprocket 188 and shaft 186 of the tail section weldment 170 at the outward end of sweep 28.

As sweep mechanism 44 rotates between the inward positioned shaft 122 and sprocket 136 and the outward positioned shaft 186 and sprocket 188, the paddles 264 extend downward from links 262 and engage the grain and urge the grain toward center sump 24.

Any other configuration of a sweep mechanism 44 is hereby contemplated for use with the system 10 such as a drag chain, a belt, an auger or any other grain moving device.

In Operation:

In the arrangement shown, as one example, sweep system for full floor grain bins 10 is connected to pivot point 36 at the approximate center of grain bin 12. Upon activation, motor 118 rotates gearing mechanism 120, which rotates shaft 122, which rotates sprocket 136, which causes sweep mechanism 44 to rotate around the inward positioned shaft 122 and sprocket 136 of head section 32, which causes rotation around the outward positioned shaft 186 and sprocket 188 of tail section 34.

As shaft 122 and sprocket 136 in head section 32 and shaft 186 and sprocket 188 of tail section 34 rotate, the links 262 and paddles 264 of sweep mechanism 44 move from tail section 34 toward head section 32 on the lower side of sweep 28, while the links 262 and paddles 264 of sweep mechanism 44 move from head section 32 toward tail section 34 through the hollow interior of sweep 28, which is defined by openings 154 in end frames 152. As sweep mechanism 44 moves toward head section 32, the paddles 264 extend downward from links 262 and engage the grain and urge the grain toward center sump 24. The lower ends of paddles 264 pass just above the upper surface of elevated floor 20, as such most if not all of the grain engaged by paddles 264 is moved along the length of elongated body 30 toward head section 32 and sump 24. As the paddles 264 engage the grain and push the grain forward toward head section 32 and sump 24, the grain is stopped from moving behind sweep 28 by stop surface 160. That is, stop surface 160 captures the grain and ensures that the grain is moved toward sumps 24 instead of passing under sweep 28.

As motor 118 operates and sweep mechanism 44 moves grain toward sumps 24, pushers 42 push sweep 28 in a clockwise direction around pivot point 36 as carrier wheels 40 support the weight of sweep 28. That is, as the drive wheel 260 of pushers 42 rotates, drive wheel 260 engages outer wear track 100 thereby driving sweep 28 forward in a clockwise direction (however counterclockwise is also contemplated for use). As sweep 28 is driven forward, grain is pushed into the open leading side of the lower end of elongated body 30, while the stop surface 160 closes the trailing side of elongated body 30 thereby preventing grain from passing under the sweep 28.

As the sweep 28 is driven around pivot point 36, carrier wheels 40 and drive wheels 260 of pusher 42 travel on outer wear tracks 100 which are supported by bridging supports 102. The addition of the outer wear tracks 100 help to provide strength and rigidity to elevated floor 20 as sweep 28 passes over thereby preventing denting or sagging of the planks 60 of elevated floor 22. This weight is also supported by additional bridging supports 102 positioned below elevated floor 20 where present, such as over grain conveyor 26.

As the sweep 28 is driven around pivot point 36, the weight of the inward end of sweep 28 or head section 32 is supported by a plurality of support wheels 38, which are concentrated around pivot point 36. These support wheels 38 ride on wear track 98 positioned around pivot point 36. The addition of the wear tracks 98 help to provide strength and rigidity to elevated floor 20 around pivot point 36 as sweep 28 passes over thereby preventing denting or sagging of elevated floor 20 around pivot point 36 where weight of sweep 28 may be concentrated. This weight is also supported by additional center support stands 86 positioned adjacent pivot point 36 as well as the supports 68/72 used in association with sump 24.

The weight of pivot point 36 is supported by the centrally positioned horizontal support 68 of sump 24, which is itself supported by vertical supports 72 positioned at the outward ends of horizontal supports 68. By placing pivot point 36 in the center of centrally positioned sump 24, grain may be delivered to the center of centrally positioned sump 24 regardless of the angular orientation of the sweep 28.

Electrical lead 50 extends between foundation 14 and elevated floor 20, upward through the hollow interior of a vertical support 72 of centrally positioned sump 24, through the hollow interior of the centrally positioned horizontal support 68, through the opening in mounting plate 76, through the hollow interior 142 of pivot point 36, through the hollow interior of pivot column 112 and conduit 144, and eventually connects to slip ring assembly 146 before extending through portions of sweep 28. As sweep 28 rotates, the upper portion of slip ring assembly 146 rotates and maintains an electrical connection while the lower portion of slip ring assembly 146.

As the sweep 28 rotates around pivot point 36, and the shaft 186 connected to sprocket 188 rotates in tail section 34 as sweep mechanism 44 moves within sweep 28. As shaft 186 rotates, so rotates agitator 46 connected to the forward end or leading end of shaft 186. As agitator 46 rotates, the opposing arms 216 and tabs 218 engage the grain and break up any clumps in the grain thereby allowing the sweep 28 to not be stopped by a clump of grain at or near the outward end of sweep 28. As the agitator 46 rotates, the rotating arms 216 and tabs 218 have a tendency to move grain toward the inward end of sweep 28 and into the travel path of sweep 28 such that the grain is moved by sweep mechanism 44 toward center sump 24.

As the sweep 28 rotates around pivot point 36, the leading edge 230 of scraper 48, which is positioned outward of the outward end of sweep 28, passes just inward of the sidewall 16 of grain bin 12. As the leading edge 230 of scraper 48 passes just inward of the sidewall 16 of grain bin 12, scraper 48 captures the grain positioned between the outward end of sweep 28 and leading edge 230. This grain is then directed along arrow "A" along the length of scraper 48. The result is that this grain, which was previously positioned outward of the outward end of sweep 28 is moved to a positioned in the travel path of sweep 28, albeit behind the sweep 28. This grain, which is deposited in the travel path of sweep 28 but behind sweep 28 is then captured by sweep 28 on a second pass of sweep 28 around pivot point 36. To maximize the amount of grain captured by scraper 48, scraper 48 is slid along slots 236 until the leading edge 230 is positioned just inward of sidewall 16. In this way, scraper 48 substantially reduces the amount of grain that remains in the grain bin 12 after the sweep 28 is used. This is especially true for grain left adjacent the sidewall 16.

Figure 1:
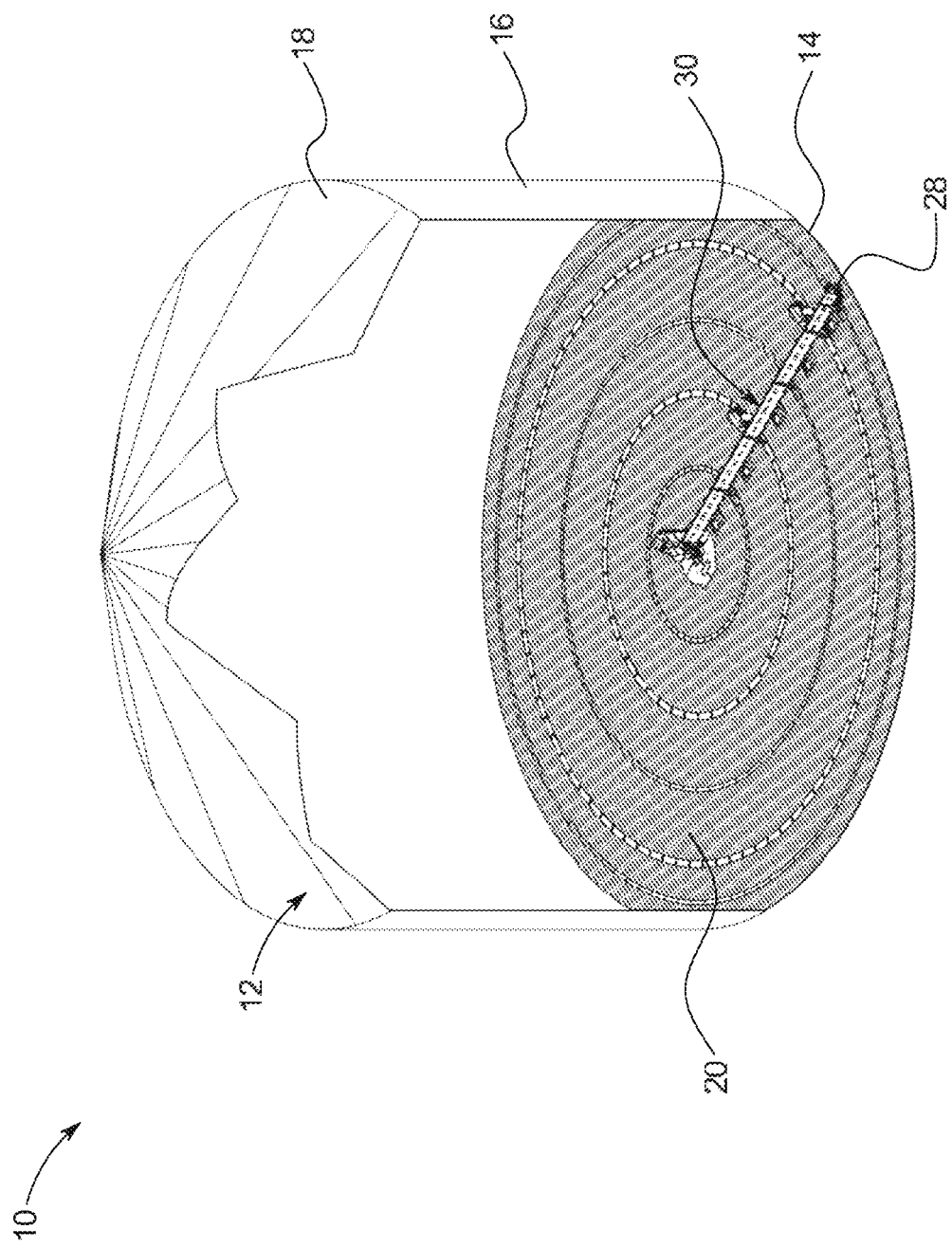
FIG. 1 shows a perspective cut-away elevation view of an exemplary grain bin having an exemplary sweep system, in accordance with one or more embodiments, the view showing a sweep system positioned on top of an elevated floor and just within the sidewall of the grain bin; the view showing the sweep connected at its inward end to a pivot point.
Figure 2:
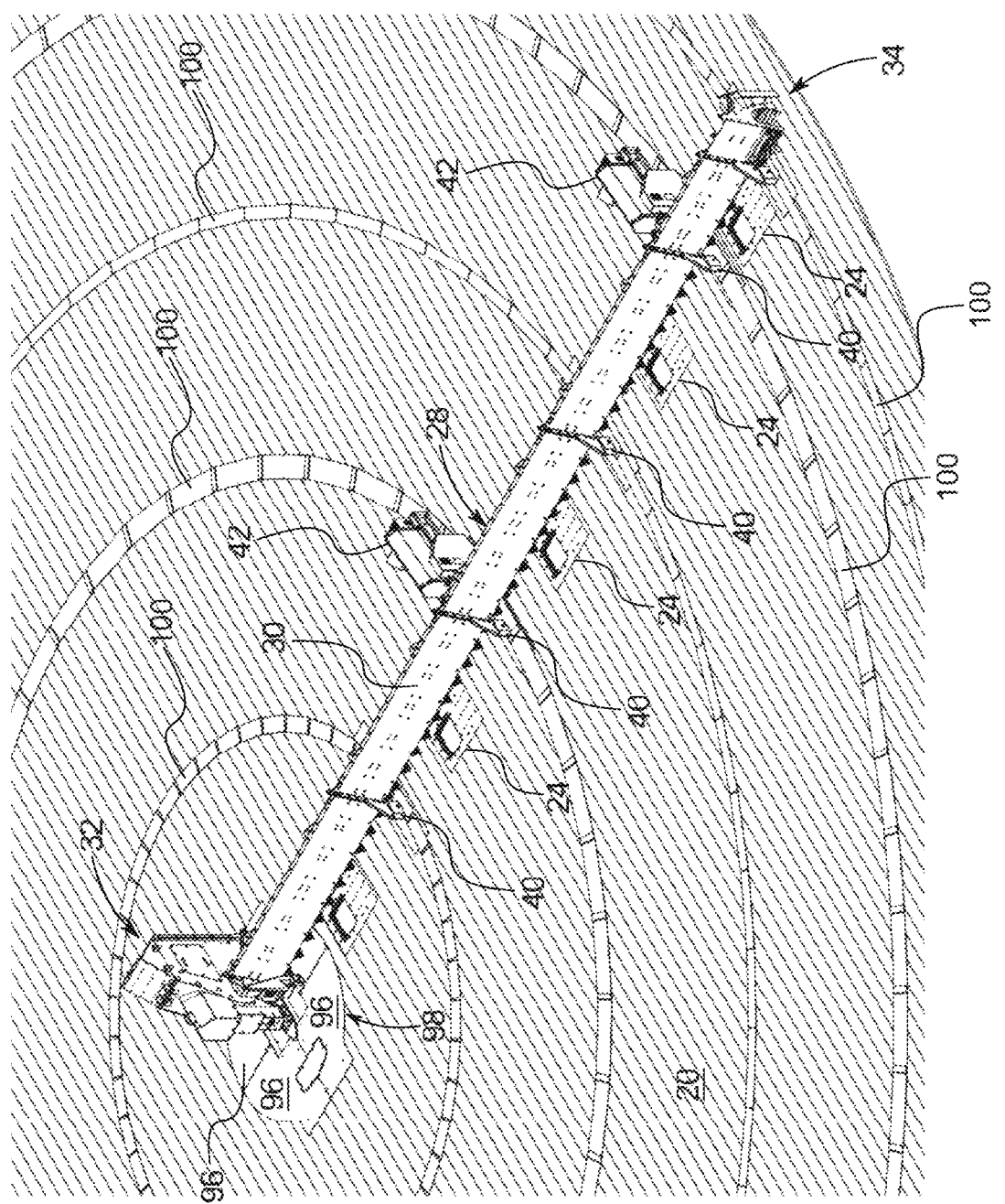
FIG. 2 shows a perspective view of an exemplary sweep system, in accordance with one or more embodiments, the view showing a sweep system positioned on top of an elevated floor of a grain bin; the view showing a leading side of the sweep; the view showing the sweep in a parked position over sumps.
Figure 3:
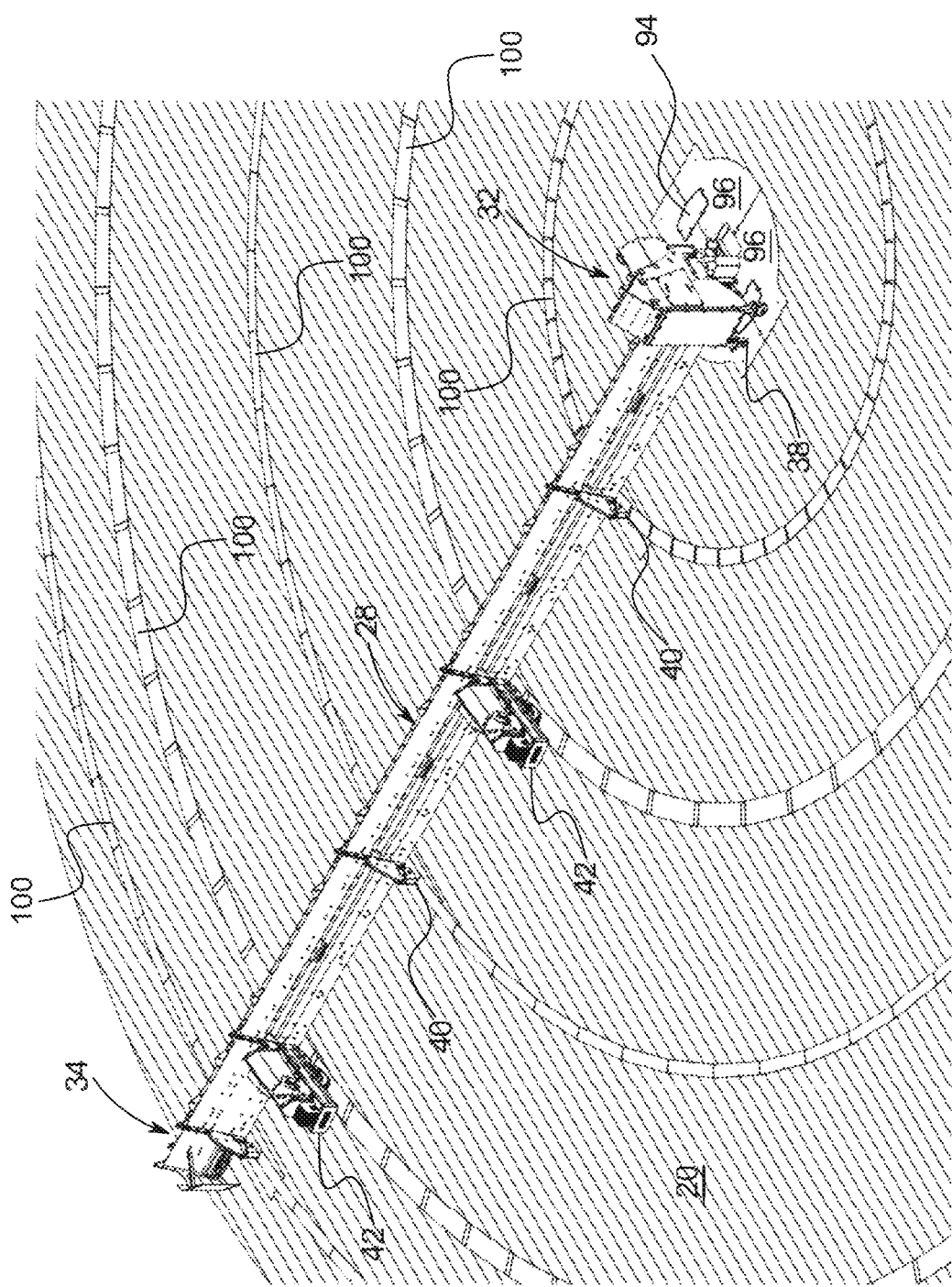
FIG. 3 shows a perspective view of an exemplary sweep system, in accordance with one or more embodiments, the view showing a trailing side of the sweep; the view showing carrier wheels and pushers riding on outer wear tracks.
Figure 4:
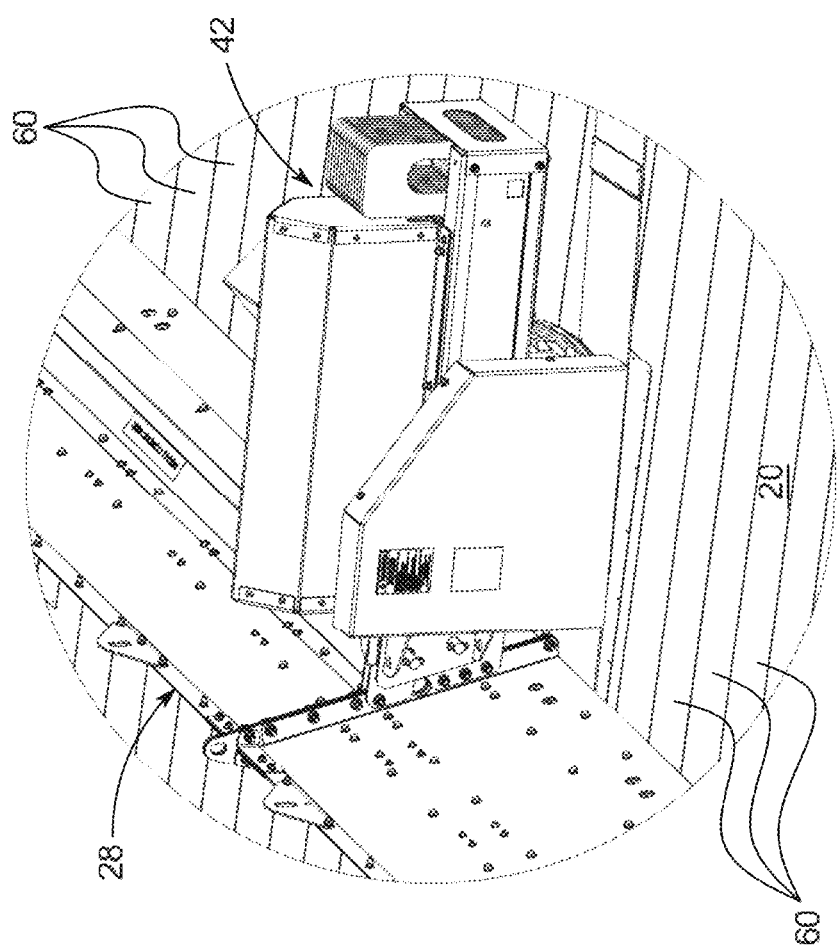
FIG. 4 shows a close up rear left elevated perspective view of a sweep and pusher, in accordance with one or more embodiments.
Figure 5:
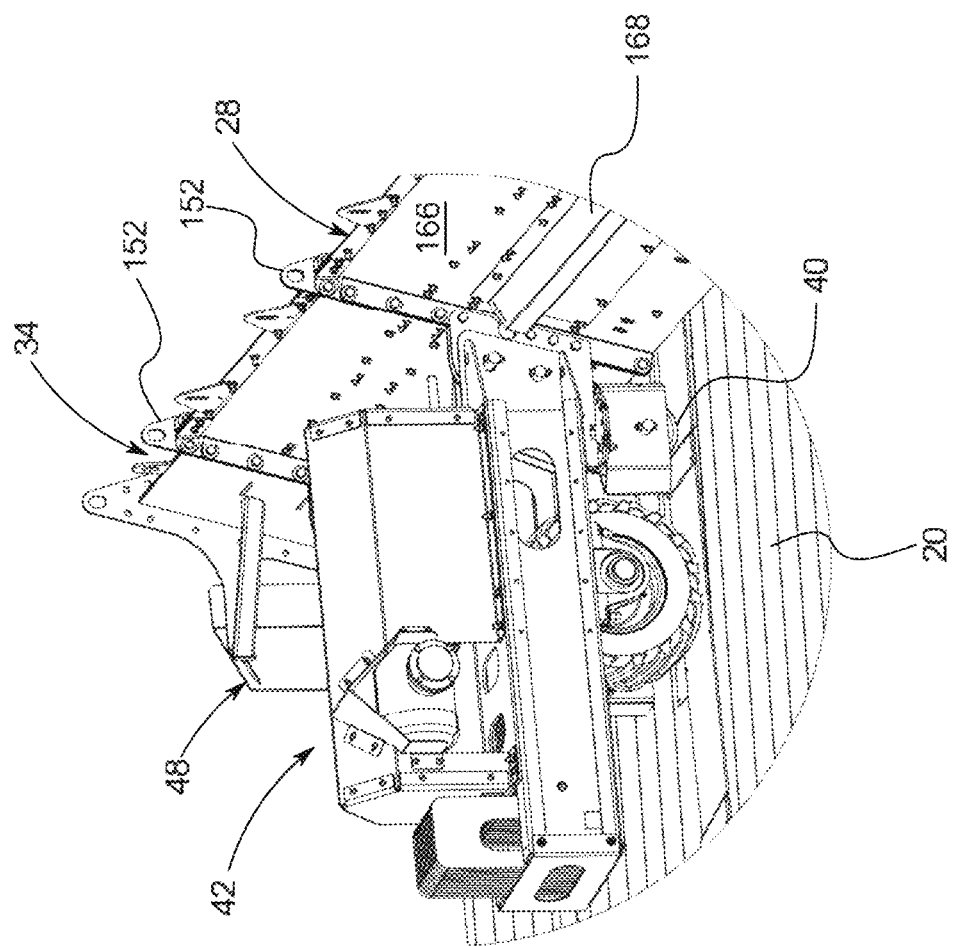
FIG. 5 shows a close up rear right elevated perspective view of a sweep and pusher, in accordance with one or more embodiments.
Figure 6:
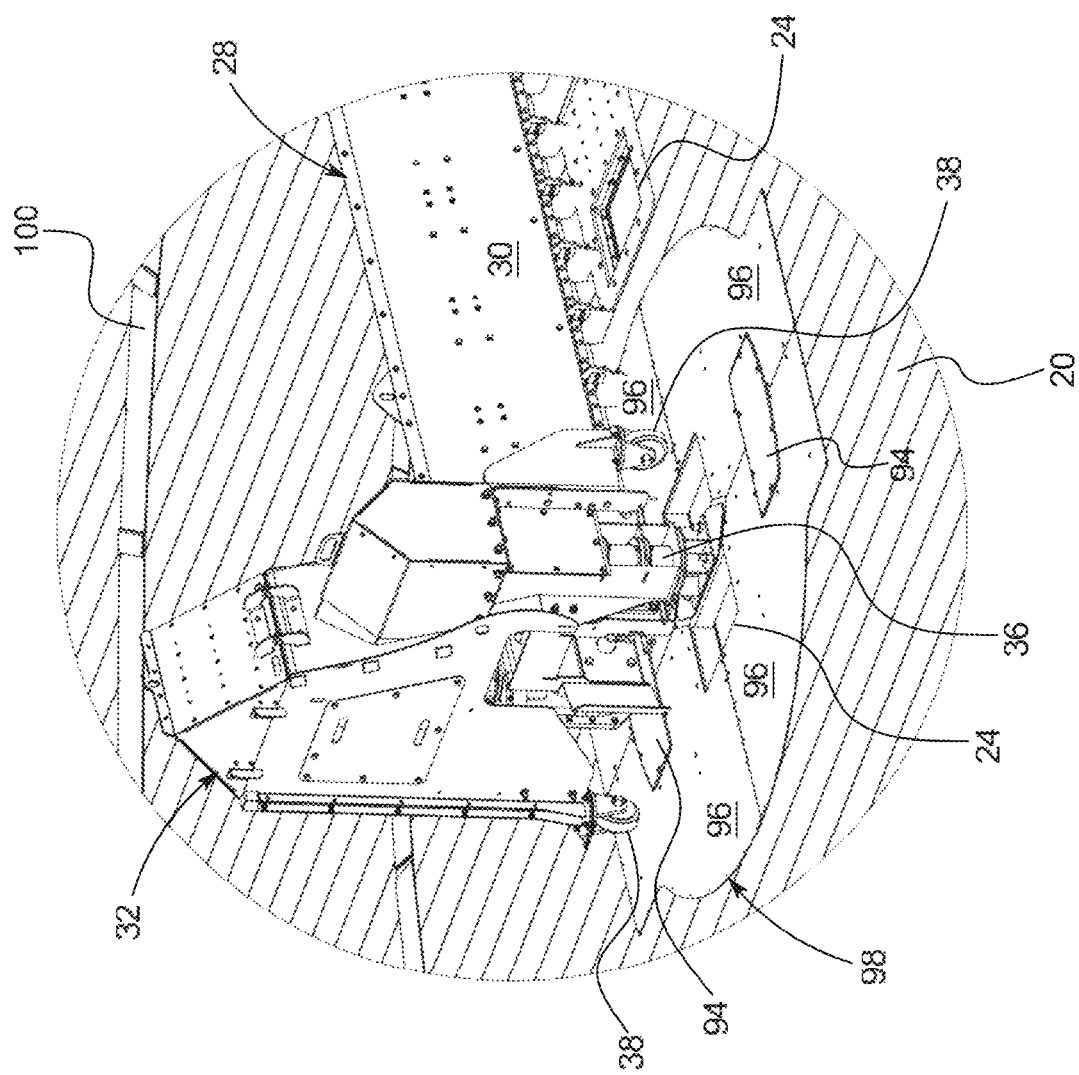
FIG. 6 shows a close up front right elevated perspective view of a head section of a sweep, in accordance with one or more embodiments.
Figure 7:
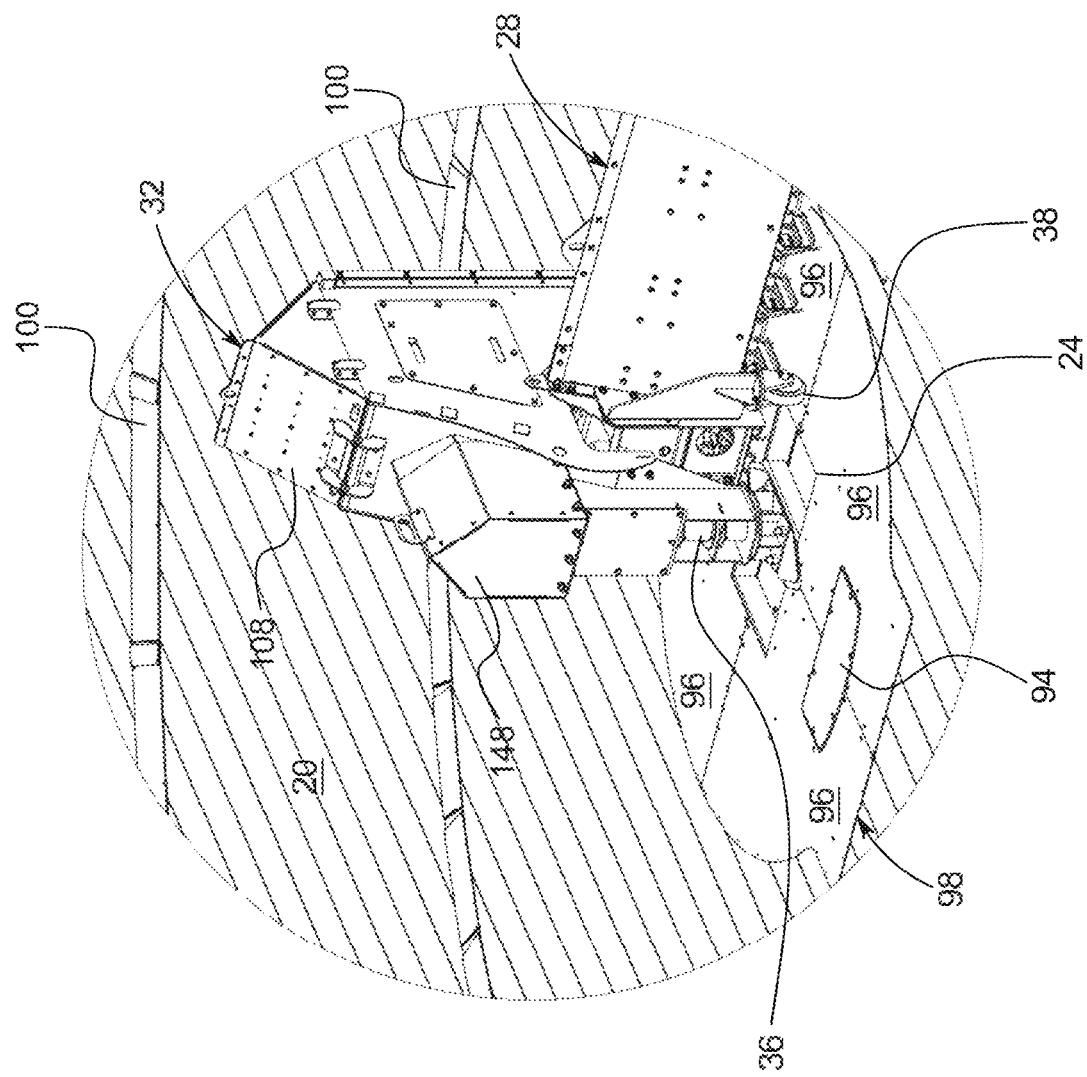
FIG. 7 shows a close up front left elevated perspective view of a head section of a sweep, in accordance with one or more embodiments.
Figure 8:
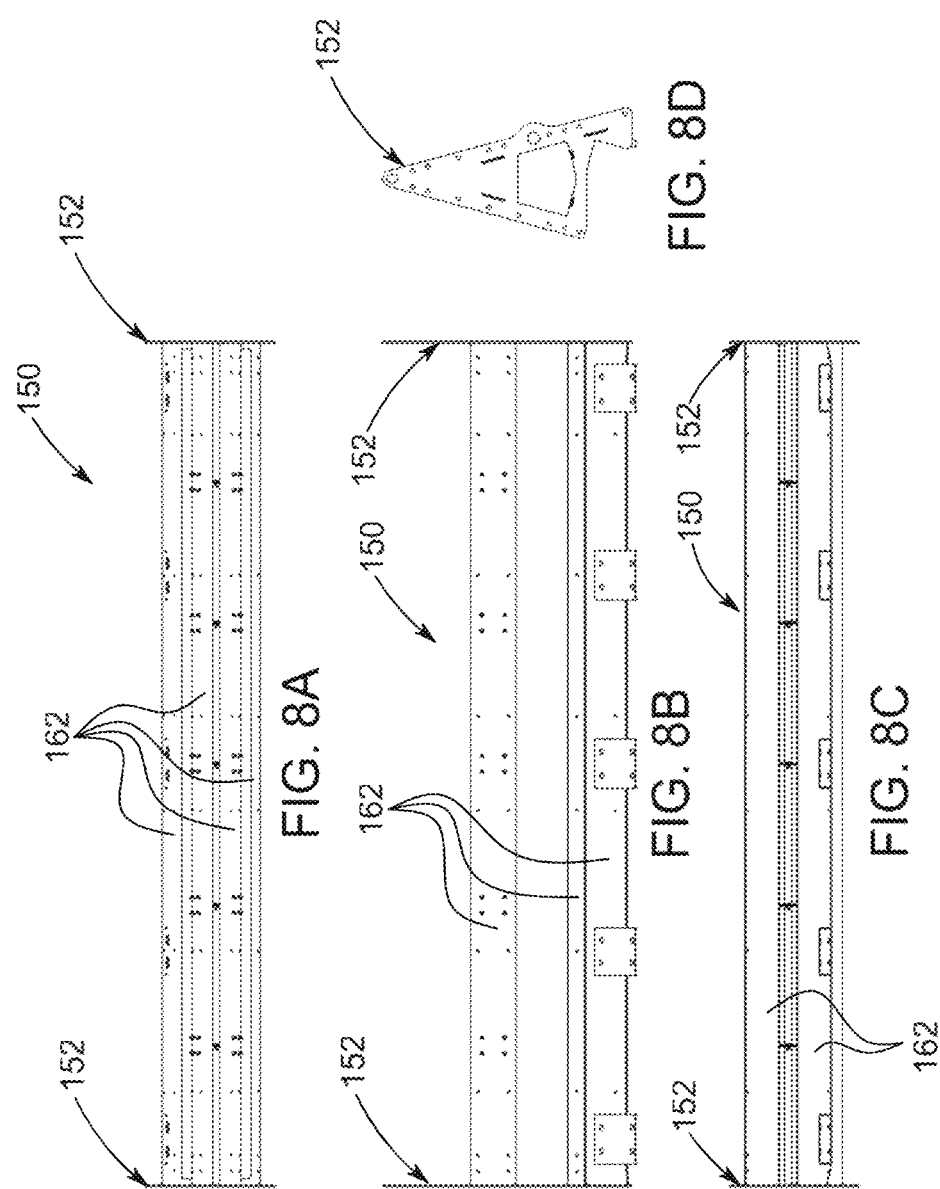
FIG. 8A shows a top view of a section of an elongated body of a sweep, in accordance with one or more embodiments.
FIG. 8B shows a front view of a section of an elongated body of a sweep, in accordance with one or more embodiments.
FIG. 8C shows a bottom view of a section of an elongated body of a sweep, in accordance with one or more embodiments.
FIG. 8D shows a left side view of a section of an elongated body of a sweep, in accordance with one or more embodiments.
Figure 9:
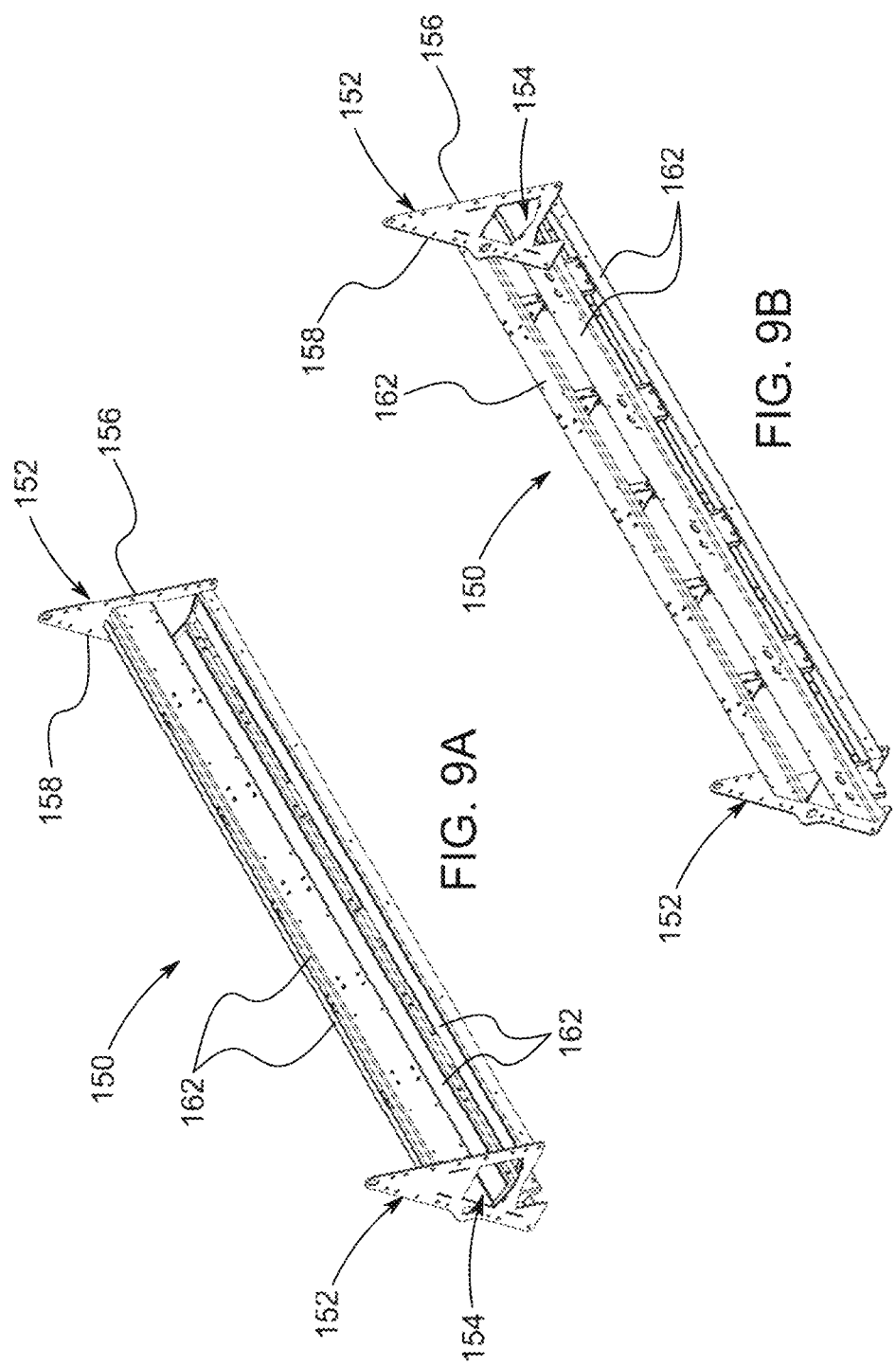
FIG. 9A shows a front right elevated perspective view of a section of an elongated body of a sweep, in accordance with one or more embodiments.
FIG. 9B shows a rear right lower perspective view of a section of an elongated body of a sweep, in accordance with one or more embodiments.
Figure 10:
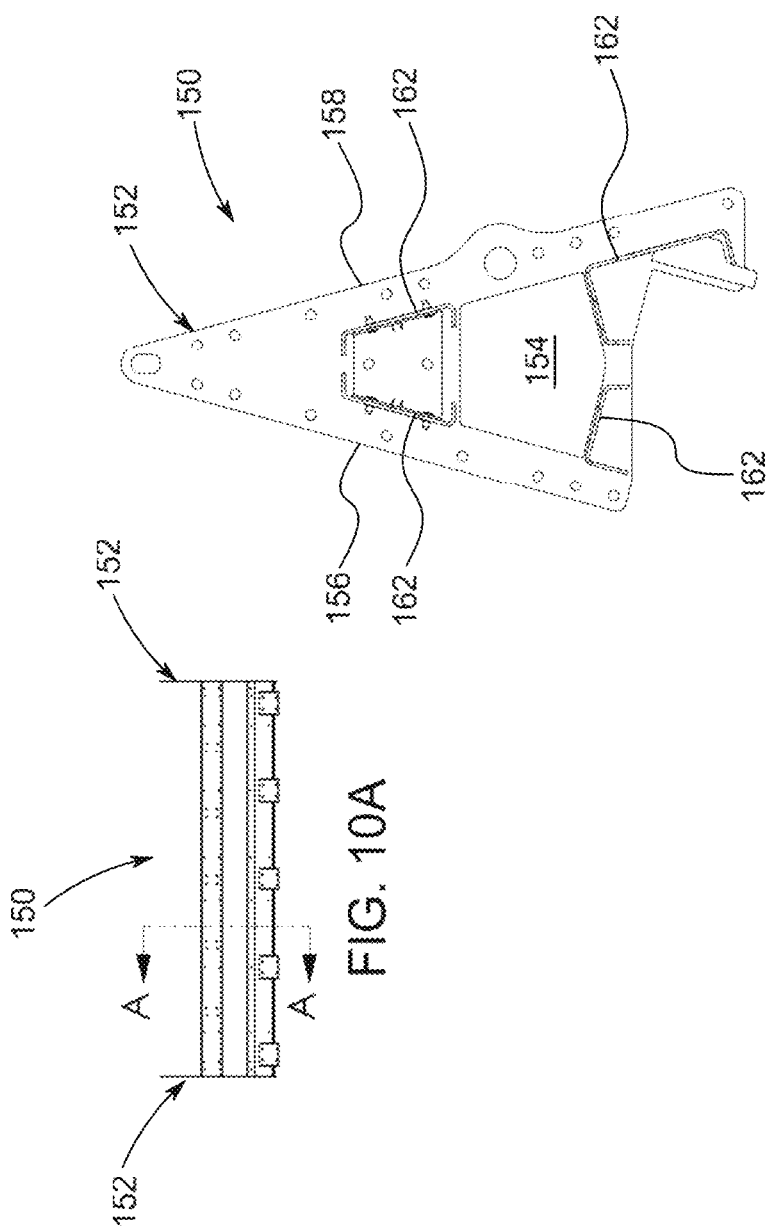
FIG. 10A shows a rear right lower perspective view of a section of an elongated body of a sweep, in accordance with one or more embodiments.
FIG. 10B shows a view of cross section A of the view shown in FIG. 10A, in accordance with one or more embodiments.
Figure 11:
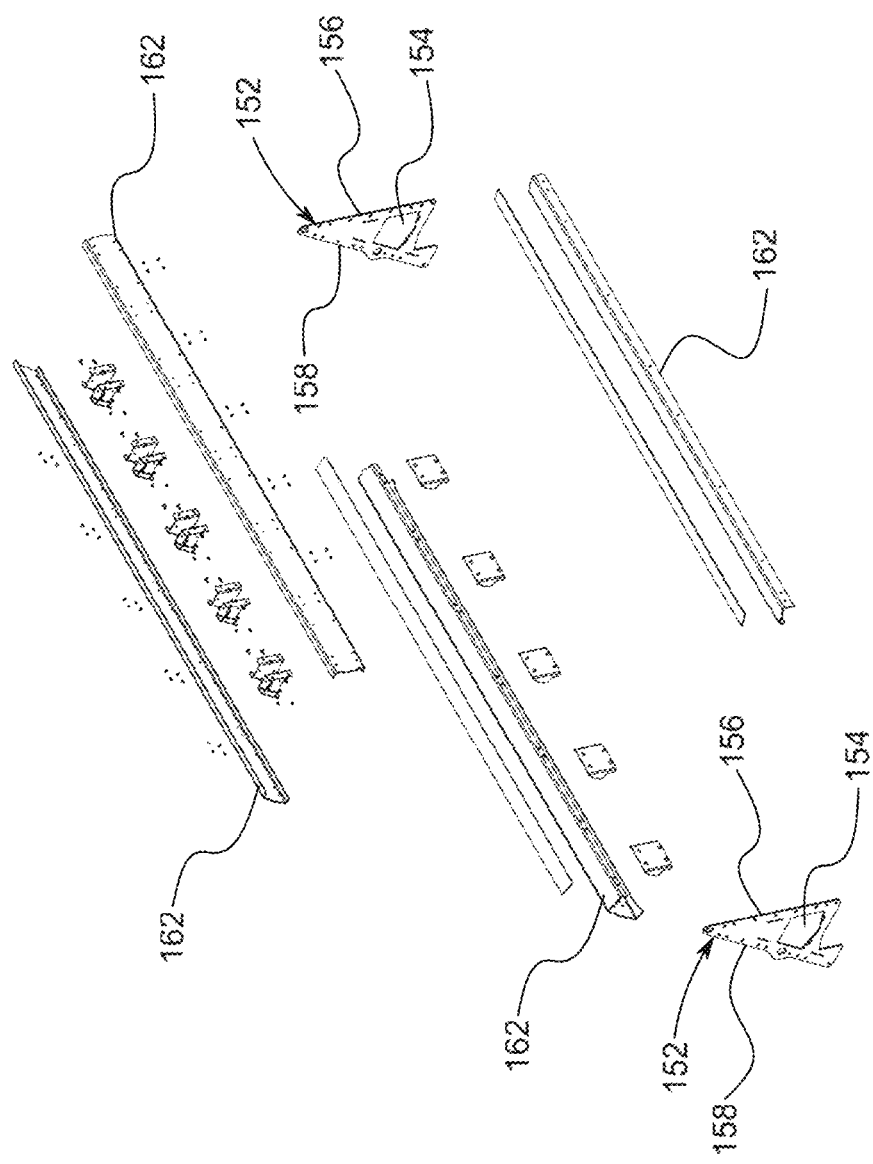
FIG. 11 shows an exploded view of a section of an elongated body of a sweep, in accordance with one or more embodiments.
Figure 12:
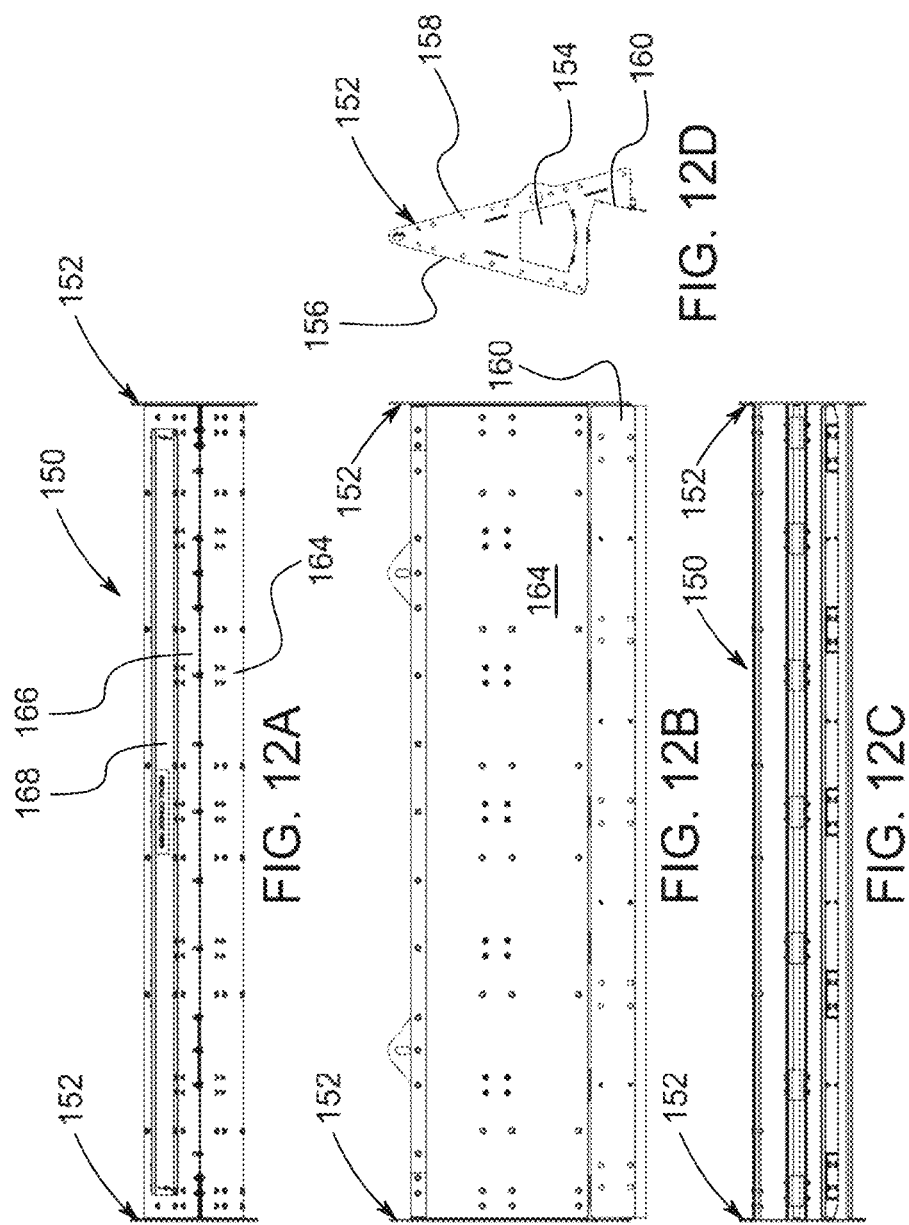
FIG. 12A shows a top view of a section of an elongated body of a sweep, in accordance with one or more embodiments.
FIG. 12B shows a front view of a section of an elongated body of a sweep, in accordance with one or more embodiments.
FIG. 12C shows a bottom view of a section of an elongated body of a sweep, in accordance with one or more embodiments.
FIG. 12D shows a left side view of a section of an elongated body of a sweep, in accordance with one or more embodiments.
Figure 13:
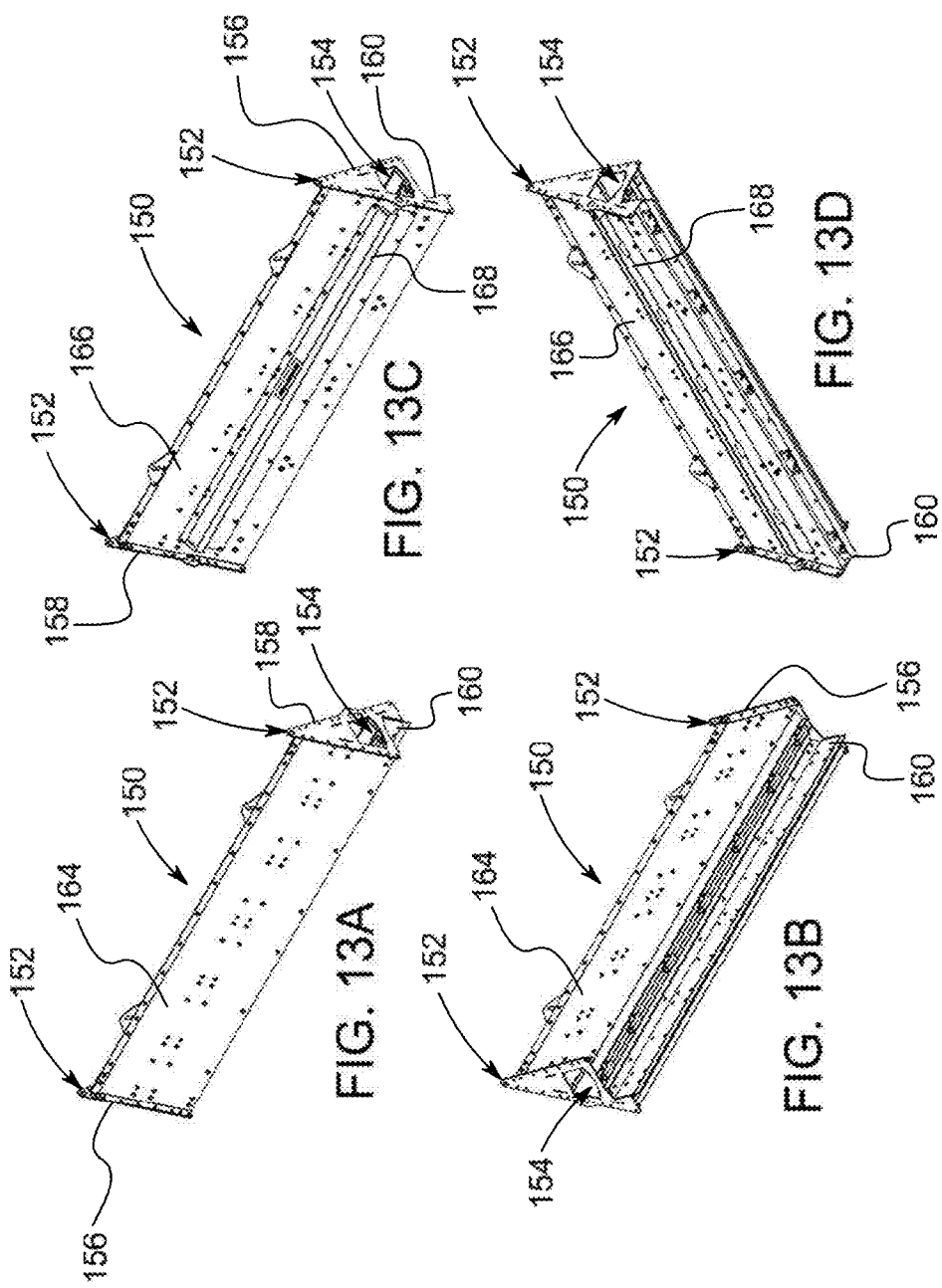
FIG. 13A shows an upper front left perspective view of the section of the elongated body if the sweep shown in FIGS. 12A-12D, in accordance with one or more embodiments.
FIG. 13B shows a lower front right perspective view of the section of the elongated body if the sweep shown in FIGS. 12A-12D, in accordance with one or more embodiments.
FIG. 13C shows an upper rear right perspective view of the section of the elongated body if the sweep shown in FIGS. 12A-12D, in accordance with one or more embodiments.
FIG. 13D shows a lower rear right perspective view of the section of the elongated body if the sweep shown in FIGS. 12A-12D, in accordance with one or more embodiments.
Figure 14:
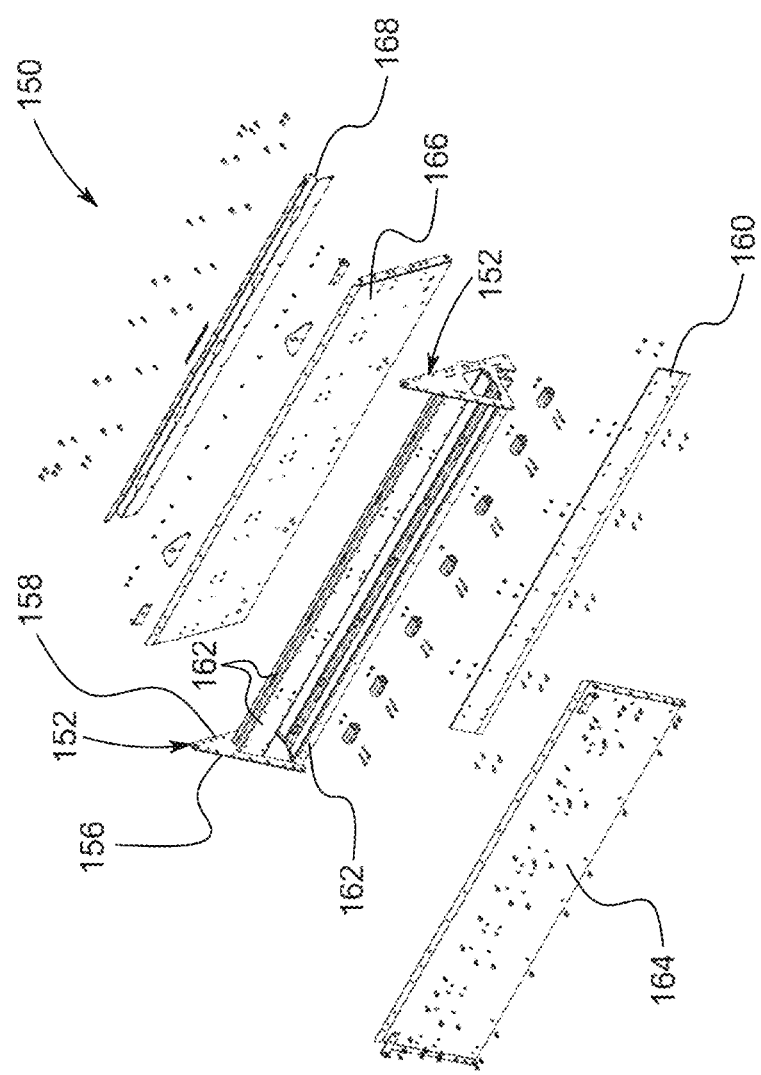
FIG. 14 shows an exploded view of a section of an elongated body of a sweep, in accordance with one or more embodiments.
Figure 17:
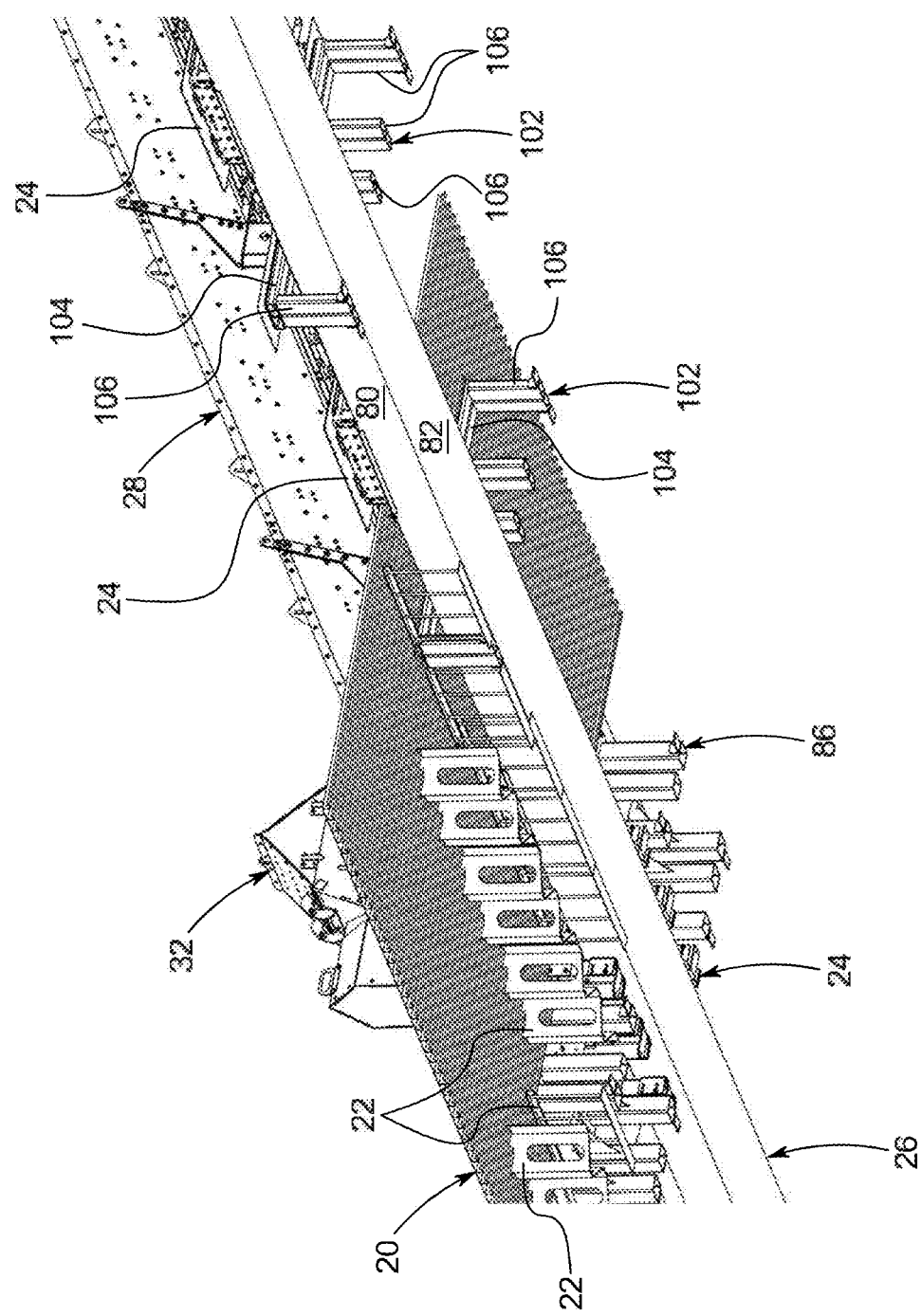
FIG. 17 shows a lower front left perspective view of an exemplary sweep system, in accordance with one or more embodiments, the view showing a grain conveyer and floor support positioned under an elevated floor of a grain bin; the view showing the braces positioned underneath sweep system positioned on top of an elevated floor of a grain bin; the view showing wear plates, bridging supports, floor supports of a center support stand supporting the sweep system at a pivot point.
Figure 18:
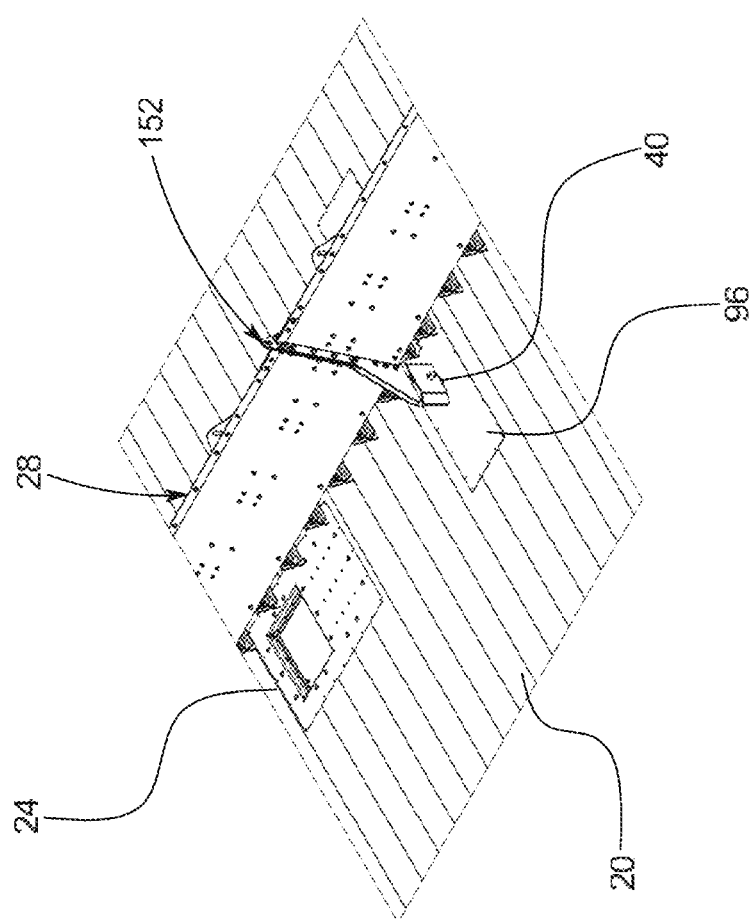
FIG. 18 shows a close up upper front left perspective view of a sweep, in accordance with one or more embodiments; the view showing a carrier wheel of the sweep positioned over a wear plate and bridging support.
Figure 19:
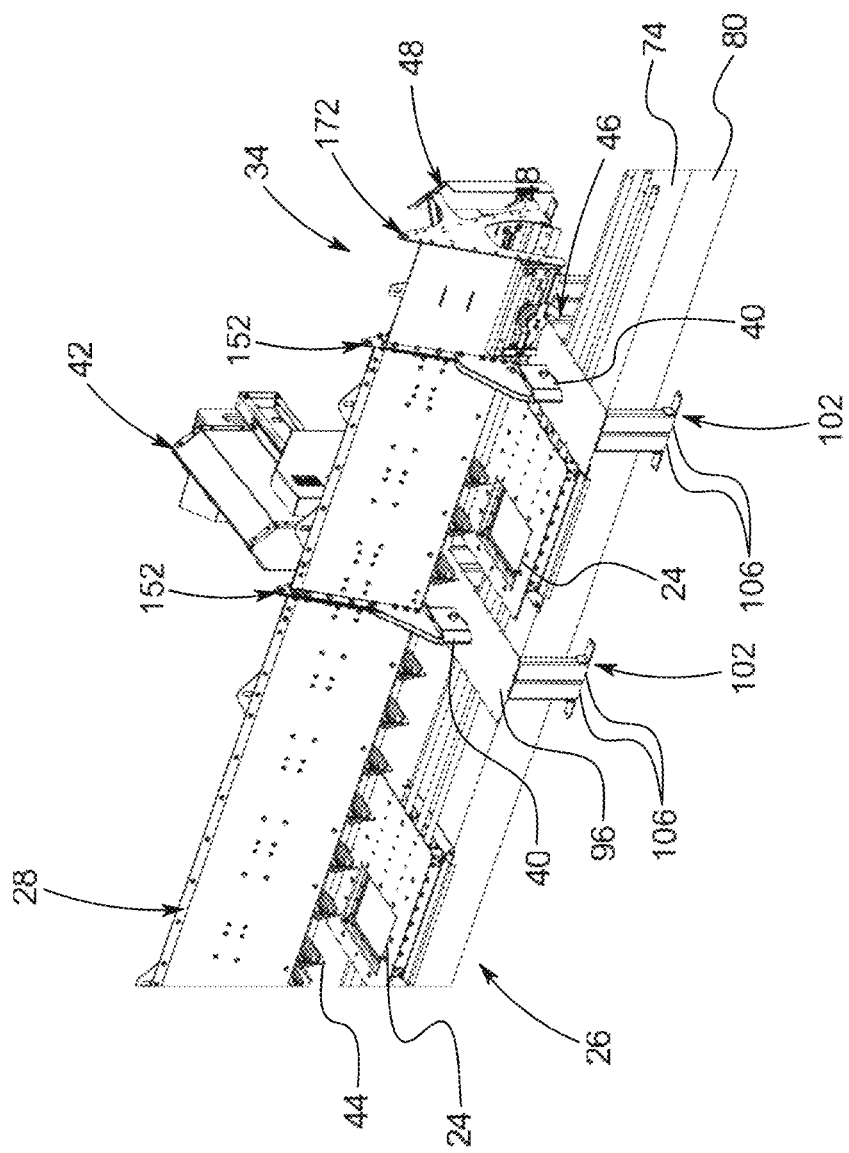
FIG. 19 shows a close up upper front left perspective view of a sweep, in accordance with one or more embodiments; the view showing the sweep in a parked position over grain conveyer with carrier wheels of the sweep positioned over wear plates and bridging supports; the view showing elevated floor omitted.
Figure 20:
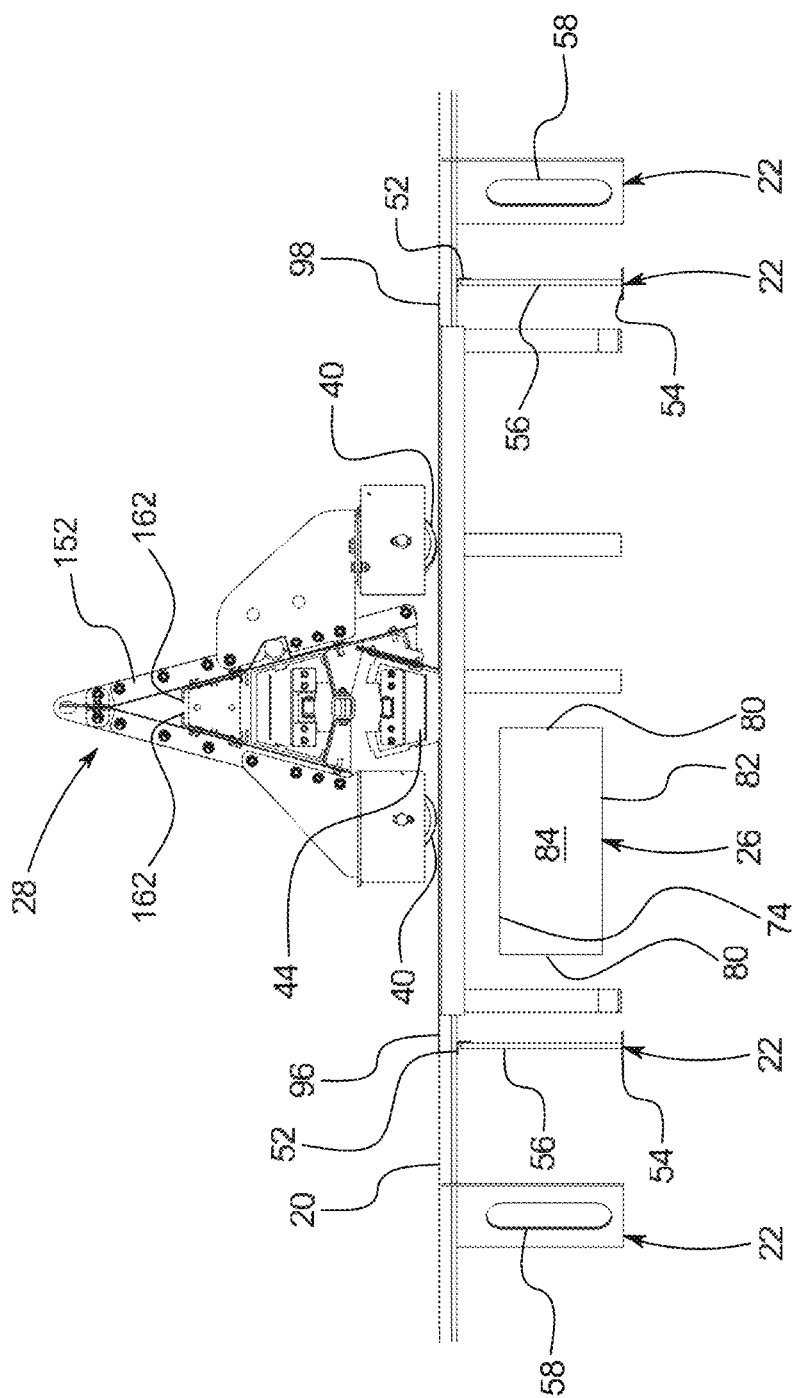
FIG. 20 shows a cross section view of a sweep, grain conveyer and elevated floor of a grain bin, in accordance with one or more embodiments; the view showing the sweep in a parked position over grain conveyer with carrier wheels of the sweep positioned over wear plates and bridging supports.
Figure 21:
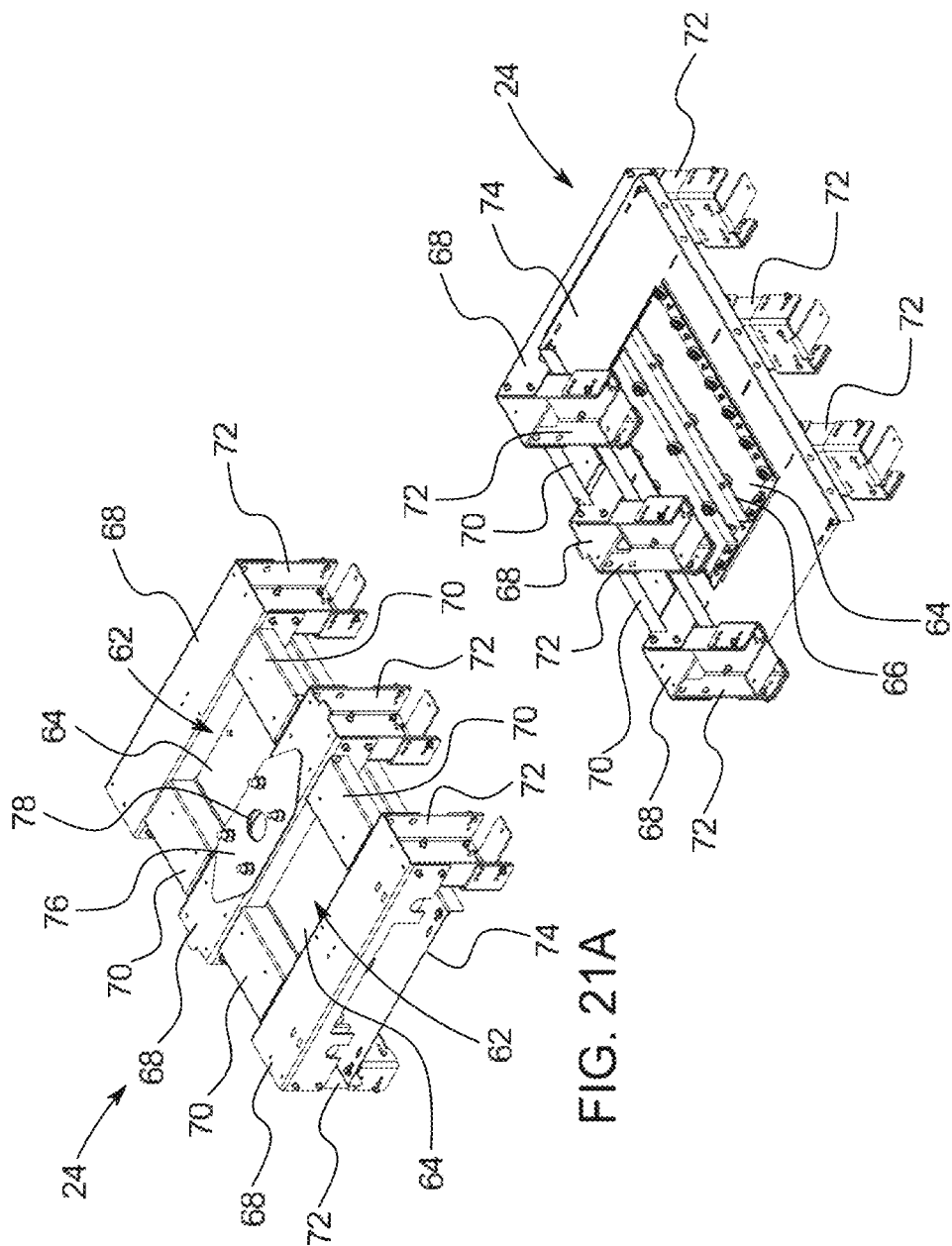
FIG. 21A shows an upper front side perspective view of a center sump of a sweep, in accordance with one or more embodiments.
FIG. 21B shows a lower front side perspective view of a center sump of a sweep, in accordance with one or more embodiments.
Figure 22:
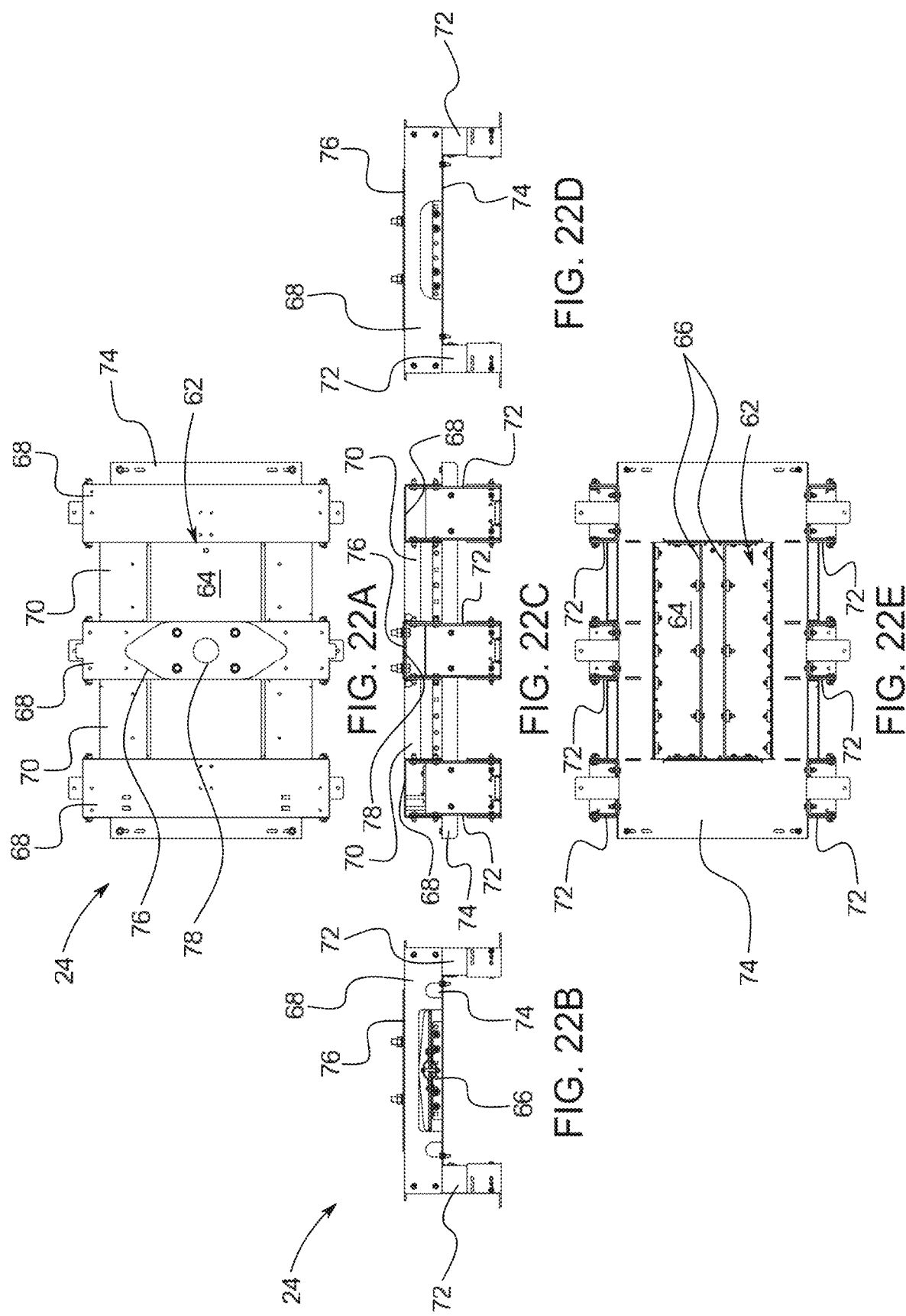
FIG. 22A shows a top view of the center sump of a sweep shown in FIGS. 22A-22B, in accordance with one or more embodiments.
FIG. 22B shows a front view of the center sump of a sweep shown in FIGS. 22A-22B, in accordance with one or more embodiments.
FIG. 22C shows a side view of the center sump of a sweep shown in FIGS. 22A-22B, in accordance with one or more embodiments.
FIG. 22D shows a rear view of the center sump of a sweep shown in FIGS. 22A-22B, in accordance with one or more embodiments.
FIG. 22E shows a bottom view of the center sump of a sweep shown in FIGS. 22A-22B, in accordance with one or more embodiments.
Figure 23:
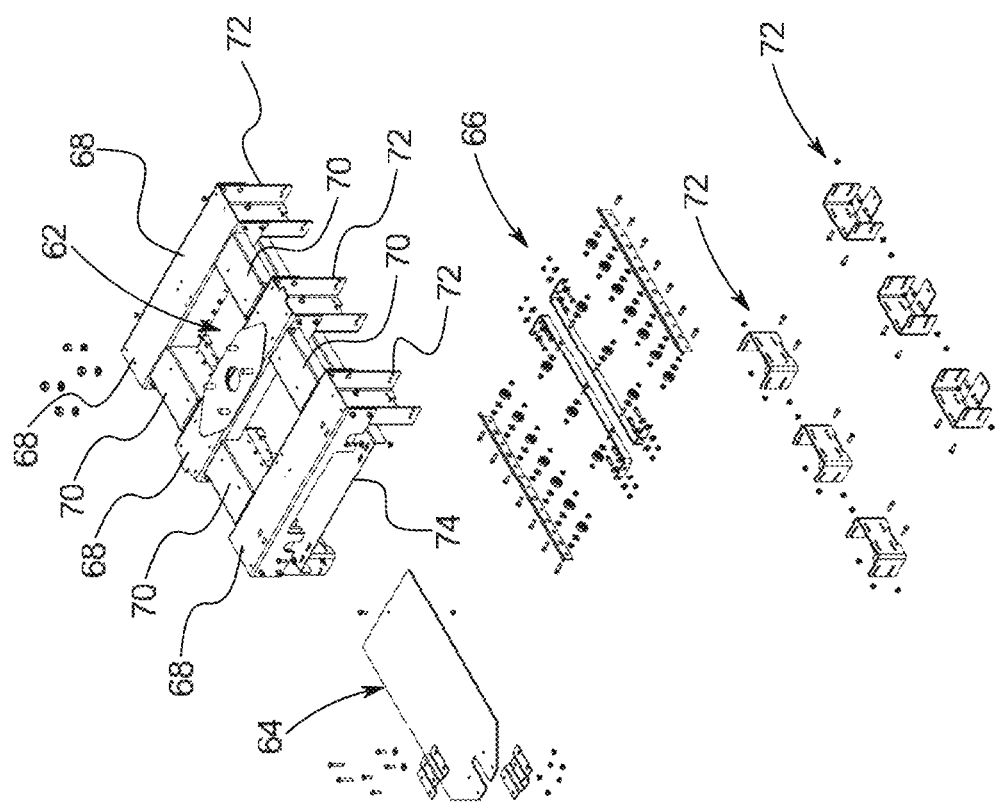
FIG. 23 shows an exploded perspective view of the center sump of a sweep shown in FIGS. 22A-22B, in accordance with one or more embodiments.
Figure 24:
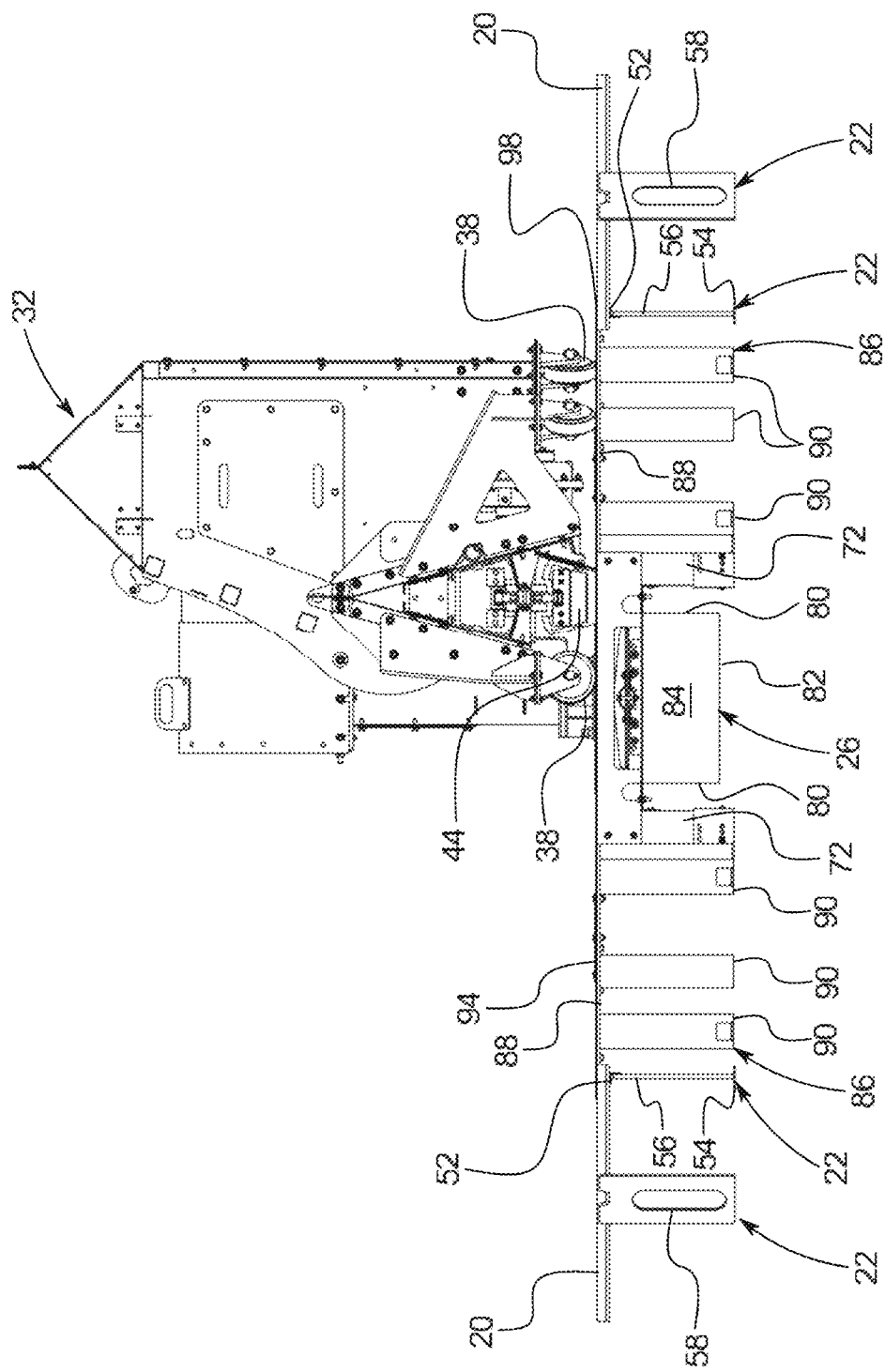
FIG. 24 shows a cross section view of a sweep, grain conveyer and elevated floor of a grain bin, in accordance with one or more embodiments; the view showing the left side of the head section of the sweep; the view showing the sweep in a parked position over grain conveyer with carrier wheels of the sweep positioned over wear plates and bridging supports.
Figure 25A:
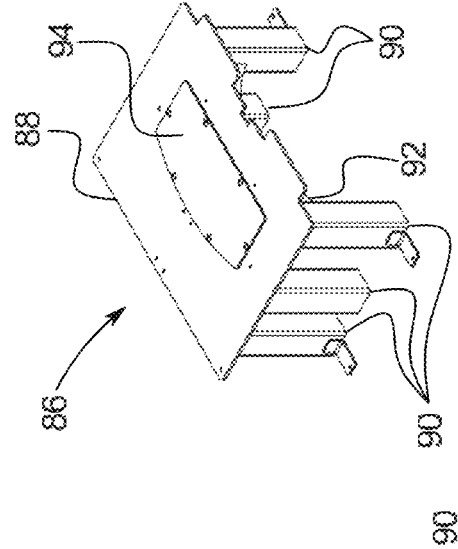
FIG. 25A shows an upper front left perspective view of a center support stand of a sweep, in accordance with one or more embodiments.
Figure 25B:
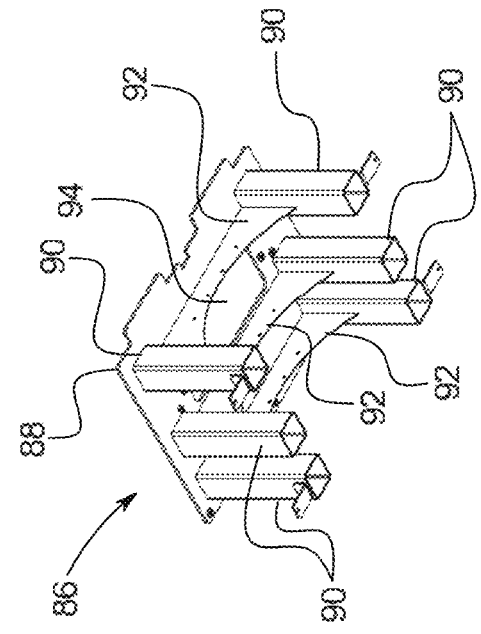
FIG. 25B shows an upper rear left perspective view of a center support stand of a sweep, in accordance with one or more embodiments.
Figure 25C:
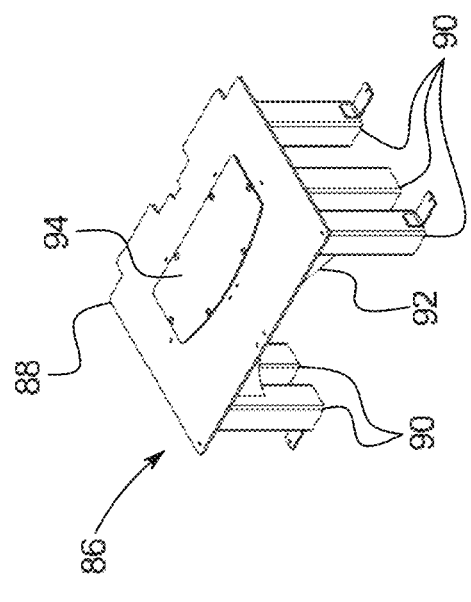
FIG. 25C shows a lower front left perspective view of a center support stand of a sweep, in accordance with one or more embodiments.
Figure 25D:
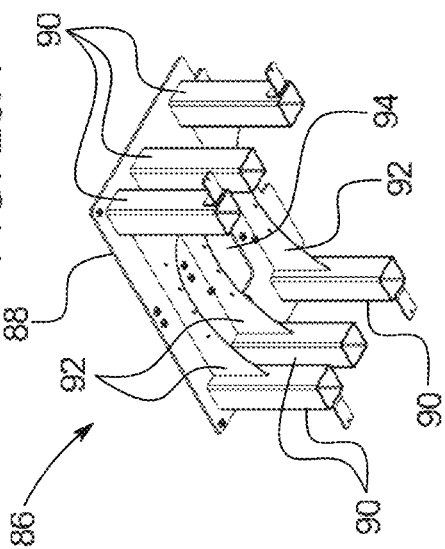
FIG. 25D shows a lower rear left perspective view of a center support stand of a sweep, in accordance with one or more embodiments.
Figure 27:
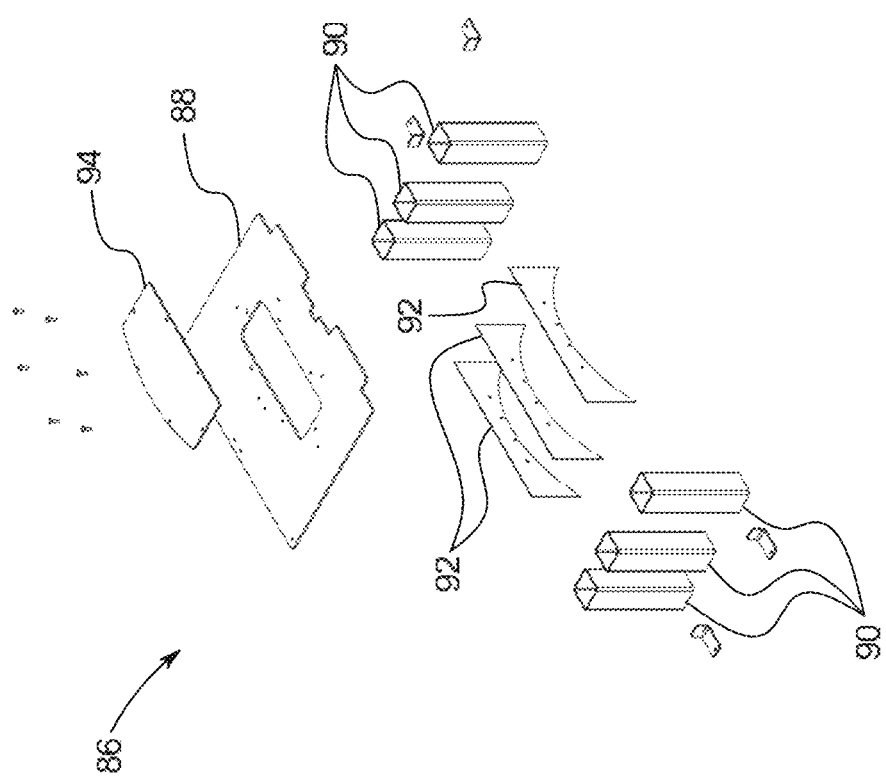
FIG. 27 shows an exploded perspective view of the center sump of a sweep shown in FIGS. 25A-25D, in accordance with one or more embodiments.
Figure 28:
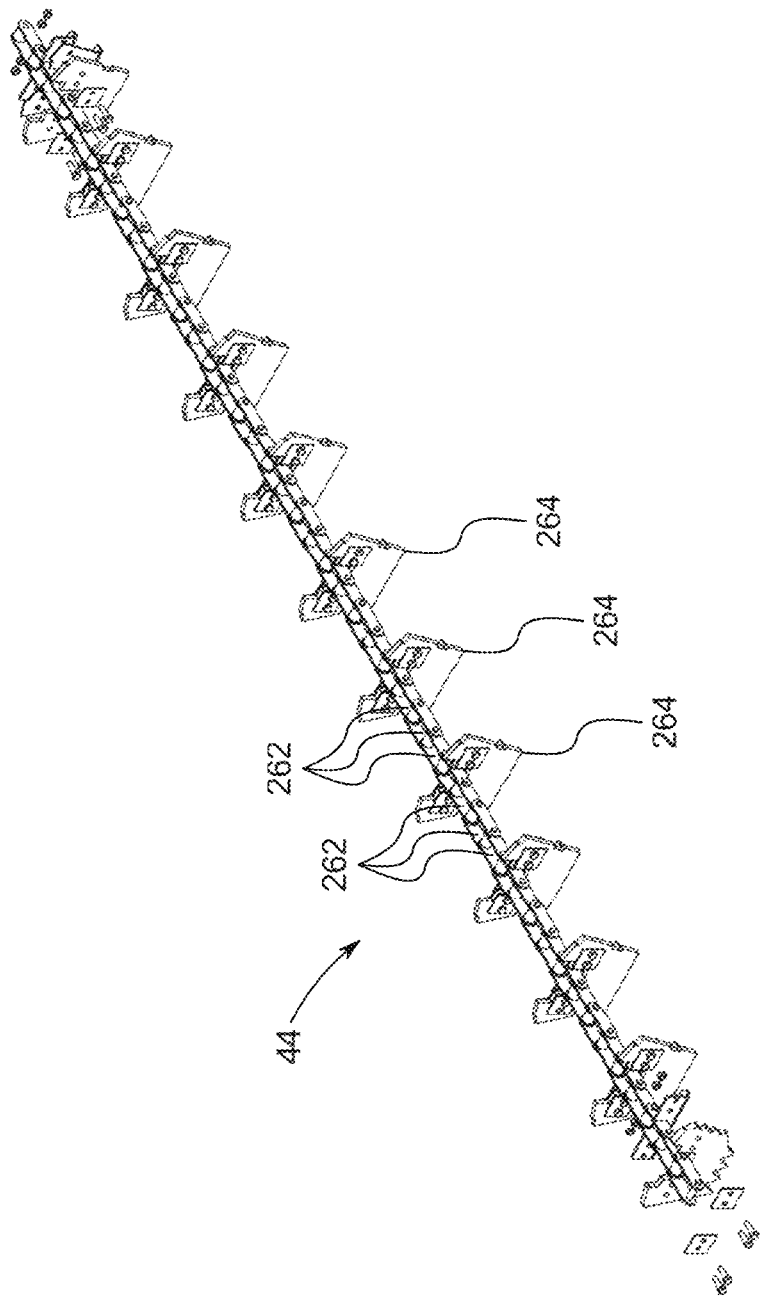
FIG. 28 shows a front side perspective view of a sweep mechanism of a sweep, in accordance with one or more embodiments.
Figure 30:
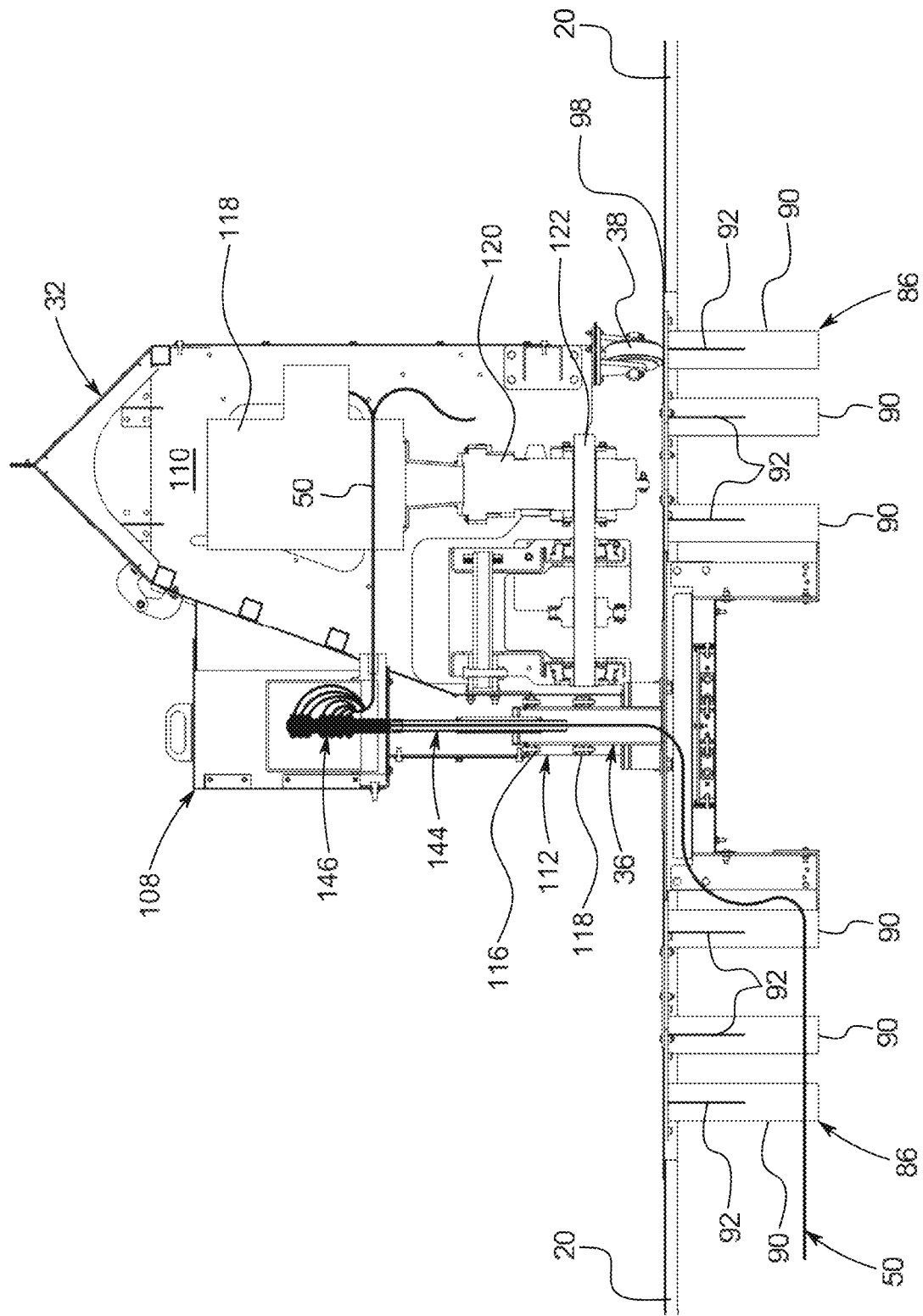
FIG. 30 shows cross section side view of a head section of an exemplary sweep system, in accordance with one or more embodiments, the view showing a motor configured to drive the sweep system positioned within a drive housing of the head section.
Figure 31A:
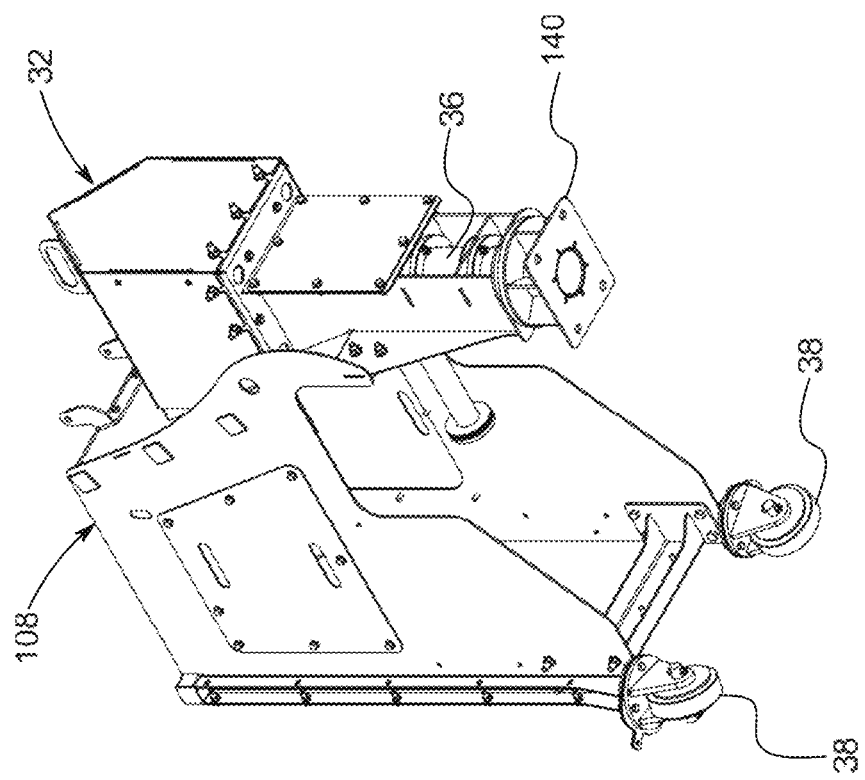
FIG. 31A shows an upper front right perspective view of a drive housing of a head section of an exemplary sweep system, in accordance with one or more embodiments.
Figure 31B:
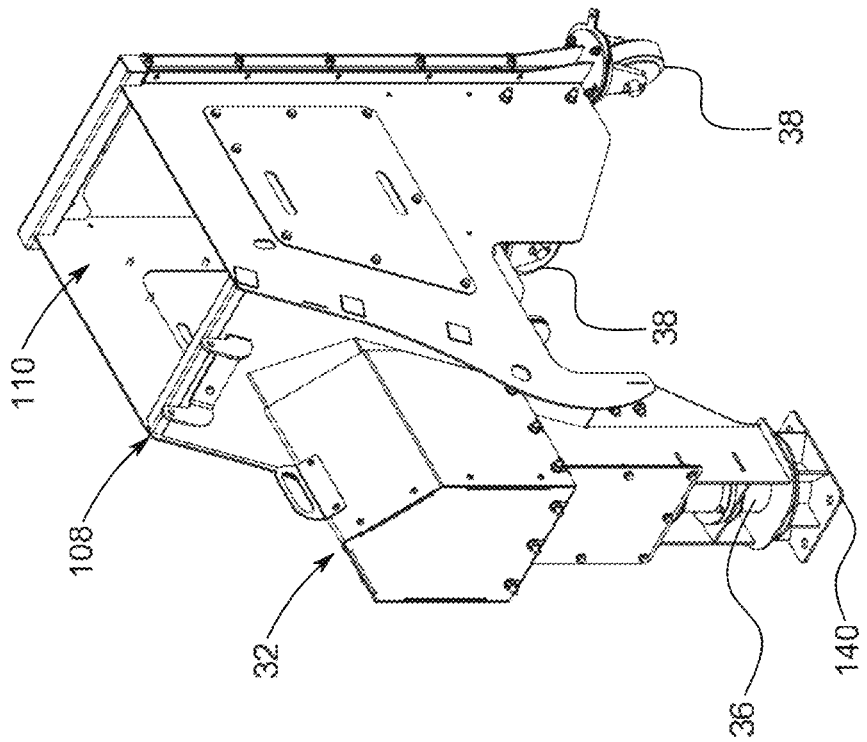
FIG. 31B shows a lower front left perspective view of a drive housing of a head section of an exemplary sweep system, in accordance with one or more embodiments.
Figure 33:
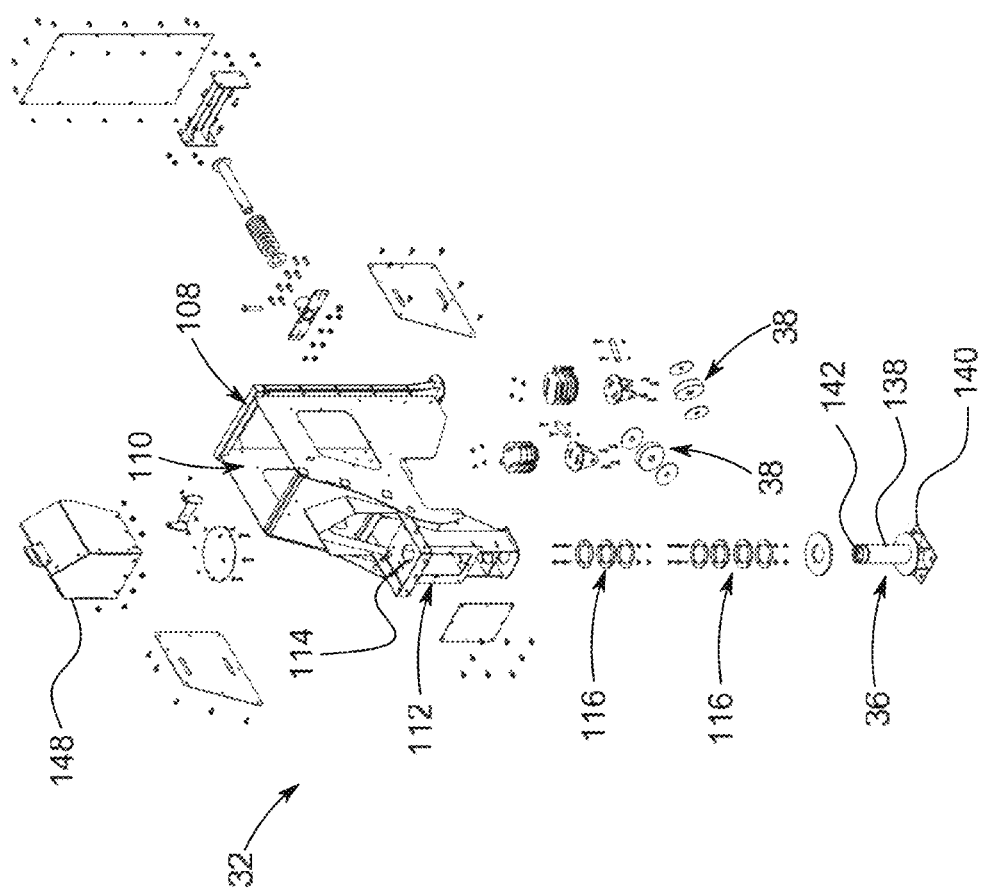
FIG. 33 shows an upper front left exploded perspective view of the drive housing of head section of an exemplary sweep system shown in FIGS. 31A and 31B, in accordance with one or more embodiments.
Figure 34:
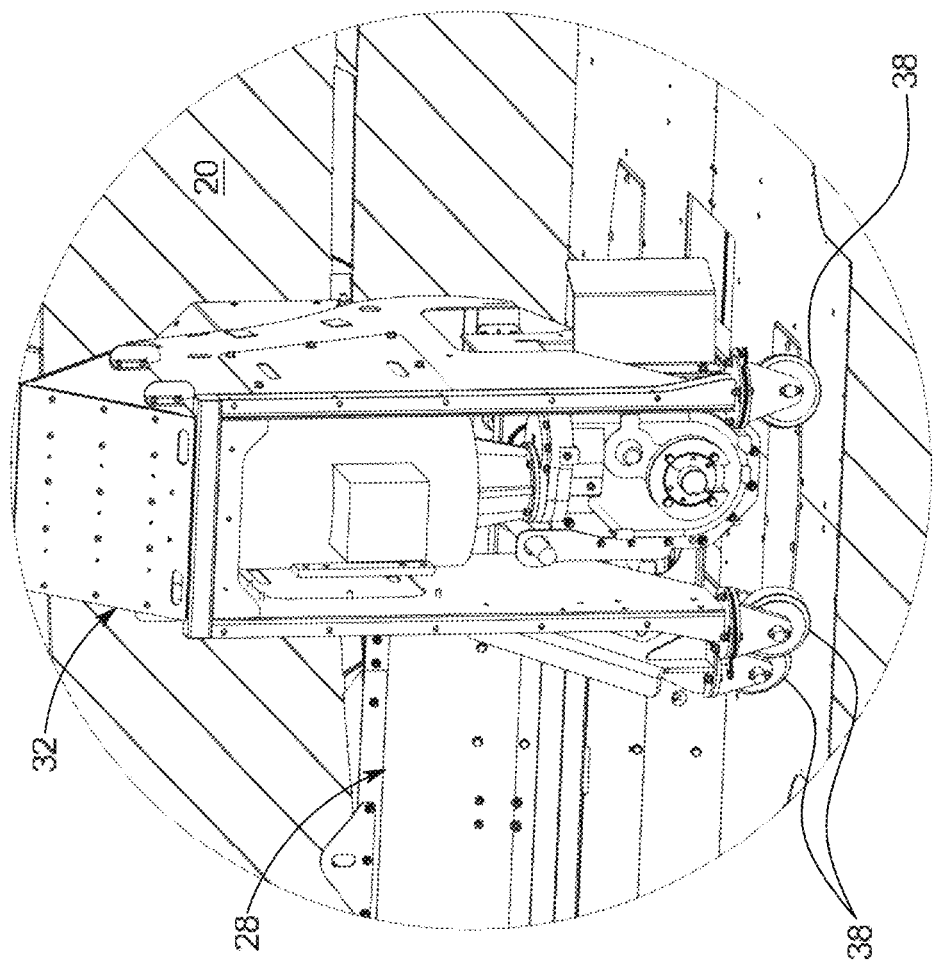
FIG. 34 shows a rear right perspective view of a drive housing of a head section of an exemplary sweep system, in accordance with one or more embodiments.
Figure 37:
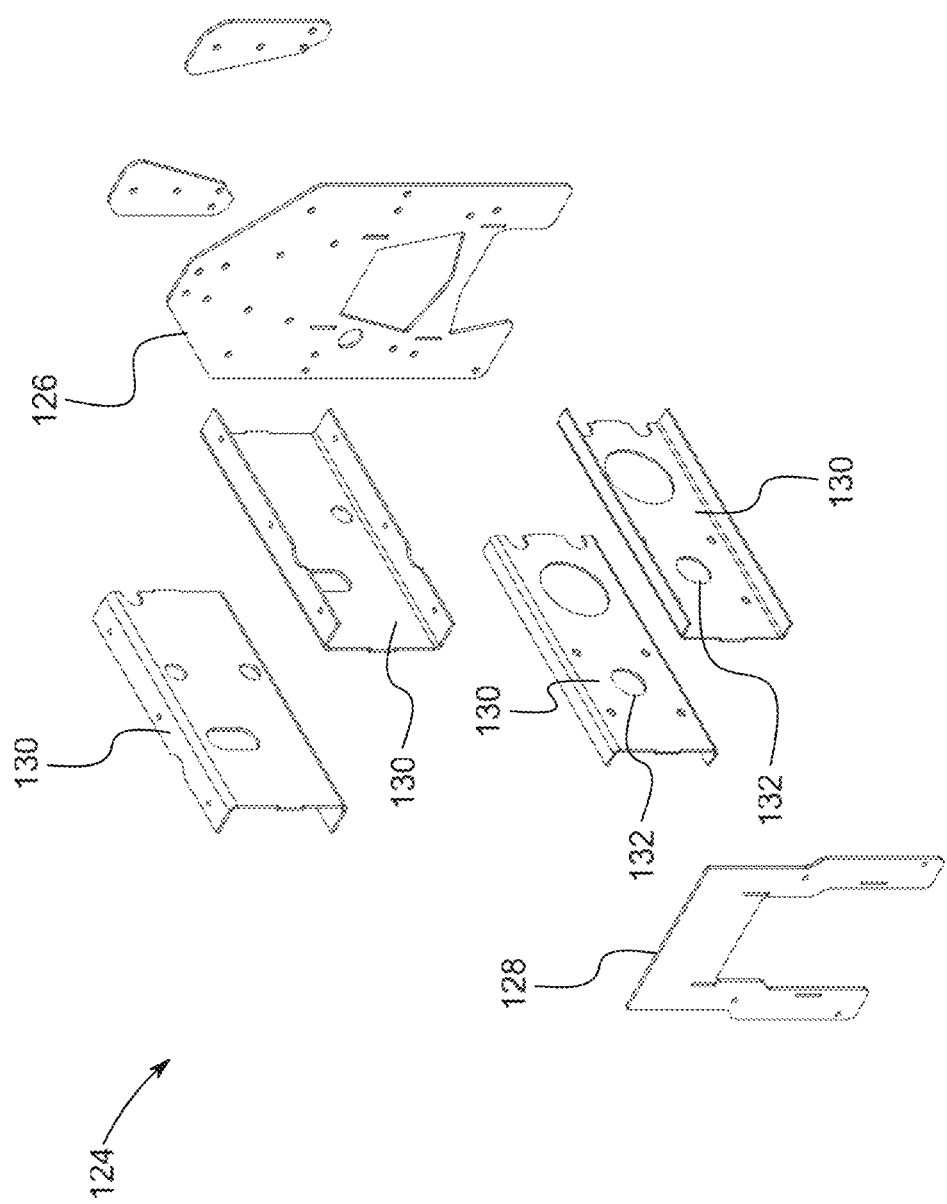
FIG. 37 shows a front right exploded perspective view of the head frame weldment shown in FIGS. 35A-35D, in accordance with one or more embodiments.
Figure 40:
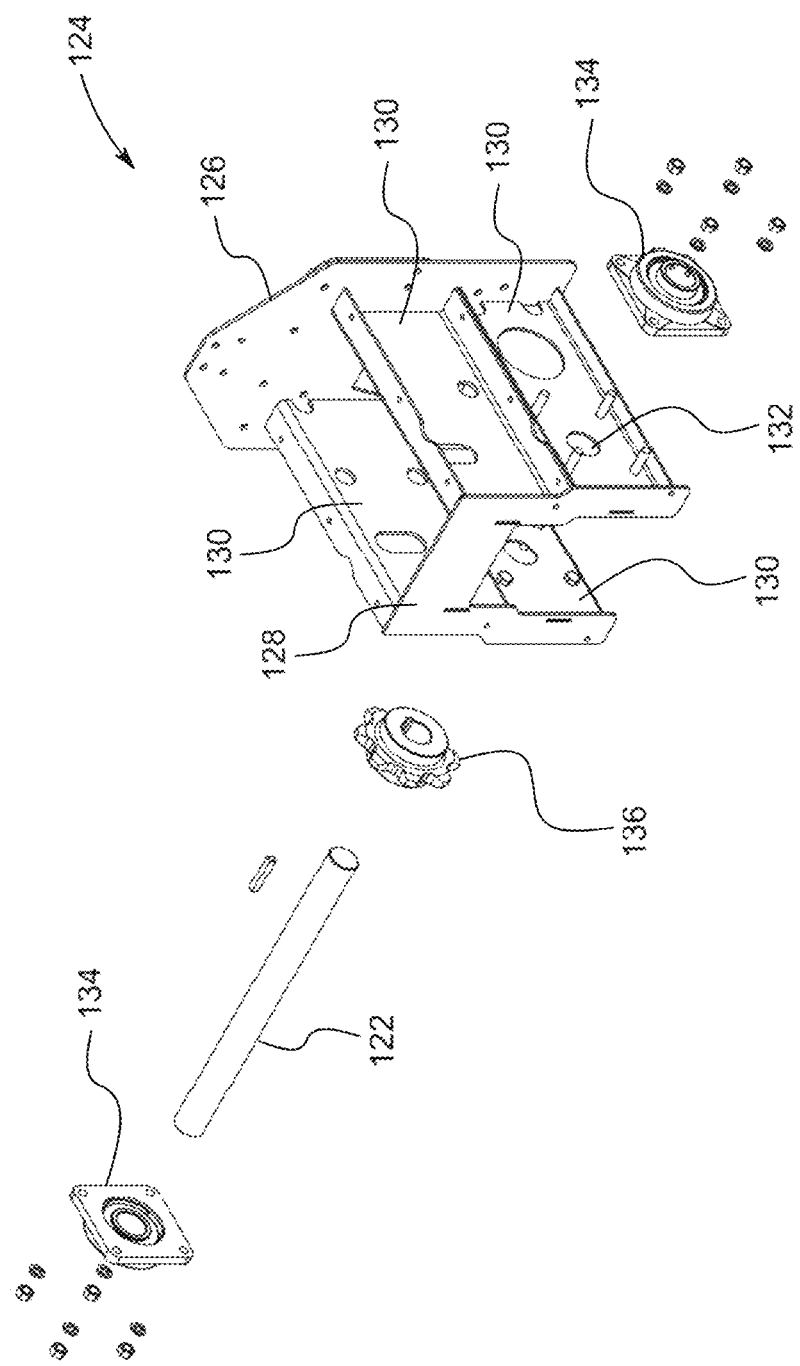
FIG. 40 shows an upper front right side perspective view of the head frame weldment shown in FIGS. 39A-39E, in accordance with one or more embodiments; the view showing an exploded view of the shaft, a bearing assembly, and a sprocket.
Figure 48:
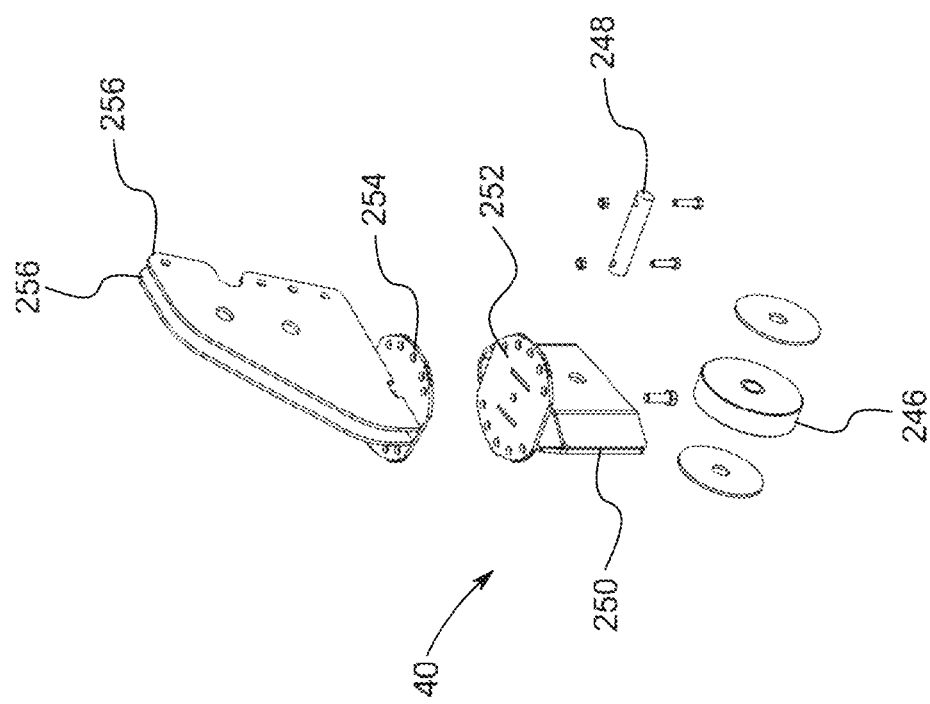
FIG. 48 shows an upper rear right exploded perspective view of a carrier wheel of an exemplary sweep system, in accordance with one or more embodiments.
Figure 49:
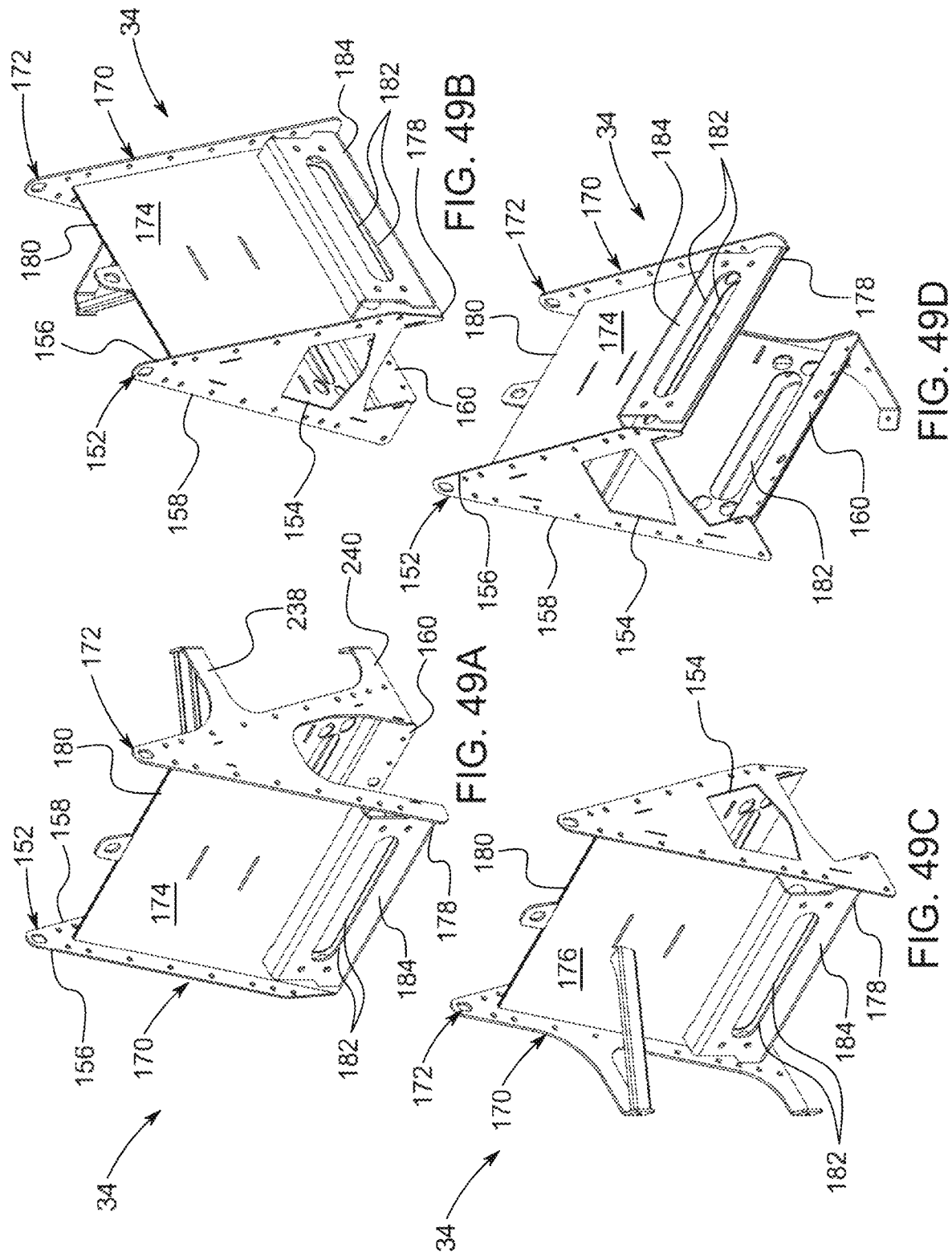
FIG. 49A shows an upper front left perspective view of a tail section weldment of an exemplary sweep system, in accordance with one or more embodiments.
FIG. 49B shows an upper front right perspective view of a tail section weldment of an exemplary sweep system, in accordance with one or more embodiments.
FIG. 49C shows an upper rear right perspective view of a tail section weldment of an exemplary sweep system, in accordance with one or more embodiments.
FIG. 49D shows a lower front right perspective view of a tail section weldment of an exemplary sweep system, in accordance with one or more embodiments.
Figure 50:
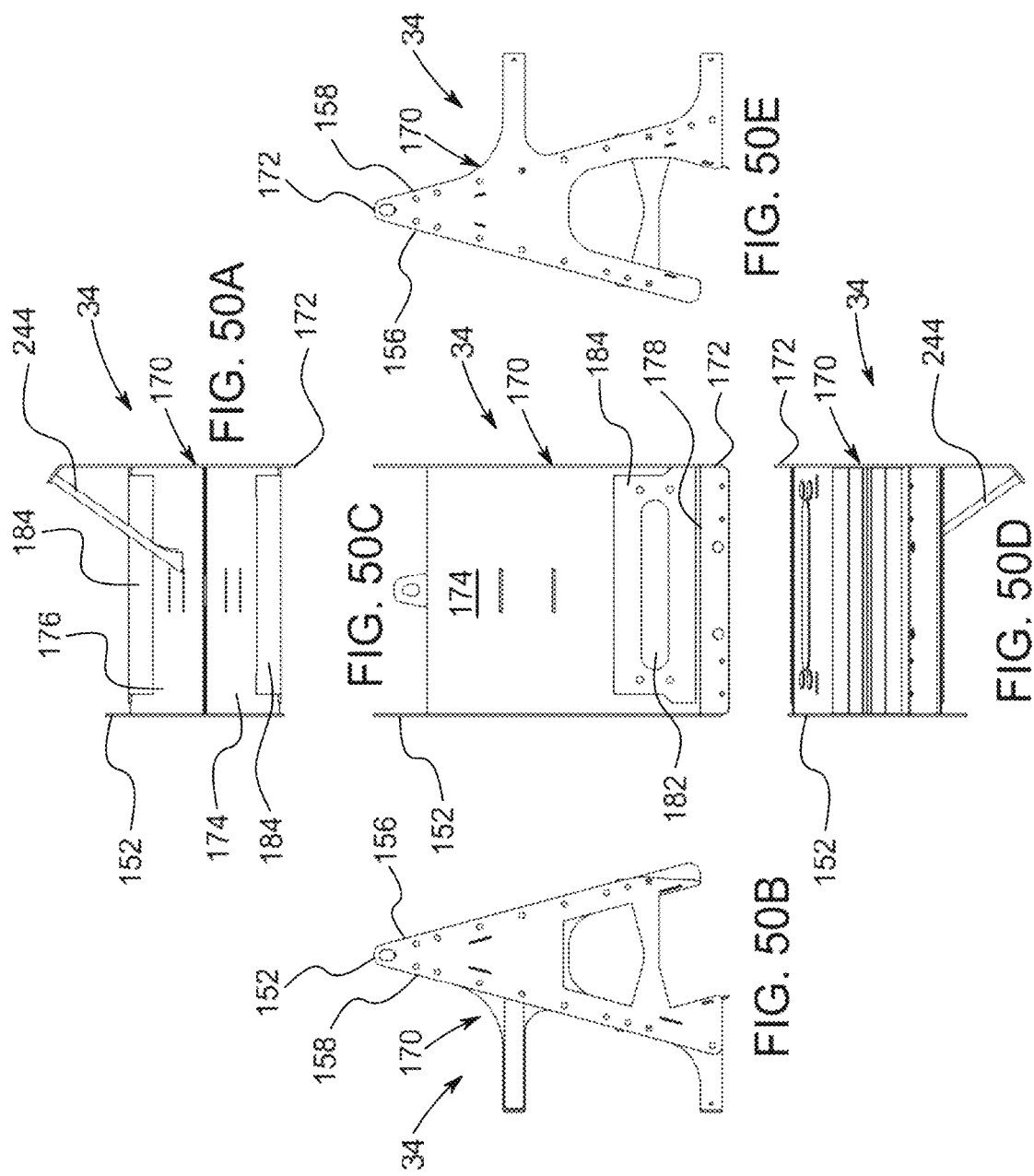
FIG. 50A shows a top view of the tail section weldment shown in FIGS. 49A-49D, in accordance with one or more embodiments.
FIG. 50B shows a right side view of the tail section weldment shown in FIGS. 49A-49D, in accordance with one or more embodiments.
FIG. 50C shows a front view of the tail section weldment shown in FIGS. 49A-49D, in accordance with one or more embodiments.
FIG. 50D shows a bottom view of the tail section weldment shown in FIGS. 49A-49D, in accordance with one or more embodiments.
FIG. 50E shows a left side view of the tail section weldment shown in FIGS. 49A-49D, in accordance with one or more embodiments.
Figure 51:
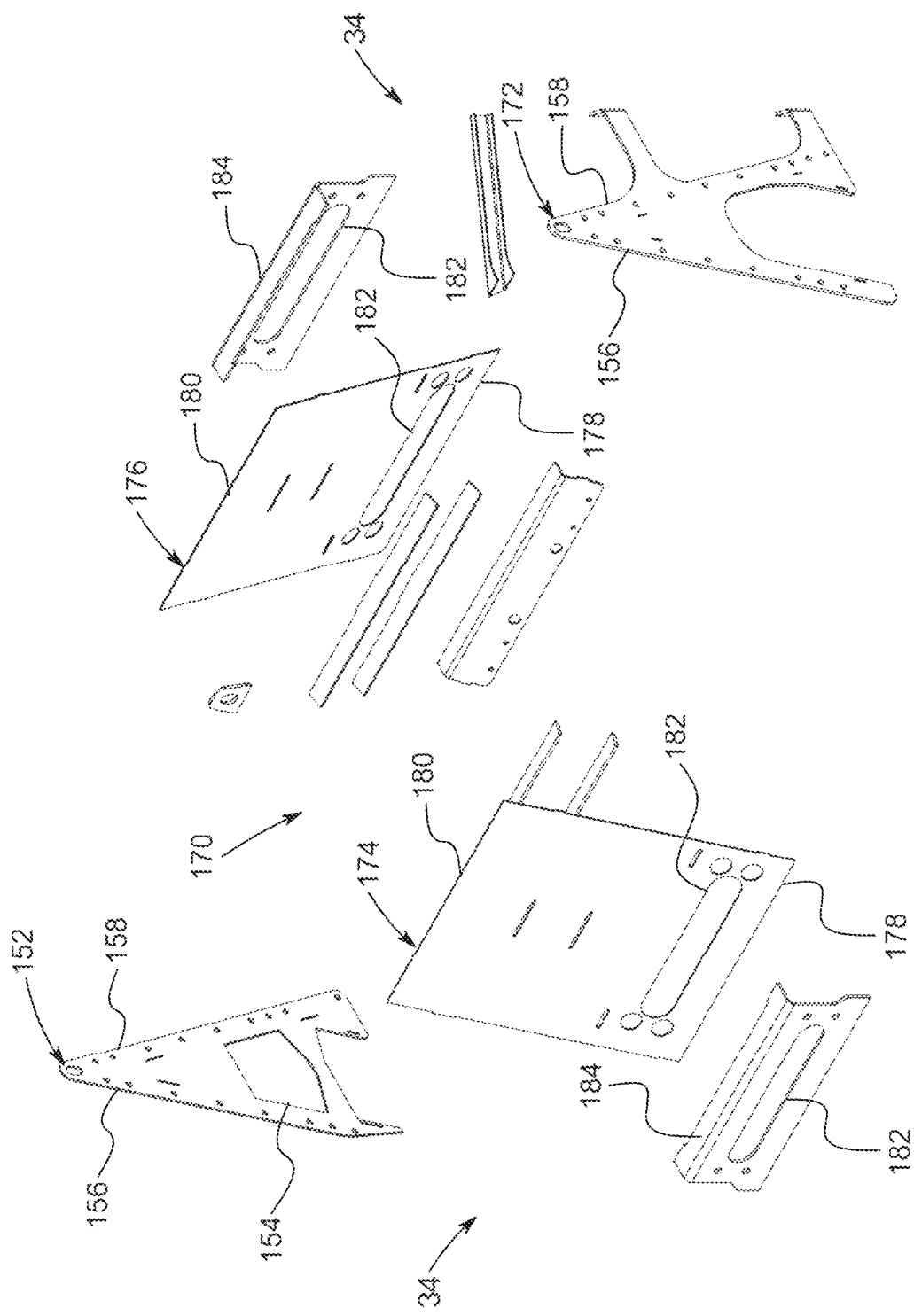
FIG. 51 shows an upper front left exploded perspective view of the tail section weldment shown in FIGS. 49A-49D, in accordance with one or more embodiments.
Figure 52:
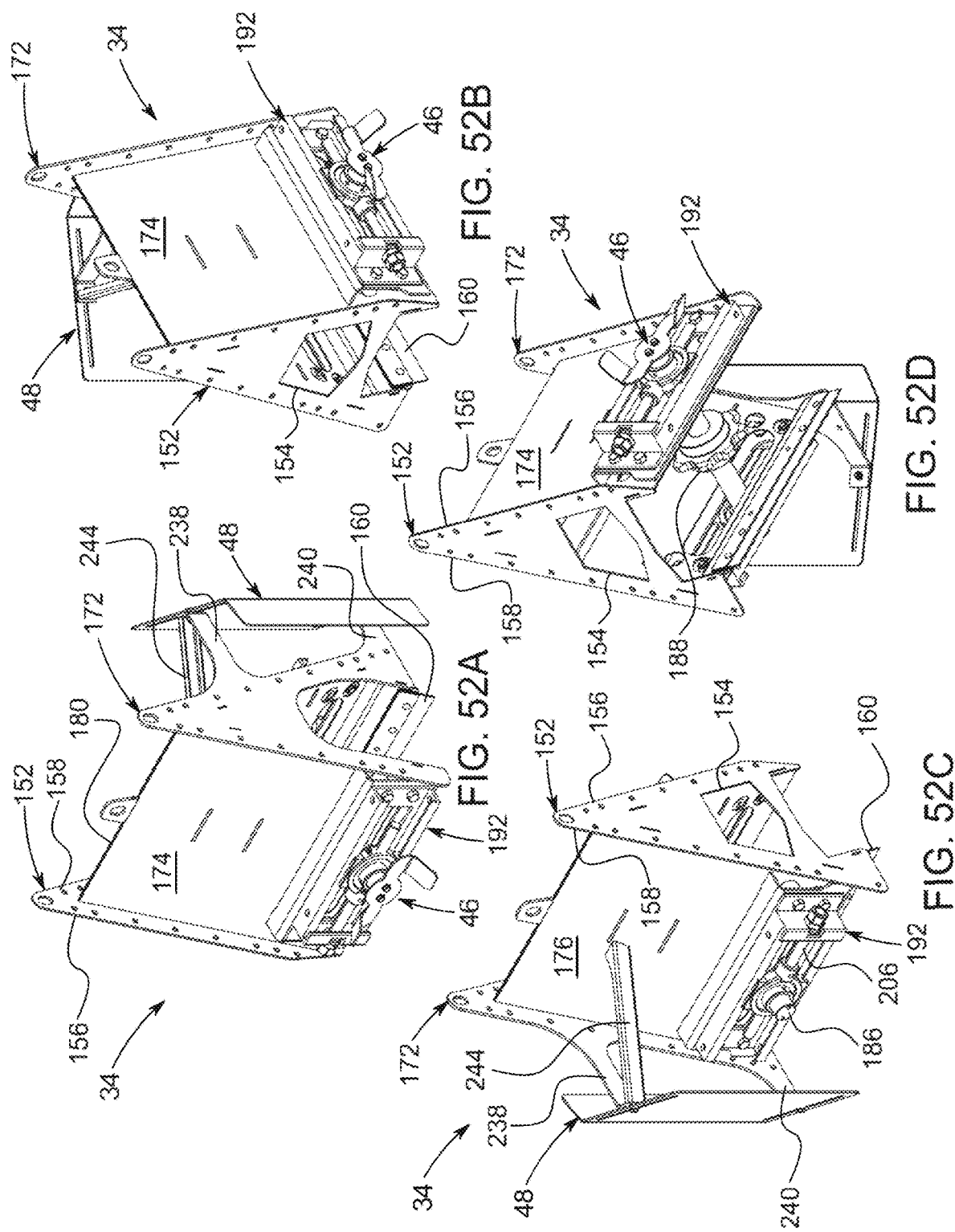
Figure 53:
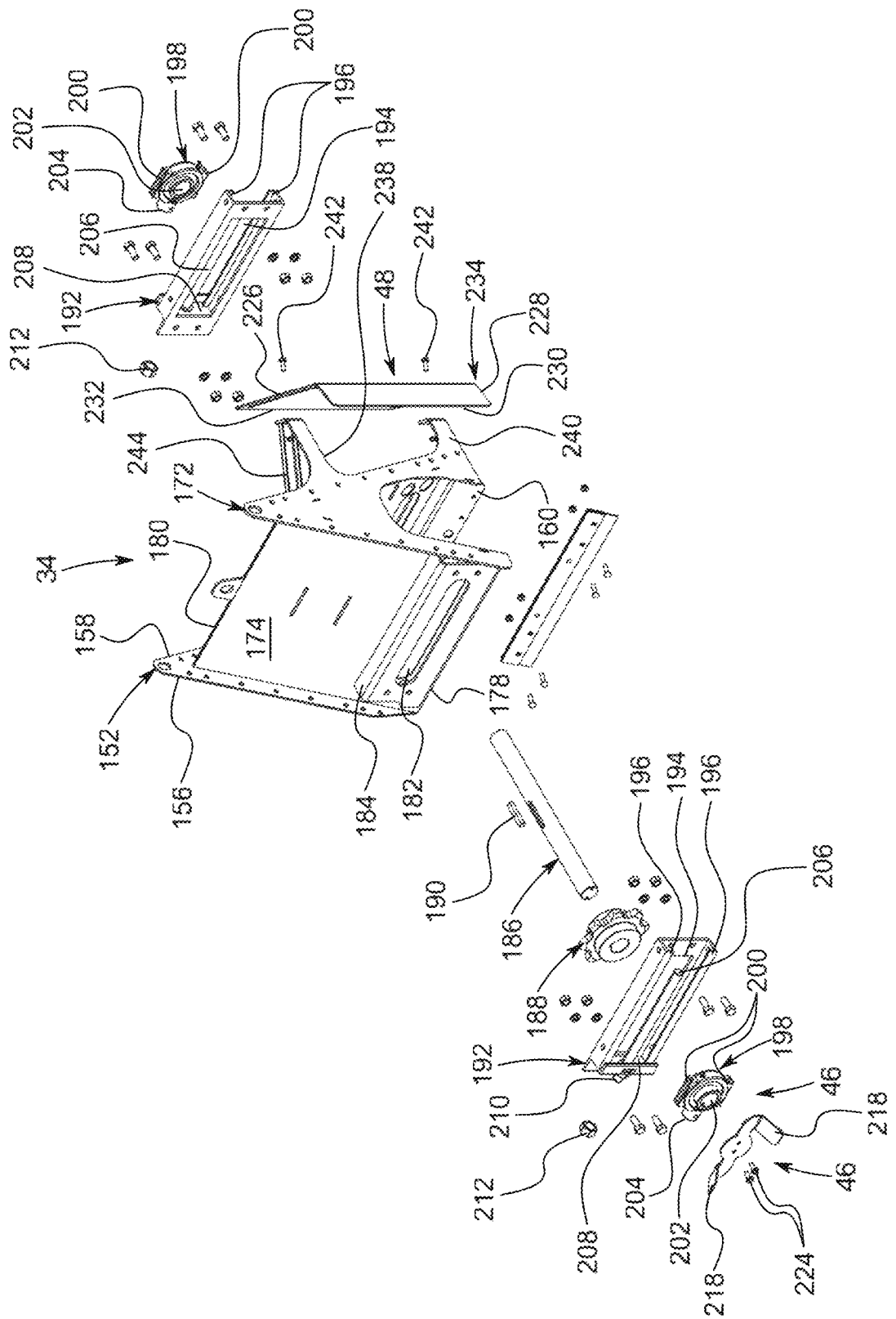

Alternative Arrangement:

With reference to FIGS. 57-89 an alternative arrangement of a sweep system 300 is presented. Sweep system 300 is similar to the system 10 discussed with reference to FIGS. 1-56 and as such all prior teaching and disclosure presented herein applies equally to this alternative arrangement shown in FIGS. 57-89 unless stated otherwise.

Skeletonized Head Section:

With reference to FIGS. 57-89, an alternative arrangement of a sweep system 300 presented that includes a head section 32 that allows the passage of grain there through. Grain bin sweeps, such as sweep system 300, are generally parked in alignment with the conveyor 26 that is positioned below the elevated floor 20 before the grain bin 12 is filled with grain. This positioning aligns the sweep system 300 with the plurality of sumps 24 in the elevated floor 20 that fluidly connect with the grain conveyor 26. As such, the sweep system 300 is parked over the sumps 24 and, therefore, the sweep system 300 blocks the natural flow of grain out of the sumps 24.

When the user of a grain bin 12 wants to drain grain out of the grain bin 12, the user generally opens the center sump 24 or sumps 24. In doing so, grain is drained out of the middle of the grain bin 12. Draining grain out of the center of a grain bin 12 is important to maintain equal forces, or hoop stresses, within the grain bin 12. However, when sweep systems is positioned above the center sump 24 or sumps 24, sweep systems generally have a tendency to block the flow of grain out of the grain bin 12. In some cases, this blockage by the sweep system 300 can cause the grain bin to get plugged.

However, it is important to align the sweep system 300 above the sumps 24 as the sumps 24 must remove the grain around the sweep system 300 before the sweep system 300 can be operated. As such, there is a conflict. The sweep system 300 must be positioned over the sumps 24 so that the sumps 24 can drain grain out of the grain bin around the sweep system 300. However, in doing so, that is positioning the sweep system 300 above the sumps 24 the sweep system 300 blocks the flow of grain out of the sumps 24.

In the arrangement shown, as one example, a head section 32 is presented that allows the passage of grain through the head section 32. As the grain flows through head section 32 the grain also flows through the inward positioned end of sweep mechanism 44. This allows the grain to flow through the head section 32 and out the sumps 24 positioned below the head section 32. This improves the efficiency of emptying a grain bin 12 and reduces the potential for blocks or plugs.

In the arrangement shown, as one example, head section 32 extends a length from an outward end 302 to an inward end 304. The outward end 302 connects to and/or forms the inward end of sweep 28. The inward end 304 connects to arms 306 that connect to pivot point 36 as is further described herein.

In the arrangement shown, as one example, head section 32 includes a plurality of frame members 308 that extend in approximate parallel spaced relation to one another. In the arrangement shown, as one example, these frame members 308 are generally planar in shape and have straight sides with a peaked top and a hollow interior that lets the passage of sweep mechanism 44 there through. In the arrangement shown, as one example, a plurality of bars 310 extend through and connect adjacent frame members 308. In the arrangement shown, as one example, one bar 310 extends through the approximate peak of the frame members 308 with a plurality of bars 310 extending downward along the angled sides of the peak of frame members 308 in approximate equal spaced parallel spaced alignment. In the arrangement shown, as one example, these bars 310 connect all frame members 308 of head section 32 thereby giving head section 32 structural strength and rigidity while also allowing grain to pass through the head section 32.

In the arrangement shown, as one example, when viewed from above or below, there are large exposed openings 312 between uncovered frame members 308 and bars 310. These exposed openings 312 allow the passage of grain through the head section 32. In this way, the plurality of openings 312 in head section 32, gives head section a skeletonized look and therefore in this way head section 32 may be described as skeletonized.

In the arrangement shown, although, head section 32 is uncovered, the elongated body 30 of sweep 28 remains covered. The cover of elongated body 30 helps to facilitate movement of links 262 and paddles 264 of sweep mechanism 44 when large amounts of grain remain top of elongated body 30 before the sweep mechanism is operated. In one or more arrangements, shaft 122, which rotates the links 262 and paddles 264 of sweep mechanism 44, is located within skeletonized head section 32. In the arrangement show, shaft 122 is positioned as approximately in a central section of head section 32. In this location, lower paddles 264 are able to move grain for removal through center sump 24. It is recognized that weight of grain in the uncovered head section 32 may obstruct movement of links 262 and paddles 264 of sweep mechanism 44. However, shaft 122 of sweep mechanism 44 in this location provides a balance that promotes functional operability of the sweep system with grain able to pass through the skeletonized head section 32 without overly inhibiting movement of sweep mechanism 44.

Head Section Allows for Vertical Movement as Well as Angular Movement:

In the arrangement shown, as one example, head section 32 allows for vertical movement as well as angular movement of sweep system 10. This vertical movement as well as angular movement of the inward end of sweep system 300 provides substantial advantages and allows sweep system 300 to move and articulate as it engages variations in the elevated floor 20 during operation as it rotates around pivot point 36 and as it travels over elevated floor 20.

In the arrangement shown, as one example, the inward end 304 of head section 32 includes a pair of arms 306 that extend toward and connect to gearbox 314, which is positioned at the upper end of pivot point 36. Gearbox 314 is formed of any suitable size, shape and design and is configured to transmit rotational energy and force from the shaft of pivot point 36 to shaft 316, which rotates sprocket 318, which rotates chain 320, which rotates sprocket 322, which rotates shaft 122, which rotates the links 262 and paddles 264 of sweep mechanism 44. Connecting sweep 28 through head section 32 in this manner facilitates a relatively direct and secure and rigid connection with minimal chains, sprockets and gearing, which improves the robustness of the design, improves efficiencies and reduces loss of energy.

In the arrangement shown, as one example, one arm 306 receives a cylindrical collar 324 that surrounds shaft 316. Collar 324 is connected to a bracket 326 that connects to the exterior surface of gearbox 314 by way of fasteners such as screws of bolts. This collar 324 is received within opening 328 in arm 306. Opening 328 is generally cylindrical in shape so as to allow the upward and downward rotation of the outward end of sweep 28. This is also known as rotational movement of the outward end of sweep 28. This rotational movement allows the outward end of sweep 28 to climb or accommodate variations in the elevated floor 20 of grain bin 12, which is common due to variations in the poured concrete of the foundation 14 of grain bin 12, variations in the parts and components of the system 300, variations due to installation, as well as settling, shifting, or other movement or variation. If it were not for the ability for the outward end of sweep 28 to angularly adjust the sweep 28 could engage the elevated floor 20 in the high spots thereby damaging the elevated floor 20 and/or sweep 28. Similarly, if it were not for the ability for the outward end of sweep 28 to angularly adjust the sweep 28 could pass-over grain on the elevated floor 20 in the low spots thereby not fully emptying the grain bin 12 and leaving grain behind.

However, this opening 328 is also taller than it is wide, and in this way, it is slot-shaped with flat sides 330 and rounded ends 332. This added vertical height allows for the vertical movement of the inward end of sweep 28. This vertical movement allows for the inward end of sweep 28 to move up and down in a limited and controlled manner to accommodate variations in the elevated floor 20 of grain bin 12 which is common due to variations in the poured concrete of the foundation 14 of grain bin 12, variations in the parts and components of the system 300, variations due to installation, as well as settling, shifting, or other movement or variation.

The combination of the rotational freedom and the vertical freedom of the inward end of sweep 28 provides sweep 28 with unprecedented freedom and flexibility which leads to less potential for breakage, less potential for wear, and a more durable and more versatile sweep 28 that can operate under practically any conditions.

The opposite arm 306 also includes an opening 328 with flat sides 330 and rounded ends. This arm 306 however receives a shaft 334 of a bracket 336 that is similarly affixed to the exterior surface of gearbox 314. In the arrangement shown, as one example, shaft 334 is non-rotational in nature, meaning it is affixed to gearbox 314 and does not rotate.

In this way, both sides of gearbox 314 are connected to arms 306 by way of cylindrical components (324, 334). In this way, both sides of the connection of head section 32 or sweep 28 to gearbox 314 allow for vertical movement as well as rotational movement.

As such, in operation, as the shaft of pivot point 36 rotates around, this rotates the gears in gearbox 314 that sits at the upper end of the shaft of pivot point 36. As the shaft of pivot point 36 rotates, this rotation is imparted unto shaft 316, which rotates sprocket 318, which rotates chain 320, which rotates sprocket 318 which rotates shaft 122, which rotates sprocket 136, which rotates the links 262 and paddles 264 of sweep mechanism 44, which rotates the sprocket 358, which drives the wheel 260 of pusher 42 of sweep 28, which causes sweep 28 to rotate around pivot point 36 as the sweep 28 travels over elevated floor 20 of grain bin 12. As the sweep 28 rotates, the sweep 28 encounters variations in the elevated floor 20 of grain bin 12, which is common due to variations in the poured concrete of the foundation 14 of grain bin 12, variations in the parts and components of the system 300, variations due to installation, as well as settling, shifting, or other movement or variation. As the sweep 28 encounters these variations in elevated floor 20, the outward end of sweep 28 may rotate upward which is facilitated by the collar 324 rotating within and/or relative to opening 328 of arm 306 while shaft 334 rotates within and/or relative to opening 328 of arm 306. Similarly, as the sweep 28 encounters variations in elevated floor 20, the inward end of sweep 28 may move up and down which is facilitated by the collar 324 moving vertically within opening 328 of arm 306 while shaft 334 moves vertically within opening 328 of arm 306. As such in this way a durable and flexible sweep 28 is presented that can accommodate variations in the elevated floor 20 of grain bin 12 in unprecedented ways. Such variations in the elevated floor 20 are common due to variations in the poured concrete of the foundation 14 of grain bin 12, variations in the parts and components of the system 300, variations due to installation, as well as settling, shifting, or other movement or variation.

One Motor that Powers Grain Conveyor, Paddle Sweep and Drive Wheel:

In an arrangement shown, as one example, a single motor 338 powers a grain conveyor 26, sweep 28 and a drive wheel 260 of a pusher 42. That is, a single motor 338 powers and causes the rotation of a grain conveyor 26 that facilitates the below-floor 20 removal of grain from grain bin 12, as well as causes the rotation of the links 262 and paddles 264 of sweep 28 that facilitates the movement of grain toward the sumps 24 in the center of grain bin 12, as well as causing rotation of drive wheel 260 of pusher 42 that facilitates driving sweep 28 in a circular pattern around elevated floor 20. In the arrangement shown, as one example, a single motor 338 is connected to the outward end of grain conveyor 26, which in the arrangement shown is an auger having a shaft 340 with flighting 342. In the arrangement shown, as one example, the output shaft 344 of motor 338 is connected to a pulley 346 that connects to another pulley 346 by way of a belt or chain. As such, operation of the motor 338 rotates pulleys 346, which causes rotation of the shaft 340 of the auger of grain conveyor 26. Notably, it is hereby contemplated that a grain conveyor 26, such as a belt, or any other grain conveying device may be used in place of an auger.

In the arrangement shown, as one example, the inward end of shaft 340 of grain conveyor 26 connects to a gearbox 348 that transmits laterally extending rotation to vertically extending rotation. Gearbox 348 causes the rotation of shaft 350 which causes the rotation of sprocket 352 that is connected to the upper end of shaft 350. Sprocket 350 is connected to chain 354 and as such the rotation of sprocket 350 causes rotation of chain 354. The opposite side of chain 354 is connected to sprocket 356 which is connected to the lower end of the shaft of pivot point 36.

The rotation of pivot point 36 causes the rotation of the gears within gearbox 314, which causes the rotation of shaft 316, which causes the rotation of sprocket 318, which causes the rotation of chain 320, which causes the rotation of sprocket 322, which causes the rotation of shaft 122, which causes the rotation of sprocket 136, which causes the rotation of the inward end of sweep mechanism 44. As the links 262 of sweep mechanism 44 rotate, this causes the rotation of sprocket 358 positioned at or near the outward end of sweep mechanism 44. The rotation of sprocket 358 causes rotation of shaft 360 that drives drive wheel 260 of pusher 42.

In this way, a single motor 338 drives or powers grain conveyor 26, sweep 28 and a drive wheel 260 of a pusher 42. This mechanical arrangement saves cost by reducing expensive components, such as multiple motors as well as the coordinated control and electrical connection of multiple motors. This mechanical arrangement also improves efficiencies, durability and uptime by eliminating additional motors and the potential for any one of the multiple motors to go down or fail.

Similarly, in one or more arrangements, a first motor may be used to power grain conveyor 26 and second motor may be used to power both sweep 28 and a drive wheel 260 of a pusher 42. The second motor may be for example a remotely actuated electric motor operably connected to either the links 262 and paddles 264 of sweep 28 or to the pusher 42. In operation, when time to empty grain bin 12, the center sump 24 of grain bin 12 is opened and the first motor is operated to power grain conveyor 26 and remove grain from the center of grain bin 12. Once grain is no longer moved through center sump 24 by gravity, the second motor is engaged to power both sweep 28 and a drive wheel 260 of a pusher 42 to facilitate removal of remaining grain in grain bin 12 by sweep 28 as described herein.

Outward End of the Sweep is Levitated Above the Grain Bin Floor:

In the arrangement shown, as one example, the carrier wheels 40 at the middle and at the outward end of elongated body 30 of sweep 28 (other than the inward-most carrier wheels 40 that engage wear track 100) are configured to levitate above the elevated floor 20 of the grain bin 12 in a natural state. Or, said another way, when the grain bin 12 is empty, or empty enough for the operation of the sweep 28, the carrier wheels 40 at the middle and at the outward end of elongated body 30 of sweep 28 (other than the inward-most carrier wheels 40 that engage wear track 100) are levitated above the elevated floor 20 of grain bin 12 a small distance such that they are not in constant contact with elevated floor 20. In addition, when the sweep 28 is operating, and rotating around the grain bin 12, the carrier wheels 40 at the middle and at the outward end of elongated body 30 of sweep 28 (other than the inward-most carrier wheels 40 that engage wear track 100) are levitated above the elevated floor 20 of grain bin 12 (other than perhaps an occasional engagement of a bump in the floor or other aberration or variance).

Configuring the outward end of elongated body 30 of sweep 28 such that the carrier wheels 40 at the middle and at the outward end of elongated body 30 of sweep 28 (other than the inward-most carrier wheels 40 that engage wear track 100) to levitate above the elevated floor 20 of grain bin 12 as it rotates around grain bin 12 eliminates most if not all the contact between the elongated body 30 of sweep 28 and elevated floor 20 other than the engagement of the inward most carrier wheels 40 that ride on wear track 100 and the engagement of wheel 260 of pusher 42. This reduces the wear and tear that occurs on the elevated floor 20 by engagement of the carrier wheels 40 of sweep 28 (as well as reduces damage to grain trapped between the elevated floor and the elongated body 30 of sweep 28). Also, the elimination of the engagement between the carrier wheels 40 at the middle and at the outward end of elongated body 30 of sweep 28 (other than the inward-most carrier wheels 40 that engage wear track 100) allows the elimination of wear tracks 100 for these middle-positioned and outward-positioned carrier wheels 40 in the elevated floor 20 that prevent the elevated floor 20 from being dented. The elimination of wear tracks 100 reduces cost, reduces parts, reduces installation time, reduces weight, and increases airflow through the elevated floor 20 by removing portions that are covered or blocked.

In addition, by levitating these middle-positioned and outward-positioned carrier wheels 40 of elongated body 30 of sweep 28 causes the weight of the outward end of elongated body 30 of sweep 28 to be carried by wheel 260 of pusher 42. This helps to facilitate improved engagement between wheel 260 of pusher 42 and elevated floor 20. This helps to drive the elongated body 30 of sweep 28 around the pivot point 36.

In one arrangement, the outward end of elongated body 30 of sweep 28 is configured to be naturally sprung in the levitated state such that the carrier wheels 40 at the middle and at the outward end of elongated body 30 of sweep 28 (other than the inward-most carrier wheels 40 that engage wear track 100) are not in contact with the elevated floor 20 and instead only the wheel 260 of pusher 42 and the inward-most-positioned carrier wheels 40 are in engagement with the elevated floor 20. However, when the grain bin 12 is filled with grain, and the elongated body 30 of sweep 28 is covered with grain, the pressure of the grain on top of the elongated body 30 of sweep 28 causes the elongated body 30 of sweep 28 to bend or flex downward which causes the carrier wheels 40 at the middle and at the outward end of elongated body 30 of sweep 28 to contact the elevated floor 20, which is in addition to the wheel 260 of pusher 42 and the inward-most-positioned carrier wheels 40 being in engagement with the elevated floor 20. However, whenever the grain is removed, the carrier wheels 40 at the middle and at the outward end of elongated body 30 of sweep 28 (other than the inward-most carrier wheels 40 that engage wear track 100) returns to their natural levitated non-contact state. In one arrangement, in its natural state, when the grain bin 12 is not loaded with grain, sweep 28 contacts elevated floor 20 at three points of contact, the inward-most positioned carrier wheels 40, which engage the wear track 100, one of which is in front of the sweep 28 in the direction of travel and one of which is behind the sweep 28 in the direction of travel, and the wheel 260 of pusher 42 at or near the outward end of sweep 28. The sweep 28 is also connected to gearbox 314 at the inward end of head section 32 at arms 306 which is connected to other components of grain bin 12.

More specifically, in the arrangement shown, as one example, elongated body 30 of sweep 28 includes a plurality of carrier wheels 40 positioned in spaced relation along the length of the elongated body 30 of sweep 28. The inward most carrier wheels 40 are configured to continuously engage elevated floor 20 as the elongated body 30 of sweep 28 rotates around grain bin 12. As such, as is shown in the figures, a wear plate 96 is positioned to receive the inward most positioned carrier wheels 40.

However, the other carrier wheels 40 are configured to be levitated above the elevated floor 20 of grain bin 12 when the grain bin 12 is emptied, and/or when enough grain is removed to facilitate operation of the sweep 28. (Note, in this position, the wheel 260 of pusher 42 is configured to be in contact with the elevated floor 20). As one example, four sets of carrier wheels 40 are shown connected to elongated body 30 of sweep 28 and one drive wheel 260 of pusher 42 is shown. In this arrangement, the inward most set of carrier wheels 40 are configured to be in constant contact with wear plate 96 of elevated floor 20 and the drive wheel 260 of pusher 42 is configured to be in contact with elevated floor 20, whereas the other three sets of carrier wheels 40 are configured to be levitated above the elevated floor 20 during use and only engage the elevated floor 20 when an aberration in the elevated floor 20 is present or when the elongated body 30 of sweep 28 has encountered a bump or other operational aberration.

In the arrangement shown, as one example, the elongated body 30 of sweep 28 is configured to be stored just slightly behind (in the direction of rotation of elongated body 30 of sweep 28) the grain conveyor 26 and the plurality of sumps 24 in the elevated floor 20. This allows the grain to be drained immediately in front of the elongated body 30 of sweep 28 and provides increased access to sumps 24 which improves grain removal. However, this slight angular offset does not help coverage of the inward-most sumps 24, and as such head section 32 is skeletonized or has openings therein to allow grain to flow through the head section 32 and out the inward-most positioned sumps 24.

In one or more embodiments, for storage purposes, parking plates 362 are positioned below the carrier wheels 40 at the middle and at the outward end of elongated body 30 of sweep 28 when the elongated body 30 of sweep 28 is in a storage position (which is slightly behind the grain conveyor 26 and the plurality of sumps 24). These parking plates 362 receive the carrier wheels 40 at the middle and at the outward end of elongated body 30 of sweep 28 on their upper surface when the grain bin 12 is filled with grain and the elongated body 30 of sweep 28 is pressed downward or flexes downward under the weight of the grain on top of the elongated body 30 of sweep 28. These parking plates 362 distribute the weight of the carrier wheels 40 at the middle and at the outward end of elongated body 30 of sweep 28 and prevent the elevated floor from being damaged while the elongated body 30 of sweep 28 is in a storage position.

However, these parking plates 362 are positioned in a limited area around the grain conveyor 26 (and do not extend all the way around the rotation of travel of carrier wheels 40) because as soon as the grain is drained enough for the elongated body 30 of sweep 28 to operate, the carrier wheels 40 at the middle and at the outward end of elongated body 30 of sweep 28 return to their natural elevated state, in which carrier wheels 40 at the middle and at the outward end of elongated body 30 of sweep 28 are no longer in constant contact with elevated floor 20.

In one arrangement, while the carrier wheels 40 at the middle and at the outward end of the elongated body 30 of sweep 28 are levitated above the elevated floor 20 such that the carrier wheels 40 at the middle and at the outward end of elongated body 30 of sweep 28 are not in constant contact with the elevated floor 20 once enough grain is removed to facilitate operation of the sweep 28, for purposes of clarity, wheel 260 of pusher 42 is configured to engage elevated floor 20 (or grain on top of elevated floor 20) so as to push the elongated body 30 of sweep 28 forward. That is, wheel 260 of pusher 42 is configured to engage elevated floor 20 when the carrier wheels 40 at the middle and at the outward end of elongated body 30 of sweep 28 are elevated or levitated above elevated floor 20 when carrier wheels 40 are in non-contact with the elevated floor 20. This contact of wheel 260 of pusher 42 does not damage the elevated floor 20 as wheel 260 is wide and soft and is configured to have a large surface area of contact with elevated floor 20 as it is configured to push the elongated body 30 of sweep 28 forward. In contrast, carrier wheels 40 are narrow and hard and are configured to cut through the grain when the elongated body 30 of sweep 28 is pushed forward by pusher 42.

Alternative Arrangement:

With reference to FIGS. 90-116F, an alternative arrangement of a sweep system 300 is presented that includes a skeletonized head section 32 that allows the passage of grain there through. The sweep system 300 discussed with reference to FIGS. 90-116F is similar to the system 300 discussed with reference to FIGS. 57-89 and as such all prior teaching and disclosure presented herein applies equally to this alternative arrangement shown in FIGS. 90-116F unless stated otherwise. A difference of the sweep system 300 shown in FIGS. 90-116F and the sweep system 300 shown in FIGS. 57-89 relates to shape of bars 310 and frame members 308 that form openings 312 in head section 32.

Through careful observation it has been recognized that grain may be become compacted, crust over, form clumps or otherwise form non-flowable sections during storage in grain bin 12. Such compaction or clumping may prevent grain from easily breaking up and flowing through openings 312 in head section 32 by way of gravity when grain bin 12 is emptied. In the arrangement shown, as one example, bars 310 and frame members 308 of head section 32 have a narrow planar shape with a narrow upper edges to help cut into and break up compacted or clumped grain as it contacts the upper edges of bars 310 and frame members 308.

In the arrangement shown, as one example, head section 32 includes an exposed frame 380 extending across an upper end of head section 32 between opposing side members 382 of head section 32. Exposed frame 380 is formed of any suitable size shape or design and is configured to interconnect and structurally reenforce opposing sides and opposing ends of head section 32 while providing openings 312 to promote flow of grain into and through head section 32 and into a center sump 24 to facilitate emptying of grain bin 12. In the arrangement shown, as one example, exposed frame 380 includes a plurality of frame members 308 extending between opposing side members 382 and bars 310 extending between and transverse to frame members 308. In this example arrangement, grain is able to flow through openings 312 in the spaces between side members 382, frame members 308, and bars 310.

While some arrangements are primarily described with reference to head section 32 having an exposed frame 380 formed by a set bars 310 extending transverse to of frame members 308, the embodiments are not so limited. Rather, it is contemplated that in some various different arrangements, head section 32 may have exposed frame 380 formed by bars 310, frame members 308 and/or other structures in any other arrangement that facilitates grain to flow through head section 32.

Frame Members 308 are formed of any suitable size, shape, or design and are configured to extend between and structurally support side members 382 of head section 32. In the arrangement shown, as one example, frame members 308 have an inverted V shape with planar elongated arms 386 extending downward and outward between an upper edge 402 and a lower edge 404 from a center peak 392 to bottom edges 394.

In this example arrangement, frame members 308 have a plurality of openings 398. Openings 398 are formed of any suitable size shape and design and are configured to permit bars 310 to traverse across frame members 308 through openings 398. In the arrangement shown, as one example, openings 398 have an elongated generally rectangular shape extending between opposing side edges 400 from an upper edge 402 to a lower edge 404. In this example arrangement, the shape of openings 398 is approximately the same as the shape of a cross section of bars 310.

Bars 310 are formed of any suitable size, shape, or design and are configured to extend between frame members 308. In the arrangement shown, as one example, bars 308 have an elongated generally rectangular planer shape having an upper edge 410 and a lower edge 412 extending between opposing ends 414. In the arrangement shown, bars 308 have a narrow upper edge 410 when viewed from the ends 414. That is, in the arrangement shown, as one example, bars 308 have are wider from upper edge 410 to lower edge 412 than the width of upper edge 412. In the arrangement shown, as one example, bars 308 are primarily formed in a rectangular shape, with the narrower sides of the rectangle oriented facing upward and downward. As previously discussed, the narrow upper edge 410 helps to cut into and break up compacted grain that encounters the upper edge 410. In this manner, flow of grain is improved with emptying grain bin 12.

The narrower upper edge 410 of the rectangular shaped bars 308 helps to break up compacted grain and/or clumps of grain by having a small surface area of contact. In this way, the narrower upper edge 410 cuts into the compacted grain or grain clumps in a knife-like manner. While having a narrow upper edge 410 of bars 308 has been tested with success to break up compacted grain and grain clumps, to improve this functionality in one or more arrangements, upper edge 412, rather than being flat and arranged perpendicular to the force of gravity, the upper edge 410 may be pointed and/or angled and/or formed in a knife-blade-like arrangement thereby reducing or eliminating the perpendicular upper surface 410 of bars 308. This pointed, angled, sharp or bladed upper edge 410 acts like a knife blade that cuts into compacted grain and/grain clumps thereby facilitating increased and improved flow of grain into and through head section 32.

In operation, when bars 308 engage compacted grain or grain clumps, the narrow upper surface 410 of bars 308 cut into and break up the compacted grain, thereby permitting the grain to flow into head section 32 through openings 398, and through head section into center sump 24.

In one arrangement, when bars 308 are used that have a generally rectangular shape, with the narrower side facing upward, these generally rectangular bars 308 tend to provide improved performance over bars that are generally circular or round in shape in that they tend to break up clumps of grain or compacted grain better than round bars and they provide greater spaces between adjacent bars 308. Similarly, when bars 308 are used that have a generally rectangular shape, with the narrower side facing upward, these generally rectangular bars 308 tend to provide improved performance over bars that are generally square in shape in that they tend to break up clumps of grain or compacted grain better than round bars and they provide greater spaces between adjacent bars 308. Performance can be further improved by angling or sharpening the upper edge 410 of bars 308 which helps to cut into clumps of grain.

Scraper 424:

In one or more arrangements, sweep 28 of system 300 includes a scraper 424 positioned at the outward end of tail section 34. Scraper 424 is formed of any suitable size, shape, and design and is configured to connect to the outward end of tail section 34 and is configured to redirect grain, that is positioned beyond the outward end of tail section 34, inward and behind the system 300 to a position where sweep 28 can move the grain to a sump 24 on the next pass of the sweep 28.

In the arrangement shown, as one example, scraper 424 is a generally square or rectangular generally planar member that extends a height between an upper edge 426 and a lower edge 428 and extends a length between an inner edge 430 and an outer edge 432. In the arrangement shown, as one example, scraper 424 is attached to a bracket 460 connected to sweep 28 proximate to back edge 408 at the outward end of tail section 34, In one or more arrangements, fasteners 436 extend through slots 438 in scraper 424 and holes 478 in flanges 476 of bracket 460, thereby rigidly affixing scraper 424 to the outward end of tail section 34. The position of scraper 424 may be adjusted by loosening fasteners 436 and sliding scraper 424 further outward or further rearward and then tightening the fasteners 436 again once scraper 424 is in its desired position. In this way, scraper 424 may be quickly and easily and precisely adjusted so as to ensure scraper 424 extends as close as is desired to the interior surface of sidewall 16 of grain bin 12 so as to capture as much grain as possible.

In one or more arrangements, scraper 424 includes a flexible member 442 and ridged support member 444. In this example arrangement, flexible member 442 has a generally rectangular planar shape extending between upper edge 426, lower edge 428, inner edge 430, and outer edge 432 of scraper 424. In this example arrangement, ridged support member 444 has a generally rectangular planar shape extending downward from upper edge 426 to a lower edge 446 located a distance above lower edge 428. Rigid support member 444 also extends from inner edge 430 to an outer edge 448 located a distance inward from outer edge 432 of scraper 424. In other words, lower edge 428 of scraper 424, (which may contact the floor 20 of grain bin 12 in operation) and outer edge 432 of scraper 424, (which may contact the side wall 16 of grain bin 12 in operation), are formed by a portion of flexible member 442 that extends beyond ridged support member 444. In this manner, portions of scraper 424 that may contact the elevated floor 20 and/or sidewall 16 of grain bin 12 are permitted to flex during operation to avoid causing damage.

Having outer edge 432 of scraper 424 being formed of the flexible member 442 allows a flexible leading edge (outer edge 432) that facilitates the capture of additional grain, by extending closer to, if not in contact with, the interior surface of sidewall 16 of grain bin 12 without fear of damaging the sidewall 16 if contact occurred. This is important as not all grain bins 12 are perfectly round. So, this configuration, with a scraper 424 having a flexible leading edge, allows for greater grain removal without the risk of potential damage to the grain bin 12.

Similarly, having lower edge 428 of scraper 424 being formed of the flexible member 442 allows a flexible lower edge that facilitates the capture of additional grain, by extending closer to, if not in contact with, the upper surface of floor 20 of grain bin 12 without fear of damaging the floor 20 if contact occurred. This is important as not all floors 20 of grain bins 12 are perfectly flat. So, this configuration, with a scraper 424 having a flexible leading edge, allows for greater grain removal without the risk of potential damage to the grain bin 12.

Similarly, the combination of a flexible leading edge (outer edge 432) coupled with a flexible lower edge 428 allows the scraper 424 to be as close as possible and even in contact with the interior surface of sidewall 16 provides optimum grain removal.

In one or more arrangements, scraper 424 include a flexible member 442 that is sandwiched between two ridged support members 444 positioned on opposite sides of flexible member 442. In one or more arrangements, scraper 424 include a brush 450 attached to rigid support member 444 in addition to or in lieu of flexible member 442. In this example arrangement, brush 450 has a generally rectangular planar shape having a bristles extending outward from a spine 449 that extends along outer edge 448 of rigid support member 444. In this manner, bristles of brush 450 may contact the sidewall 16 of grain bin 12 and are permitted to flex during operation to avoid causing damage while guiding grain away from sidewall 16 of grain bin 12. A similar configuration of brush 450 may be presented that extends past lower edge 446 of rigid support member 444, which scrapes and/or brushes grain on floor 20 of grain bin 12.

Bracket 460:

Bracket 460 is formed of any suitable size, shape, or design and is configured to operably connect scraper 424 to an outward end of tail section 34 of sweep 28 and provide one or more openings 484 to permit grain to be redirected by scraper 424 inward through openings 484 to a position behind sweep 28 that will be within the path of sweep 28 on the next rotation. In the arrangement shown, as one example, bracket 460 is a generally planar C-shaped bracket having an elongated forward portion 462 extending from an upper end 464 to a lower end 466, an upper arm 468 extending rearward from upper end 464 to a rearward end 470, and a lower arm 472 extending rearward from lower end 466 to a rearward end 474. In this example arrangement, bracket 460 has a pair of flanges 476 extending outward from rearward ends 470 and 474. In this example arrangement, flanges 476 extend outward from rearward ends 470 and 474 at an angle to position the scraper 424 at an angle. In this example arrangement, bracket 460 includes holes 478 to facilitate attachment of bracket 460 with sweep 28 and with scraper 424 (e.g., using bolts 480, fasteners, or other method or means for fastening).

In the arrangement shown, as one example, bracket 460 provides two openings 484 to facilitate movement of grain by scraper 424 inward through openings 484 and behind sweep 28. In this example arrangement, lower arm 472 of bracket 460 is raised above floor to provide a first opening 484 in a gap between lower arm 472 and the floor 20. In this example arrangement, bracket 460 also provides a second opening 484 in a gap between lower arm 472 and upper arm 468. However, the embodiments are not so limited. Rather, it is contemplated that in various different arrangements, bracket 460 may be shaped to provide any number of openings 484 for movement of grain, which may be located in any number of different positions.

During operation, scraper 424 captures grain as sweep 28 is moved forward, grain is moved inward along scraper 242 and directed through openings 484 to a position behind sweep 28, where the grain will be in the path of sweep 28 on the next rotation.

Support Skid(s) 500:

Although some arrangements may utilize support wheels 38 and/or carrier wheels 40 to provide support for sweep 28, the embodiments are not so limited. Rather, it is contemplated that some arrangements may additionally or alternatively utilize various other methods and means to provide support for sweep 28. For example, in one or more arrangements, sweep 28 includes one or more support skids 500.

Support skid(s) 500 are formed of any suitable size, shape, and design and are configured connect to either the leading side or trailing side of the elongated body 30 of sweep 28 and provide support to sweep 28. In the arrangement shown in FIGS. 103-105, as one example, system 10 includes a support skid 500 positioned at an end frame 152 of a section 150 of elongated body 30 proximate to an outward end of head section 32 of sweep 28. In this example arrangement, support skid 500 has a pair of generally triangular planar members having a front edge 502 and a back edge 504 extending upward from a lower edge 506 to an upper end 508. In the arrangement shown, lower edge 506 has a smooth generally planar surface with sloped portions 510 that slope upwards at a front and back ends where lower edge 506 meets front edge 502 and back edge 504. Sloped portions 510 of lower edge 506 help to prevent support skid 500 from catching on obstructions of floor 20 and help facilitate smooth sliding of support skid 500 during operation. In one or more arrangements, lower edge 506 of support skid 500 is formed of a lower friction material 512 having a lower coefficient of friction (e.g., UHMW or other low friction material).

In various arrangement, support skids 500 may be attached to sweep 28 using various means and/or methods for attachment. In one or more arrangement, as one example, support skids 500 may be attached to the leading edge 156 and/or trailing edge 158 by brackets 502 that are attached to end frames 152 of sections 150 of elongated body 30. In one or more arrangements, support skids 500 may be spaced along the length of elongated body 30 to provide support along the length of elongated body 30. In one arrangement, support skids 500 ride on a skid track positioned on top of or in floor 20.

From the above discussion it will be appreciated that the sweep system for grain bins improves upon the state of the art. More specifically, and without limitation, it will be appreciated that the sweep system for grain bins: reduces or eliminates the need for a user to enter the grain bin; works effectively; is robust; is durable; can be used with all kinds of grain; has a long useful life; can be used with an elevated floor without damaging the elevated floor; can be used with paddle sweeps, auger sweeps, or any other configuration of a sweep; effectively removes the vast majority of grain from the grain bin; is efficient to use; improves safety; can be used with practically any grain bin; does not cause sagging or collapse of the elevated floor; is high quality; and/or helps to clear clumps in the grain; operates in a robust manner, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
the elongated body having a head section positioned adjacent the inward end of the elongated body;
the elongated body having a covered section positioned outward from and adjacent to the head section;
wherein the head section includes:
a pair of opposing side members;
a plurality of frame members extending between the pair of opposing side members; and
a plurality of bars extending between the plurality of frame members;
wherein the head section includes a plurality of openings formed by the plurality of frame members and the plurality of bars;
a grain transport positioned below a floor of the grain bin;
the grain transport having a sump positioned below the head section;
the plurality of openings configured to allow grain to flow into the head section through the plurality of openings and into the sump so as to facilitate emptying of grain from the grain bin before operating the sweep apparatus.

2. The system of claim 1, wherein the plurality of bars extends in a generally transverse manner to the plurality of frame members.

3. The system of claim 1, wherein the plurality of bars extend in a generally perpendicular manner to the plurality of frame members.

4. The system of claim 1, wherein the plurality of frame members have an arch shape.

5. The system of claim 1, wherein the plurality of frame members have an inverted V-shape.

6. The system of claim 1, wherein the plurality of frame members are planar shaped.

7. The system of claim 1, wherein the plurality of bars are planar shaped.

8. The system of claim 1, wherein plurality of frame members are planar shaped; and
wherein the plurality of bars are planar shaped.

9. The system of claim 1, wherein the plurality of frame members is generally planar shaped and oriented in a vertical plane to facilitate breaking up of grain that contacts a top edge of the frame member.

10. The system of claim 1, wherein the plurality of bars is generally planar shaped and oriented in a vertical plane to facilitate breaking up of grain that contacts a top edge of the plurality of bars.

11. The system of claim 1, wherein the plurality of frame members is generally planar shaped and oriented in a vertical plane to facilitate breaking up of grain that contacts a top edge of the frame member; and wherein the plurality of bars is generally planar shaped and oriented in a vertical plane to facilitate breaking up of grain that contacts a top edge of the plurality of bars.

12. The system of claim 1, wherein the elongated body houses a sweep mechanism having a plurality of links and paddles.

13. The system of claim 1, wherein the head section is positioned above a sump in the floor of the grain bin.

14. The system of claim 1, wherein the head section is positioned above a sump in the floor of the grain bin such that grain travels through the head section and through the sump.

15. The system of claim 1, wherein the connection of the head section to the pivot point allows for vertical movement as well as angular movement as the elongated body rotates around the grain bin.

16. The system of claim 1, further comprising a pusher connected adjacent the outward end of the elongated body, the pusher having a wheel, wherein the wheel is in contact with the floor of the grain bin such that the wheel of the pusher pushes the elongated body around the pivot point.

17. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
the elongated body having a head section positioned adjacent the inward end of the elongated body;
at least one skid connected to the sweep apparatus;
the skid configured to contact a floor of the grain bin and transfer downward force from the sweep apparatus to the floor so as to support the weight of sweep apparatus on the floor;
wherein the skid is configured to slide along the floor as the elongated body rotates around the grain bin.

18. The system of claim 17, wherein the head section includes a plurality of openings configured to allow grain to flow through the head section so as to facilitate emptying of grain from the grain bin.

19. The system of claim 17, wherein the elongated body is formed primarily of a first material;
wherein a portion of the skid that contacts the floor is formed of a second material;
wherein the second material has a lower coefficient of friction than the first material to facilitate sliding of the skid on the floor.

20. The system of claim 17, wherein the elongated body is formed primarily of a metallic material;
wherein a portion of the skid that contacts the floor is formed of a non-metallic material.

21. The system of claim 17, wherein a portion of the skid that contacts the floor is formed of an ultra-high molecular weight (UHMW) material.

22. The system of claim 17, wherein the skid is connected to the elongated body; and
a floor scraper;
wherein the floor scraper is attached to a lower edge of the elongated body adjacent a rearward side of the elongated body;
wherein the floor scraper is configured to inhibit grain from passing under the lower edge of the back of the elongated body as the elongated body rotates around the grain bin.

23. The system of claim 17, wherein the skid is connected to an outward end of the head.

24. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
wherein the outward end of the elongated body travels in a circular path around the pivot point;
a scraper attached to the outward end of the elongated body;
the scraper configured to direct grain that is positioned outside of the circumference of the circular path to a position behind the elongated body that is within the circumference of the circular path as the elongated body rotates around the grain bin.

25. The system of claim 24, wherein the sweep apparatus includes a head section, wherein the head section includes a plurality of openings configured to allow grain to flow through the head section so as to facilitate emptying of grain from the grain bin.

26. The system of claim 24, wherein the scraper is attached to a rearward side of the outward end of the elongated body.

27. The system of claim 24, wherein the scraper is configured to be repositioned to adjust the distance that the scraper extends outward beyond the outward end of the elongated body.

28. The system of claim 24, wherein the scraper is a brush.

29. The system of claim 24, wherein the scraper is a flexible blade.

30. The system of claim 24, wherein the scraper is configured to contact a wall of the grain bin.

31. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
the elongated body having a head section positioned adjacent the inward end of the elongated body;
wherein the head section includes a plurality of openings configured to allow grain to flow through the head section so as to facilitate emptying of grain from the grain bin;
at least one carrier wheel positioned adjacent the outward end of the elongated body; and
wherein when the grain bin is empty of grain, the outward end of the elongated body is configured to levitate above a floor of the grain bin such that the at least one carrier wheel positioned adjacent the outward end of the elongated body is not in constant contact with the floor;
wherein when the grain bin is filled with grain, the outward end of the elongated body is pressed downward such that the at least one carrier wheel positioned adjacent the outward end of the elongated body is in constant contact with the floor.

32. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
the elongated body having a head section positioned adjacent the inward end of the elongated body;
wherein the head section includes a plurality of openings configured to allow grain to flow through the head section so as to facilitate emptying of grain from the grain bin;
at least one carrier positioned adjacent the outward end of the elongated body; and
wherein when the grain bin is empty of grain, the outward end of the elongated body is configured to levitate above a floor of the grain bin such that the at least one carrier positioned adjacent the outward end of the elongated body is not in constant contact with the floor;
wherein when the grain bin is filled with grain, the outward end of the elongated body is pressed downward such that the at least one carrier positioned adjacent the outward end of the elongated body is in constant contact with the floor.

33. A system for a grain bin, comprising:
a sweep apparatus having an elongated body;
the elongated body extending a length from an outward end to an inward end;
the inward end of the elongated body operatively connected to a pivot point;
wherein the elongated body is configured to pivot around the pivot point as the elongated body rotates around the grain bin;
the elongated body having a head section positioned adjacent the inward end of the elongated body;
wherein the head section includes a plurality of openings configured to allow grain to flow through the head section so as to facilitate emptying of grain from the grain bin; and
wherein the elongated body is sprung so as to levitate the outward end of the elongated body above a floor of the grain bin when the grain bin is empty of grain.

34. The system of claim 24, further comprising a floor scraper;
wherein the floor scraper is attached to a lower edge of the elongated body adjacent a rearward side of the elongated body;
wherein the floor scraper is configured to inhibit grain from passing under the lower edge of the back of the elongated body as the elongated body rotates around the grain bin;
wherein the floor scraper extends along the length of the elongated body.

35. The system of claim 24, further comprising a floor scraper;
wherein the floor scraper is attached to a lower edge of the elongated body adjacent a rearward side of the elongated body;
wherein the floor scraper is configured to inhibit grain from passing under the lower edge of the back of the elongated body as the elongated body rotates around the grain bin;
wherein the floor scraper is positioned adjacent the outward end of the elongated body and extends inward a distance from the outward end of the elongated body.

36. The system of claim 24, further comprising a floor scraper;
wherein the floor scraper is attached to a lower edge of the elongated body adjacent a rearward side of the elongated body;
wherein the floor scraper is configured to inhibit grain from passing under the lower edge of the back of the elongated body as the elongated body rotates around the grain bin;
wherein the floor scraper includes a brush positioned in contact with the floor.

37. The system of claim 24, further comprising a floor scraper;
wherein the floor scraper is attached to a lower edge of the elongated body adjacent a rearward side of the elongated body;
wherein the floor scraper is configured to inhibit grain from passing under the lower edge of the back of the elongated body as the elongated body rotates around the grain bin;
wherein the scraper includes a flexible blade positioned in contact with the floor.

38. The system of claim 1, wherein the plurality of openings of the head section include at least one opening positioned adjacent a forward one of the pair of opposing side members; and
wherein the plurality of openings of the head section include at least one opening positioned adjacent a rearward one of the pair of opposing side members.

39. The system of claim 1, wherein the plurality of openings of the head section include one or more openings configured to facilitate flow of grain in through a forward half of the head section; and
wherein the plurality of openings of the head section include one or more openings configured to facilitate flow of grain in through a rearward half of the head section.

* * * * *